US012579489B1

(12) United States Patent (10) Patent No.: US 12,579,489 B1
Poel et al. (45) Date of Patent: *Mar. 17, 2026

(54) METHOD AND SYSTEM FOR FACILITATING COLLABORATION SESSIONS

(71) Applicant: Steelcase Inc., Grand Rapids, MI (US)

(72) Inventors: Robert Poel, Grand Rapids, MI (US); Darrin Sculley, Byron Center, MI (US)

(73) Assignee: Steelcase Inc., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,634

(22) Filed: Apr. 17, 2024

Related U.S. Application Data

(63) Continuation of application No. 17/407,800, filed on Aug. 20, 2021, now Pat. No. 12,001,976, which is a
(Continued)

(51) Int. Cl.
*G06F 3/04842* (2022.01)
*G06Q 10/0631* (2023.01)
(52) U.S. Cl.
CPC ... *G06Q 10/06311* (2013.01); *G06F 3/04842* (2013.01)
(58) Field of Classification Search
None
See application file for complete search history.

(56) References Cited

U.S. PATENT DOCUMENTS 4,751,399 A 6/1988 Koehring
5,050,077 A 9/1991 Vincent
(Continued)

FOREIGN PATENT DOCUMENTS

AU 2011203137 A1 7/2011
AU 2013203919 A1 5/2013
(Continued)

OTHER PUBLICATIONS

Ah Kun et al., Co-Present Photo Sharing on Mobile Devices, 9th International Conference on Human Computer Interaction with Mobile Devices and Services (MobileHCI'07), 2007, pp. 277-284.
(Continued)

*Primary Examiner* — Folashade Anderson
(74) *Attorney, Agent, or Firm* — Quarles & Brady LLP

(57) ABSTRACT

A collaboration system for sharing digital content among multiple conferees during a conference session, each conferee using a personal computing device including a device display screen and a device processor, includes a wireless receiver, at least a first large common display screen providing a common emissive surface, and at least a first system processor linked to the receiver and the at least a first common display screen. The device and system processors are programmed to cooperate to provide a user interface via each device display screen, each interface including at least a first sharing field and a file queue. The processors also are programmed to visually distinguish, on each user interface, each file added to the session by one conferee from other files added by other conferees. Additionally, the processors are configured to replicate content presented in the at least a first sharing field on the large common emissive surface.

20 Claims, 116 Drawing Sheets

Related U.S. Application Data continuation of application No. 16/842,152, filed on Apr. 7, 2020, now Pat. No. 11,321,643, which is a continuation of application No. 14/640,288, filed on Mar. 6, 2015, now Pat. No. 10,664,772.

(60) Provisional application No. 62/059,602, filed on Oct. 3, 2014, provisional application No. 61/994,372, filed on May 16, 2014, provisional application No. 61/949,696, filed on Mar. 7, 2014.

(56) References Cited

U.S. PATENT DOCUMENTS

| | | | |
|---|---|---|---|
| 5,086,385 A | 2/1992 | Launey |
| 5,097,672 A | 3/1992 | Takenaka |
| 5,293,097 A | 3/1994 | Elwell |
| 5,406,176 A | 4/1995 | Sugden |
| 5,455,487 A | 10/1995 | Mix |
| 5,476,221 A | 12/1995 | Seymour |
| 5,489,827 A | 2/1996 | Xia |
| 5,570,301 A | 10/1996 | Barrus |
| 5,717,856 A | 2/1998 | Carleton |
| 5,872,924 A | 2/1999 | Nakayama |
| 5,898,579 A | 4/1999 | Boys |
| 5,915,091 A | 6/1999 | Ludwig |
| 5,933,597 A | 8/1999 | Hogan |
| 6,038,542 A | 3/2000 | Ruckdashel |
| 6,064,976 A | 5/2000 | Tolopka |
| 6,100,663 A | 8/2000 | Boys |
| 6,140,921 A | 10/2000 | Baron |
| 6,144,942 A | 11/2000 | Ruckdashel |
| 6,177,905 B1 | 1/2001 | Welch |
| 6,266,612 B1 | 7/2001 | Dussell |
| 6,266,691 B1 | 7/2001 | Watanabe |
| 6,288,716 B1 | 9/2001 | Humpleman |
| 6,297,621 B1 | 10/2001 | Hui |
| 6,304,068 B1 | 10/2001 | Hui |
| 6,342,906 B1 | 1/2002 | Kumar |
| 6,360,101 B1 | 3/2002 | Irvin |
| 6,361,173 B1 | 3/2002 | Vlahos |
| 6,424,623 B1 | 7/2002 | Borgstahl |
| 6,434,158 B1 | 8/2002 | Harris |
| 6,434,159 B1 | 8/2002 | Woodward |
| 6,466,234 B1 | 10/2002 | Pyle |
| 6,487,180 B1 | 11/2002 | Borgstahl |
| 6,501,364 B1 | 12/2002 | Hui |
| 6,532,218 B1 | 3/2003 | Shaffer |
| 6,546,419 B1 | 4/2003 | Humpleman |
| 6,548,967 B1 | 4/2003 | Dowling |
| 6,587,782 B1 | 7/2003 | Nocek |
| 6,691,029 B2 | 2/2004 | Hughes |
| 6,724,159 B2 | 4/2004 | Gutta |
| 6,760,412 B1 | 7/2004 | Loucks |
| 6,760,749 B1 | 7/2004 | Dunlap |
| 6,803,744 B1 | 10/2004 | Sabo |
| 6,839,417 B2 | 1/2005 | Weisman |
| 6,850,837 B2 | 2/2005 | Paulauskas |
| 6,888,438 B2 | 5/2005 | Hui |
| 6,906,495 B2 | 6/2005 | Cheng |
| 7,000,660 B2 | 2/2006 | Chen |
| 7,003,728 B2 | 2/2006 | Berque |
| 7,027,995 B2 | 4/2006 | Kaufman |
| 7,042,196 B2 | 5/2006 | Ka Lai |
| 7,043,532 B1 | 5/2006 | Humpleman |
| 7,084,758 B1 | 8/2006 | Cole |
| 7,124,164 B1 | 10/2006 | Chemtob |
| 7,139,976 B2 | 11/2006 | Kausik |
| 7,149,776 B1 | 12/2006 | Roy |
| 7,163,263 B1 | 1/2007 | Kurrasch |
| 7,180,503 B2 | 2/2007 | Burr |
| 7,212,414 B2 | 5/2007 | Baarman |
| 7,221,937 B2 | 5/2007 | Lau |
| 7,239,110 B2 | 7/2007 | Cheng |
| 7,248,017 B2 | 7/2007 | Cheng |
| 7,266,383 B2 | 9/2007 | Anderson |
| 7,268,682 B2 | 9/2007 | Bialecki, Jr. |
| 7,293,243 B1 | 11/2007 | Ben-Shachar |
| 7,340,769 B2 | 3/2008 | Baugher |
| 7,370,269 B1 | 5/2008 | Prabhu |
| 7,393,053 B2 | 7/2008 | Kurrasch |
| 7,394,405 B2 | 7/2008 | Godden |
| 7,421,069 B2 | 9/2008 | Vernon |
| 7,474,058 B2 | 1/2009 | Baarman |
| 7,475,078 B2 | 1/2009 | Kiilerich |
| 7,495,414 B2 | 2/2009 | Hui |
| 7,499,462 B2 | 3/2009 | MacMullan |
| 7,518,267 B2 | 4/2009 | Baarman |
| 7,519,664 B2 | 4/2009 | Karaki |
| 7,522,878 B2 | 4/2009 | Baarman |
| 7,525,283 B2 | 4/2009 | Cheng |
| 7,526,525 B2 | 4/2009 | Hagale |
| 7,554,316 B2 | 6/2009 | Stevens |
| 7,554,437 B2 | 6/2009 | Axelsen |
| 7,576,514 B2 | 8/2009 | Hui |
| 7,577,522 B2 | 8/2009 | Rosenberg |
| 7,590,941 B2 | 9/2009 | Wee |
| 7,605,496 B2 | 10/2009 | Stevens |
| 7,612,528 B2 | 11/2009 | Baarman |
| 7,615,936 B2 | 11/2009 | Baarman |
| 7,619,366 B2 | 11/2009 | Diederiks |
| 7,622,891 B2 | 11/2009 | Cheng |
| 7,634,533 B2 | 12/2009 | Rudolph |
| 7,639,110 B2 | 12/2009 | Baarman |
| 7,639,514 B2 | 12/2009 | Baarman |
| 7,639,994 B2 | 12/2009 | Greene |
| 7,643,312 B2 | 1/2010 | Vanderelli |
| 7,649,454 B2 | 1/2010 | Singh |
| 7,664,870 B2 | 2/2010 | Baek |
| 7,689,655 B2 | 3/2010 | Hewitt |
| 7,693,935 B2 | 4/2010 | Weber |
| 7,707,249 B2 | 4/2010 | Spataro |
| 7,714,537 B2 | 5/2010 | Cheng |
| 7,715,831 B2 | 5/2010 | Wakefield |
| 7,734,690 B2 | 6/2010 | Moromisato |
| 7,735,918 B2 | 6/2010 | Beck |
| 7,741,734 B2 | 6/2010 | Joannopoulos |
| 7,810,025 B2 | 10/2010 | Blair |
| 7,825,543 B2 | 11/2010 | Karalis |
| 7,844,306 B2 | 11/2010 | Shearer |
| 7,847,675 B1 | 12/2010 | Thyen |
| 7,849,135 B2 | 12/2010 | Agrawal |
| 7,863,861 B2 | 1/2011 | Cheng |
| 7,868,482 B2 | 1/2011 | Greene |
| 7,868,587 B2 | 1/2011 | Stevens |
| 7,869,941 B2 | 1/2011 | Coughlin |
| 7,873,470 B2 | 1/2011 | Baba |
| 7,881,233 B2 | 2/2011 | Bieselin |
| 7,885,925 B1 | 2/2011 | Strong |
| 7,893,953 B2 | 2/2011 | Krestakos |
| 7,896,436 B2 | 3/2011 | Kurrasch |
| 7,898,105 B2 | 3/2011 | Greene |
| 7,904,209 B2 | 3/2011 | Podgorny |
| 7,915,858 B2 | 3/2011 | Liu |
| D636,333 S | 4/2011 | Kulikowski |
| 7,925,308 B2 | 4/2011 | Greene |
| 7,925,525 B2 | 4/2011 | Chin |
| 7,932,618 B2 | 4/2011 | Baarman |
| 7,941,133 B2 | 5/2011 | Aaron |
| 7,941,753 B2 | 5/2011 | Meisels |
| 7,948,448 B2 | 5/2011 | Hutchinson |
| 7,952,324 B2 | 5/2011 | Cheng |
| 7,953,369 B2 | 5/2011 | Baarman |
| 7,965,859 B2 | 6/2011 | Marks |
| 7,973,635 B2 | 7/2011 | Baarman |
| 7,973,657 B2 | 7/2011 | Ayed |
| 7,989,986 B2 | 8/2011 | Baarman |
| 7,999,669 B2 | 8/2011 | Singh |
| 8,004,235 B2 | 8/2011 | Baarman |
| 8,021,164 B2 | 9/2011 | Epstein |
| 8,022,576 B2 | 9/2011 | Joannopoulos |
| 8,024,661 B2 | 9/2011 | Bibliowicz |
| 8,026,908 B2 | 9/2011 | Ku |
| 8,028,020 B2 | 9/2011 | Huck |
| 8,032,705 B2 | 10/2011 | Klitsner |

(56)                References Cited

U.S. PATENT DOCUMENTS

| | | | |
|---|---|---|---|
| 8,035,255 | B2 | 10/2011 | Kurs |
| 8,035,340 | B2 | 10/2011 | Stevens |
| 8,039,995 | B2 | 10/2011 | Stevens |
| 8,040,103 | B2 | 10/2011 | Hui |
| 8,041,586 | B2 | 10/2011 | Jethani |
| 8,049,301 | B2 | 11/2011 | Hui |
| 8,054,854 | B2 | 11/2011 | Poslinski |
| 8,055,310 | B2 | 11/2011 | Beart |
| 8,055,644 | B2 | 11/2011 | Crowley |
| 8,057,069 | B2 | 11/2011 | Mangiardi |
| 8,061,864 | B2 | 11/2011 | Metcalf |
| 8,069,100 | B2 | 11/2011 | Taylor |
| 8,069,465 | B1 | 11/2011 | Bartholomay |
| 8,073,614 | B2 | 12/2011 | Coughlin |
| 8,076,800 | B2 | 12/2011 | Joannopoulos |
| 8,076,801 | B2 | 12/2011 | Karalis |
| 8,081,083 | B2 | 12/2011 | Hinterlong |
| 8,084,889 | B2 | 12/2011 | Joannopoulos |
| 8,091,029 | B1 | 1/2012 | Gay |
| 8,093,758 | B2 | 1/2012 | Hussmann |
| 8,097,983 | B2 | 1/2012 | Karalis |
| 8,097,984 | B2 | 1/2012 | Baarman |
| 8,102,235 | B2 | 1/2012 | Hui |
| 8,106,539 | B2 | 1/2012 | Schatz |
| 8,112,100 | B2 | 2/2012 | Frank |
| 8,115,448 | B2 | 2/2012 | John |
| 8,116,681 | B2 | 2/2012 | Baarman |
| 8,116,683 | B2 | 2/2012 | Baarman |
| 8,117,262 | B2 | 2/2012 | Kumar |
| 8,120,311 | B2 | 2/2012 | Baarman |
| 8,126,974 | B2 | 2/2012 | Lyle |
| 8,127,155 | B2 | 2/2012 | Baarman |
| 8,129,864 | B2 | 3/2012 | Baarman |
| 8,138,875 | B2 | 3/2012 | Baarman |
| 8,140,701 | B2 | 3/2012 | Rajan |
| 8,141,143 | B2 | 3/2012 | Lee |
| 8,149,104 | B2 | 4/2012 | Crum |
| 8,150,449 | B2 | 4/2012 | Onozawa |
| 8,159,090 | B2 | 4/2012 | Greene |
| 8,164,222 | B2 | 4/2012 | Baarman |
| 8,170,946 | B2 | 5/2012 | Blair |
| 8,174,152 | B2 | 5/2012 | Baumann |
| 8,180,663 | B2 | 5/2012 | Tischhauser |
| 8,188,856 | B2 | 5/2012 | Singh |
| 8,200,520 | B2 | 6/2012 | Chen |
| 8,204,272 | B2 | 6/2012 | Marks |
| 8,204,935 | B2 | 6/2012 | Vernon |
| 8,209,618 | B2 | 6/2012 | Garofalo |
| 8,214,061 | B2 | 7/2012 | Westrick, Jr. |
| 8,219,115 | B1 | 7/2012 | Nelissen |
| 8,222,827 | B2 | 7/2012 | Kuennen |
| 8,223,508 | B2 | 7/2012 | Baarman |
| 8,228,025 | B2 | 7/2012 | Ho |
| 8,228,026 | B2 | 7/2012 | Johnson |
| 8,234,189 | B2 | 7/2012 | Taylor |
| 8,238,125 | B2 | 8/2012 | Fells |
| 8,239,890 | B2 | 8/2012 | Kooman |
| 8,259,428 | B2 | 9/2012 | Mollema |
| 8,262,244 | B2 | 9/2012 | Metcalf |
| 8,266,535 | B2 | 9/2012 | Brown |
| 8,269,456 | B2 | 9/2012 | Hui |
| 8,270,320 | B2 | 9/2012 | Boyer |
| 8,280,453 | B2 | 10/2012 | Beart |
| 8,280,948 | B1 | 10/2012 | Chen |
| 8,290,479 | B2 | 10/2012 | Aaron |
| 8,296,669 | B2 | 10/2012 | Madonna |
| 8,299,753 | B2 | 10/2012 | Hui |
| 8,300,784 | B2 | 10/2012 | Choi |
| 8,301,077 | B2 | 10/2012 | Xue |
| 8,301,079 | B2 | 10/2012 | Baarman |
| 8,301,080 | B2 | 10/2012 | Baarman |
| 8,304,935 | B2 | 11/2012 | Karalis |
| 8,315,561 | B2 | 11/2012 | Baarman |
| 8,315,621 | B2 | 11/2012 | Lau |
| 8,315,650 | B2 | 11/2012 | Lau |
| 8,324,759 | B2 | 12/2012 | Karalis |
| 8,327,410 | B2 | 12/2012 | Andersen |
| 8,338,990 | B2 | 12/2012 | Baarman |
| 8,339,274 | B2 | 12/2012 | Van De Sluis |
| 8,341,532 | B2 | 12/2012 | Ryan |
| 8,346,166 | B2 | 1/2013 | Baarman |
| 8,346,167 | B2 | 1/2013 | Baarman |
| 8,350,971 | B2 | 1/2013 | Malone |
| 8,351,856 | B2 | 1/2013 | Baarman |
| 8,352,296 | B2 | 1/2013 | Taneja |
| 8,354,821 | B2 | 1/2013 | Cheng |
| 8,362,651 | B2 | 1/2013 | Hamam |
| 8,364,400 | B2 | 1/2013 | Coughlin |
| 8,370,516 | B2 | 2/2013 | Salesky |
| 8,373,310 | B2 | 2/2013 | Baarman |
| 8,373,386 | B2 | 2/2013 | Baarman |
| 8,375,103 | B2 | 2/2013 | Lin |
| 8,380,255 | B2 | 2/2013 | Shearer |
| 8,380,786 | B2 | 2/2013 | Hoffert |
| 8,385,894 | B2 | 2/2013 | Takehara |
| 8,390,669 | B2 | 3/2013 | Catchpole |
| 8,395,282 | B2 | 3/2013 | Joannopoulos |
| 8,395,283 | B2 | 3/2013 | Joannopoulos |
| 8,400,017 | B2 | 3/2013 | Kurs |
| 8,400,018 | B2 | 3/2013 | Joannopoulos |
| 8,400,019 | B2 | 3/2013 | Joannopoulos |
| 8,400,020 | B2 | 3/2013 | Joannopoulos |
| 8,400,021 | B2 | 3/2013 | Joannopoulos |
| 8,400,022 | B2 | 3/2013 | Joannopoulos |
| 8,400,023 | B2 | 3/2013 | Joannopoulos |
| 8,400,024 | B2 | 3/2013 | Joannopoulos |
| 8,407,289 | B2 | 3/2013 | Chen |
| 8,410,636 | B2 | 4/2013 | Kurs |
| 8,415,897 | B2 | 4/2013 | Choong |
| 8,421,407 | B2 | 4/2013 | Johnson |
| 8,423,288 | B2 | 4/2013 | Stahl |
| 8,432,062 | B2 | 4/2013 | Greene |
| 8,438,333 | B2 | 5/2013 | Edwards, III |
| 8,441,154 | B2 | 5/2013 | Karalis |
| 8,441,354 | B2 | 5/2013 | Padmanabhan |
| 8,443,035 | B2 | 5/2013 | Chen |
| 8,446,046 | B2 | 5/2013 | Fells |
| 8,446,450 | B2 | 5/2013 | Mauchly |
| 8,450,877 | B2 | 5/2013 | Baarman |
| 8,456,509 | B2 | 6/2013 | Khot |
| 8,457,888 | B2 | 6/2013 | Ranford |
| 8,461,719 | B2 | 6/2013 | Kesler |
| 8,461,720 | B2 | 6/2013 | Kurs |
| 8,461,721 | B2 | 6/2013 | Karalis |
| 8,461,722 | B2 | 6/2013 | Kurs |
| 8,461,817 | B2 | 6/2013 | Martin |
| 8,466,583 | B2 | 6/2013 | Karalis |
| 8,471,410 | B2 | 6/2013 | Karalis |
| 8,473,571 | B2 | 6/2013 | Penner |
| 8,476,788 | B2 | 7/2013 | Karalis |
| 8,482,158 | B2 | 7/2013 | Kurs |
| 8,482,160 | B2 | 7/2013 | Johnson |
| 8,484,494 | B2 | 7/2013 | Siegel |
| 8,487,480 | B1 | 7/2013 | Kesler |
| 8,489,329 | B2 | 7/2013 | Coughlin |
| 8,494,143 | B2 | 7/2013 | DeJana |
| 8,497,601 | B2 | 7/2013 | Hall |
| 8,499,119 | B2 | 7/2013 | Balraj |
| 8,504,663 | B2 | 8/2013 | Lowery |
| 8,508,077 | B2 | 8/2013 | Stevens |
| 8,510,255 | B2 | 8/2013 | Fadell |
| 8,519,668 | B2 | 8/2013 | Hui |
| 8,527,549 | B2 | 9/2013 | Cidon |
| 8,527,610 | B2 | 9/2013 | Koike |
| 8,528,014 | B2 | 9/2013 | Reynolds |
| 8,531,153 | B2 | 9/2013 | Baarman |
| 8,531,294 | B2 | 9/2013 | Slavin |
| 8,533,268 | B1 | 9/2013 | Vernon |
| 8,538,330 | B2 | 9/2013 | Baarman |
| D692,010 | S | 10/2013 | Verghese |
| 8,552,592 | B2 | 10/2013 | Schatz |
| 8,554,476 | B2 | 10/2013 | Coughlin |
| 8,554,477 | B2 | 10/2013 | Coughlin |
| 8,558,411 | B2 | 10/2013 | Baarman |

(56) References Cited

U.S. PATENT DOCUMENTS

| | | | |
|---|---|---|---|
| 8,558,693 | B2 | 10/2013 | Martin |
| 8,560,024 | B2 | 10/2013 | Beart |
| 8,560,128 | B2 | 10/2013 | Ruff |
| 8,560,232 | B2 | 10/2013 | Coughlin |
| 8,567,048 | B2 | 10/2013 | Singh |
| 8,569,914 | B2 | 10/2013 | Karalis |
| 8,587,153 | B2 | 11/2013 | Schatz |
| 8,587,154 | B2 | 11/2013 | Fells |
| 8,587,155 | B2 | 11/2013 | Giler |
| 8,593,105 | B2 | 11/2013 | Baarman |
| 8,594,291 | B2 | 11/2013 | Bieselin |
| 8,596,716 | B1 | 12/2013 | Caruso |
| 8,598,721 | B2 | 12/2013 | Baarman |
| 8,598,743 | B2 | 12/2013 | Hall |
| 8,600,670 | B2 | 12/2013 | Kim |
| 8,604,714 | B2 | 12/2013 | Mohan |
| 8,610,400 | B2 | 12/2013 | Stevens |
| 8,610,530 | B2 | 12/2013 | Singh |
| 8,618,696 | B2 | 12/2013 | Kurs |
| 8,618,749 | B2 | 12/2013 | Kuennen |
| 8,618,770 | B2 | 12/2013 | Baarman |
| 8,620,484 | B2 | 12/2013 | Baarman |
| 8,620,841 | B1 | 12/2013 | Filson |
| 8,621,245 | B2 | 12/2013 | Shearer |
| D697,477 | S | 1/2014 | Jonas, III |
| 8,622,314 | B2 | 1/2014 | Fisher |
| 8,629,578 | B2 | 1/2014 | Kurs |
| 8,629,755 | B2 | 1/2014 | Hashim-Waris |
| 8,630,741 | B1 | 1/2014 | Matsuoka |
| 8,631,126 | B2 | 1/2014 | Veiseh |
| 8,638,062 | B2 | 1/2014 | Baarman |
| 8,643,326 | B2 | 2/2014 | Campanella |
| 8,650,600 | B2 | 2/2014 | Ogle |
| 8,653,927 | B2 | 2/2014 | Singh |
| 8,659,417 | B1 | 2/2014 | Trundle |
| 8,660,790 | B2 | 2/2014 | Stahl |
| 8,665,310 | B2 | 3/2014 | Verthein |
| 8,666,051 | B2 | 3/2014 | Gilzean |
| 8,667,401 | B1 | 3/2014 | Lozben |
| 8,667,452 | B2 | 3/2014 | Verghese |
| 8,669,676 | B2 | 3/2014 | Karalis |
| 8,669,844 | B2 | 3/2014 | Walker |
| 8,670,018 | B2 | 3/2014 | Cunnington |
| 8,680,960 | B2 | 3/2014 | Singh |
| 8,683,345 | B2 | 3/2014 | Lee |
| 8,686,598 | B2 | 4/2014 | Schatz |
| 8,686,647 | B2 | 4/2014 | Ono |
| 8,687,452 | B2 | 4/2014 | Kishibe |
| 8,688,100 | B2 | 4/2014 | Aaron |
| 8,690,362 | B2 | 4/2014 | Wendt |
| 8,692,410 | B2 | 4/2014 | Schatz |
| 8,692,412 | B2 | 4/2014 | Fiorello |
| 8,692,639 | B2 | 4/2014 | Baarman |
| 8,692,641 | B2 | 4/2014 | Singh |
| 8,692,642 | B2 | 4/2014 | Singh |
| 8,694,026 | B2 | 4/2014 | Forstall |
| 8,694,165 | B2 | 4/2014 | Smith |
| 8,694,597 | B1 | 4/2014 | Raj |
| 8,698,590 | B2 | 4/2014 | Singh |
| 8,698,591 | B2 | 4/2014 | Singh |
| 8,700,060 | B2 | 4/2014 | Huang |
| 8,707,546 | B2 | 4/2014 | Singh |
| 8,710,948 | B2 | 4/2014 | Singh |
| 8,712,858 | B2 | 4/2014 | Blair |
| 8,713,112 | B2 | 4/2014 | Hewitt |
| D705,745 | S | 5/2014 | Kurs et al. |
| 8,716,903 | B2 | 5/2014 | Kurs |
| 8,717,400 | B2 | 5/2014 | Ranganath |
| 8,719,070 | B2 | 5/2014 | Jabbour |
| 8,723,366 | B2 | 5/2014 | Fiorello |
| 8,729,737 | B2 | 5/2014 | Schatz |
| 8,731,116 | B2 | 5/2014 | Norconk |
| 8,737,950 | B2 | 5/2014 | Jonsson |
| 8,742,625 | B2 | 6/2014 | Baarman |
| 8,743,171 | B2 | 6/2014 | Hiller |
| 8,743,198 | B2 | 6/2014 | Padmanabh |
| 8,756,348 | B2 | 6/2014 | Beel |
| 8,760,007 | B2 | 6/2014 | Joannopoulos |
| 8,760,008 | B2 | 6/2014 | Joannopoulos |
| 8,760,265 | B2 | 6/2014 | Krueger |
| 8,766,484 | B2 | 7/2014 | Baarman |
| 8,766,485 | B2 | 7/2014 | Joannopoulos |
| 8,766,487 | B2 | 7/2014 | Dibben |
| 8,767,032 | B2 | 7/2014 | Rodman |
| 8,768,309 | B2 | 7/2014 | Robbins |
| 8,772,971 | B2 | 7/2014 | Joannopoulos |
| 8,772,972 | B2 | 7/2014 | Joannopoulos |
| 8,772,973 | B2 | 7/2014 | Kurs |
| 8,782,527 | B2 | 7/2014 | Karlson |
| 8,788,448 | B2 | 7/2014 | Fadell |
| 8,792,912 | B2 | 7/2014 | Gits |
| 8,797,159 | B2 | 8/2014 | Kirkpatrick |
| 8,810,379 | B2 | 8/2014 | Murphy |
| 8,812,028 | B2 | 8/2014 | Yariv |
| 8,813,196 | B2 | 8/2014 | Weller |
| 8,819,136 | B1 | 8/2014 | Vernon |
| 8,819,138 | B2 | 8/2014 | Houston |
| 8,825,597 | B1 | 9/2014 | Houston |
| 8,838,681 | B2 | 9/2014 | Motes |
| 8,842,153 | B2 | 9/2014 | Ranganath |
| 8,843,816 | B2 | 9/2014 | Stull |
| 8,849,914 | B2 | 9/2014 | Bove |
| 8,856,256 | B1 | 10/2014 | Srinivasan |
| 8,866,619 | B2 | 10/2014 | Knibbe |
| 8,872,432 | B2 | 10/2014 | Kercso |
| 8,875,195 | B2 | 10/2014 | Ogle |
| 8,878,439 | B2 | 11/2014 | Noguchi |
| 8,884,742 | B2 | 11/2014 | Gits |
| 8,887,069 | B2 | 11/2014 | Tipirneni |
| 8,896,656 | B2 | 11/2014 | Epstein |
| 8,898,231 | B2 | 11/2014 | Crawford |
| 8,904,293 | B2 | 12/2014 | Bastide |
| 8,909,702 | B2 | 12/2014 | Golovchinsky |
| 9,098,502 | B1 | 8/2015 | Horling |
| 9,140,555 | B1 | 9/2015 | Andersson |
| 9,176,214 | B2 | 11/2015 | Berrett et al. |
| 9,204,251 | B1 | 12/2015 | Mendelson |
| 9,247,828 | B2 | 2/2016 | Cvek |
| 9,339,106 | B2 | 5/2016 | Epstein |
| 9,380,682 | B2 | 6/2016 | Mead |
| 9,465,524 | B2 | 10/2016 | Epstein |
| 9,642,219 | B2 | 5/2017 | Mead |
| 9,703,274 | B2 | 7/2017 | Li |
| 9,716,861 | B1 | 7/2017 | Poel |
| 9,766,079 | B1 | 9/2017 | Poel |
| 9,804,731 | B1 | 10/2017 | Baloga |
| 9,852,388 | B1 | 12/2017 | Swieter |
| 9,871,978 | B1 | 1/2018 | Epstein |
| 9,877,266 | B1 | 1/2018 | Knas |
| 9,921,726 | B1 | 3/2018 | Sculley |
| 9,955,316 | B2 | 4/2018 | Jampani |
| 9,955,318 | B1 | 4/2018 | Scheper |
| 9,980,112 | B1 | 5/2018 | Newby |
| 10,021,530 | B2 | 7/2018 | Sigal |
| 10,038,952 | B2 | 7/2018 | Labrosse |
| 10,044,871 | B2 | 8/2018 | Bargetzi |
| 10,057,963 | B2 | 8/2018 | Mead |
| 10,121,113 | B1 | 11/2018 | Swieter et al. |
| 10,161,752 | B1 | 12/2018 | Poel |
| 10,225,707 | B1 | 3/2019 | Scheper |
| 10,353,664 | B2 | 7/2019 | Poel |
| 10,433,646 | B1 | 10/2019 | Schmidt et al. |
| 10,459,611 | B1 | 10/2019 | Sculley et al. |
| 10,561,006 | B2 | 2/2020 | Mead et al. |
| 10,614,694 | B1 | 4/2020 | Zwier et al. |
| 10,634,503 | B2 | 4/2020 | Hill |
| 10,664,772 | B1 | 5/2020 | Poel |
| 10,733,371 | B1 | 8/2020 | Baloga |
| 10,860,954 | B1 | 12/2020 | Yeluguri |
| 10,904,490 | B1 * | 1/2021 | Noll .................. G06F 16/9038 |
| 10,970,662 | B2 | 4/2021 | Swieter |
| 11,085,771 | B1 | 8/2021 | Scheper |
| 11,100,282 | B1 | 8/2021 | Baloga |
| 11,143,510 | B1 | 10/2021 | Poel |

(56) References Cited

U.S. PATENT DOCUMENTS

| | | | |
|---|---|---|---|
| 11,150,859 B2 | 10/2021 | Poel | |
| 11,168,987 B2 | 11/2021 | Poel | |
| 11,212,898 B2 | 12/2021 | Mead | |
| 11,280,619 B1 | 3/2022 | Scheper | |
| 11,307,037 B1 | 4/2022 | Scheper | |
| 11,321,643 B1 | 5/2022 | Poel | |
| 11,330,647 B2 | 5/2022 | Sculley | |
| 11,402,216 B1 | 8/2022 | Scheper | |
| 11,402,217 B1 | 8/2022 | Scheper | |
| 11,687,854 B1 | 6/2023 | Swieter | |
| 11,690,111 B1 | 6/2023 | Sculley | |
| 11,713,969 B1 | 8/2023 | Poel | |
| 11,744,376 B2 | 9/2023 | Schmidt | |
| 11,956,838 B1 | 4/2024 | Sculley | |
| 2001/0051885 A1 | 12/2001 | Nardulli | |
| 2002/0015097 A1 | 2/2002 | Martens | |
| 2002/0130834 A1 | 9/2002 | Madarasz | |
| 2003/0097284 A1 | 5/2003 | Shinozaki | |
| 2003/0103075 A1 | 6/2003 | Rosselot | |
| 2003/0107498 A1 | 6/2003 | Drennan | |
| 2003/0218537 A1 | 11/2003 | Hoch | |
| 2004/0001095 A1 | 1/2004 | Marques | |
| 2004/0015401 A1 | 1/2004 | Lee et al. | |
| 2004/0051644 A1 | 3/2004 | Tamayama | |
| 2004/0051813 A1 | 3/2004 | Marmaropoulos | |
| 2004/0141605 A1 | 7/2004 | Chen | |
| 2004/0153504 A1 | 8/2004 | Hutchinson | |
| 2004/0210933 A1 | 10/2004 | Dresti | |
| 2004/0215694 A1 | 10/2004 | Podolsky | |
| 2004/0261013 A1 | 12/2004 | Wynn | |
| 2005/0018826 A1 | 1/2005 | Benco | |
| 2005/0027581 A1 | 2/2005 | Kjesbu | |
| 2005/0071213 A1 | 3/2005 | Kumhyr | |
| 2005/0144259 A1* | 6/2005 | Buckley | G06F 16/95 |
| | | | 709/219 |
| 2005/0160368 A1 | 7/2005 | Liu | |
| 2005/0197877 A1 | 9/2005 | Kalinoski | |
| 2005/0218739 A1 | 10/2005 | Maddin | |
| 2005/0235329 A1 | 10/2005 | Karaoguz | |
| 2005/0273372 A1 | 12/2005 | Bowne | |
| 2005/0273493 A1 | 12/2005 | Buford | |
| 2006/0009215 A1 | 1/2006 | Bogod | |
| 2006/0015376 A1 | 1/2006 | Sattler | |
| 2006/0021363 A1 | 2/2006 | Mizukoshi | |
| 2006/0026502 A1 | 2/2006 | Dutta | |
| 2006/0045107 A1 | 3/2006 | Kucenas | |
| 2006/0080007 A1 | 4/2006 | Gerard | |
| 2006/0080432 A1 | 4/2006 | Spataro | |
| 2006/0168618 A1 | 7/2006 | Choi | |
| 2006/0218027 A1 | 9/2006 | Carrion | |
| 2007/0008181 A1 | 1/2007 | Rollert | |
| 2007/0083597 A1* | 4/2007 | Salesky | G06F 16/24 |
| | | | 709/204 |
| 2007/0094065 A1 | 4/2007 | Wu | |
| 2007/0118415 A1 | 5/2007 | Chen | |
| 2007/0136095 A1 | 6/2007 | Weinstein | |
| 2007/0162315 A1 | 7/2007 | Hodges | |
| 2007/0197239 A1 | 8/2007 | Sane | |
| 2007/0198744 A1 | 8/2007 | Wensley | |
| 2007/0216131 A1 | 9/2007 | Potappel | |
| 2007/0226034 A1 | 9/2007 | Khan | |
| 2007/0282661 A1 | 12/2007 | Franco | |
| 2007/0288291 A1 | 12/2007 | Earle | |
| 2008/0028323 A1 | 1/2008 | Rosen | |
| 2008/0091503 A1 | 4/2008 | Schirmer | |
| 2008/0120370 A1 | 5/2008 | Chan | |
| 2008/0122635 A1 | 5/2008 | Fujikawa | |
| 2008/0162198 A1 | 7/2008 | Jabbour | |
| 2008/0184115 A1 | 7/2008 | Back | |
| 2008/0201664 A1 | 8/2008 | O | |
| 2008/0239994 A1 | 10/2008 | Xiong | |
| 2008/0244417 A1 | 10/2008 | Simpson | |
| 2008/0288355 A1 | 11/2008 | Rosen | |
| 2008/0291021 A1 | 11/2008 | Bhogal | |
| 2008/0300660 A1 | 12/2008 | John | |
| 2009/0019367 A1 | 1/2009 | Cavagnari | |
| 2009/0055234 A1 | 2/2009 | Li | |
| 2009/0066486 A1 | 3/2009 | Kiekbusch | |
| 2009/0094533 A1 | 4/2009 | Bozionek | |
| 2009/0106567 A1 | 4/2009 | Baarman | |
| 2009/0146982 A1 | 6/2009 | Thielman | |
| 2009/0164581 A1 | 6/2009 | Bove | |
| 2009/0210822 A1 | 8/2009 | Schindler | |
| 2009/0212637 A1 | 8/2009 | Baarman | |
| 2009/0265280 A1 | 10/2009 | Taneja | |
| 2009/0271713 A1 | 10/2009 | Stull | |
| 2009/0286556 A1 | 11/2009 | Yumoto | |
| 2009/0300174 A1 | 12/2009 | Floris | |
| 2009/0327227 A1 | 12/2009 | Chakra | |
| 2010/0017245 A1 | 1/2010 | Kristiansen | |
| 2010/0037151 A1* | 2/2010 | Ackerman | G06Q 10/10 |
| | | | 715/753 |
| 2010/0070334 A1 | 3/2010 | Monteverde | |
| 2010/0088239 A1 | 4/2010 | Blair | |
| 2010/0102640 A1 | 4/2010 | Joannopoulos | |
| 2010/0127575 A1 | 5/2010 | Joannopoulos | |
| 2010/0133918 A1 | 6/2010 | Joannopoulos | |
| 2010/0133919 A1 | 6/2010 | Joannopoulos | |
| 2010/0133920 A1 | 6/2010 | Joannopoulos | |
| 2010/0153160 A1 | 6/2010 | Bezemer | |
| 2010/0153983 A1 | 6/2010 | Philmon | |
| 2010/0179854 A1 | 7/2010 | Shafer | |
| 2010/0187911 A1 | 7/2010 | Joannopoulos | |
| 2010/0207458 A1 | 8/2010 | Joannopoulos | |
| 2010/0219694 A1 | 9/2010 | Kurs | |
| 2010/0219791 A1 | 9/2010 | Cheng | |
| 2010/0231340 A1 | 9/2010 | Fiorello | |
| 2010/0235216 A1 | 9/2010 | Hehmeyer | |
| 2010/0256823 A1 | 10/2010 | Cherukuri | |
| 2010/0259110 A1 | 10/2010 | Kurs | |
| 2010/0274855 A1 | 10/2010 | Wassingbo | |
| 2010/0277121 A1 | 11/2010 | Hall | |
| 2010/0283600 A1 | 11/2010 | Herbert | |
| 2010/0308939 A1 | 12/2010 | Kurs | |
| 2010/0315483 A1 | 12/2010 | King | |
| 2010/0319066 A1 | 12/2010 | Berry | |
| 2011/0043049 A1 | 2/2011 | Karalis | |
| 2011/0072482 A1 | 3/2011 | Lau | |
| 2011/0074346 A1 | 3/2011 | Hall | |
| 2011/0084804 A1 | 4/2011 | Khorashadi | |
| 2011/0088056 A1 | 4/2011 | Ansari | |
| 2011/0095618 A1 | 4/2011 | Schatz | |
| 2011/0121920 A1 | 5/2011 | Kurs | |
| 2011/0126127 A1 | 5/2011 | Mariotti | |
| 2011/0149809 A1 | 6/2011 | Narayanaswamy | |
| 2011/0153738 A1 | 6/2011 | Bedingfield | |
| 2011/0223899 A1 | 9/2011 | Hiraide | |
| 2011/0225563 A1 | 9/2011 | Kim | |
| 2011/0231216 A1 | 9/2011 | Fyke | |
| 2011/0244798 A1 | 10/2011 | Daigle | |
| 2011/0267002 A1 | 11/2011 | Baarman | |
| 2011/0270952 A1 | 11/2011 | Ray | |
| 2011/0295392 A1 | 12/2011 | Cunnington | |
| 2011/0296465 A1 | 12/2011 | Krishnan | |
| 2012/0007441 A1 | 1/2012 | John | |
| 2012/0016678 A1 | 1/2012 | Gruber | |
| 2012/0022909 A1 | 1/2012 | Ayatollahi | |
| 2012/0032484 A1 | 2/2012 | Cvek | |
| 2012/0032522 A1 | 2/2012 | Schatz | |
| 2012/0062345 A1 | 3/2012 | Kurs | |
| 2012/0068549 A1 | 3/2012 | Karalis | |
| 2012/0068832 A1 | 3/2012 | Feldstein | |
| 2012/0072030 A1 | 3/2012 | Elliott | |
| 2012/0078676 A1 | 3/2012 | Adams | |
| 2012/0086284 A1 | 4/2012 | Capanella | |
| 2012/0086867 A1 | 4/2012 | Kesler | |
| 2012/0089722 A1 | 4/2012 | Enholm | |
| 2012/0091794 A1 | 4/2012 | Campanella | |
| 2012/0091795 A1 | 4/2012 | Fiorello | |
| 2012/0091796 A1 | 4/2012 | Kesler | |
| 2012/0091797 A1 | 4/2012 | Kesler | |
| 2012/0091819 A1 | 4/2012 | Kulikowski | |
| 2012/0091820 A1 | 4/2012 | Campanella | |
| 2012/0091949 A1 | 4/2012 | Campanella | |

(56) References Cited

U.S. PATENT DOCUMENTS

| | | |
|---|---|---|
| 2012/0091950 A1 | 4/2012 | Campanella |
| 2012/0098350 A1 | 4/2012 | Campanella |
| 2012/0112531 A1 | 5/2012 | Kesler |
| 2012/0112532 A1 | 5/2012 | Kesler |
| 2012/0112534 A1 | 5/2012 | Kesler |
| 2012/0112535 A1 | 5/2012 | Karalis |
| 2012/0112536 A1 | 5/2012 | Karalis |
| 2012/0112538 A1 | 5/2012 | Kesler |
| 2012/0112668 A1 | 5/2012 | Van de Sluis |
| 2012/0112691 A1 | 5/2012 | Kurs |
| 2012/0119569 A1 | 5/2012 | Karalis |
| 2012/0119575 A1 | 5/2012 | Kurs |
| 2012/0119576 A1 | 5/2012 | Kesler |
| 2012/0119698 A1 | 5/2012 | Karalis |
| 2012/0136572 A1 | 5/2012 | Norton |
| 2012/0139355 A1 | 6/2012 | Ganem |
| 2012/0143639 A1 | 6/2012 | Rollert |
| 2012/0184338 A1 | 7/2012 | Kesler |
| 2012/0192084 A1* | 7/2012 | Dura .................... G06F 3/0481 |
| | | 715/762 |
| 2012/0204272 A1 | 8/2012 | Svensson |
| 2012/0206050 A1 | 8/2012 | Spero |
| 2012/0206096 A1 | 8/2012 | John |
| 2012/0216129 A1 | 8/2012 | Ng |
| 2012/0223573 A1 | 9/2012 | Schatz |
| 2012/0228952 A1 | 9/2012 | Hall |
| 2012/0228953 A1 | 9/2012 | Kesler |
| 2012/0228954 A1 | 9/2012 | Kesler |
| 2012/0228960 A1 | 9/2012 | Karalis |
| 2012/0229592 A1 | 9/2012 | White |
| 2012/0233205 A1 | 9/2012 | McDermott |
| 2012/0235500 A1 | 9/2012 | Ganem |
| 2012/0235501 A1 | 9/2012 | Kesler |
| 2012/0235502 A1 | 9/2012 | Kesler |
| 2012/0235503 A1 | 9/2012 | Kesler |
| 2012/0235504 A1 | 9/2012 | Kesler |
| 2012/0235505 A1 | 9/2012 | Schatz |
| 2012/0235566 A1 | 9/2012 | Karalis |
| 2012/0235633 A1 | 9/2012 | Kesler |
| 2012/0235634 A1 | 9/2012 | Hall |
| 2012/0239117 A1 | 9/2012 | Kesler |
| 2012/0239202 A1 | 9/2012 | Voysey |
| 2012/0242159 A1 | 9/2012 | Lou |
| 2012/0243158 A1 | 9/2012 | Gentil |
| 2012/0248886 A1 | 10/2012 | Kesler |
| 2012/0248887 A1 | 10/2012 | Kesler |
| 2012/0248888 A1 | 10/2012 | Kesler |
| 2012/0248981 A1 | 10/2012 | Karalis |
| 2012/0254909 A1 | 10/2012 | Serdiuk |
| 2012/0256494 A1 | 10/2012 | Kesler |
| 2012/0274586 A1 | 11/2012 | Southworth |
| 2012/0284672 A1 | 11/2012 | Madonna |
| 2012/0313449 A1 | 12/2012 | Kurs |
| 2012/0313742 A1 | 12/2012 | Kurs |
| 2012/0324589 A1 | 12/2012 | Nukala |
| 2012/0331108 A1 | 12/2012 | Ferdowsi |
| 2012/0331394 A1 | 12/2012 | Trombley-Shapiro |
| 2013/0007949 A1 | 1/2013 | Kurs |
| 2013/0013750 A1 | 1/2013 | Butler |
| 2013/0018952 A1 | 1/2013 | McConnell |
| 2013/0018953 A1 | 1/2013 | McConnell |
| 2013/0020878 A1 | 1/2013 | Karalis |
| 2013/0033118 A1 | 2/2013 | Karalis |
| 2013/0038402 A1 | 2/2013 | Karalis |
| 2013/0041973 A1 | 2/2013 | Zhou |
| 2013/0054863 A1 | 2/2013 | Imes |
| 2013/0057364 A1 | 3/2013 | Kesler |
| 2013/0062966 A1 | 3/2013 | Verghese |
| 2013/0069441 A1 | 3/2013 | Verghese |
| 2013/0069543 A1 | 3/2013 | Mohan |
| 2013/0069753 A1 | 3/2013 | Kurs |
| 2013/0073094 A1 | 3/2013 | Knapton |
| 2013/0080255 A1 | 3/2013 | Li |
| 2013/0088154 A1 | 4/2013 | Van Hoof |
| 2013/0099587 A1 | 4/2013 | Lou |
| 2013/0113249 A1 | 5/2013 | Cvek |
| 2013/0117158 A1 | 5/2013 | Cvek |
| 2013/0157509 A1 | 6/2013 | Srivastava |
| 2013/0167039 A1 | 6/2013 | Howell |
| 2013/0171981 A1 | 7/2013 | Woo |
| 2013/0175874 A1 | 7/2013 | Lou |
| 2013/0181541 A1 | 7/2013 | Karalis |
| 2013/0198653 A1 | 8/2013 | Tse |
| 2013/0199420 A1 | 8/2013 | Hjelm |
| 2013/0200721 A1 | 8/2013 | Kurs |
| 2013/0208186 A1 | 8/2013 | Malone |
| 2013/0218829 A1 | 8/2013 | Martinez |
| 2013/0221744 A1 | 8/2013 | Hall |
| 2013/0234481 A1 | 9/2013 | Johnson |
| 2013/0234531 A1 | 9/2013 | Budgett |
| 2013/0241439 A1 | 9/2013 | Nishigaki |
| 2013/0246901 A1 | 9/2013 | Massano |
| 2013/0249410 A1 | 9/2013 | Thompson |
| 2013/0262687 A1 | 10/2013 | Avery |
| 2013/0278073 A1 | 10/2013 | Kurs |
| 2013/0278074 A1 | 10/2013 | Kurs |
| 2013/0278075 A1 | 10/2013 | Kurs |
| 2013/0278631 A1 | 10/2013 | Border |
| 2013/0283325 A1 | 10/2013 | Chiniara |
| 2013/0300353 A1 | 11/2013 | Kurs |
| 2013/0304924 A1 | 11/2013 | Dhara |
| 2013/0307349 A1 | 11/2013 | Hall |
| 2013/0314543 A1 | 11/2013 | Sutter |
| 2013/0320773 A1 | 12/2013 | Schatz |
| 2013/0325526 A1 | 12/2013 | Tyler |
| 2013/0334892 A1 | 12/2013 | Hall |
| 2013/0334973 A1 | 12/2013 | Wagenaar Cacciola |
| 2014/0002012 A1 | 1/2014 | McCauley |
| 2014/0021798 A1 | 1/2014 | Kesler |
| 2014/0026025 A1 | 1/2014 | Smith |
| 2014/0028112 A1 | 1/2014 | Hui |
| 2014/0032327 A1 | 1/2014 | Prakash |
| 2014/0035378 A1 | 2/2014 | Kesler |
| 2014/0035704 A1 | 2/2014 | Efe |
| 2014/0044281 A1 | 2/2014 | Ganem |
| 2014/0044293 A1 | 2/2014 | Ganem |
| 2014/0046713 A1 | 2/2014 | Harvey |
| 2014/0046716 A1 | 2/2014 | Black et al. |
| 2014/0049118 A1 | 2/2014 | Karalis |
| 2014/0052974 A1 | 2/2014 | Masters |
| 2014/0054961 A1 | 2/2014 | Metcalf |
| 2014/0058778 A1 | 2/2014 | McLarty |
| 2014/0062211 A1 | 3/2014 | Hamam |
| 2014/0067865 A1 | 3/2014 | Kirigin |
| 2014/0074930 A1 | 3/2014 | Kumashio |
| 2014/0084703 A1 | 3/2014 | Hall |
| 2014/0084859 A1 | 3/2014 | Hall |
| 2014/0091636 A1 | 4/2014 | Ofstein |
| 2014/0091756 A1 | 4/2014 | Ofstein |
| 2014/0103738 A1 | 4/2014 | Campanella |
| 2014/0108084 A1 | 4/2014 | Bargetzi |
| 2014/0108956 A1 | 4/2014 | Varenhorst |
| 2014/0109210 A1 | 4/2014 | Borzycki |
| 2014/0111304 A1 | 4/2014 | Hashim-Waris |
| 2014/0135648 A1 | 5/2014 | Holoien |
| 2014/0139426 A1 | 5/2014 | Kryze |
| 2014/0149519 A1 | 5/2014 | Redfern |
| 2014/0150059 A1 | 5/2014 | Uchida |
| 2014/0159589 A1 | 6/2014 | Pandharipande |
| 2014/0159652 A1 | 6/2014 | Hall |
| 2014/0164934 A1* | 6/2014 | Yang .................... G06Q 50/01 |
| | | 715/738 |
| 2014/0167618 A1 | 6/2014 | Wang |
| 2014/0175898 A1 | 6/2014 | Kurs |
| 2014/0181704 A1 | 6/2014 | Madonna |
| 2014/0181935 A1 | 6/2014 | Beckmann |
| 2014/0195149 A1 | 7/2014 | Yang |
| 2014/0195291 A1 | 7/2014 | Aaron |
| 2014/0195805 A1 | 7/2014 | Koo |
| 2014/0203659 A1 | 7/2014 | Madawala |
| 2014/0203921 A1 | 7/2014 | Baker |
| 2014/0215551 A1 | 7/2014 | Allain |
| 2014/0217785 A1 | 8/2014 | Arens |
| 2014/0223313 A1 | 8/2014 | Aebi |

(56) References Cited

U.S. PATENT DOCUMENTS

| | | |
|---|---|---|
| 2014/0225978 A1 | 8/2014 | Saban |
| 2014/0229578 A1 | 8/2014 | Chu |
| 2014/0236659 A1 | 8/2014 | Hapse |
| 2014/0244043 A1 | 8/2014 | Foster |
| 2014/0244678 A1 | 8/2014 | Zamer |
| 2014/0253813 A1 | 9/2014 | Bakar |
| 2014/0259047 A1 | 9/2014 | Bakar |
| 2014/0269531 A1 | 9/2014 | Luna |
| 2014/0274005 A1 | 9/2014 | Luna |
| 2014/0277757 A1 | 9/2014 | Wang |
| 2014/0277763 A1 | 9/2014 | Ramachandran |
| 2014/0278057 A1 | 9/2014 | Berns |
| 2014/0282013 A1 | 9/2014 | Amijee |
| 2014/0285113 A1 | 9/2014 | Huang |
| 2014/0297758 A1 | 10/2014 | Kidron |
| 2014/0300277 A1 | 10/2014 | Ono |
| 2014/0302795 A1 | 10/2014 | Chacon |
| 2014/0354429 A1 | 12/2014 | Henderson |
| 2014/0365568 A1 | 12/2014 | Huang |
| 2015/0005011 A1 | 1/2015 | Nehrenz |
| 2015/0012843 A1 | 1/2015 | Ouyang et al. |
| 2015/0015399 A1 | 1/2015 | Gleckler |
| 2015/0035440 A1 | 2/2015 | Spero |
| 2015/0069915 A1 | 3/2015 | Ogawa |
| 2015/0085063 A1 | 3/2015 | Fish |
| 2015/0149929 A1 | 5/2015 | Shepherd |
| 2015/0179012 A1 | 6/2015 | Sharpe |
| 2015/0193739 A1 | 7/2015 | Min |
| 2015/0195620 A1 | 7/2015 | Buchner et al. |
| 2015/0200982 A1 | 7/2015 | Velagaleti |
| 2015/0201480 A1 | 7/2015 | Ogawa |
| 2015/0229644 A1 | 8/2015 | Nozawa |
| 2015/0234468 A1* | 8/2015 | Hwang ............... G06F 3/0486 |
| | | 345/156 |
| 2015/0296594 A1 | 10/2015 | Blum |
| 2015/0301727 A1 | 10/2015 | Miyazawa |
| 2015/0321590 A1 | 11/2015 | Mizoi |
| 2015/0324754 A1 | 11/2015 | Bathiya |
| 2015/0330780 A1 | 11/2015 | Yuzawa |
| 2015/0369612 A1 | 12/2015 | Nishimura |
| 2015/0370272 A1 | 12/2015 | Reddy |
| 2016/0026253 A1 | 1/2016 | Bradski et al. |
| 2016/0044071 A1 | 2/2016 | Sandholm |
| 2016/0049064 A1 | 2/2016 | McNabb |
| 2016/0162844 A1 | 6/2016 | Rachuri |
| 2016/0171566 A1 | 6/2016 | Pugh |
| 2016/0231731 A1 | 8/2016 | Carver |
| 2016/0253048 A1 | 9/2016 | Silcock |
| 2016/0304013 A1 | 10/2016 | Wolas |
| 2016/0327922 A1 | 11/2016 | Sekiguchi |
| 2016/0342950 A1 | 11/2016 | Pignataro |
| 2017/0046113 A1 | 2/2017 | Noyes et al. |
| 2017/0060350 A1 | 3/2017 | Zheng et al. |
| 2017/0083275 A1 | 3/2017 | Shin |
| 2017/0208664 A1 | 7/2017 | Mead |
| 2017/0223312 A1 | 8/2017 | McNelley |
| 2017/0238401 A1 | 8/2017 | Sadwick |
| 2017/0293458 A1 | 10/2017 | Poel |
| 2017/0314803 A1 | 11/2017 | Jacobson |
| 2018/0004178 A1 | 1/2018 | Haines |
| 2018/0107444 A1 | 4/2018 | Dunn |
| 2018/0137369 A1 | 5/2018 | Roth |
| 2018/0143025 A1 | 5/2018 | Kurata |
| 2019/0004178 A1 | 1/2019 | Motoyama et al. |
| 2019/0053012 A1 | 2/2019 | Hill |
| 2019/0118838 A1 | 4/2019 | Lequio |
| 2019/0141291 A1 | 5/2019 | McNelley |
| 2019/0272141 A1 | 9/2019 | Poel |
| 2019/0294018 A1 | 9/2019 | Shrivastava |
| 2019/0370700 A1 | 12/2019 | Ludwig |
| 2020/0007921 A1 | 1/2020 | Ojala |
| 2020/0049509 A1 | 2/2020 | Hill |
| 2020/0096346 A1 | 3/2020 | Dhandapani |
| 2020/0096573 A1 | 3/2020 | Cha |
| 2020/0116493 A1 | 4/2020 | Colburn |
| 2020/0250879 A1 | 8/2020 | Foster |
| 2020/0272163 A1 | 8/2020 | Ha |
| 2021/0027208 A1 | 1/2021 | Clark |
| 2021/0392290 A1 | 12/2021 | McNelley et al. |

FOREIGN PATENT DOCUMENTS

| | | |
|---|---|---|
| AU | 2013203947 A1 | 5/2013 |
| CN | 102239633 A | 11/2011 |
| CN | 102439669 A | 5/2012 |
| CN | 102870338 A | 1/2013 |
| EP | 0935263 A2 | 8/1999 |
| EP | 2367146 A1 | 9/2011 |
| EP | 2388977 A1 | 11/2011 |
| EP | 2439686 A1 | 4/2012 |
| KR | 20140007006 A | 1/2014 |
| WO | 2007008646 A2 | 1/2007 |
| WO | 2008118178 A1 | 10/2008 |
| WO | 2009085896 A1 | 7/2009 |
| WO | 2009108958 A1 | 9/2009 |
| WO | 2009108959 A1 | 9/2009 |
| WO | 2010093997 A1 | 8/2010 |
| WO | 2011034759 A2 | 3/2011 |
| WO | 2011099873 A1 | 8/2011 |
| WO | 2011112795 A1 | 9/2011 |
| WO | 2012037279 A1 | 3/2012 |
| WO | 2012170278 A3 | 12/2012 |
| WO | 2013008252 A2 | 1/2013 |
| WO | 2013059441 A1 | 4/2013 |
| WO | 2013112185 A2 | 8/2013 |
| WO | 2013122483 A1 | 8/2013 |
| WO | 2014007656 A1 | 1/2014 |
| WO | 2014011059 A1 | 1/2014 |
| WO | 2014035260 A1 | 3/2014 |
| WO | 2014035263 A1 | 3/2014 |
| WO | 2014038966 A1 | 3/2014 |
| WO | 2014054953 A1 | 4/2014 |
| WO | 2014094107 A1 | 6/2014 |
| WO | 2014139781 A2 | 9/2014 |
| WO | 2017142541 A1 | 8/2017 |
| WO | 2019133264 A1 | 7/2019 |

OTHER PUBLICATIONS

Cisco, WebEx Meeting Center User Guide For Hosts, Presenters, and Participants, Version 8.23, Copyright 1997-2011 Cisco and/or its affiliates.

Citrix, GoToMeeting User Guide, Copyright 2015 Citrix Systems.

Citrix, GoToWebinar User Guide, Copyright 2015 Citrix Systems.

CiviCRM Books: User and Administrator Guide for Version 4.5, Published Sep. 2014, http://book.civicrm.org/user/current/email/scheduled-reminders/.

Davis, A Careful Return: How A Global Pandemic Changed a Workplace Design Firm's Office Spaces—And Its Business Direction Toward Safety-Tech Solutions, AV Technology, 2020, 13(6), 15(3), https://dialog.proquest.com/professional/printviewfile?accountid= 131444, 3 pages.

Events and Room Reserve Scheduled Task Setup for Email Notifications, Article No. 268, Apr. 22, 2013, http://kb.evanced.info/article.php?id=268.

Greenberg et al., The Notification Collage: Posting Information to Public and Personal Displays, Proceedings of the ACM Conference on Human Factors in Computing Systems, [CHI Letters 3(1)], pp. 514-521.

Join.me forum and FAQ, Apr. 3, 2014.

Krumm et al., The NearMe Wireless Proximity Server, UbiComp 2004, The Sixth International Conference on Ubiquitous Computing, pp. 283-300, Sep. 7-10, 2004.

Lee, TechnicLee—My Thoughts on Technology, Business, and Innovation, Posted in Outlook, Scripting, Jan. 20, 2012, http://techniclee.wordpress.com/2012/01/20/sending-a-meeting-reminder-email-in-outlook/.

Lomas et al., Collaboration Tools, Educause Learning Initiative, 2008, 2(11):1-11.

(56)     References Cited

OTHER PUBLICATIONS

Marrinan et al., SAGE2: A New Approach for Data Intensive Collaboration Using Scalable Resolution Shared Displays, 10th IEEE International Conference on Collaborative Computing: Networking, Applications and Worksharing, 2014, pp. 177-186.

NFS Technology Group, Rendezvous—Technology for Meeting Room, Desk Scheduling and Event Management, http://myrendezvous.net/rendezvous-event-booking-software/calendar-management/, Mar. 1, 2016, 2 pages.

Oracle Communications, Oracle Data Sheet—Calendar Server, Copyright 2015 Oracle and/or its affiliates, http://www.oracle.com/us/industries/communications/communications-calendar-server-ds-071728.pdf.

Stirworks, Inc., The Height-Adjustable, Standing Stir Kinetic Desk, http://www.stirworks.com/, Copyright 2015 Stirworks, Inc., 6 pages.

Tam et al., A Framework for Asynchronous Change Awareness in Collaborative Documents and Workspaces, International Journal of Human-Computer Studies, 2006, 64:583-598.

* cited by examiner

Jim Eisner
Director Digital
Ventures

1100

1102

1120

1122

1130

1132

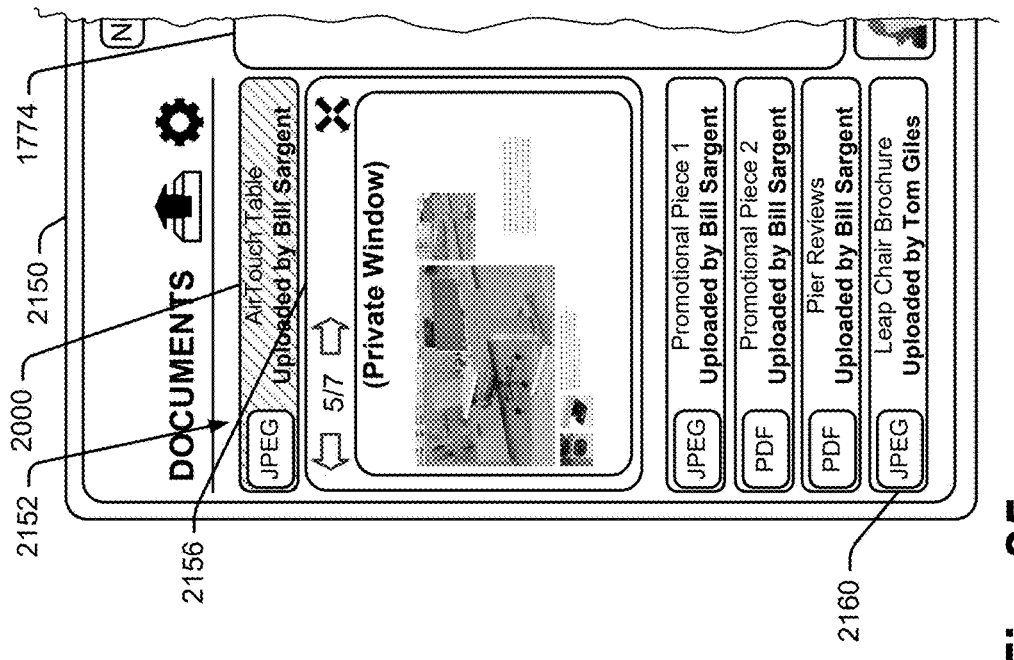
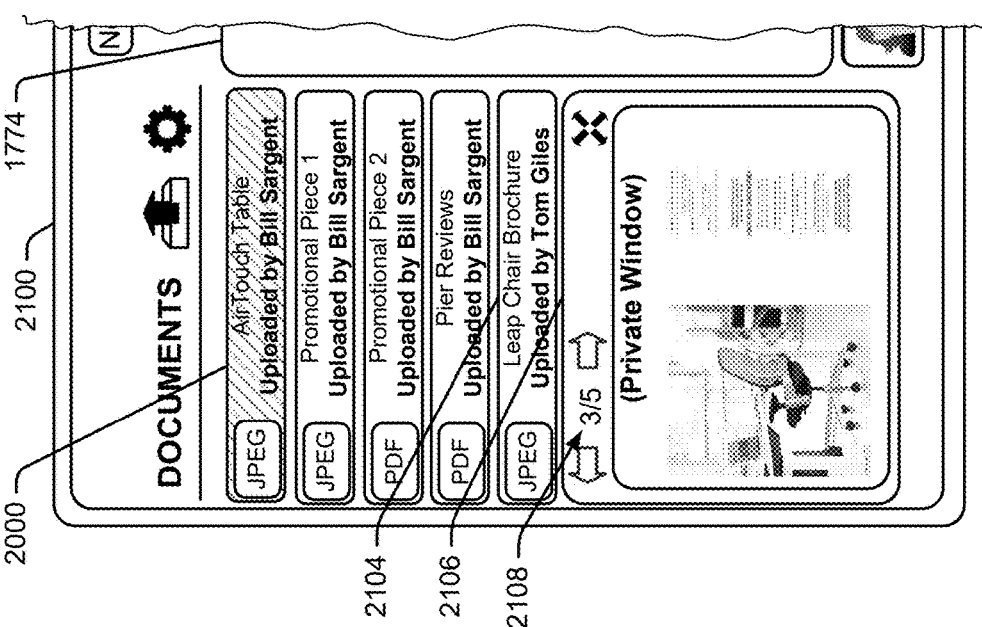
Fig. 85

2222 —   — 2220

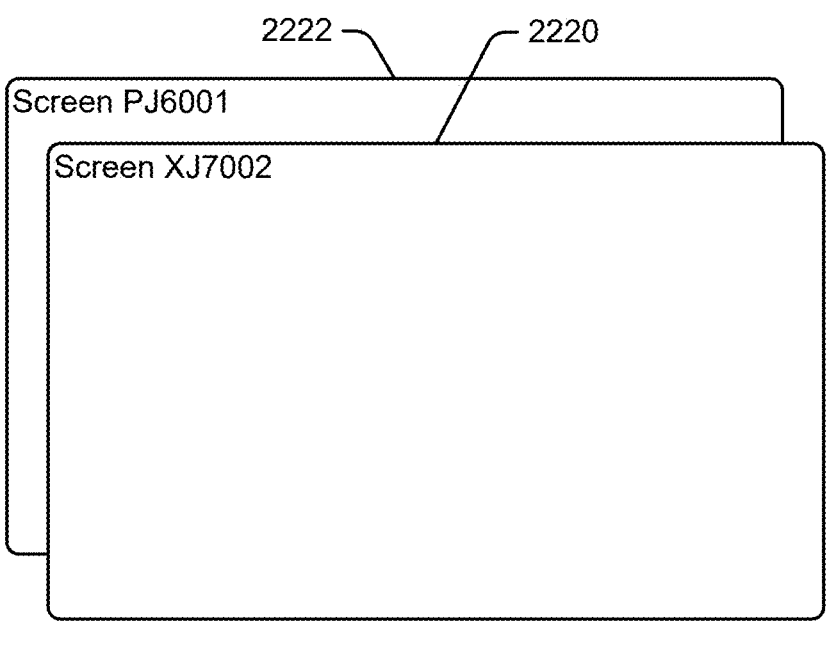

Screen PJ6001

Screen XJ7002

2230 —   2231 —   2226 —   — 2224

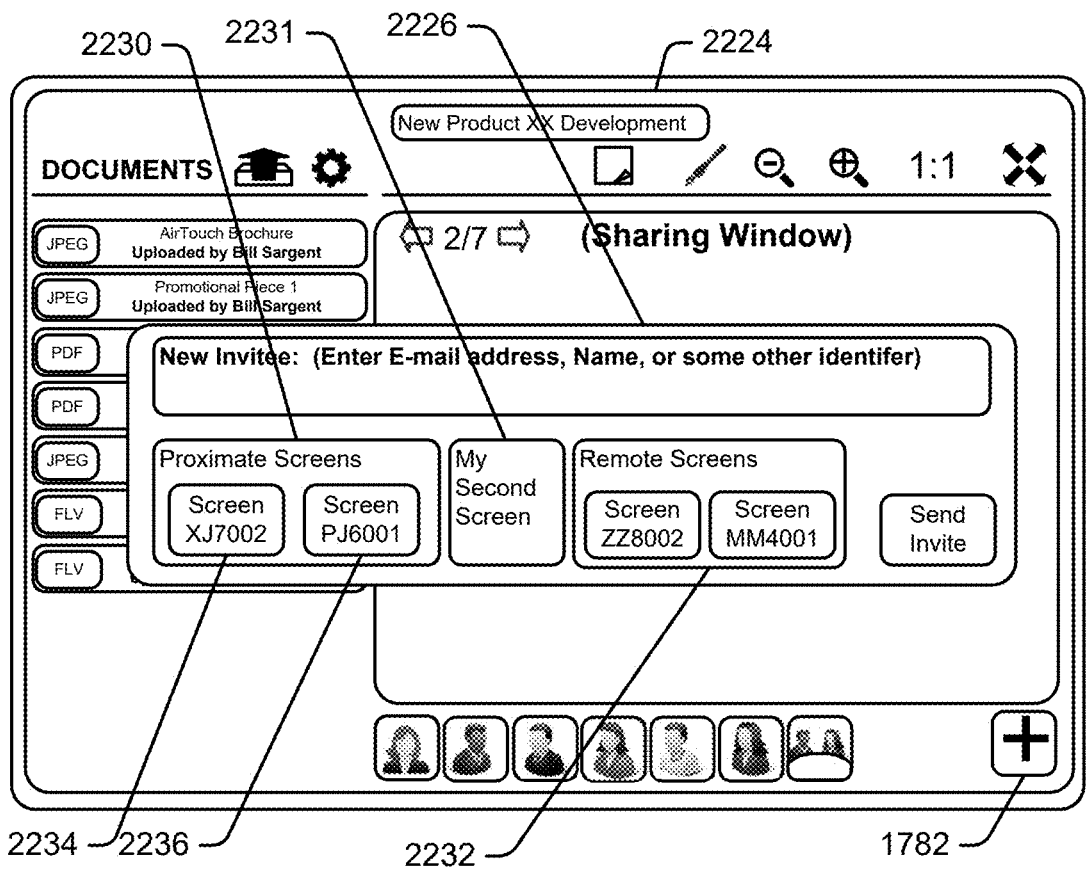

New Product XX Development

DOCUMENTS ⬆ ⚙    ▢   ✎   ⊖   ⊕   1:1   ✖

| JPEG | AirTouch Brochure<br>Uploaded by Bill Sargent |
| JPEG | Promotional Piece 1<br>Uploaded by Bill Sargent |
| PDF | |
| PDF | |
| JPEG | |
| FLV | |
| FLV | |

◁ 2/7 ▷    (Sharing Window)

New Invitee: (Enter E-mail address, Name, or some other identifer)

Proximate Screens

| Screen XJ7002 | Screen PJ6001 |

My Second Screen

Remote Screens

| Screen ZZ8002 | Screen MM4001 |

Send Invite

Start

2262 — Join Session And View Session Screen Via Conferee Device

2264 — Cache Session Files At Conferee Device

2266 — Plug Dongle Into Large Common Screen

2268 — Present Screen Address/Identifier Via Display

2270 — Enter Screen Address Into Personal Device And Invite Screen

2272 — Link Session To Common Screen

2274 — Cache Session Files At Common Screen

2276 — Continue Session

2027

2255

Cancel Desktop Share

2277

Word Processor

Session Browser

2239

METHOD AND SYSTEM FOR FACILITATING COLLABORATION SESSIONS

CROSS-REFERENCE TO RELATED APPLICATIONS

This application is a continuation of U.S. patent application Ser. No. 17/407,800, which is titled "Method and System for Facilitating Collaboration Sessions," which was filed on Aug. 20, 2021, which is a continuation of U.S. patent application Ser. No. 16/842,152, which is titled "Method and System for Facilitating Collaboration Sessions," which was filed on Apr. 7, 2020, which is a continuation of U.S. patent application Ser. No. 14/640,288, which is titled "Method and System for Facilitating Collaboration Sessions," which was filed on Mar. 6, 2015, which is related to and claims the benefit of priority to U.S. provisional patent application No. 62/059,602, which is titled "Method and System for Locating Resources and Communicating Within an Enterprise," and which was filed on Oct. 3, 2014, U.S. provisional patent application No. 61/994,372, which is titled "Method and System for Facilitating Collaboration Sessions," and which was filed on May 16, 2014, and U.S. provisional patent application No. 61/949,696 which is titled "Method and System for Initiation and Creation of Collaboration Session," and which was filed on Mar. 7, 2014.

BACKGROUND OF THE DISCLOSURE

The field of the disclosure is resource tracking and more specifically systems and methods for identifying available resources including, among other things, space, people and equipment associated with an enterprise and obtaining access to those resources.

The present disclosure also relates generally to network-based systems for electronic collaboration sessions with at least some conferees participating from remote locations and more specifically to a system that enables a session to be initiated or scheduled and populated with content using software tools that are already familiar to most computer and communication network users.

The disclosure also describes a system that enables conferees associated with a session to add documents and files to a session queue at any time after a session is instantiated so that the queue provides a persistent repository for content related to the session that can be accessed at any time by one, a subset or all conferees associated with the session. The content including documents or files can be obtained from any digital source. Any conferee can invite any other person to associate with a session after which the invitee has full session privileges in at least some embodiments. The disclosed system, in at least some embodiments, enables conferees to control shared content during a conference in an egalitarian fashion where any conferee can open any content from the queue to share at any time and where each conferee also has the ability to independently view any document in a private window alongside a sharing window.

Conferences and meetings have evolved from gatherings or sessions in conference rooms where participants met in person in the same physical location to electronic collaboration sessions where conferees can attend and substantially fully participate in sessions electronically or "on line" from remote locations. To this end, tools have been developed that enable remote conferees to appear via audio and/or video to other conferees and to view and hear other conferees via video and audio, respectively. Tools have also been developed that enable remote conferees to share content such as documents, images, video clips, application output, web sites, etc., with other conference attendees.

One now ubiquitous content sharing tool is electronic mail commonly referred to as E-mail. As well known to almost all computer users, E-mail enables users to transmit and memorialize communications between two or more persons and also to share content (e.g., documents, images, video clips, etc.) via attachment to E-mail messages. Essentially all E-mail programs have similar features (e.g., fields, tool bars, etc.) that computer users are extremely familiar with. Familiarity with E-mail has resulted in widespread use.

While on line collaboration and communication sessions have proven very useful, known collaboration tools have several shortcomings. First, known collaboration tools often require several steps in order to set up and manage a session. For instance, assume a session initiator intends to invite seven other conferees to a session at 8 AM on Tuesday and that the session initiator, while thinking about the session, decides that the initiator wants to refer to several different sets of content during the session including two word processor documents, a video clip and two spreadsheets showing sales figures for a prior quarter and a current quarter business cycle. Here, in order to set up the session, in many cases a session initiator has to use scheduling software to schedule the session and send invitations to the seven other conferees to be invited to the session. In addition, the initiator will likely have to select and send each of the five sets of content to be delivered to the other session conferees prior to the session so that the other conferees can access that information during the session. Hereinafter, unless indicated otherwise, a content set will be referred to as a file or a record. To expedite access by other conferees the initiator may attach all five files to be shared to a single E-mail to be transmitted to the other conferees. Upon receiving the scheduling notice, each of the seven conferees needs to open the notice and accept the session to be scheduled on their calendars.

Now assume that two days after initially scheduling the Tuesday 8 AM session, the initiator identifies two other files (e.g., another word processor document and a drawing generated via a drawing application) that the initiator intends to share with others during the session. Here, the initiator may attach the other two files to another E-mail, reselect the seven other conferees and send the other files to the other conferees.

Assume that one day before the session is to commence, the conference initiator determines that one of the original five files should be swapped out and replaced by another file (e.g., perhaps a new version of the file being swapped out). Here, the initiator may send yet another E-mail to the invitees including the new file and, perhaps, a note that one of the original files should be ignored.

Also, assume that upon receiving the invite to the Tuesday 8 AM session, a first and a second of the other conferees each identifies other files that they would like to share during the session. Here, each of the first and second other conferees may attach additional files to E-mails to the other conferees and send their files with a note indicating a desire to share the files.

Next assume that two of the seven conferees invited are not available for the session. Here, the initiator may invite two other substitute conferees to the session (e.g., proxies for the two originally invited conferees that cannot attend). In this case, the initiator would also have to forward files to be shared to each of the two proxies. In addition, each other conferee that intends to share files would also have to forward files to the two proxies.

Once a session starts, all conferees connect to the session for sharing. Here, connection often requires each conferee to call into a session for audio and/or video communication. In at least some cases, during a session, each conferee is required to access shared files separately by opening E-mail attachments as other conferees refer to different files. Here, where multiple conferees shared files in different E-mails, keeping all conferees "on the same page" can be a burdensome task at best as conferees have to independently access the previously sent E-mails, access specific files currently being discussed in an accessed E-mail and then switch between files and among pages or portions of specific files as other files and sections of files are referenced.

To reduce the complexities associated with scheduling a session and synchronizing shared content during a session, systems have been developed that enable conferees to simultaneously view content shared by other conferees. For instance, web-based conferencing software has been developed whereby conferees can share files, applications, etc., by sharing output presented on display screens of their personal computing devices (e.g., desktop computers, laptop computers, tablet type computers, smart phone or personal digital assistant type computers, etc.). Here, in addition to creating an audio and/or video link between conferees, an internet or other network link is created for sharing the content where all conferees link to a session run by a server.

Some web-based systems enable a conference initiator to earmark files including documents and other content to be shared in a session so that the files can easily be accessed by the initiator during a session. For instance, where an initiator intends to share seven files, each of the seven files can be linked to the session for access by the initiator. Where an invited conferee intends to share two files, the conferee can access those files during the session period and share the files with other conferees.

While web-based systems solve some of the problems associated with prior systems, they still have several shortcomings. For instance, to initiate a session, many known systems require a conferee to pre-register with a session server to create a system account. This process often requires entry of personal information as well as a process to establish some type of linkage to a user's electronically stored contact list(s), a process to establish a link to files controlled by the conferee, and requires at least some time commitment by the conferee to enter the information and for the server to set up the account.

As another instance, after an account has been set up, to initiate a session, a conferee needs to access a system software interface (e.g., a browser page) that, in many cases, is completely unfamiliar to the conferee. Here, while effort has been made to make initiation interfaces simple and intuitive, where a user does not use the interface routinely, even a simple interface can be intimidating to use and therefore operate as a deterrent to greater use.

As another instance, while known systems enable a conferee (e.g., an initiator) to queue files for sharing during a session, known systems do not provide a universal session queue to receive all conferee files prior to and/or during a session. For instance, in a conference including eight conferees where an initiator intends to share seven files and each of the other seven conferees intends to share two files each for a total of 21 files, there is no queue for receiving all of the files. No universal session queue means conferees often cannot form an understanding of the volume of content to be shared during a session or intentions of other conferees to share files. In these cases, often times session periods end prior to conferees sharing files or valuable session time is wasted with conferees verbally bantering back and forth about intention to share files during the session.

In addition, because files are not queued in a universal queue, there is no ability for conferees to access or control other conferee files unless those files are shared by the conferee that provided the files. For instance, where a session initiator has earmarked seven files to be shared during a session, other conferees can only see and interact with files currently shared by the initiator. For example, if the initiator shares a single word processor document with other conferees, a second conferee can only see and manipulate the shared document and has no ability to access or control the other six files earmarked by the initiator to be shared.

Another problem with known systems is that real time control of remote conferee display screens is often slow as updates between linked computers have to be sent in their entirety to each computer linked to a session. Often times there is at least some latency between when actions occur on a local screen and when actions are replicated on remote screens given network capabilities, noise, etc. Any latency in content delivery is bothersome and can hamper the natural flow of information between disparately located conferees.

One other problem with known conferencing systems is that known systems often are tied to specific hardware or, more specifically, to specific display screens for sharing content. For instance, many conference spaces have dedicated display screens that are mounted within or otherwise substantially permanently secured within a conference space and that are linked to hardware switching devices for receiving content from sources. In other cases screens may be mounted to carts for movement to different locations within a larger conferencing area but the screens are still dedicated to the larger conferencing system. In many cases large flat panel display screens exist that are primarily provided for some non-conferencing purpose such as to show a video or to display a television show (e.g., CNN news network). Despite many available large display screens at many locations, those screens are typically not useable for conferencing purposes. Inability to use available large displays for conferencing purposes is especially troublesome in cases where a remote conferee is required to use a device including a small display (e.g., a smart phone or tablet type device) during a conference despite an available larger screen display in the conferee's vicinity.

Yet another problem with existing conferencing systems is that known systems only allow most conferees to use a single display screen during a session despite the fact that the information to be shared among disparately located conferees often is more than can optimally be presented on a single display screen. For instance, while there are conference spaces that have been specifically set up to use two, three or more common large display screens within a single conference space to share content among conferees within the space, in most cases remote conferees patching into these systems to participate in conference activities only have a single desktop computer screen, a laptop screen, a tablet screen, etc. Viewing content from a large display screen on a smaller screen is difficult for many conferees. Where content is shared on several large display screens in a local conference space, viewing all of that content on a smaller screen is almost impossible. Here, one option is for a remote conferee to view content from only one large screen at a time and to flip through the large screen content but that solution means that the conferee cannot see all of the content at the same time.

Years ago, most companies were regional or, where they were national, had one or more offices in each region of the country to service relatively local clients. Employees lived near the facilities they worked in and often had dedicated offices adjacent other employees they routinely worked with and had access to local resources such as conference spaces, video communication systems, printers, etc. One advantage in these cases was that employees became familiar with all available resources within a facility through routine use. Each employee knew office layouts, locations of and affordances in conference spaces, and in many cases even knew general schedules of fellow employees in their facilities (e.g., that staffing meetings were held every Monday morning from 8 AM to 9 AM in conference room AAA).

Another advantage was that the employees could quickly determine availability of resources including conference spaces and other employees. An employee could see if a light or a computer was on in another employee's office and determine if the other employee was in a facility that day. An employee could visually determine if a conference space was available.

One other advantage was that teams of people that worked on specific projects were often located in the same facility. Co-location meant that team members were able to see each other routinely and to find other team members in between team conferences to move team tasks along. To this end, with employees co-located, short impromptu meetings when two employees had open space in their schedules could happen naturally. For instance, two employees could bump into each other in a hallway and have a short conference regarding a pressing issue. As another instance, one employee could pop her head into another employee's office and, if the other employee was available, could have a short discussion about some topic or could identify a time when the short discussion could occur.

Yet another advantage was that employees could sense availability of other employees based on non-verbal tell-tale signs. For instance, if a first employee had her door shut during morning hours, other employees could sense that the first employee was busy during that time even though the first employee's schedule may have indicated availability. As another instance, based on personal conversations, employees in one facility may have known well in advance when a first employee from that facility was going to be traveling to a different facility in a different time zone and therefore that the first employee would likely be out of pocket during certain periods of the day due to the time change.

Times have changed and so have the staffing models at many large companies so that now many employees routinely travel among many different facilities nationally and internationally to attend meetings and conferences. Many employees are routinely located in unfamiliar facilities without knowledge about facility layout and affordances, locations of other employees within facilities, or any tools for assessing real time schedules of enterprise resources (e.g., conference or personal spaces, affordances within spaces, other employees, etc.). For example, an employee visiting a large Tokyo facility for the first time would be unfamiliar with locations of conference spaces within the facility as well as options for space that could be used for personal focused work as well as affordances (e.g., video capabilities, printers, etc.) within the spaces. Here, the employee also generally would not be aware of locations of personal offices of other employees within the space or of spaces temporarily (e.g., for a day) used by other specific employees within the space. Even if the employee had a map of different spaces within the facility, the employee would have no way to determine availability of the spaces for personal or group use or the locations of other employees in the facility located outside their assigned personal spaces.

Problems associated with lack of insight into resources and schedules are exacerbated by un-scheduled on the fly changes to resource schedules that are unknown to employees. For instance, a conference space may be claimed for an impromptu 25 minute meeting between two colleagues that unexpectedly bump into each other in a hall way. In this case, the conference space as well as each of the conferencing colleagues are out of pocket during the 25 minute meeting. As another instance, a conference scheduled for 60 minutes including 7 employees may be completed early after 25 minutes so that the space used for the conference as well as the 7 employees are freed up earlier than expected. Here, even if a first employee had access to an electronically maintained schedule of another employee in a conference, the unexpected schedule change would not be detected and an opportunity to communicate or inability to communicate as a function of a schedule change would not be perceived by the first employee.

To support a fluid set of employees within enterprise facilities, enterprises are routinely seeking to provide space optimized for specific uses. For instance, where employees within a facility or a section of a facility routinely engage in focused individual activities, space should be optimized for individual activities and in another section of a facility where employees routinely work in large groups (e.g., 5 or more employees), the space should be optimized to facilitate large group activities. Current systems for identifying optimized employee supporting resources are not very good.

Thus, there is a need for tools that enable employees of an enterprise to identify resources within one or more enterprise facilities as well as affordances associated with those resources and current and future availability of those resources.

There is also a need for employees to be able to set notifications for themselves or for other employees to indicate status changes (e.g., a change from available to busy or vice versa) for specific enterprise resources. There is further a need for a system that enables tracking of resource use in a simple and cost effective manner using hardware that already exists for other purposes, especially in facility areas where wireless access points or the like are not provided.

BRIEF SUMMARY OF THE DISCLOSURE

Embodiments of the present disclosure provide a system, method and program for initiating and/or scheduling an online collaboration session among a session initiator and at least some remote invitees to a session using a conventional Email system. In some cases a specific virtual mailbox address may be assigned to a session server function scheduling where any E-mail addressed to the address is used to schedule a session at a future time. Thus, here, any system user that sends an Email addressed to the mailbox can schedule a session without having to pre-register or set up a user account of some type.

In some embodiments a session initiator may be able to identify invitees by simply adding invitees to a conventional "To" or target field in an E-mail addressed to the session server scheduling function. For instance, in addition to addressing an Email to the session server scheduling function, the initiator may add seven other E-mail addresses to the address or target field to indicate seven invitees to the session. Here, because the request to initiate or schedule a session is made via an initiator's conventional E-mail account, the initiator's E-mail contact information is automatically accessible to the initiator for selecting invitees for the session. Here, when an E-mail is sent, the E-mail is transmitted to the session server which gleans the invitee list from the target field and adds the invitees to a session record. In addition to adding invitees to the session record, the server generates invite E-mails to each of the invitees requesting either that the invitee confirm that the invitee will join the scheduled session. Where an invitee agrees to join a scheduled session, the server may communicate with the invitee's scheduling software to add the session to the invitee's calendar.

In at least some embodiments other session server addresses may be associated with other session management functions. For instance, in some cases the server may support an immediate session start function whereby a user can start a session immediately by sending an e-mail to a "startsession@session.com" address.

Here, the process above for scheduling a session would be repeated to invite conferees identified in the target field to provide other functionality.

In some embodiments the invite E-mail sent to a session invitee may include a simple "Join" icon for joining a session that is progressing or that will commence shortly or may include an "Accept" or "Schedule" icon that is selectable to accept or schedule a future session.

In at least some embodiments the server may generate a session queue for each of the sessions that is scheduled where the session queue stores instances of files that may be shared by conferees during a session. Here, to add files to the session, in at least some cases a conferee may be able to add files to a queue via an Email system. For instance, where a session initiator knows that she intends to share seven files with other conferees during a session, the initiator can add those files to a session request attachment field in an E-mail. Here, advantageously, E-mail systems already include intuitive tools that most people are comfortable using for selecting and attaching files to an attachment field. Here, when the system server receives an E-mail to initiate or schedule a session, the server may obtain all attached files and automatically add those files to an associated session queue.

In at least some cases an invitee may be able to add files to a queue when the invitee accepts an invitation to join or schedule a session. In this regard, for instance, in some cases upon indicating a desire to join or schedule a session, the server may cause an E-mail system to generate and present a response E-mail to be sent by the invitee where the response E-mail is addressed to the session server and enables a conferee to add additional files to an attachment field. The response E-mail may include instructions for the invitee to add files to the session queue along with pre-canned text where the invitee confirms a desire to join or schedule the session. Again, here, the invitee's E-mail system already includes familiar tools for adding files as attachments so the invitee does not need to perform some unfamiliar process.

In at least some embodiments any conferee may be able to add files to a session queue at any time prior to, during or after a session conference using an E-mail system. For instance, a conferee may open a new E-mail template, attach files to share and address the E-mail to an "add file" mailbox associated with a session server add file function. Any attached files may be added to a session queue.

In some cases a conferee can use a web-based browser to link to a session at any time after the session has been instantiated (e.g., scheduled) and may be able to add files or documents to the session, delete documents, annotate documents, etc.

In at least some embodiments any conferee may be able to access and at least independently view any files in the queue of a session regardless of who added the file to the queue either before, during, or after a session. This feature encourages conferees to prepare for a session by becoming familiar with content other conferees intend to share and also helps conferees understand importance of content so that a natural ordering of content based on importance can occur.

In some embodiments, in addition to a document or session queue, a system interface will provide a conferee queue with images or, where available, real time video, of each conferee linked to a session. Where video is available, even where the queue only includes small representations of each conferee, slight movements and expressions of conferees can convey a lot of information. In some cases a real time video of a conferee may be opened in a sharing window or, in other cases, in a secondary window in addition to a sharing window for a better view of one of the conferees. In other cases a real time conferee video may be moved to a second display screen.

In some embodiments, during a session conference while content is being shared in a sharing window, any conferee may open any queue document or file in a private window for private viewing. The privately viewed document may be a second instance of the document being shared in the sharing window or may be a different document. Two conferees may open separate instances of the same document in their private windows and may view the same or different pages of the document simultaneously. Two conferees may open different documents in their private windows. The sharing window remains visible on all conferee views at all times. Thus, the sharing and private window arrangement enables all conferees to view any queue document at any time during a sharing conference while still having a view of the shared document.

In some embodiments, whenever a conferee links to a session, instances of every document or file in the session queue are automatically transmitted to the conferee's device and are cached in a memory associated with the device. Thereafter, quick access to any document in a private windows and quick manipulation of documents in the sharing windows of all linked devices can be facilitated.

In at least some embodiments, conferees can annotate documents in the sharing window on their device and the annotations are shown on all linked devices. In some cases conferees can annotate documents in private windows where the annotations may be automatically added to instances of the documents cached by other conference devices, may only be added to other instances of the documents upon an affirmative sharing step by a conferee, or may only be stored for private use by the conferee that generated the annotation.

In some embodiments, in addition to a session queue that is identical for all session conferees, the system may provide a private queue for each conferee for storing documents, files, etc., that the conferee is considering sharing with other conferees but that the conferee does not want to share at the current time for some reason. During a session, when a document is moved from a private queue to the session queue, a document icon for the document is added to each instance of the session queue on devices linked to the session and the document is transmitted to each of those devices for caching to facilitate quick access.

In at least some embodiments, large display screens that can be linked to a session via invitation but that cannot be used as input devices may only show the sharing window as opposed to other interface features used for session navigation. The larger version of the sharing window provides a view that is easier to see.

In at least some embodiments an image or video icon of the conferee that has opened a document in the sharing windows may be visually distinguished in some fashion to show or indicate who has current control of the sharing window. For instance, a colored shadow or other highlight about a conferee icon may indicate current control.

In some cases the system may be able to wirelessly monitor locations of conferee devices and identify proximate large display screens available to be invited to a session. The session interface may present proximate screen options to simplify the invitation process and reduce the friction associated with linking a screen to a session.

In some embodiments any conferee may be able to share her device desktop in a sharing window. By sharing a desktop, any conferee can run any application on their device and share the output of that application with other conferees. For instance, a conferee could share a word processing application, a spreadsheet application, a drawing application, etc. In some cases only the conferee sharing a desktop can control applications presented via the desktop while in other cases any conferee may be able to control any other conferee's shared desktop application.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE SEVERAL VIEWS OF THE DRAWINGS

FIG. 85 shows two partial screen shots for two different conferee devices where one of the conferees is viewing a first document in a private window and a second conferee is viewing a second document in a private window at the same time;

FIG. 91 shows a conferee device screen shot as well as two large display screens where the device screen shot includes tools for inviting large screens to a session.

Figure 1:
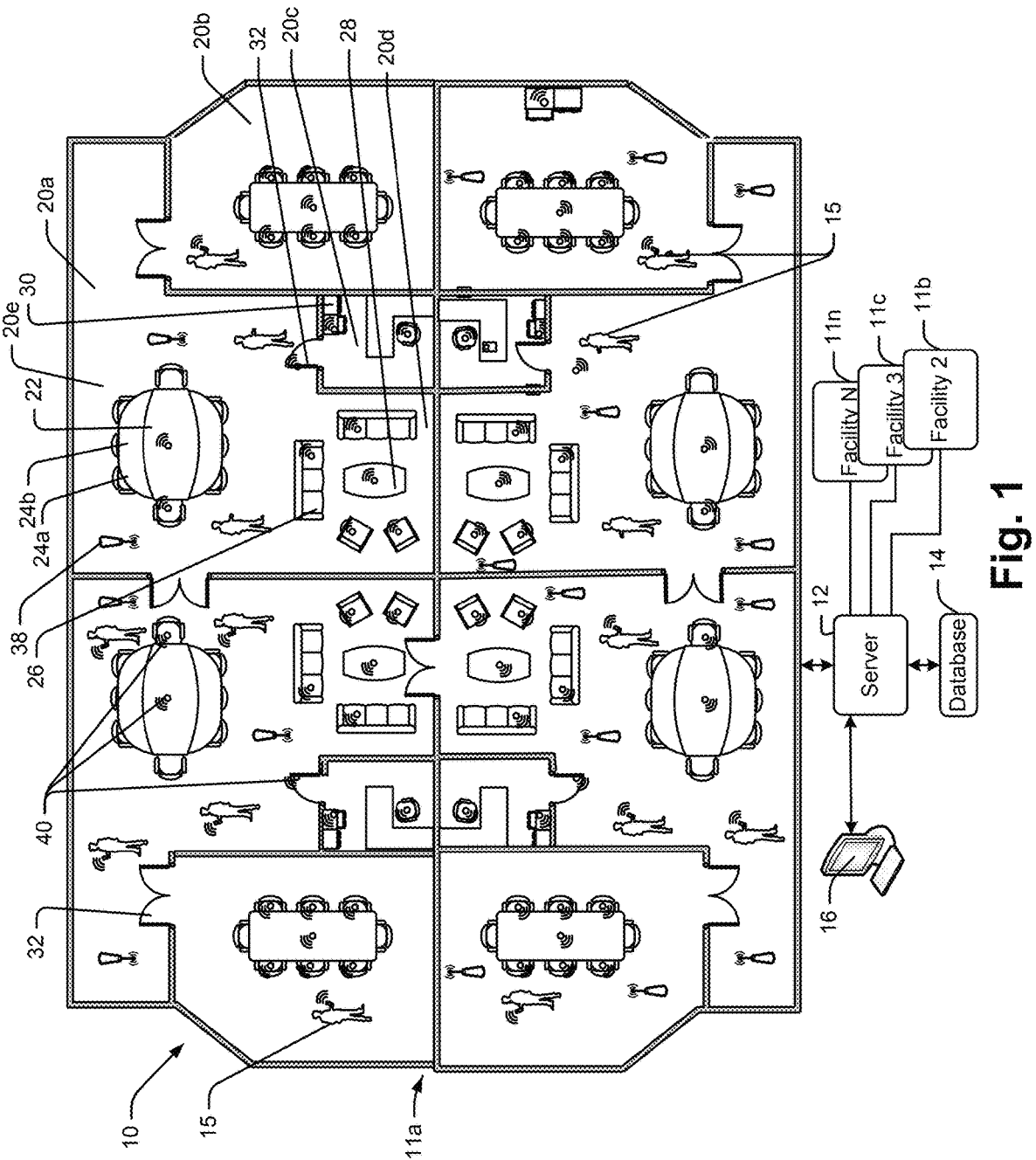
FIG. 1 is a schematic view showing a system associated with an enterprise that is capable of performing at least some aspects of various embodiments of the present disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE DISCLOSURE

The various aspects of the subject disclosure are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

In the description that follows, various system components and features are described in the context of different embodiments. It should be appreciated that different systems may have different complexities and therefore that some systems may only have a subset of the described components and may only provide a subset of the described features. In addition, while one or another feature may be described in the context of a specific embodiment, any of the features may be used in any of the embodiments and there will be synergies between different features and feature subsets in different embodiments.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The phrase "computer readable media" can include but is not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views and, more specifically, referring to FIG. 1, the present disclosure will be described in the context of an exemplary enterprise system 10 for managing facility resources including resources associated with one or more enterprise spaces 11 a, 11 b, 11 c, . . . 11n. Among other components, the system 10 includes a server 12, a database 14 (e.g., a computer readable medium) and, in at least some cases, employee computer devices(s) or work station(s) 16.

Herein, an "enterprise" is a business or entity that includes resources including, among other things, conference tables, desks, credenzas, stationary or moveable wall structures, doors, video conferencing subassemblies, projectors, printers, computers, etc. In addition, resources may also include employees that work for an enterprise and/or employee time. I still other cases, resources may also include mechanical affordances that are capable of being controlled in different ways to provide different capabilities. For instance, in some cases, a set of emissive surfaces within a conference space may be controlled to facilitate any one of several different types of space use. For example, the emissive surfaces may be controlled to facilitate a leader based presentation of information at one time and controlled in a different fashion to facilitate a collaboration session wherein conferees can share content in an egalitarian fashion (e.g., each conferee can share content on any of the emissive surfaces at any time during a session without requiring another to yield control of the surface and regardless of who is currently presenting content via the surfaces). Other space control functionalities are contemplated.

In still other cases resources may include non-employee personnel located in or on an enterprise property such as, for instance, third party contractors, customers, clients, service providers, etc. Herein, unless indicated otherwise the term "employee" will be used generally to refer to an actual employee of an enterprise or some other non-employee person that is at least temporarily located on an enterprise property. In at least some embodiments different resource information may be made available to employees and non-employees. For instance, while employees may be able to view locations of all employees and non-employees in an enterprise facility, non-employees may not and may be restricted to identify a subset of available personal and conference spaces reserved for use by visiting non-employees. In other cases non-employees may have the ability to access all resource information that is accessible to employees.

In order to effectively use resources, employees need to know the resources that they have available for use, locations of the resources and, in many cases, whether or not those resources have been prescheduled or are currently occupied and therefore cannot be used during various time periods. The present disclosure describes exemplary systems and processes that may be used to track and report resource locations and use and to enable enterprise employees to access resources efficiently.

Referring still to FIG. 1, server 12 includes one or more computers that cooperate to perform various processes and methods that are consistent with at least some aspects of the present invention. While server 12 is shown as a single component in system 10, it should be appreciated that server 12 may include two or more servers and other computing and networked devices that cooperate to perform processes or that divide up tasks and processes to be performed. Server 12 is linked to database 14.

Database 14 includes one or more computer readable mediums and stores programs run by server 12 as well as data and other information used by server 12 to facilitate programs and methods and data that is generated through use of the programs run by server 12. Types of data stored in database 14 depend on which of several different applications are performed by server 12. For instance, some applications may only be useful for identifying locations of non-human resources (e.g., spaces, video conferencing equipment, etc.), other applications may only be useful for identifying locations of enterprise employees or non-employees, and still other applications may be used to manage all (e.g., human and non-human) resources. Where non-human resource locations are to be reported, in some cases simple descriptions of the resources suitable to distinguish one from others may suffice. In other cases where views of resources are to be provided, 2D or 3D CAD or other resource representations may be stored for generating views of spaces. Where employee locations are tracked, records for each employee may be stored including name, title, an image, etc. In addition, in some cases employee tracking or privacy preferences may be stored such as, for instance, limitations related to which other employees can track an employee's location, spaces in which location can and cannot be tracked, time periods during which employee locations can and cannot be tracked, activities during which employee locations can and cannot be tracked, etc.

In still other cases, applications may allow employees to view and modify schedules of all or a subset of enterprise resources. Here, for each resource that can be scheduled, either database 14 will store scheduling software and schedule information or server 12 will have access to scheduling applications maintained by another linked server for obtaining schedule information and manipulating resource schedules.

In still other applications it is contemplated that alarms or notifications related to various resource activities, statuses, circumstances, etc., may be rendered by server 12 to enterprise employees. For instance, an employee may want to know when another employee has entered a specific enterprise facility. As another instance, an employee may want to know when a specific conference room becomes available for use. In these and other cases, database 14 may store notification specifications for each resource indicating circumstances to track and other employees to notify. In some cases all of the above applications may be integrated into a single system package in which case relatively complex records for each resource may be stored in database 14. Other types of data required to support applications described hereafter are contemplated.

Workstation 16 is linked to server 12 for accessing output of various of the programs run by server 12 and to allow input for controlling various aspects of the programs. While workstation 16 may be stationary, in some embodiments the work station 16 may be portable and include a laptop, a table type computing device, a smart phone, etc. Server 12 is also linked to various other system components as described in greater detail hereafter.

Referring still to FIG. 1, each space 11a through 11n is shown as a separate facility. In other embodiments, however, each space may include a floor of a facility, all of the floors that comprise a multi floor facility, or a subset of floors or spaces, or any other space subset associated with an enterprise. The exemplary space 11a in FIG. 1 includes common or open spaces (e.g., 20a), subspaces including conference spaces (e.g., 20b, 20d, 20e) and personal or individual work spaces (20c), etc., that form a map when viewed in top plan view as in FIG. 1. FIG. 1 indicates real time locations of various resources in at least some of the subspaces including enterprise employees 15, conference tables 22, 28 or desks, task chairs 24a, 24b, etc., credenzas or file cabinets 30, lounges or sofas 26, doors 32 and other resources including printers, portable video conferencing equipment, etc. Other resources may include moveable wall structures and other portable equipment useable in one or multiple of the subspaces.

Figure 2:
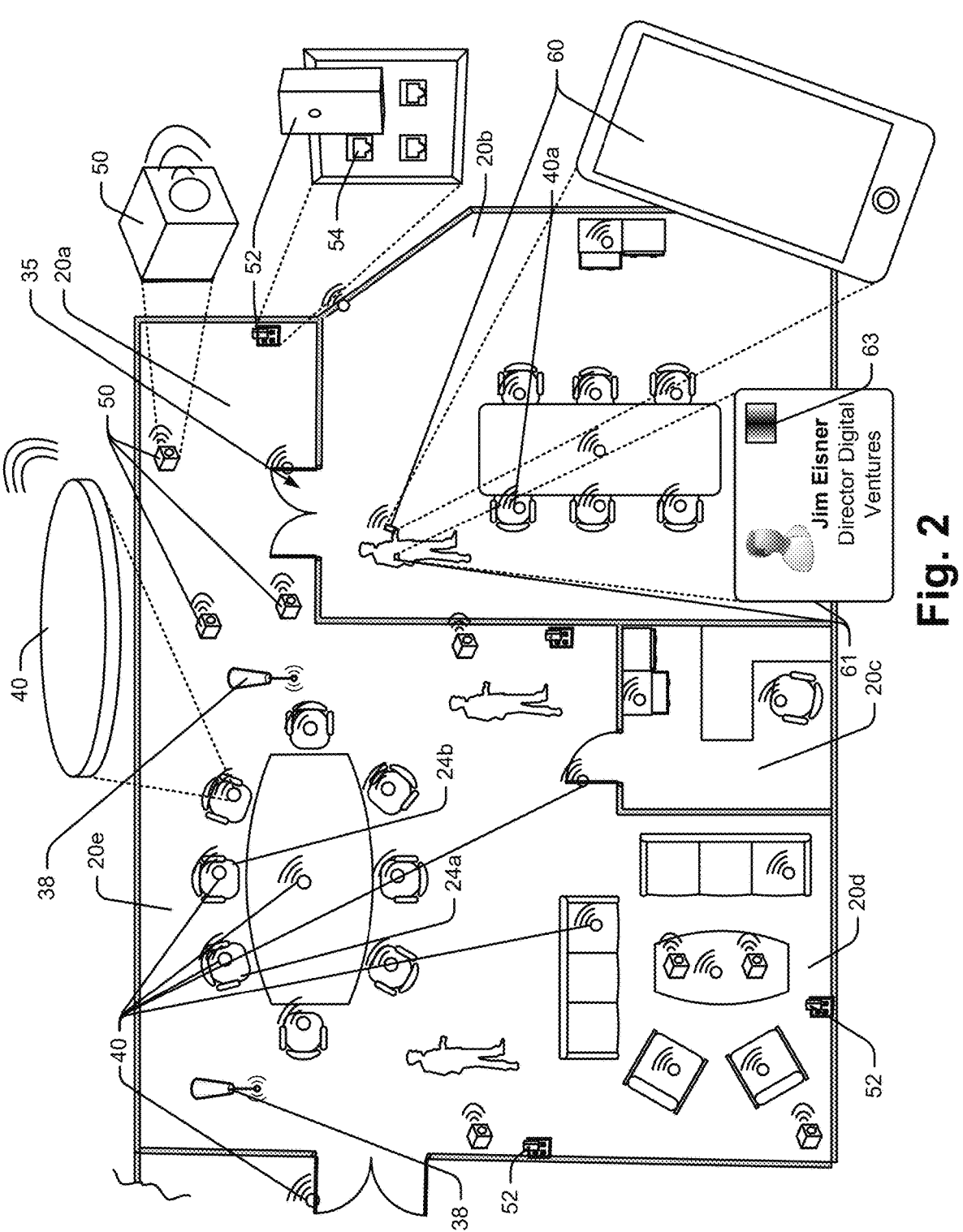
FIG. 2 is a schematic view illustrating a subset of the system components shown in FIG. 1 and associated with a sub-portion of the space shown in FIG. 1.

Referring still to FIG. 1 and now also to FIG. 2, a portion of space 11a in FIG. 1 is shown in a larger and more detailed view in FIG. 2. The enlarged space in FIG. 2 includes subspaces 20a through 20e where wall structure separates space 20b from the other spaces and separates space 20c from the other spaces but where space 20a opens into space 20e and space 20d also opens into space 20e. Thus, in at least some cases, spaces recognized as distinct from other spaces may be portions of larger spaces without any mechanical dividing wall or other structure.

Referring again FIG. 1, digital maps of each of the enterprise spaces 11a through 11n are stored within database 14 for use by server 12 to perform various applications useful in managing the enterprise. The walls and other permanent dividing structure in the maps may be identified using a floor or architectural plan for each of the facility spaces as known in the art. In at least some cases all or at least a subset of the maps are dynamic in that they are routinely updated to reflect changes in the locations of resources within facility spaces. For instance, if a conference table and a set of chairs is moved from one facility space to another, the locations of the table and chairs on a facility map may be updated to reflect the movements.

In at least some embodiments it is contemplated that portable personal computing devices like smart phones, tablet type devices 60 and even laptop computers may be used as the primary interface tools by system administrators and enterprise employees generally for accessing many different types of information related to enterprise resources. Hereinafter, the phrase "portable computing device" will be used to refer to portable computing devices generally.

It is contemplated that a "corporate maps" application may be stored on a device that is accessible via a corporate maps icon. To this end, see FIG. 3 that shows a portable computing device 60 including a display screen 160 that includes a plurality of application icons including a corporate maps icon 162, a compass icon 163 and a room peak icon 165. The icons 162, 163 and 165 correspond to three separate applications that may be used to manage enterprise resources. While the applications are shown as distinct, each has at least some similar capabilities and each, in at least some aspects, is only different from the others in how resource information is accessed or presented to a device user. In other embodiments various aspects of each of the applications may be provided as part of any of the other two applications.

Figure 4:
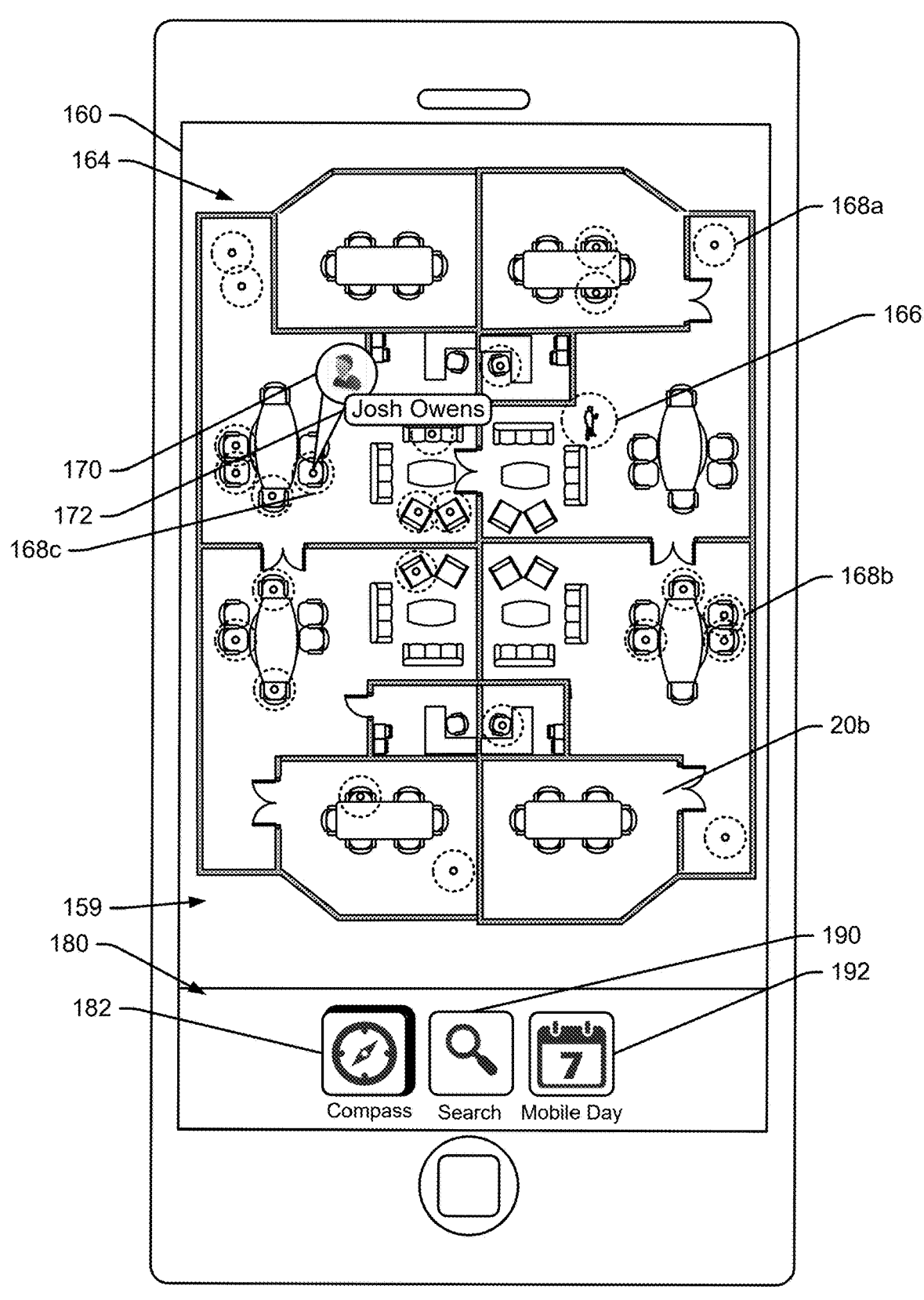
FIG. 4 is similar to FIG. 3, albeit showing a graphical map screen shot view of a facility.

Hereinafter, unless indicated otherwise, an employee using a portable computing device will be referred to as a device 60 user. When icon 162 is selected by a device 60 user, any of several different initial default screen shots of a subset of enterprise resources may be presented. For instance, in at least some embodiments, when icon 162 is selected, a screen shot 164 as shown in FIG. 4 may be presented as an initial application screen. Screen shot 164 includes a content field 159 and a toolbar field 180. The tool bar field 180 includes a set of tool icons that are generally persistently presented while the application is open for selecting different application functions associated with the corporate maps application. The exemplary field 180 includes a "compass" icon 182, a "search" icon 190 and a "mobile day" icon 192. Other icons for other functionality are contemplated, some of which are descried hereafter. Each of icons 182, 190 and 192 and related functionality will be descried hereafter.

Initially the compass icon 182 is highlighted to indicate that a compass functionality is an initial default function. Compass functionality will, it is believed, be the most routinely used functionality associated with the corporate maps application and therefore the default is to that functionality. An image of a facility map (e.g., a resource representation) is presented in field 159 which shows the location of device 60 at 166 on a graphical top plan view map of at least a portion of a facility in which the employee using device 60 is located along with the current locations of other employees within the facility subspace associated with the map to help a device 60 user locate other employees and spaces. Here, the locations of other persons within the space corresponding to the map are each indicated via a phantom circle 168a, 168b, 168c, etc.

In addition to showing employees within the mapped space near the device user 166, the view 159 also shows other resources including tables, chairs, sofas, printers, video conferencing system, etc. Here, in at least some cases, the virtual view 159 indicates real time locations of other (e.g., non-personnel) resources within the facility spaces. Thus, for instance, if a portable videoconferencing system has been moved from space 20*b* into second space 20*e* (see again FIG. 2), the real time location of the conferencing system in space 20*e* may be graphically represented so that a device 60 user can access current resource location information.

Referring again to FIGS. 1 and 2, to track locations of enterprise resources, in at least some cases, tracking devices 40 may be provided for each of at least a subset of resources that are located within each or at least a subset of the facility subspaces. An exemplary tracking device 40 stores and transmits a unique device identifier that can be used to distinguish one device 40 from all others. For instance, device 40 may transmit a wireless low energy Bluetooth advertising signal including a device specific identifier. In some cases, the signal may be periodically transmitted (e.g., every 40 seconds). In some cases the period between transmitted signals may change as a function of sensed movement of a resource or a resource component. For instance, if a chair movement (e.g., a change in location) is currently sensed, the beacon signal may be transmitted every five seconds until movement is no longer sensed. As another instance, if the backrest of a chair recliners, the beacon signal may be transmitted every two seconds until the recline angle is stabilized, after which the signal may again be transmitted every 40 seconds.

Figure 5:
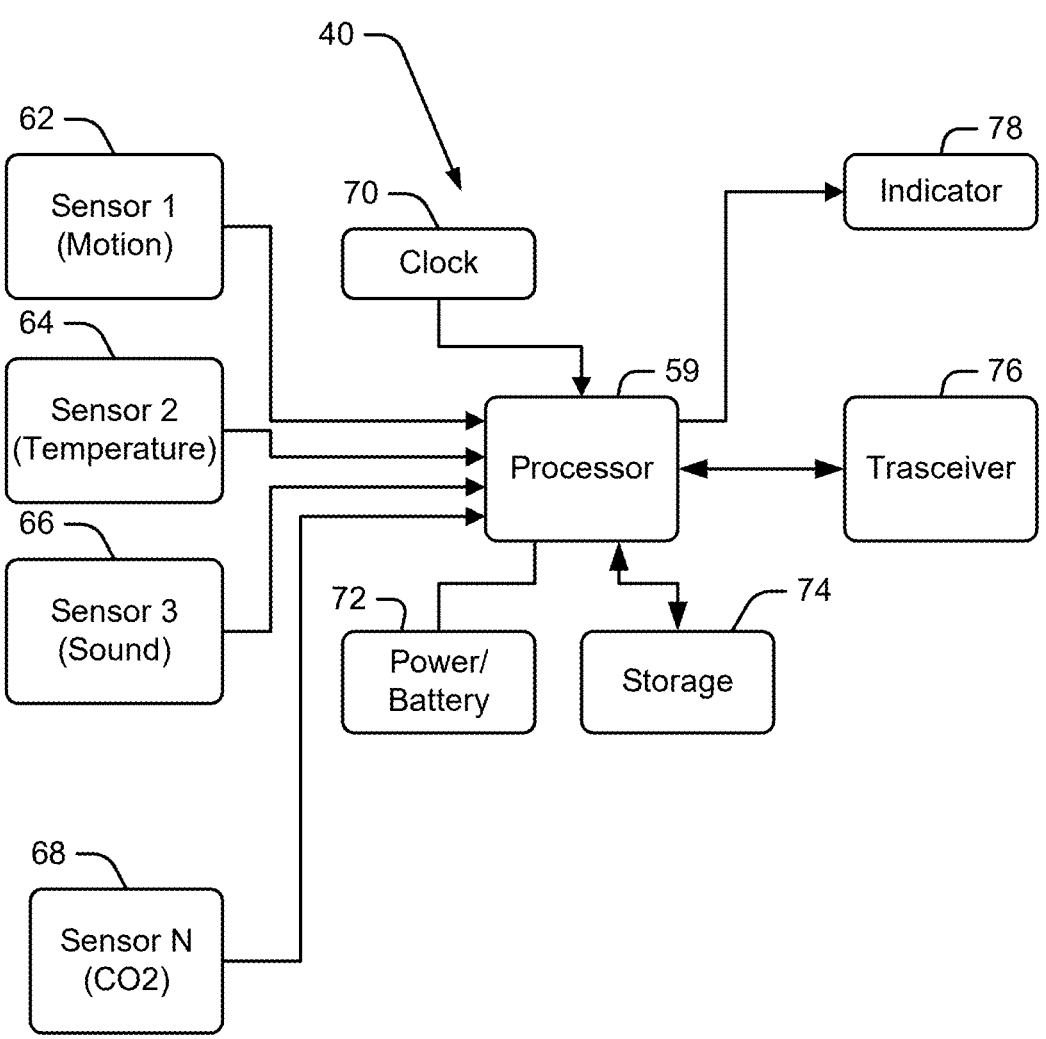
FIG. 5 is a schematic view showing the components of one of the tracking devices shown in FIG. 2.

Referring to FIG. 5, an exemplary tracking device 40 is shown in schematic view and includes a processor 59, a clock 70, a power source or battery 72, a data storage device 74, a transceiver 76 and an indicator 78. Clock 70 is linked to processor 59 and generates a time signal that can be used to determine when to transmit signals to server 12 as well as for generating time stamps for various purposes. While shown as a separate component, clock 70 may be provided by processor 59 itself. Battery 72 is linked to processor 59 and, in at least some embodiments, may store energy sufficient to drive the device 40 for ten or more years. To this end, in at least some cases it is contemplated that device 40 will be a low energy Bluetooth or other type of low energy wireless transmitting device that will only sporadically transmit data to data collector devices. Indicator 78 may indicate when data is being transmitted (e.g., a heartbeat signal) or may indicate when the battery 72 needs to be replaced or recharged. In some cases devices 40 will be so inexpensive that after the battery discharges, the device can be thrown out and replaced.

Figure 8:
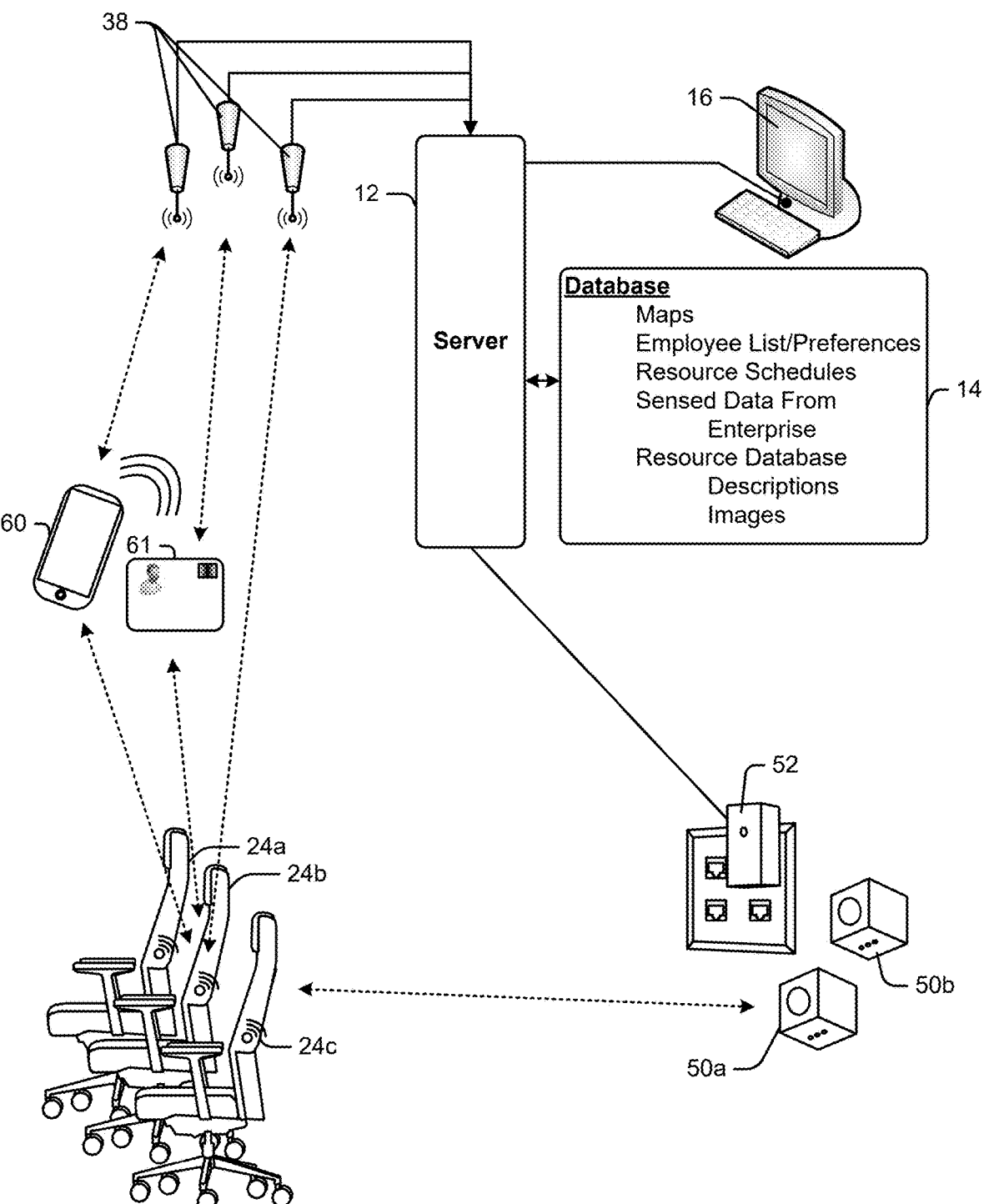
FIG. 8 is a schematic view showing another representation of a subset of the system components from FIG. 1 to show communication paths between system devices in a simplified view.

Referring again to FIGS. 1 and 2 and also to FIG. 8, in some cases wireless access points 38 that are built into a facility structure and linked to server 12 for providing wireless communication with computing and other devices may be used to track locations of at least some of the devices 40 and hence the locations of resources associated with each device. To this end, where access points 38 are located relatively proximate tracking devices 40, when devices 40 transmit their identification signals, one or more access points may receive the transmitted signals and use the strengths of those signals to identify general or precise locations of the devices 40. For instance, where several access points receive a signal from one device 40, the strengths of the received signals may be used to triangulate the location of the device 40 within a space using algorithms known in the wireless tracking art generally.

In many cases there are spaces within facilities that are poorly served by access points or that are positioned such that signals received at access points are unable to be used to identify device 40 location accurately enough for at least some useful applications contemplated in the present disclosure. For instance, metal and other structures that form facility walls or other affordances may interfere with device 40 signals so that any signal received by an access point from a device 40 would be highly inaccurate.

Where access points are unable to receive particularly accurate signals from devices 40 but where resource locations are desirable, some other system must be used to detect resource locations. Two other data collecting systems are contemplated in this disclosure. A first system includes semi-stationary Ethernet linked data collector subassemblies and a second system includes portable computing devices 60 programmed to collect and report information from devices 40 to server 12.

Figure 6:
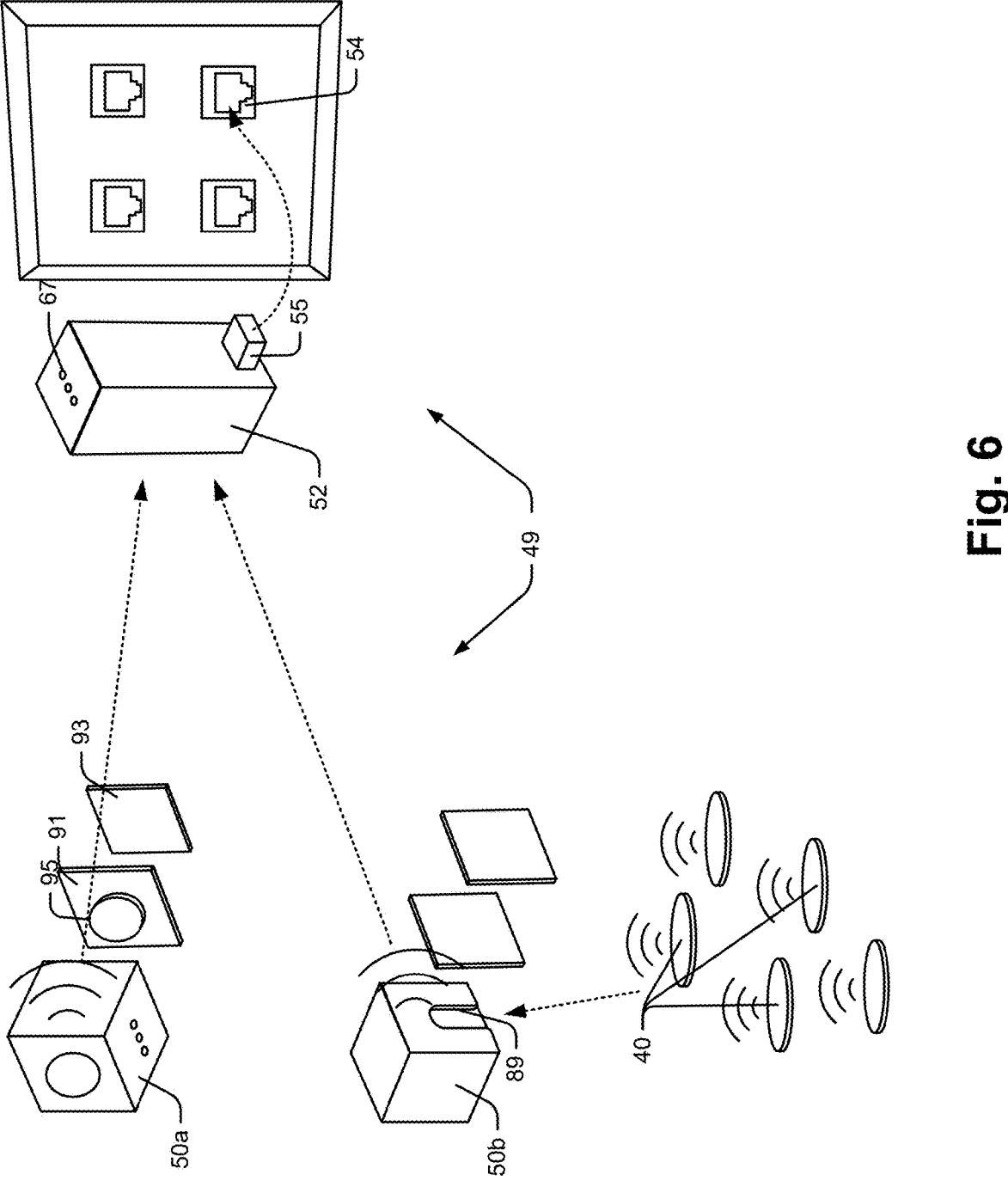
FIG. 6 is a schematic view showing a data collector subassembly that is consistent with at least some aspects of the present disclosure.
Figure 7:
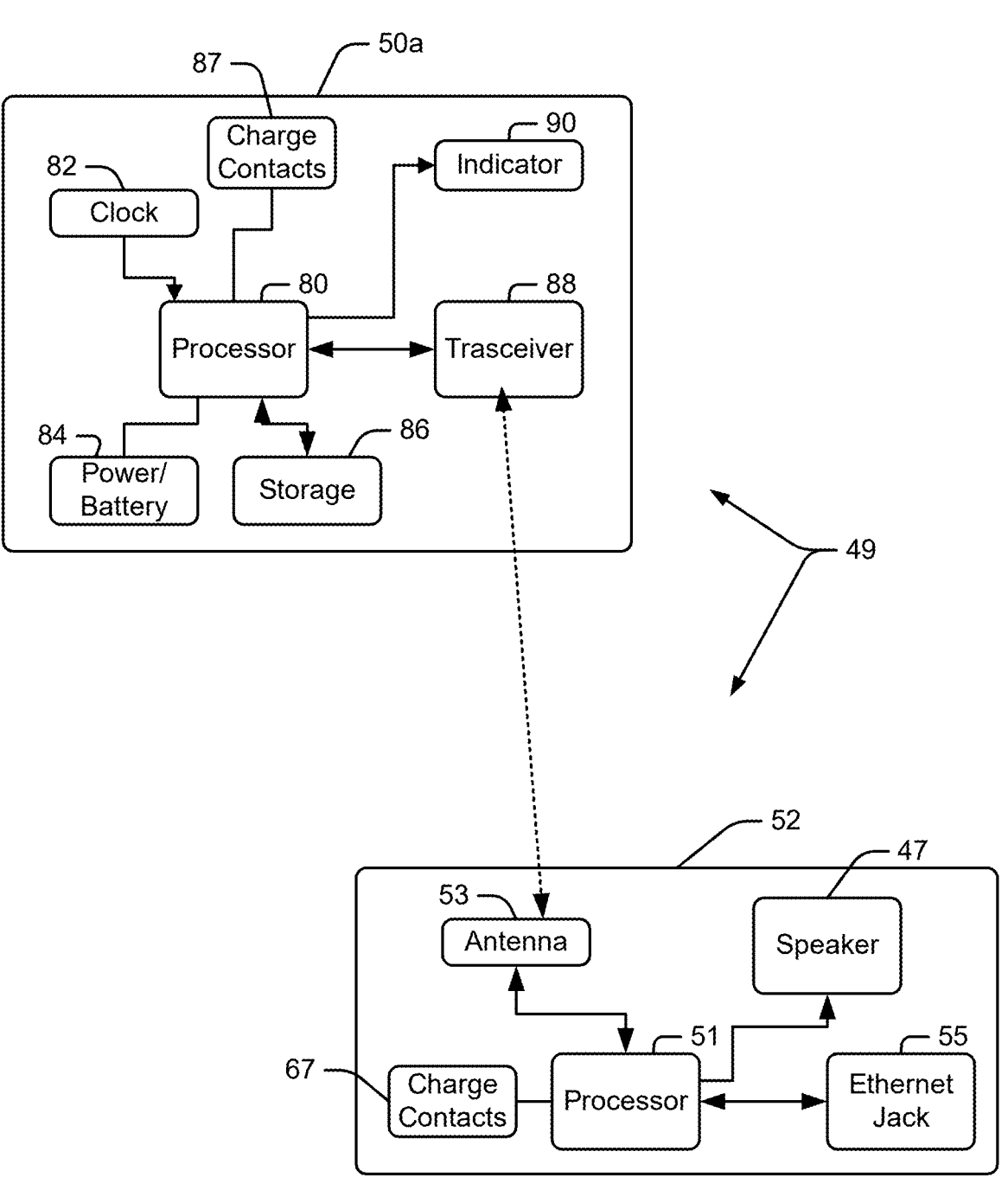
FIG. 7 is a schematic showing internal components of at least some of the components shown in FIG. 6.

Regarding the first system, FIGS. 6 and 7 illustrate a semi-stationary collector subassembly 49 including a base assembly 52 (hereinafter "base") and first and second satellite assemblies 50*a* and 50*b* (hereinafter "satellites"). The base 52 includes a processor 51, an antenna 53 and an Ethernet jack 55. The antenna 53 is linked to processor 51 and tuned to receive information transmitted by satellites 50*a* and 50*b*. Jack 55 is linked to processor 51 and plugs into a standard wall mounted Ethernet receptacle 54 to link with server 12. Thus, data received by base 52 via antenna 53 can be provided to server 12.

Referring to FIG. 7, an exemplary satellite 50*a* includes a processor 80, a clock 82, a battery 84, a data storage device 86, an indicator 90 and a transceiver 88. Each of the clock 80, battery 82, device 86, transceiver 88 and indicator 90 are linked to processor 80.

Prior to use, satellites 50*a*, 50*b*, etc., are positioned or mounted within a facility space at locations selected to optimally obtain information transmitted by devices 40 within the space via transceivers 88. To this end, in many spaces Ethernet receptacles 54, while present, are often located at relatively low positions (e.g., at the locations of traditional power receptacles) within a space and therefore are often not well positioned for obtaining information transmitted via low energy signals from devices 40 as furniture, wall structures, or the like within a space often blocks a direct transmission path. Satellites 50*a* and 50*b* may be mounted at relatively optimal locations within a space for collecting data from devices 40. For instance, first satellite 50*a* may be mounted to a wall at a relatively high location within a space to have a substantially direct transmission path from many of the devices 40 located within a space and to also have a substantially direct transmission path to a base unit 52 connected at an Ethernet receptacle at a low location. Second satellite 50*b* may be similarly mounted, albeit at a different position within the space so that different transmission paths from devices 40 are covered within the space. To better enable communications with the base 52, the satellites 50*a*, 50*b*, etc., will, in at least some embodiments, transmit signals using higher power than tracking devices 40 so that even if furniture or the like is located within the path between a satellite and a base 52, the signal should be strong enough to be received by the base 52.

To mount a satellite 50*a*, in at least some embodiments each satellite will include a mounting sub-configuration. For instance, in FIG. 6 the mounting components include a downwardly opening channel 89 formed in a rear surface of a satellite housing structure, a mounting bracket 91 and an adhesive mounting pad 93. The bracket 91 includes front and rear surfaces and a member 95 that extends from the front surface that includes a reduced diameter neck portion and an enlarged distal end head portion. The channel 89 forms a circumferential rim for receiving the enlarged head portion of member 95 via a sliding action. Adhesive pad 95 adheres to the rear surface of bracket 91 and also to a supporting ambient wall or other surface (not shown). Thus, bracket 91 adheres at least semi-permanently to a mounting location within a space and satellite 50a mounts via reception of head member 95 within channel 89 in a releasable fashion. Although not shown some mechanical fastener may also be provided to lock satellite 50a to bracket 91 unless affirmative steps are taken to release the satellite 50a from the bracket 91.

Referring again to FIG. 4, while battery 84 may be replaceable, in some cases battery 84 may be rechargeable and may need to be recharged periodically (e.g., every month, every quarter, etc.). To this end, device 50a may also include charging contacts 87 (see also FIGS. 6 and 7) and base 52 may also include charging contacts 67. Here, satellite 50a may be periodically removed from bracket 91 and placed on the top surface of base 52 so that contacts 67 and 87 connect for charging purposes. A magnet may be provided in the top surface of base 52 and a metal or magnetic plate may be provided in the undersurface of satellite 50a that help to automatically align satellite contacts 87 with the base contacts 67. Other mechanical alignment features are contemplated.

In at least some cases it is contemplated that one or the other of the base 52 and a satellite 50a may generate some signal to indicate when a rechargeable battery 84 needs to be recharged. In this regard, for instance, see again FIG. 7 where indicator 90 may include an LED that processor 80 may illuminate when battery 84 needs to be recharged. Again, to recharge battery 84, satellite 50a may be slid off bracket 91 and placed on base 52 with contacts 67 and 87 in communication. As another instance, base 51 may include a speaker 47 and may, when the signal from a satellite 50a becomes relatively weak or is no longer received, be programmed to generate a sound (e.g., a periodic chirp) to indicate a need for recharging.

Although not shown, in at least some embodiments the subassembly 49 may include a third or more satellites like 50a and one of the satellites may always be mounted to the base 52 for charging. The satellite mounted to the base 52 may receive transmissions from devices 40 for use by the system while charging. Here, if a remote satellite needs to be charged, the satellite mounted to the base can be swapped with the satellite that needs charging so that all satellites can remain functional at all times. In addition to providing consistent space coverage, having a system where all satellites remain functional all the time means the sensing algorithms for a subassembly 49 can be set once and be generally valid thereafter.

In some cases the subassembly 49 may cooperate to help an installer place the satellites 50a and 50b in locations where signals therefrom are receivable by the base 52. To this end, for instance, during an installation process, with base 52 connected to an Ethernet receptacle for power and with a satellite 50a fully charged, device 50a may transmit a periodic heartbeat signal to base 52. Satellite 50a can be mounted in a desired location within a space. Here, if satellite 50a is mounted in a location at which sufficiently strong signals from the satellite 50a cannot reach the base 52, the base will miss heartbeat signals from satellite 50a and can generate a chirp (or the satellite 50a can generate a chirp) sound to indicate that the mounting location is not suitable. If the chirp sound is generated, the installer can change the mounting position of the satellite until the chirping sound ceases. Thus, an installer can apply personal knowledge about a facility space to optimally position satellites for receiving device 40 signals while being guided by the base to select only locations that will work well given the mounting location of the base 52.

In cases where collector subassemblies 49 are employed, locations of the satellites 50a, 50b, etc., within a facility need to be added to the maps stored in database 16 either manually or in some automatic fashion. Manual indication may be facilitated by accessing a facility map via workstation 16 and indicating the locations of satellites 50a, 50b, etc., on the map and entering satellite unique identifiers for each indicated location. An automatic determination of satellite locations is described hereafter.

Once locations of satellites 50a, 50b are known, in at least some cases, triangulation methods may be used to determine locations of tracking devices 40 within a space. In other cases signal strength from devices 40 may be so low that only satellites 50 within a space associated with one of the devices 40 will be able to receive a signal there from. Here, locations of devices 40 will be identifiable at at least a room or separate space level.

While the system described with respect to FIGS. 6 and 7 uses Ethernet to link to a system server, other embodiments are contemplated where WiFi or cellular connection is used instead of Ethernet. In other cases it is contemplated that at least some bases 52 may be linked to other bases in adjacent spaced via a Bluetooth or other type of mesh network so that information collected thereby can be wirelessly transmitted from one base to the next until delivered to the system server. Here, it may be that a last base operating as a mesh network gateway is linked via Ethernet to the server.

Regarding the second system type that includes portable computing devices 60 programmed to collect and report information from devices 40, it has been recognized that many enterprise employees use devices 60 for work and even for personal communication that have the capability to collect, retransmit and even analyze information obtained or generated by devices 40. To this end, many people now routinely use electronic devices like smart phones, tablet type devices and even laptops that are essentially always on and that include transceivers that can obtain information transmitted by devices 40 when in the general vicinity of those devices 40.

In at least some embodiments it is contemplated that portable computing devices 60 may be used to automatically obtain information from devices 40 when in an area associated with the devices 40. For instance, when device 60 is proximate device 40a in space 20b in FIG. 2, device 60 may collect data packets transmitted from device 40a within space 20b. Upon receiving a data packet from device 40a, device 60 may run some application that uses or consumes that information. For instance, where device 60 is used by a facilities manager, device 60 may run an application that enables the manager to determine resource locations within a space. Many other applications run on device 60 based on information from devices 40 are contemplated.

In at least some other cases, when information is obtained by device 60 from devices 40, the obtained information may be wirelessly passed on to server 12 either immediately if device 60 is capable of broadcasting to an access point 38 or at some subsequent time when device 60 is within a receiving range of one of the access points or a satellite 50a, 50b, etc. Where information is transmitted to an access point or satellite subsequent to collection, device 60 may store the information received from devices 40 until subsequent transmission occurs. Thus, movement of resources associated with devices 40 that are remotely located from wireless access points can be detected, stored and used to drive applications run by server 12. This type of sporadic data collection from devices 40 is particularly useful in applications that do not require a complete or immediate history of resource use or states.

In cases where collector subassemblies 49 are employed, locations of satellites 50a, 50b may be automatically determined in several ways. For instance, where a base 52 associated with a satellite 50a is linked to a specific Ethernet receptacle and the location of the receptacle is known to be within a specific facility space, it may be assumed that the satellite 50a associated with the base is in the same facility space (e.g., the same conference room). In other cases, where locations of Ethernet receptacles 54 are known and signals generated by a satellite 50a are received by more than one Ethernet linked base 52, signal strengths of the signals received by several bases 52 may be used to determine the location of the satellite 50a via triangulation or some type of statistical analysis of the signals received and the locations of the receptacles 54.

In still other cases where employees use portable electronic devices 60 within a facility, devices 60 may be programmed to collect information from satellites 50a, 50b, etc., within their vicinity and to perform a location determining program to identify locations of the satellites. Here, each device 60 would have to be able to determine its own location based on communication with access points or other signal generators (e.g., base 52 that can transmit signals from known locations of receptacles 54) or with other satellites 50a that have known locations. Then, each device 60 may run a program to assess the locations of other satellites based on signal strengths of signals received from the satellites and its own location.

The location determining process may be repeated each time a device 60 is near a satellite 50a and satellite location may routinely be rendered more precise over time. For instance, where a device 60 is initially within a space including a satellite 50a but is not near the satellite (e.g., is on the other side of a conference room), the system may only be able to accurately determine that the satellite 50a is located within one half of the space but no more. A next time a device 60 is in the space, the device may be located relatively closer to the satellite and the signals from the satellite 50a may be relatively strong. Here, the stronger signal may be useable to more precisely identify the location of the satellite. The strengths of multiple sequential signals received by one or more devices 60 may be used to triangulate and further refine the location of a satellite 50a. Here, for instance, where eight devices 60 are located within a space and their positions are known, signal strength of signals from a satellite 50a received by the eight devices 60 may be used in a triangulation process. In a similar fashion where a single device 60 is moved within a space to eight different locations over time, signal strengths associated with the eight different locations may be used to triangulate the location of the satellite.

Referring to FIG. 8, in at least some cases electronic identification badges 61 may be provided instead of or in addition to portable computing devices to operate as data collection devices or as Bluetooth beacons, or both. Here, a badge would operate in the same or in a similar fashion to the computing devices described above.

Referring to FIG. 8, an exemplary system for managing resources may include any one or more of the three different ways to collect information from tracking devices 40 associated with enterprise resources including access points 38, supplemental collector subassemblies 49 and portable computing devices 60 and 61. In some cases each of the three information collection systems may be used together. For instance, where access points 38 and assemblies 49 can collect information from devices 40, that information may be routinely collected. Periodically when a portable computing device 60 is located within a space, the device 60 may collect resource information from devices 40 that is more accurate than the information collected using the access points 38 and collector assemblies 49 and that information may be used to supplement or replace some of the information obtained using the collector subassemblies and access points.

In many cases a set of enterprise employees will not use portable computing devices 60 or may not have their portable devices turned on at some times. In these cases, other devices may be required to track employee locations. For instance, referring again to FIG. 2, each employee may be issued an exemplary electronic identification badge 61 that stores a unique employee identification number in a badge memory and that includes a transmitter 63 that transmits the identifier to data collector devices located within the enterprise facilities. Here, as in the case of devices 40, each badge 61 may transmit lower power signals so that a battery charge can last several years. Location of the badge 61 can be determined via proximity of the badge 61 to data collecting devices and knowledge about the locations of the collecting devices. For instance, signals transmitted by device 63 may be received by satellites 50a, 50b and used to determine location of an associated badge 61 and employee.

In at least some embodiments of the present disclosure it is also contemplated that each or at least a subset of tracking devices 40 may be programmed to sense other information that may be useful for driving different system applications. For instance, in cases where at least some employees do not use trackable devices (e.g., portable electronic devices or trackable badges) or where an enterprise does not include systems for tracking employee locations, it may still be useful to know if and when spaces within a facility are utilized. For example, a facility manager may want to know how often and for how long specific spaces are utilized, how many employees utilize the spaces, etc. As another example, an employee searching for an unoccupied space for use may want to access a list of available and unoccupied conference spaces.

According to at least one aspect of some embodiments of the present disclosure, each device 40 may also include one or more sensors that can be used to sense state for status changes associated with resources or the environments in which those resources are deployed. For instance, referring again to FIG. 5, in addition to the components described above, each device 40 may also include any one or more of a motion sensor 62, a temperature sensor 64, a sound sensor 66, an Nth sensor 68 (e.g., a $CO_2$ sensor), etc. Motion sensor 62 may be any type of motion sensing device including one or more accelerometers, tilt sensors, inclinometers, gyroscopes, or other devices capable of sensing movement of a resource through or within space. For instance, an accelerometer may be mounted to the undersurface of a chair seat and may be able to detect movement within a space or changes in relative juxtaposition of a resource to other affordances within a space. An accelerometer may also sense any slight movement of a desk or a table such as, for example, when a person touches a top surface of the desk or table during use, opening of a file cabinet drawer, closing of a door in an egress, etc. As another instance, a device 40 including a tilt sensor may be placed in the backrest portion of a chair assembly and may measure tilt of the backrest with respect to a seat member.

Temperature sensor 64 may measure temperature within a space (e.g., 20*b*) or may be positioned to detect temperature change on the surface of a chair seat or backrest member. When a person enters a space the temperature of the space will often change as the person's body heat dissipates within the space. When a person sits on a chair and contacts a chair surface, the temperature of the surface typically changes and can be sensed by a temperature sensor mounted to the chair.

Sound sensor 66 may include a microphone for detecting sound within a space proximate the device 40. The sound sensor may be tunes to the pitch and tone range of typical human voices so as to be able to distinguish human voices from other sounds.

Other sensor types are contemplated and sensor N may include, for instance, a carbon dioxide sensor to detect the level of carbon dioxide within a space, one or more pressure sensors, position sensors, etc. Here, when people enter a space, the amount of carbon dioxide typically increases and therefore a change in carbon dioxide level within a space may, in at least some cases, be used to sense use of a space by one or more people. A pressure sensor may be used to sense when a person sits within a specific seat. Each sensor is linked to processor 59 and provides information to processor 59 related to the sensed parameter.

Processor 59 is programmed to either report the sensed parameter values to server 12 or, in some cases, to analyze the sensed parameter values and report some result associated with the analyzed values. For instance, in some cases processor 59 may simply recognize when a chair (e.g., a resource) moves via a motion sensor and may report the period since the most recently detected motion to server 12. In this case, server 12 would be programmed to use the received data to determine if a space associated with the resource is occupied. For instance, one simple rule may be that if a chair moved in the last 20 seconds within a conference room, that the conference room is presumed to be occupied. In this case, if any of ten chairs within a conference space moved in the last 20 seconds, occupancy may be presumed. Where duration since last movement is provided to server 12, a single received signal may be used to identify occupancy without requiring any historical data about previous locations of resources, previous movements, etc.

Another rule may be that at least one chair must move within a space and at least one sound that is consistent with the range of a human voice needs to be detected and reported to server 12 within some threshold period for the server 12 to determine that the related space is occupied. Many other more complex rules are contemplated.

In another case processor 59 may maintain several separate rolling state change event time buckets or counters where state changes that occur in a specific time period associated with a bucket are counted. For instance, in one case a processor 59 may maintain short, intermediate and long term counts corresponding to one minute, one hour, and six hour periods. When a state change occurs, the device processor may add a count to each of the counts to maintain rolling one minute, one hour and six hour counts. The three counts may be transmitted periodically to server 12. Where the counts reflect substantially the same rate of state changes over all periods tracked, server 12 may be programmed to determine that the sensed state changes are associated with ambient noise in an associated space. However, where the counts reflect an increase in state rate changes in the short and/or intermediate duration buckets, server 12 may be programmed to determine that the sensed state change(s) is associated with true movement or some other parameter associated with occupancy of a space In still other cases server 12 may be programmed to use sensed state changes from multiple sensor devices 40 within a space to discern whether or not some condition (e.g., occupancy) occurs within a space. For instance, where substantially similar movements are sensed by each of ten sensor devices 40 on ten chairs within a space, server 12 may be programmed to determine that the similar movements are attributable to noise as opposed to individual movements of chairs and therefore to determine that an associated space is unoccupied. Many other occupancy determining protocols are contemplated. In addition, many other protocols for detecting other activities or conditions (e.g., other than occupancy) using data from sensor devices 40 are contemplated.

In at least some embodiments each device 40 cobbles together device identifying information as well as state conditions into data packets that are transmitted to server 12 via data collectors. Thus, for instance, a low energy Bluetooth data packet including device identifying information and state conditions may be transmitted periodically by each device 40. In other cases data packets may only be transmitted when a change in a sensed state is detected by a device 40. For instance, in a case where occupancy is assumed when a chair is moved within a space, device 40 may only transmit a packet once movement is detected so that satellite battery power can be conserved.

Figure 9:
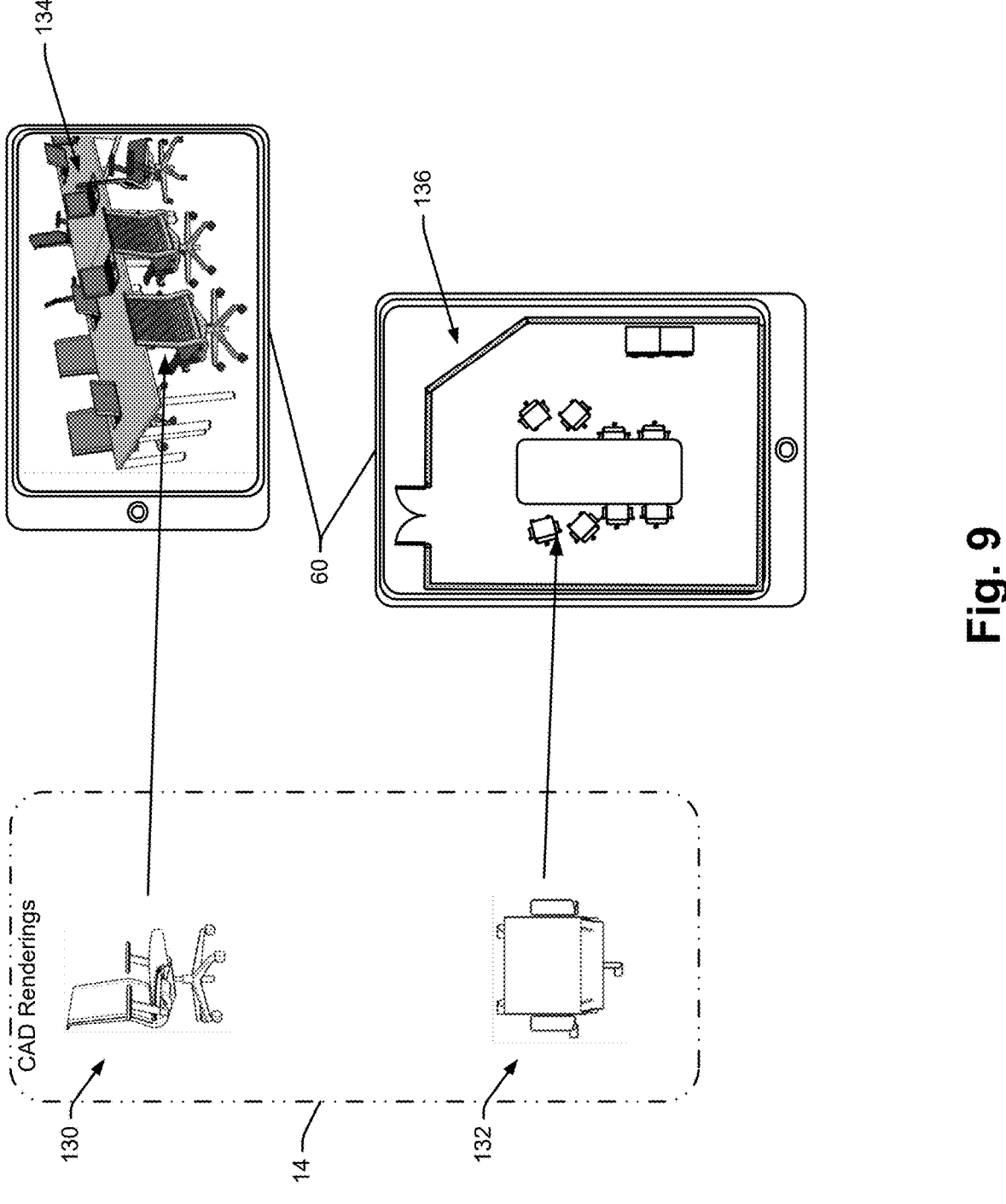
FIG. 9 is a schematic view illustrating exemplary CAD models and CAD renderings on portable electronic devices that are consistent with at least some aspects of the present disclosure.

To generate dynamic virtual views of resources within facility spaces as those resources are moved within the spaces, in at least some embodiments, server 12 may have access to 2D and 3D CAD renderings of each resource used within facility spaces. For instance, in at least some cases, a 3D view of a space may be generated for use by an enterprise employee that wants to obtain a general understanding of resources within and the layout of a space prior to use. Referring to FIG. 9, to generate dynamic virtual views of facility spaces, graphical 3D and 2D CAD models 130 and 132, respectively, of each resource available within a facility are stored in database 14 (see again FIG. 1) that can be used by server 12. In at least some embodiments, each 3D CAD model 130 includes data that enables an exemplary resource to be shown from any vantage point. For instance, a model corresponding to a specific chair type may be used to present an instance of the chair type from a front perspective view, from a side perspective view, from a rear perspective view, etc.

In some cases detail within a virtual space view will be relatively granular in the sense that resources within a space may be represented generally without showing exact real life orientations and juxtapositions of the resources within the space. For instance, where a conference table and ten chairs of a specific type are located within a space to be shown in a view, the chairs may simply be virtually represented in an equispaced and aligned pattern about a conference table without showing actual locations of the chairs, orientations of the chairs, etc. Thus, a chair that is spaced from a conference table by eight feet in reality may be shown adjacent the table edge. These general virtual images may be required where only general resource location information (e.g., which space a chair is located in) can be obtained due to sensing and processing limitations.

In other cases it is contemplated that resource state information that is sensed and collected may be much more detailed including not just which space a resource is located in but also precise location within a space, precise orientation (e.g., facing the edge of a table, facing a wall, etc.). Where more detailed information is available, that information may be used by server 12 to generate a more accurate virtual view of a space by, for instance, showing precise locations of resources within a space as well as relative juxtapositions of resources. To this end, see the exemplary image 134 in FIG. 9 where some chairs are shown oriented away from the edge of a table representation to reflect actual real life orientations. An exemplary 2D virtual image is shown at 136 where chairs are shown in actual orientations to reflect the arrangement shown in the 3D view 134.

Figure 10:
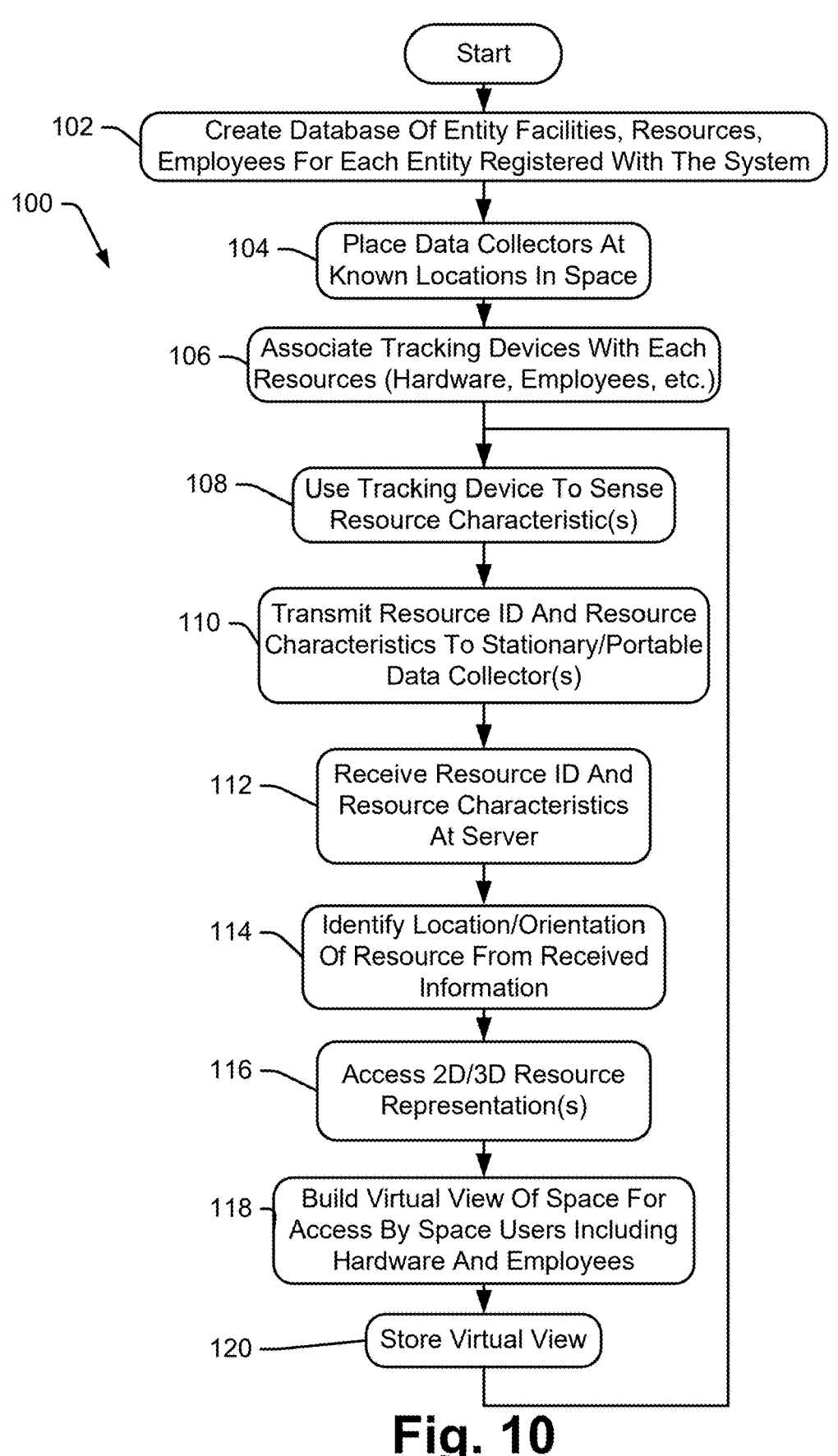
FIG. 10 is a flow chart illustrating a commissioning procedure for generating virtual views of enterprise space according to at least some aspects of the present disclosure.

Referring to FIG. 10, a process 100 that may be performed by server 12 to commission a resource management system and generate virtual views (e.g., 3D or 2D) of spaces is illustrated. At block 102, a database of entity facilities, resources and employees registered with a system is created and stored in database 14 (see again FIG. 1). Here, each resource would include a resource identifier number as well as some description of the resource itself which may include, for instance, the 3D or 2D models as shown in FIG. 9. In this case, resources include space affordances such as tables, desks, chairs, videoconferencing systems, printers, etc., as well as enterprise employees. At block 104, data collectors including access points and/or collector assemblies 49 are places about the facility space and their locations are identified and stored in database 14. Here, again, the locations may be manually identified and stored or an automated process using one or more personal portable computing devices 60 may be employed.

At block 106 tracking devices 40 are associated with each resource to be tracked within an enterprise facility. Here, association includes both physical association (e.g., attachment to a chair) and virtual by correlation of a resource identity to a unique resource identifier in database 14.

At block 108, resource characteristics are sensed by devices 40. Here, it is assumed that the virtual views to be generated will include precise location and orientation of resources. Because the application is simply for generating virtual space views, the data required to drive the application is only presence, location and orientation information indicating specific locations of resources in spaces as well as orientations (e.g., no occupancy data or data that can be used to determine occupancy state) is required in this application). At block 110, devices 40 transmits data packets including resource ID, location and orientation data. At block 112 one or more data collectors 38, 49, 60 in the vicinity of a transmitting device 40 receives the transmitted data packets and provides the received packets to server 12.

At block 114, the received packets are analyzed by server 12 to identify each resource (e.g., via the device 40 identifier), resource location and orientation. At block 116, server 12 accesses the 2D and 3D resource renderings 132 and 130, respectively, in database 14 and at block 118, server 12 uses the renderings to generate 2D and 3D views. At block 120 the views are stored for subsequent use.

Although not illustrated in detail, other data for supporting other applications may be generating using a process similar to that shown in FIG. 10. For instance, where statistical and historical space occupancy data is required by a facility administrator or the like, that information can be generated by sensing resource movement, CO2 levels, temperature, etc., at block 108 which is transmitted to the server at block 110 and which would then be used to assess occupancy of different facility spaces. The occupancy information would be used to generate an occupancy view of a facility at block 118. Similarly, current space occupancy or use views may be generated and stored at blocks 118 and 120. Virtual views, occupancy views and other view types may be generated routinely and regularly or they may be generated only when a specific view is requested by a system user.

Other circumstances in addition to occupancy maybe detected using information sensed via devices 40. For instance, the number of employees using a space may be determined by sensing movement of a subset of chairs within the space. For example, where five out of twelve chairs move routinely during a one hour meeting in a conference room, server 12 may be programmed to determine that five employees attended the meeting. Discerning other circumstances based on sensed data is contemplated.

Figure 11:
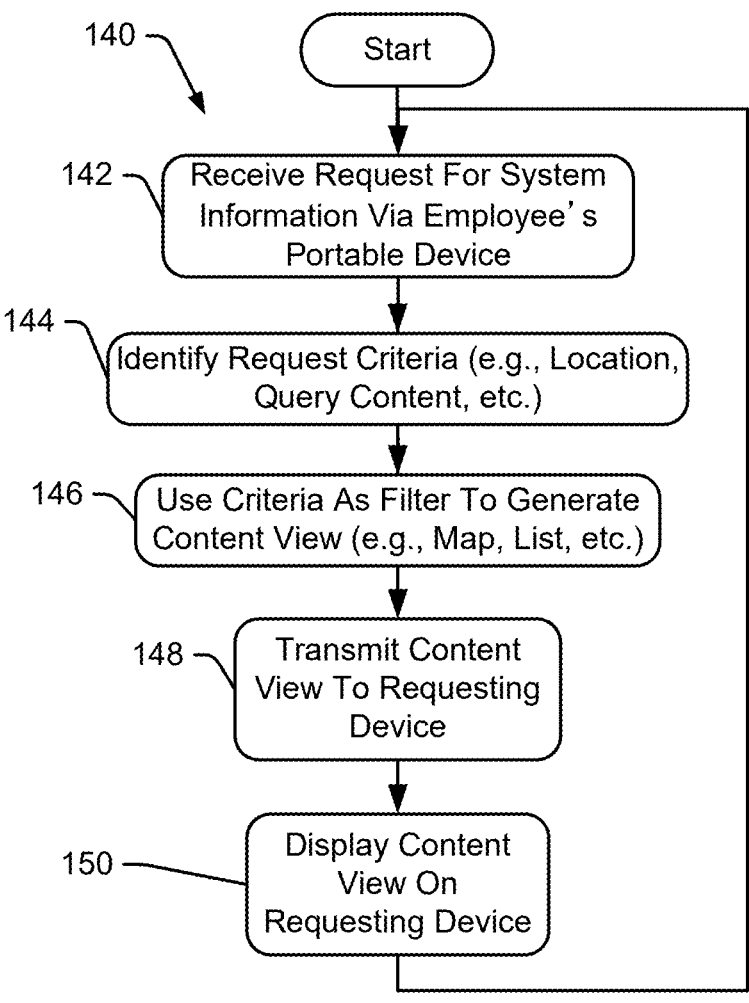
FIG. 11 is a flow chart illustrating a process whereby an electronic device can be used to render representations of enterprise space.

Referring to FIG. 11, a process 140 for obtaining information related to a facility space is shown. Here it is assumed that an enterprise employee uses a portable smart device 60 to request space information and that the information is to be presented to the employee via a display screen 160 on the portable device. In this regard an information request may be a direct request or may be automatically generated by a user's portable computer device 60. For instance, a user may request information related to a specific facility space to generate a direct request. In other cases the same user may move through a facility space and device 60 may change the requested information based on the current location of the employee within the space (e.g., if the employee is displaying information related to proximate space and the employee's location changes, the information displayed to the employee may change to track the current location).

At block 142, a portable computing device 60 is used to generate a request that is received by server 12. At block 144, server 12 identifies the request criteria including, for instance, location (e.g., selected by an employee or automatically determined as a function of location of a device 60) of the space for which the request has been generated, query content (e.g., 3D view, 2D view, current occupancy, etc.) etc. At block 146, server 12 uses the request criteria to identify information to present and generates a view that is most consistent with the request criteria. The generated view is transmitted at 148 to the requesting computing device 60 and at block 150, the requesting device 60 displays the generated view on the device display.

Referring again to FIG. 4, the exemplary screen shot includes a dynamic virtual map view 159 of space proximate a device 60 user that shows the general layout of the space including divider walls as well as the current locations of facility resources including the employee using device 60 at 166, desks, chairs, tables, doors and other non-human resources useable by the device user and locations 168a through 168c, etc., of other enterprise employees within the represented space (each other employee is indicated by a phantom circle in the illustrated example). The device user 166 may observe view 159 to determine locations of proximate resources including space, employees and affordances and thus, the overhead view operates like a compass to orient the device user.

Again, where access points 38 (see again FIG. 2) are proximate the location of one of the portable computing devices 60 or one of the detectable employee badges 61, triangulation of signals therefrom may be used to determine the location of the device 60 or badge 61. In spaces where hard wired access points do not exist as in space 20*b*, one or more collector assemblies 49 (see again FIGS. 6 and 7) may be installed and used to determine the locations of devices 60 and badges 61 therein. In still other cases sensor devices may be installed in doorways, hallways or other locations intermediate conference or personal spaces to determine employee locations as employees move through those transition spaces from one space to another. Known locations prior to movement through the intermediate spaces (e.g., a doorway) that transition between other spaces can be used to determine in which space an employee is located. For instance, in FIG. 2, if it is know that a device 60 user was initially in space 20*a* based on access point information prior to moving through the doorway 35 separating space 20*a* from space 20*b*, it can be determined that the device 60 and an employee using the device is located in space 20*b* after movement through doorway 35.

Other system signals may be useable to determine device 60 and/or badge 61 locations. For instance, where it is know that a tracking device 40 is in space 20*b* in FIG. 2 and device 60 obtains a signal from the tracking device 40 and passes that signal on to a single access point 38 outside space 20*b*, while the single signal from device 60 would be insufficient for triangulating a location, the fact that device 60 obtained a low power signal from the tracking device 40 may be enough to determine that the device 60 is located in the same space as the tracking device 40.

Thus, the access points 38, collector subassemblies 49, portable devices 60 and tracking devices 40 together may form a web for collecting signals useable by server 12 to determine locations and other characteristics of enterprise resources using one or a plurality of different algorithms.

In at least some embodiments it is contemplated that each or at least a subset of the resource representations in view 159 may be selectable to obtain additional information about that resource. For instance, as seen in FIG. 4, a representation 168*c* of one employee in the view 159 may be selected (e.g., via touch) causing an image 170 of the employee as well as a name field 172 to be presented in a manner that associates the image and name field 172 with the employee representation and location in the presented view.

Figure 12:
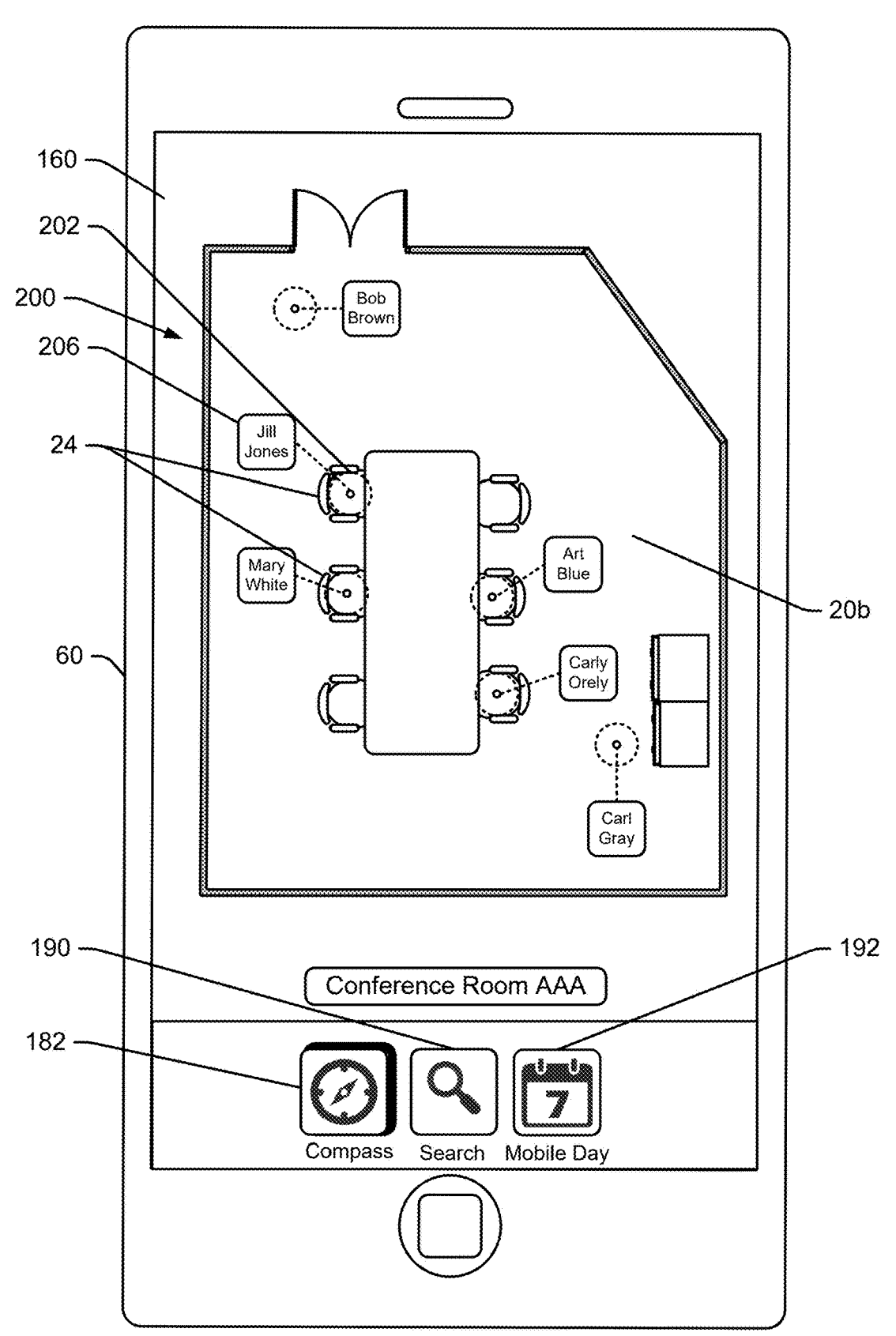
FIG. 12 is similar to FIG. 3, albeit illustrating a screen shot of a graphical map of a specific facility space.

As another example, the device 60 user may select one of the spaces presented in view 159 to obtain additional information about the space and resources or affordances located therein. For instance, where space 20*b* in FIG. 4 is selected via touch or the like, the image of space 20*b* may be enlarged as in FIG. 12 and presented as a screen shot 200 showing a larger version of the 2D representation (e.g., another resource representation) of space 20*b*. In FIG. 12 additional detail including the names of employees currently located in the space 20*b* is added to the image to help the device 60 user better understand current use of space 20*b*. Thus, for instance, the name "Jill Jones" has been spatially associated with employee representation icon 202 to indicate identity of the represented employee.

Figure 13:
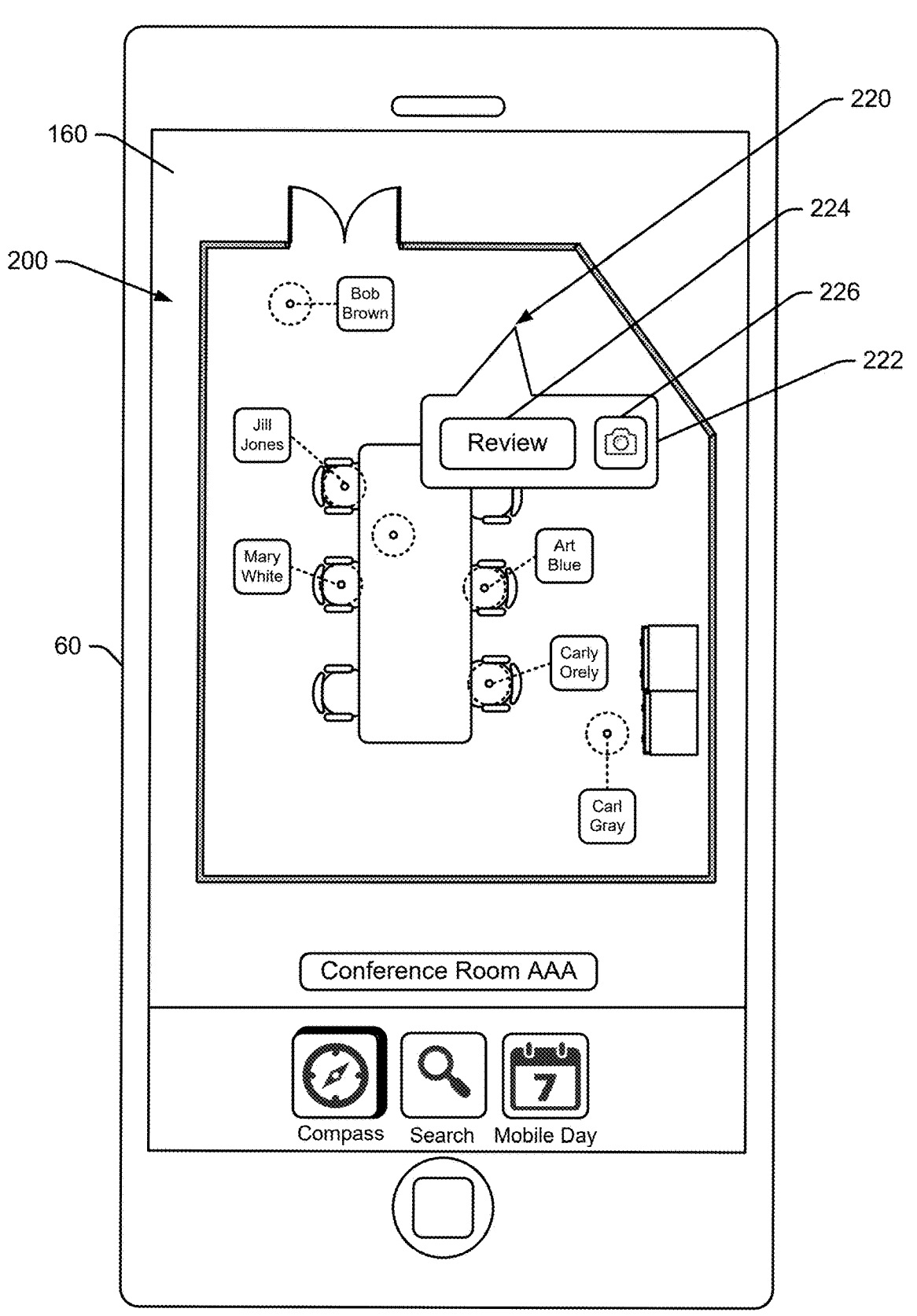
FIG. 13 is similar to FIG. 12, albeit showing a different screen shot.

When employees use a resource, often times the employee develops an impression of the resource that she would like to share with others such as, for instance, a facility administrator, other employees, etc. For instance, an employee may have determined that a specific space with specific affordances was particularly attractive or useful and may want to issue a review of the space including an image(s) and comments. To this end, referring to FIG. 13, it is contemplated that in some cases when an open portion (e.g., 220) of a space view is selected, an option to review the space may be presented as at 222 including a "Review" icon 224 and a camera icon 226. Here, selection of the review icon 224 would open up a comment field in which a system user could enter a comment related to the selected space.

Figure 14:
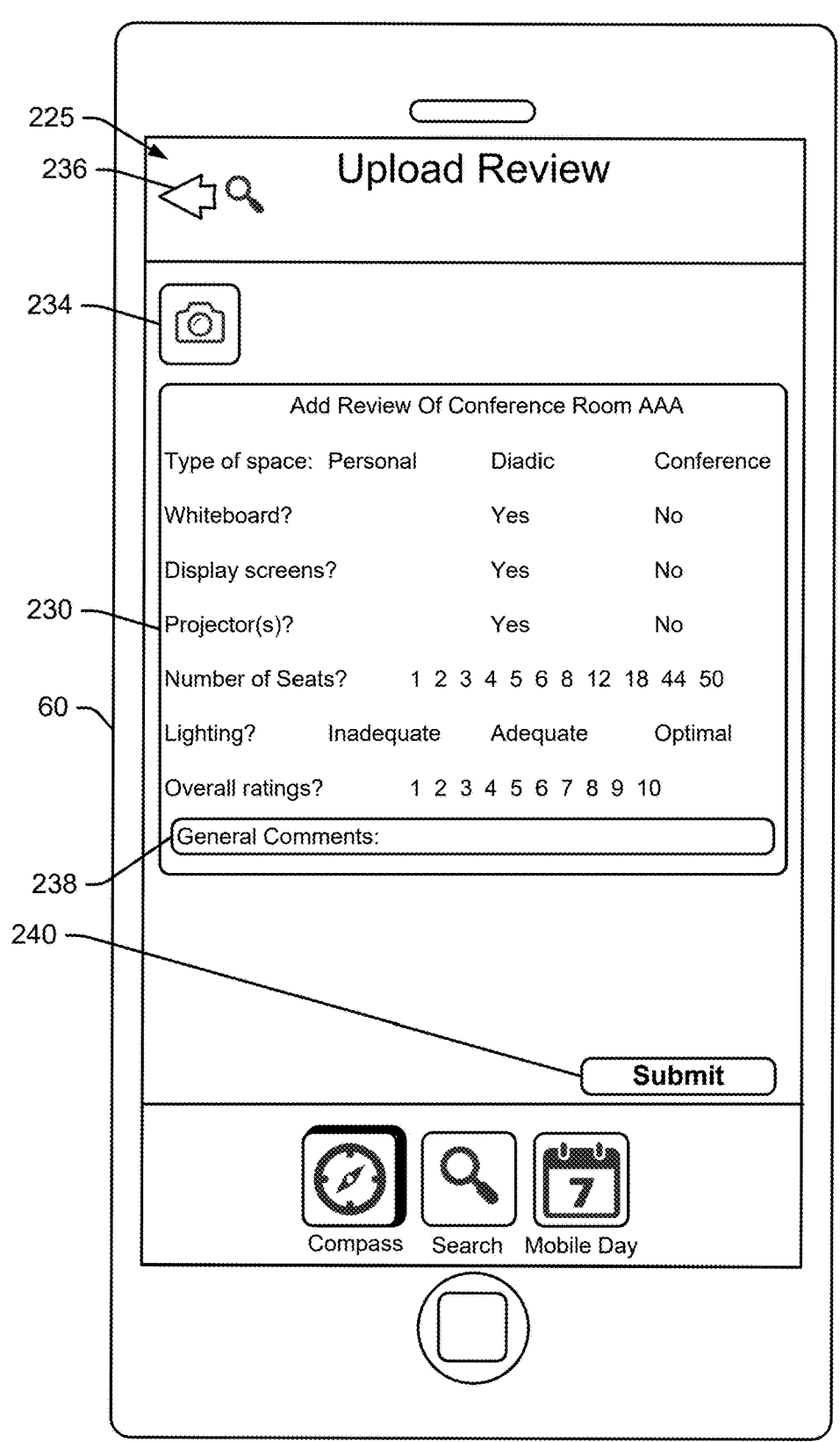
FIG. 14 is similar to FIG. 12, albeit showing yet another screen shot for generating a review of an enterprise space.

An exemplary review screen shot 235 is shown in FIG. 14 which includes a review field 230 including questions and a pre-canned set of answers that can be selected to provide useful information. For instance, an employee may be able to indicate resources that are available within a space by selecting different options in field 230 if the system does not already include that information. Some of the questions require judgment such as, for instance, if the lighting in the space is adequate, an overall rating value, etc. A field 238 is also provided so that a personalized comment can be issued. A camera icon 234 is provided for adding an image to the review. Once a review is completed, a submit icon 240 may be selected to add the review information to database 14 for subsequent access by the employee that generated the review as well as by others. A back icon 236 is also provided for returning to a previous view if the employee does not want to issue a review.

In at least some embodiments, the system may use an employee's review data to recognize an employee's preferences or favorite resources and may subsequently use that information when suggesting resources for use in the future. For instance, where an employee review indicates an overall rating of 8, 9 or 10, the system may store that information and use that information subsequently to recommend the same space when the employee is searching for a space to use during a subsequent session. In other embodiments the system may use employee review information for one space or one set of resources or affordances to recommend another set of resources or affordances. For instance, where an employee review indicates an overall rating of 8, 9 or 10 for a first space in a first facility that includes a first resource set arranged in a first arrangement, where an employee seeks a space in a second facility for a subsequent session, the system may identify the first space resource set and arrangement and suggest a second space in the second facility that has characteristics similar to the first space that is available when the employee needs a space.

Figure 15:
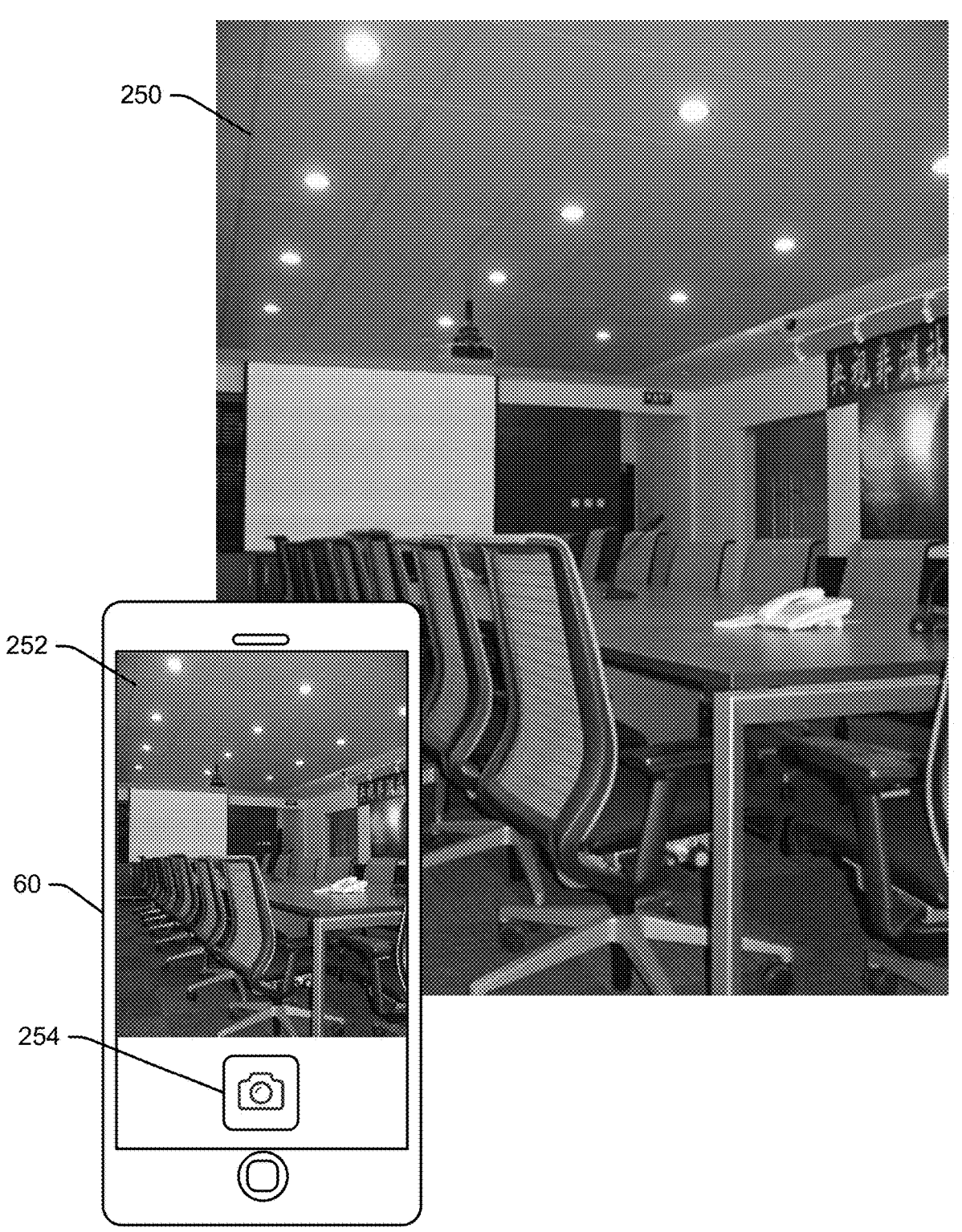
FIG. 15 is a schematic showing an image taking aspect related to a space review process that is consistent with at least some aspects of the present disclosure.

Referring again to FIG. 13, selection of camera icon 226 opens up a camera application as in FIG. 15 so that an employee can view an image 252 of a space 250 and snap a picture via virtual button 254 to obtain an image of the space to be added to a subset of data associated with the space in database 14. Space images may be subsequently access in at least some embodiments by other employees to obtain a sense of a space prior to reversing the space for subsequent use, prior to arriving at the space for a conference, etc.

Figure 16:
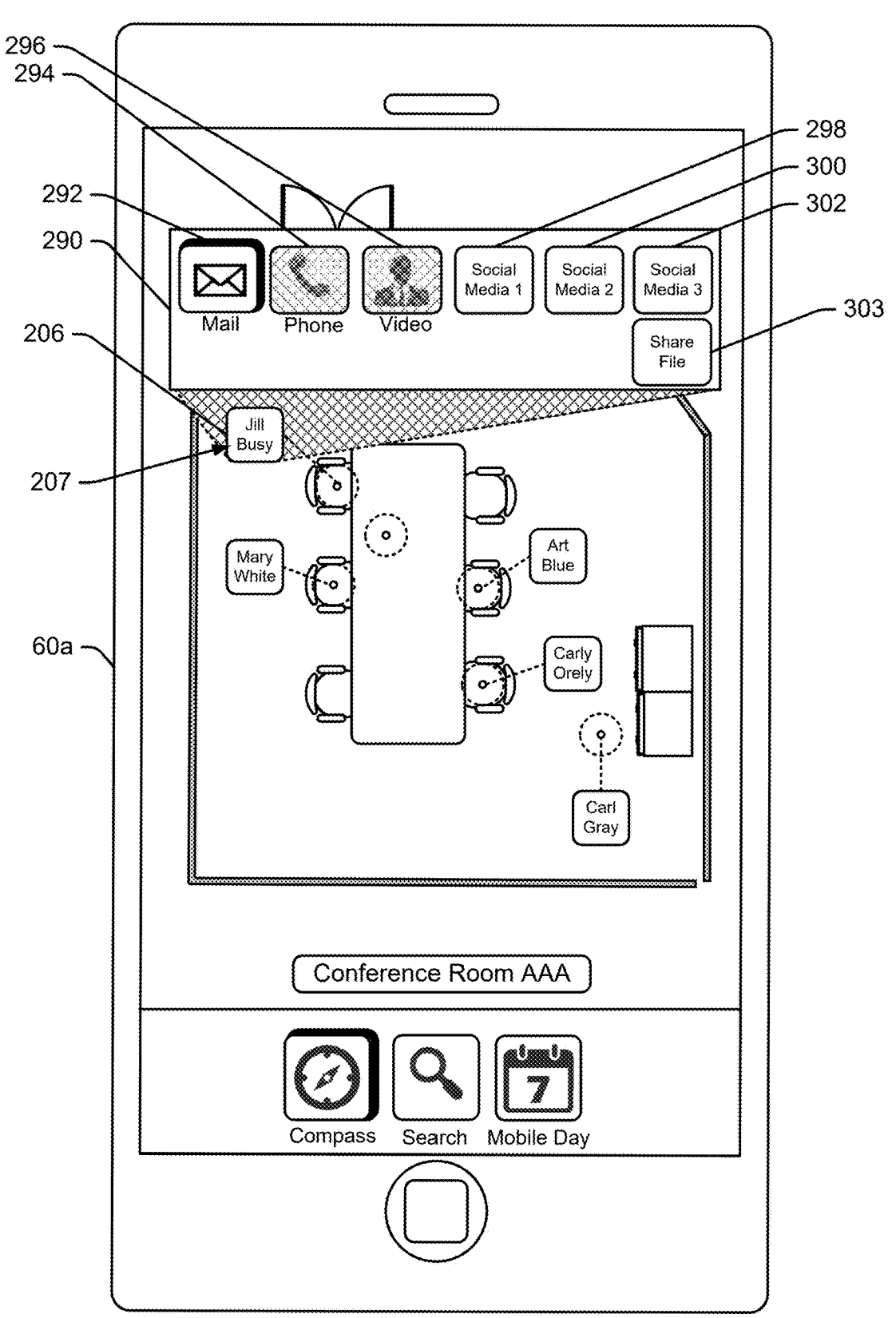
FIG. 16 is similar to FIG. 12, albeit illustrating another screen shot for facilitating communication between a device user and another enterprise employee represented via the screen shot.

In at least some embodiments a device 60 user may be able to select an employee's name from a name field associated with an employee representation on a space map view in order to establish communication with that employee. For instance, see FIG. 16 where a user has selected the "Jill Jones" field or icon 206 to open up a communication type selection field 290 including a set of icons associated with different ways of communicating with the selected employee. Here, for instance, the icon set includes a "mail" icon 292, a "phone" icon 294, a "video" icon 296, and first, second and third social media icons 298, 300 and 302 that are associated with an e-mail application, a phone application, a video application and other types of media applications, respectively. Selection of any of the icons in field 290 causes device 60 to start an associated communication process with the selected employee.

Figure 17:
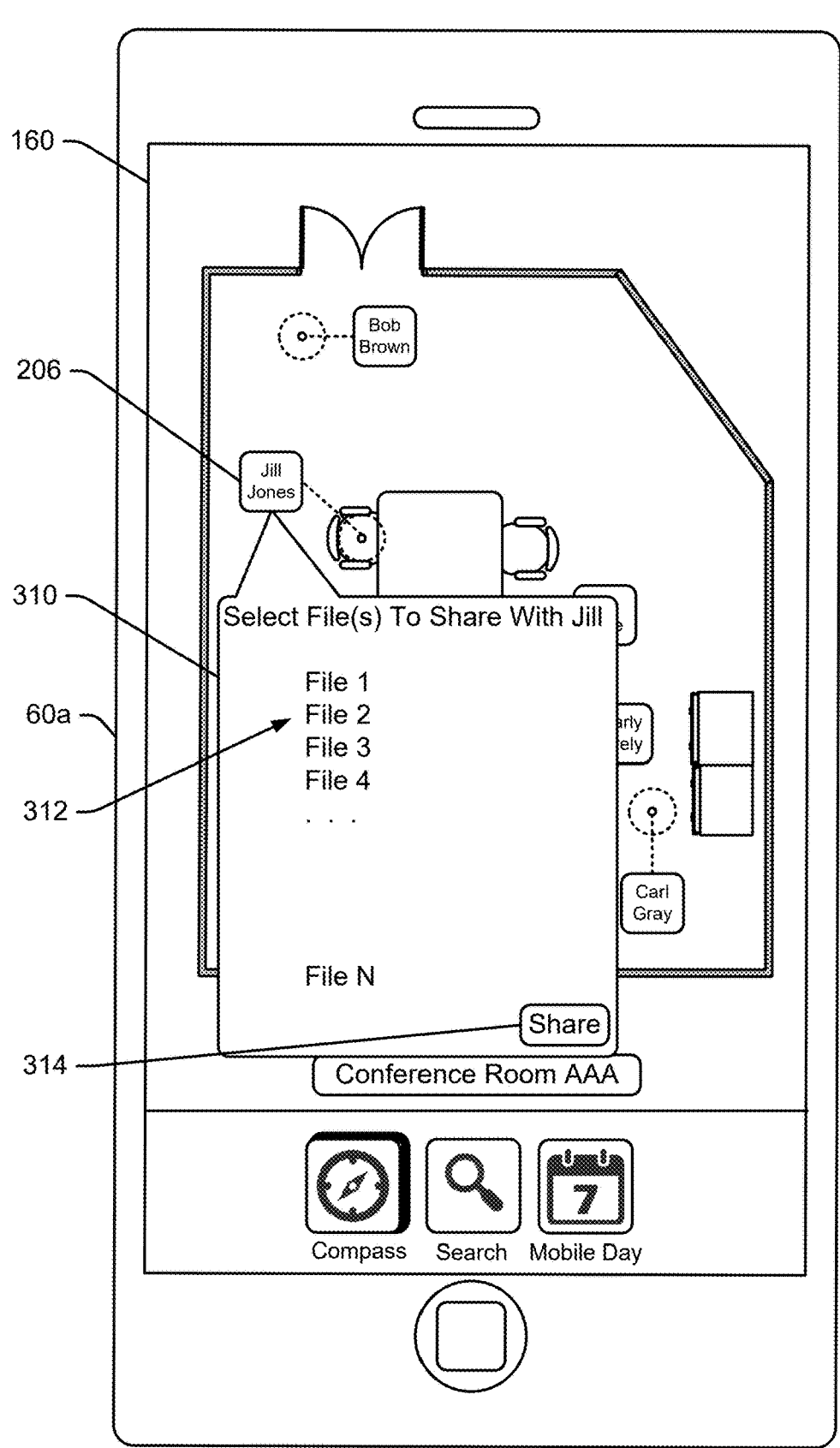
FIG. 17 is similar to FIG. 12, albeit illustrating a screen shot that enables file sharing with an employee that is represented on a graphical map on a device display.

Referring again to FIG. 16, in at least some cases field 290 will also include a file share icon 303 that is selectable to share one or more files with an employee shown on a map view. In this regard, once icon 303 is selected, referring also to FIG. 17, a file sharing window 310 may be presented in relation to the identified employee's icon 206 to enable the device 60 user to select one or more files from a list 312 to be shared with the selected employee at 206. Once files to share have been selected, a "Share" icon 314 may be selectee to complete the sharing process. In response to selection of icon 314, server 12 obtains the selected files, places the selected files in an e-mail or other electronic communication (e.g., a text message) and sends the selected files to the target recipient.

In at least some embodiments when an employee icon like icon 206 is selected, at least some information about the employee's current status (e.g., an employee status indicator) may be presented in addition to the communication selection field 290. For instance, referring again to FIGS. 13 and 16, when icon 206 is selected, the icon 206 may be changed as indicated to show that Jill is "Busy" as at 207. Here, Jill's status may be determined by accessing Jill's schedule maintained by electronic scheduling software used by Jill and other enterprise employees. In the alternative, Jill's status may be determined in real time by sensing Jill's current activities and discerning whether or not Jill is likely available by applying a rule set maintained in database 14. For instance, where server 12 can determine that Jill is in a conference space with four other employees and that the employees are having a discussion, the server 12 may be programmed to determine that Jill is in a meeting and not available.

In still other cases a combination of appointments entered into an electronic scheduling program and real time sensing of employee activities may be used to determine if an employee is available or busy or has some other status. For instance, where Jill has a scheduled meeting in 45 minutes (e.g., a meeting on an electronic schedule) and is travelling toward a conference room that is 30 minutes away (sensed real time conditions), server 12 may be programmed to detect that Jill is busy and should not be disturbed. Many other rules for automatically determining current employee status are contemplated. Other statuses and related indicators are also contemplated such as "Sleep", 'Vacation", etc.

Referring yet again to FIG. 16, where an employee (e.g., Jill represented at 206) is occupied/busy, in at least some cases certain applications for communicating with that employee may be disabled or at least indicated as less desirable options because they would disturb the employee if used. For example, see that the phone and video icons 294 and 296 are shaded with double-cross hatching to indicate that they are either disabled or less desirable ways to communicate with Jill who is indicated as busy at 207. By visually distinguishing communication options 294 and 296 from other options, device 60 steers the device 60 user toward more optimal options to communicate given the status of an associated employee.

Other initial or default corporate map screens are contemplated. For example, in many cases an employee may routinely work or socialize with a subset of enterprise employees on a team and the employee may desire to receive information related to each team member when the corporate maps application is first accessed. Hereinafter, the list of employees on a team will be referred to generally as a "favorites list" and the employees on the list will be referred to as "favorites".

Figure 18:
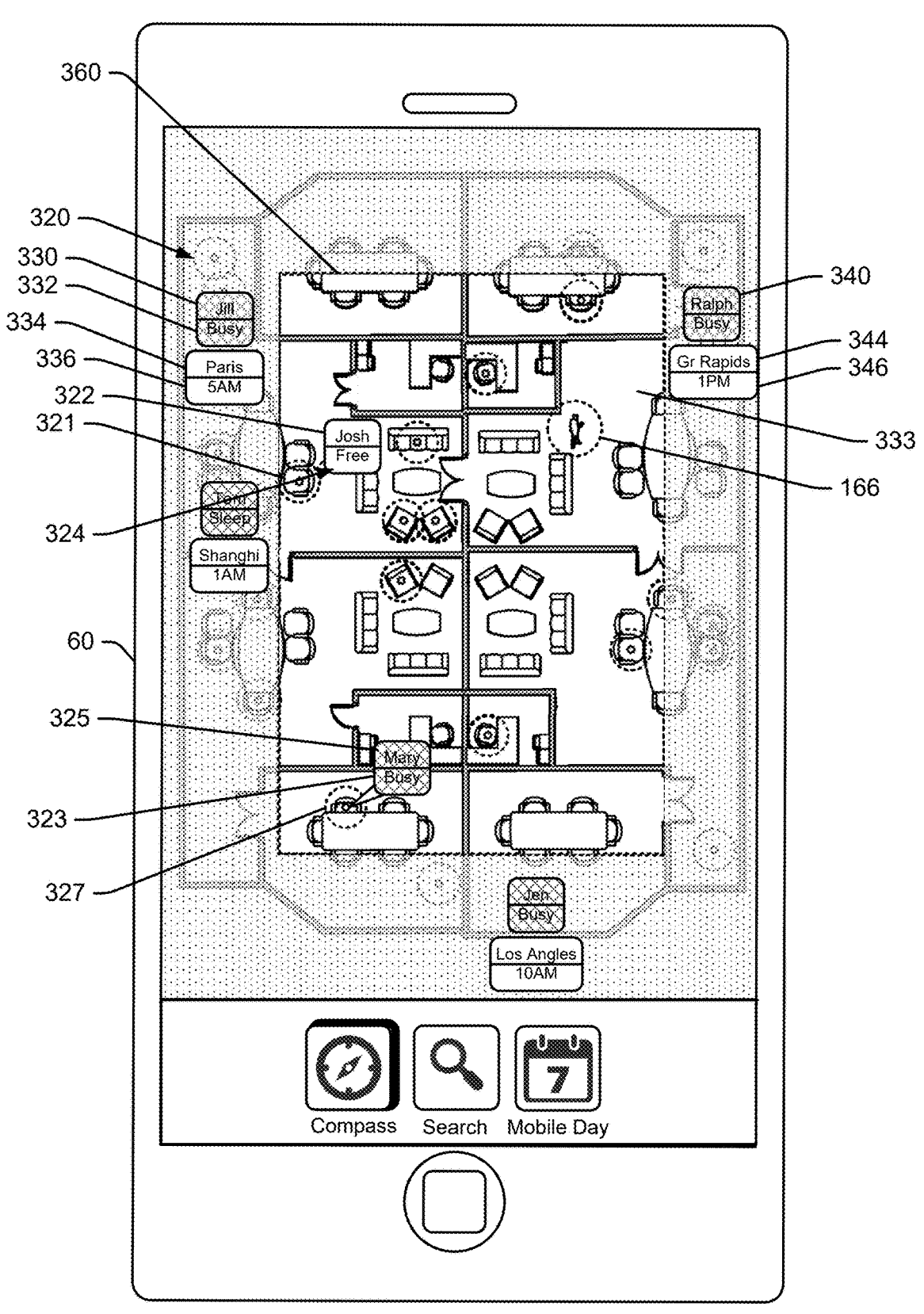
FIG. 18 is similar to FIG. 12, albeit illustrating another screen shot including a dual view to show local and remote employees at the same time.

Referring to FIG. 18, an exemplary initial "dual map" screen shot 320 showing information about employees (e.g., another resource representation) on a favorites list is illustrated. The view is referred to as a "dual map" view because the view includes one representation overlying another. In this regard, it has been recognized that oftentimes employees on a favorites list will be located at many different locations so that all favorites cannot be presented in a single facility map view. For instance, in the exemplary view in FIG. 18, six employees are on the favorites list of the employee using device 60 including Jill, Tom, Josh, Mary, Jen and Ralph. Of the six favorites, only Josh and Mary are at locations within the same facility as the device 60 user while the others are at other locations. For instance, Jill is in Paris, Tom is in Shanghai, Jen is in Los Angeles and Ralph is in Grand Rapids. Because Josh and Mary are in the same facility as the device 60 user, each of Josh and Mary can be represented in the facility map view (see phantom circles at 321 and 327) along with the device 60 user at 166. Because the other favorites are not in the same facility, they cannot be represented in the facility map view. Instead, the remote favorites are presented in a shaded frame "remote" view space 360 that overlies the facility map view.

Locations of remote employees are determined by systems in occupied facilities as described above and are provided to server 12. In some cases employee locations outside enterprise facilities may also be tracked using GPS or some other type other system and those locations may be used by server 12 to drive one or more applications along with facility location information for other employees.

Even inside a facility space, in some cases, a GPS system may be able to provide somewhat accurate position information for a portable computing device user. In this case, information from an external GPS system may be combined with signals from a transmitting device within a facility to more accurately determine location of the transmitting device. Many different algorithms for combining GPS and facility sensed information from stationary sensors as well as portable computing devices that obtain information from transmitting devices are contemplated.

In still other cases other systems that can indicate locations of persons outside facilities with sensing devices may be used to determine employee and other locations. For instance, where an employee is scheduled to be on a flight from Europe to the United States, a plane tracking system that identifies the location of the flight over the Ocean may be used to determine the location of the employee on the flight.

As shown, in at least some embodiments the remote view will be at least somewhat transparent so that the device 60 user can see there through to perceive underlying aspects of the graphical local facility map view. For instance, space defining walls, chairs, tables, etc., as well as phantom circles showing other employees may be observable under the remote view frame. Where remote favorites are represented in the remote view space 360, they may be located at locations where minimal or relatively unimportant information is represented in the underlying facility map view. For instance, remote favorites representations may, where possible, be placed in space 360 at locations where they do not overlap phantom circle representations of other employees. Remote employee representations may be presented at locations in space 360 that show employee locations relative to the graphical map view presented. Thus, in FIG. 18 where North is up, if Shanghai is to the West of the map view and Grand Rapids is to the East, Shanghai and Grand Rapids representations would be shown in the left and right portions of the border space 360 as illustrated.

In at least some cases the portion of the facility map view represented in FIG. 18 may be modified to include a space just large enough to show locations of favorites within a local facility in which the device 60 user resides. For instance, in FIG. 18, if Josh and Mary were both located in the same space (e.g., 333) as employee 166, the facility map view may automatically be zoomed in to include only space 333. In some cases the portion of the map view shown with boundary 360 which is not shaded may be zoomed in or out as a function of location of favorites so that any local favorites are within the space defined by boundary 360.

In the FIG. 18 example, each favorite's name and current status are indicated. For instance, see the name fields at 330, 322, 325 and 340. Josh is indicated as "Free" at 324 while Mary is indicated as "Busy" at 323. Here, again, the status designations may be determined in any of several ways including accessing scheduling software, by using real time sensed information about employees and their surrounding environments or a combination of both scheduled activities and sensed real time information.

For remote employees identified in the frame 360, in addition to name and status indications, location and time indicators are presented to help the device 60 user have some context in which to consider the favorite's current status. For instance, for Jill, the location and time indicators at 334 and 336 indicate that she is in Paris and that the local time is 5 PM while for Ralph the indicators at 344 and 346 indicate that he is in Grand Rapids and that the current time is 1 PM. Although not shown, other information about employees may be presented such as, for instance, additional information about their environments. For example, the current weather in Paris may be indicated and spatially associated with Jill or Jill's general availability or lack thereof during the next eight hours may be indicated (e.g., "Available next from 10 AM to 11 AM your time"). Time of day, weather or other environmental characteristics may also be represented as glanceable icons such as, for instance, a sun icon to indicate day and a moon icon to indicate night, a sun icon to indicate a sunny day and a cloud to indicate overcast conditions, etc.

Referring yet again to FIG. 18, in some cases the favorites representation may be color coded or otherwise visually distinguished in some fashion to indicate current status. For instance, because Jill is busy, the square 330 representation of Jill may be shaded red. Similarly, the square 325 associated with Mary may be shaded red to indicate a busy status while Josh's square 322 may be shaded green. Other colors for other statuses are contemplated such as, for instance, a yellow shading to indicate that an employee is scheduled to be free in the next 15 minutes. Color coding is particularly advantageous as it can be used to quickly sort out statuses of favorites or other resources as described hereafter.

Thus, the FIG. 18 dual map view is a simple way for an employee to ascertain the immediate status of and other information related to all other employee's on the employee's favorites list. In at least some cases it is contemplated that an employee will be able to customize the types of information presented for each favorite or for all favorites and may be able to add and delete other employees to and from the favorites list.

In at least some embodiments the corporate maps application will enable an employee to search for any enterprise resources including space, affordances and other employees to determine locations and current status (e.g., available, busy, etc.). To this end, see again FIG. 4 that includes search icon 190. When icon 190 is selected, in at least some embodiments a screen shot as in FIG. 19 may be presented that queries the employee to indicate the type of resource sought. The exemplary screen shot includes a proximate facility field 271, a person icon 179 and a facility selection icon 273. The facility selection icon 273 can be selected to access a list of other (e.g., remote) enterprise facilities in which the employee would like to search for a resource. For instance, when icon 273 is selected, the screen shot in FIG. 20 may be presented that shows enterprise facilities graphically along with locations of the facilities for selection by the user. The exemplary graphical representations in FIG. 20 include representations 350, 352, 354 and 356, each of which is selectable to indicate a facility for which a search should be focused. Once a facility is selected, a screen shot akin to the one shown in FIG. 19 may again be presented, albeit where the proximate facility field 271 is replaced by a similar field for the selected remote facility.

Referring again to FIG. 19, the proximate facility field 271 indicates the facility that the device 60 user currently resides in and, in the present example, indicates the Palo Alto facility. The facility in which the device 60 user currently resides may be automatically determined and set as a default if device 60 is currently located in an enterprise facility. Where a device 60 user is not currently in an enterprise facility, device 60 and/or server 12 may access a device 60 user's schedule and determine the next enterprise facility that the device 60 user will be visiting and may set that facility as the searching default. For instance, if device 60 user is at a hotel (determined via GPS or the like) near the Palo Alto facility and is scheduled to be at that facility all day, the Palo Alto facility may be set as the default in field 271.

Within field 271, a set of most commonly searched for resources may be presented to help a conferee quickly select search criteria. For instance, the FIG. 19 view includes a "conference space" icon 275, a "personal space" icon 277, a "printer" icon 279, and a "projector" icon 283, that are selectable to search for different space types and printers and projectors, respectively. An "other" icon 285 is also provided to enable the device user to specify some other resource or affordance that the user would like to locate.

Figure 19:
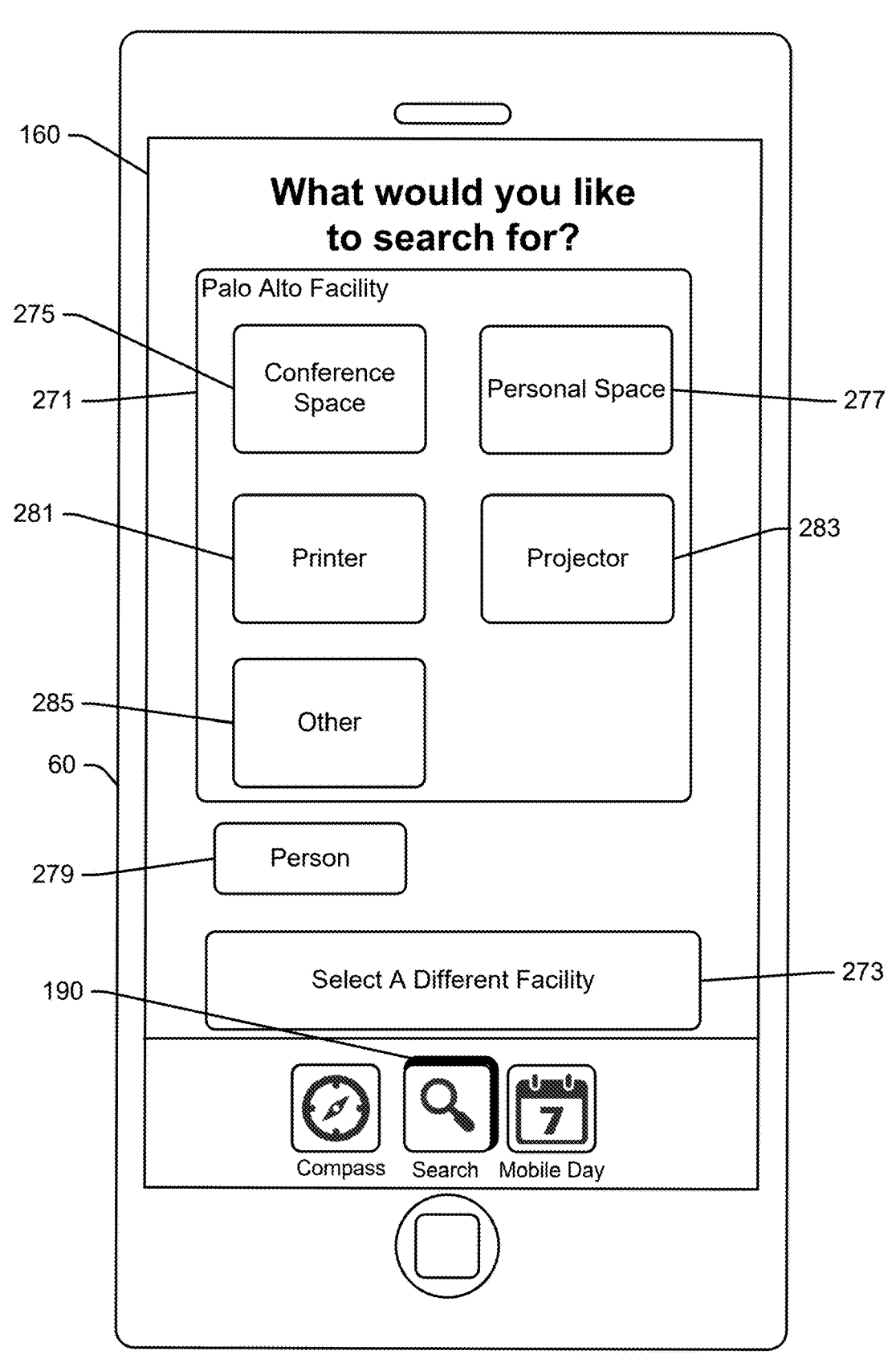
FIG. 19 is similar to FIG. 12, albeit illustrating another screen shot for expediting a resource search function.
Figure 20:
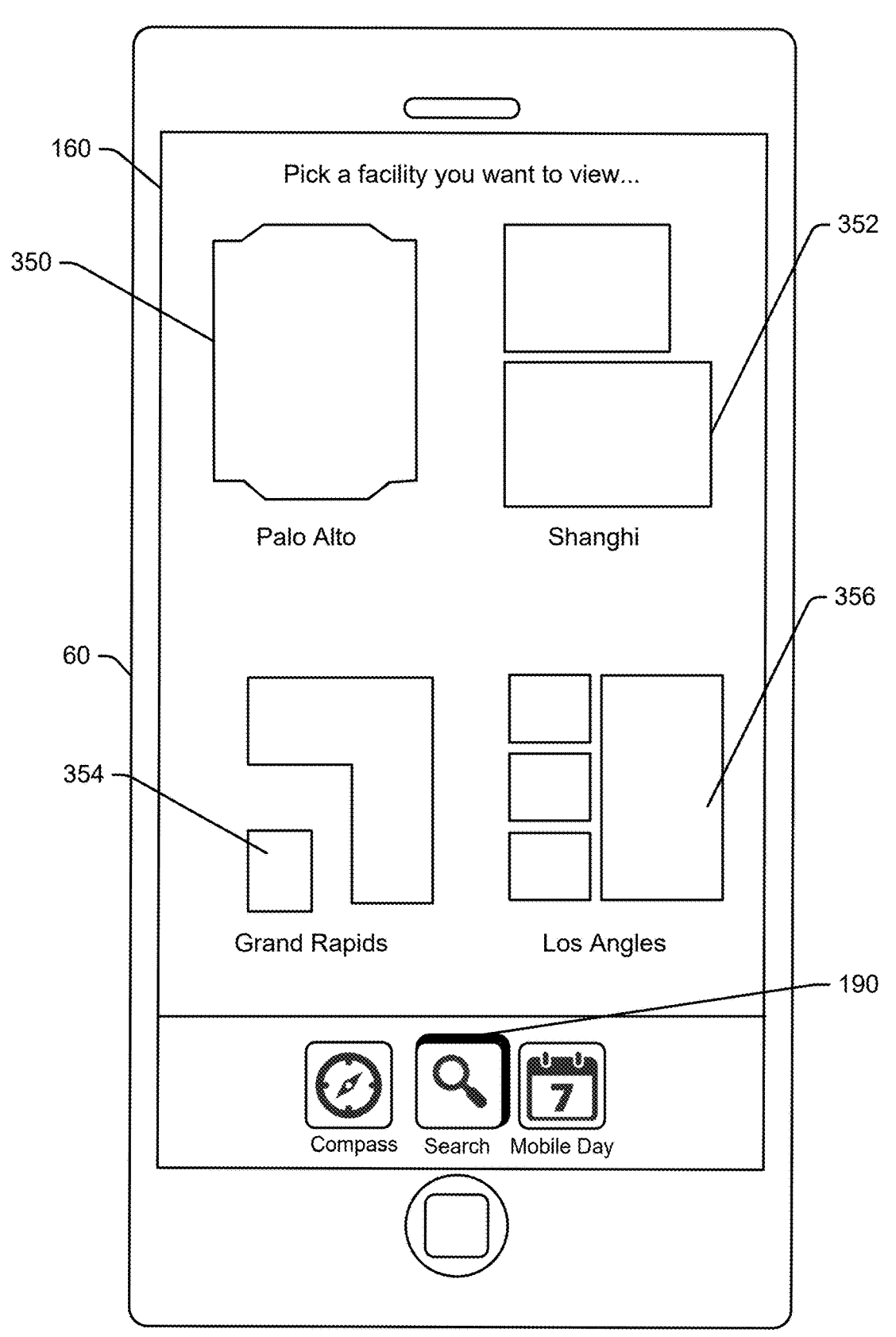
FIG. 20 is similar to FIG. 12, albeit illustrating another screen shot for selecting a facility in which to search for resources.
Figure 21:
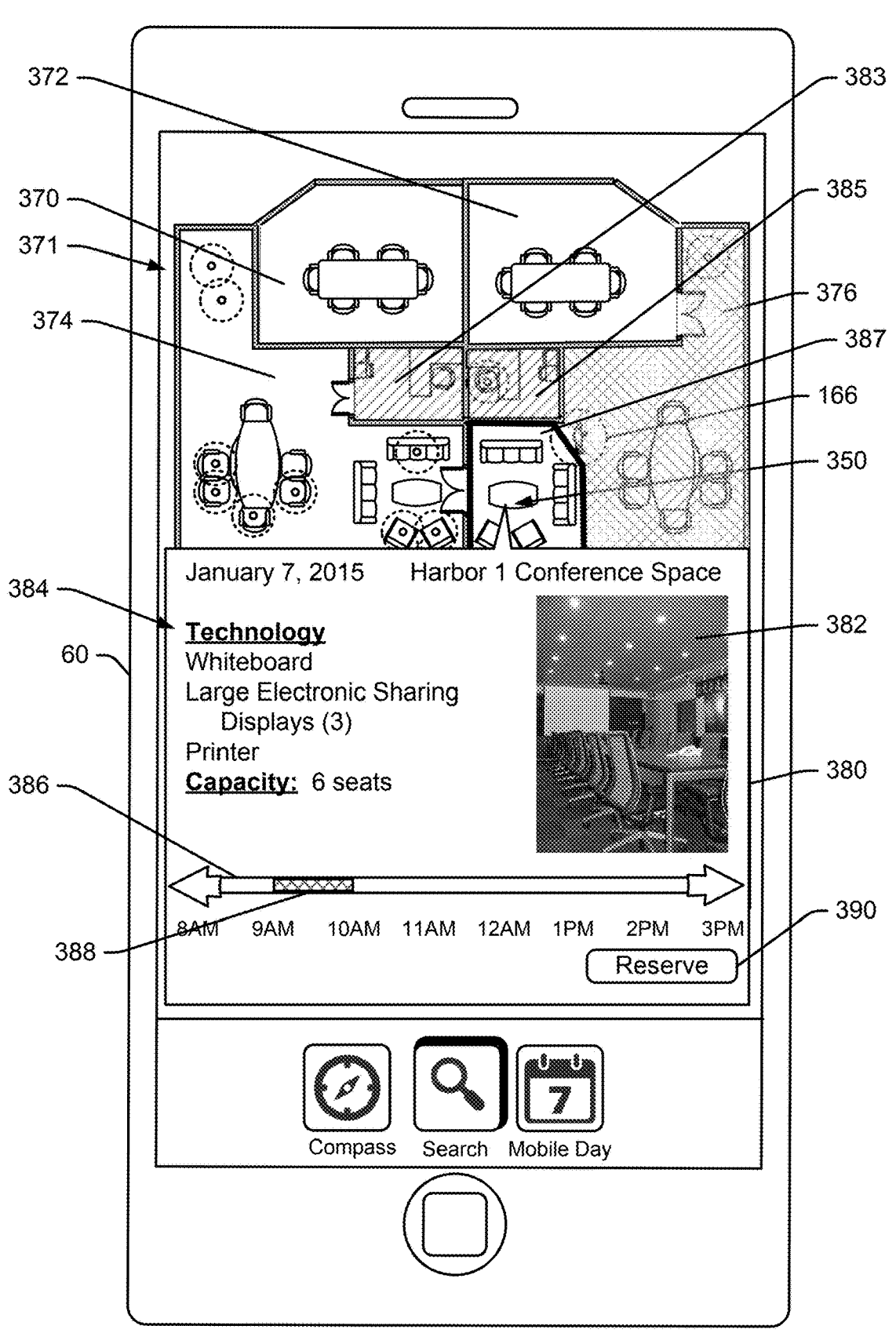
FIG. 21 is similar to FIG. 12, albeit illustrating another screen shot useful for reviewing affordances and a schedule corresponding to a specific facility space.

Referring still to FIG. 19 and also to FIG. 21, when conference space icon 275 is selected, server 12 generates screen shot 371 including a map view of the Palo Alto facility showing all conference spaces and, in at least some cases, may visually distinguish the spaces as a function of their current status. For instance, available conference spaces may be shaded (e.g., see spaces 370, 372 and 374) differently than spaces that are currently occupied and in use (see space 376 that is double-cross hatched). Spaces that will become available in the next 15 minutes may be distinguished in some other visual fashion (see spaces 383 and 385) and spaces that will be occupied within the next 30 minutes may be visually distinguished in yet another fashion. For instance, available spaces 370, 372, 374 may be shaded green, occupied spaces 376 may be shaded red, shortly available spaces 383, 385 may be shaded yellow and shortly occupied spaces may be shaded blue.

Where a space (e.g., a conference room) on the view is selected (e.g., via touch at 350 in FIG. 21), a space information window 380 may be opened that is spatially associated with the selected space and that presents information related to the selected space. The exemplary space information window 380 in FIG. 21 associated with space 387 includes an image 382 of the space, a list of affordances 384 associated with the space and a tool 386/388 for selecting a time on a schedule associated with the space during which the space can be reserved. Image 382 may be a virtual image generated by server 12 using sensed affordances within the selected space as described above or may be an image generated by an employee during a review process as described above. Similarly, the list of affordances 384 may be automatically updated as resources are moved into and out of the selected space to reflect real time affordances within the space or may be based on a review by a prior space user. Thus, for example, where additional chairs with tracking devices are moved into the space, the capacity number may be increased to reflect the additional chairs in the space in a real time and automatic fashion.

The reservation tool includes a time line 386 and a sliding icon 388 for selecting a time to reserve. Although not shown, already reserved time may be indicated on the time line 386 and would not be selectable by the device user. Once a time to reserve has been selected on time line 386, the device 60 user can select icon 390 to provide the reservation request to scheduling software via server 12.

Figure 22:
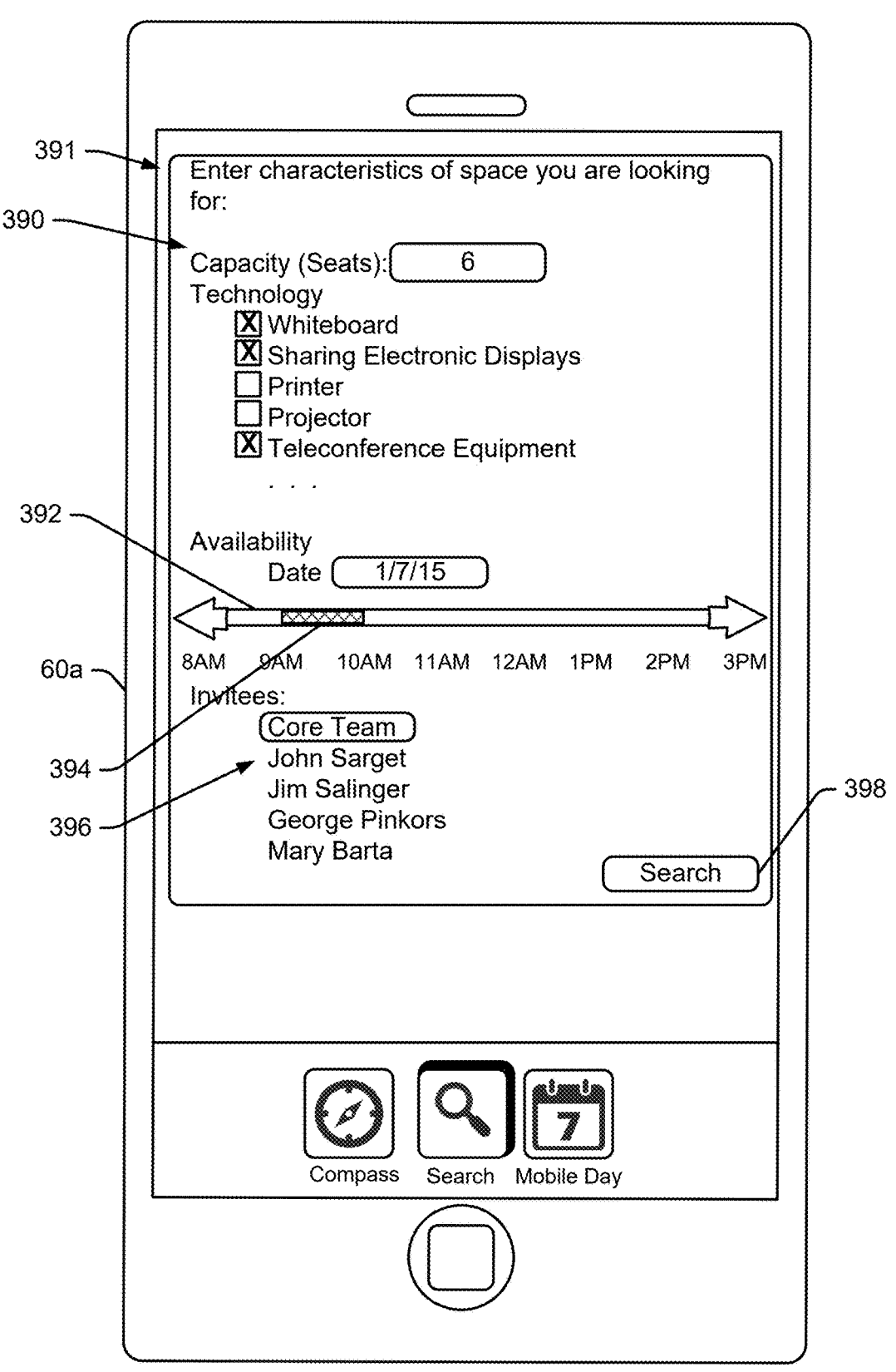
FIG. 22 is similar to FIG. 12, albeit illustrating another screen shot for selecting space characteristics to drive a space search function.

Referring again to FIG. 19, in other embodiments when the conference space icon 275 is selected, other search tools for identifying a specific space may be provided. For instance, referring also to FIG. 22, a screen shot 391 for selecting a conference space may enable an employee to specify a set of parameters or characteristics of a space sought. The exemplary screen shot 391 includes fields 390 for entering specific space parameters including a capacity selecting field and boxes that may be selected to identify affordances needed in the space sought. Exemplary selectable affordances include a whiteboard, sharing electronic displays, a printer, a projector, teleconferencing equipment, etc. The screen shot also includes time selection tools 392 and 394 and, in at least some cases, will include a tool 396 for selecting people that will use the space along with the employee. The invitee selection tool 396 may automatically populate with teams that the specifying employee is on as well as other employee names for selection. After parameters for the search have been specified, the employee selects search icon 398 to submit the request to server 12 and to generate notices to other employees regarding the scheduled activity.

Referring again to FIG. 19, when the personal space icon 277 is selected, space specifying tools akin to those described above with respect to the conference space icon 275 may be presented via other screen shots.

Figure 23:
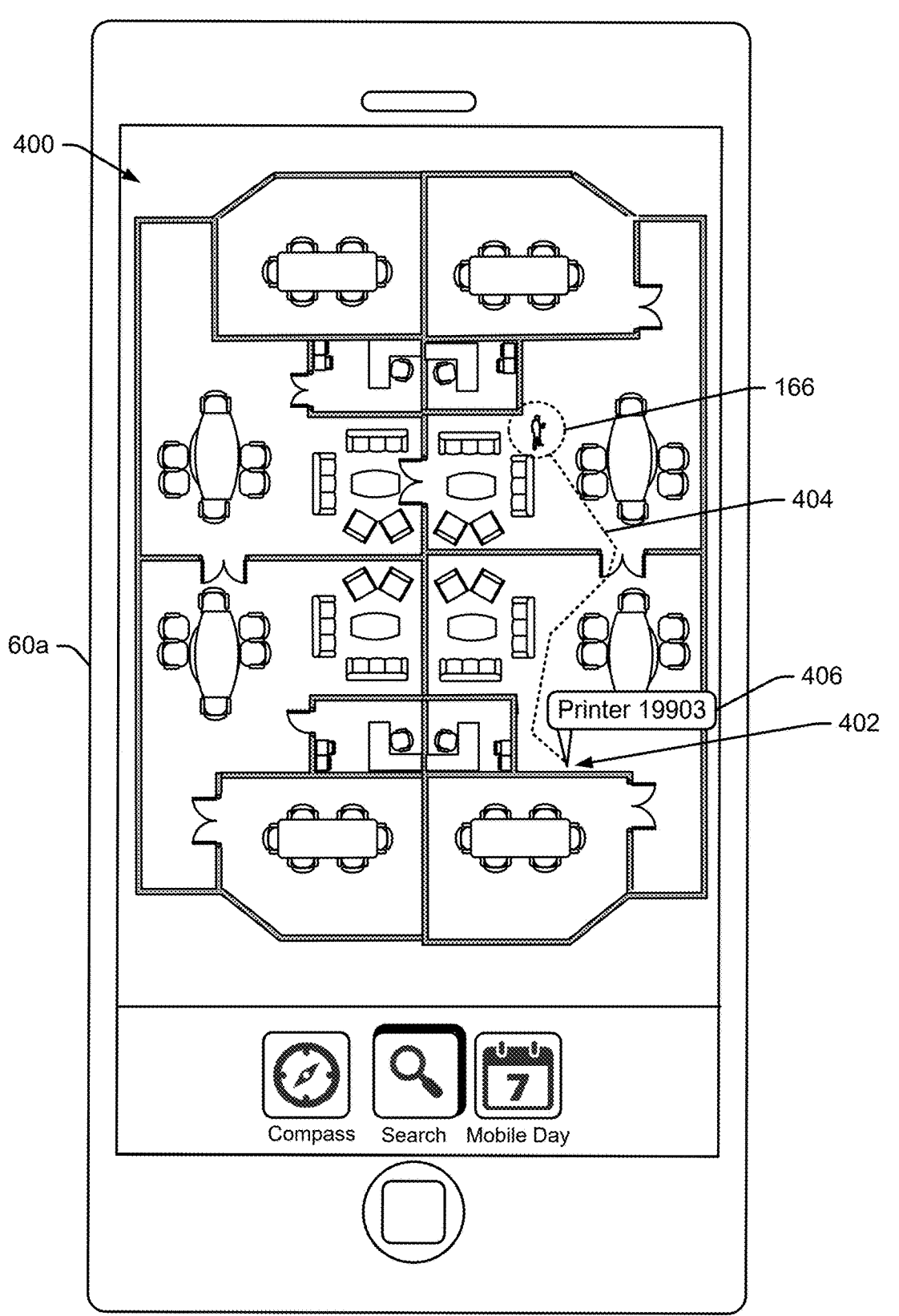
FIG. 23 is similar to FIG. 12, albeit illustrating a graphical floor plan view showing a portable device user and a path to a nearest printer that is consistent with at least some aspects of the present disclosure.

In FIG. 19, when printer icon 281 is selected, server 12 may identify the current location of the device 60 user and the current location of a nearest printer that the user can use and present information related thereto. To this end, see FIG. 23 where a screen shot 400 shows the location of a device 60 user at 166 and the location of a printer at 402 as well as a most direct path 404 to the printer location and a printer name label 406. Here, the employee using device 400 may follow the path 404 in the representation to the printer at 402 and then use the printer. In the alternative, the device user may select the printer name icon 402 to obtain on screen tools for selecting a document or other materials to print and for controlling the printer identified in the name label. Although not shown, the device 60 user may be able to select a view that shows the user in real time which turns to take along a path to the printer or some other resource.

Referring yet again to FIG. 19, the person icon 279 is separate from the facility icons 271 and 273 because many employees move from facility to facility and therefore searching for a specific person in a specific facility often times does not make sense. Tools for searching for specific people are described hereafter.

The ability to show real time locations of resources on a map as well as to access electronic schedules of enterprise resources enables various other advantageous tools to be implemented. For instance, see FIG. 24 that shows a graphical day schedule for a device 60 user based at least in part on the user's schedule (e.g., schedules and unscheduled time slots) and that may be presented to the user when mobile day icon 192 is selected. In particular, the view shows a facility map and indicates a sequence of scheduled activities (e.g., meetings, personal reserved time, etc.) at specific locations within the facility at 424, 426, 428, 430 and 432 that are sequentially labeled "1", "2", "3", "4" and "5", respectively, to indicate the sequence in which and location at which the activities are scheduled to occur. In addition, lines or other graphical connectors are provided in phantom between sequential activities to provide an intuitive graphical understanding of the user's day. In addition to the activity indicators, other scheduling information may be presented either immediately upon accessing the mobile day view or when the device 60 user selects some feature on the presented image. For instance, when the fourth activity icon 430 is selected, information about a meeting associated with the icon 430 may be presented in a pop up window 436. As another instance, when a line (e.g., the line between icons 424 and 426) between scheduled activity icons is selected, when free time exists between scheduled activities, a pop up window 440 may be presented that indicates the duration and period of free time which is visually associated with a line between scheduled activities by, for instance, a graphical pointer as at 438.

In other cases pop up activity and free time windows akin to windows 436 and 440 may be presented for each of the activity icons and lines between those icons or some subset thereof. For example, where the duration of a free time between sequential activities is less than thirty minutes the free time may not be indicated but if the free time between activities is 30 minutes or greater, the free time may be automatically indicated via a pop up window when the mobile day view is initially accessed.

In still other cases, server 12 may be programmed to indicate other information when free or available time exists within an employee's schedule. For instance, when a first employee has 30 minutes of time free between other activities, server 12 may be programmed to identify other employees that are also free and that are scheduled to be in the same general area as the first employee during the free period and may indicate that information to the first employee and, in some cases, to the other employees as well. Locations and availability of other employees may be gleaned from electronic schedules for those employees and/or via actual real time location information and sensed activity information (e.g., sensing if an employee is currently in an impromptu and unscheduled meeting with another employee). To this end, see the indicator 442 associated with the free time label 440 that indicates that two other employees are scheduled to be free and proximate during the specified free period). Which employee schedules are contemplated for notices like the 442 notice would be customizable for each employee so, for instance, an employee may only want notices related to other favorite employees or specifically selected employees as opposed to any enterprise employee.

Figure 24:
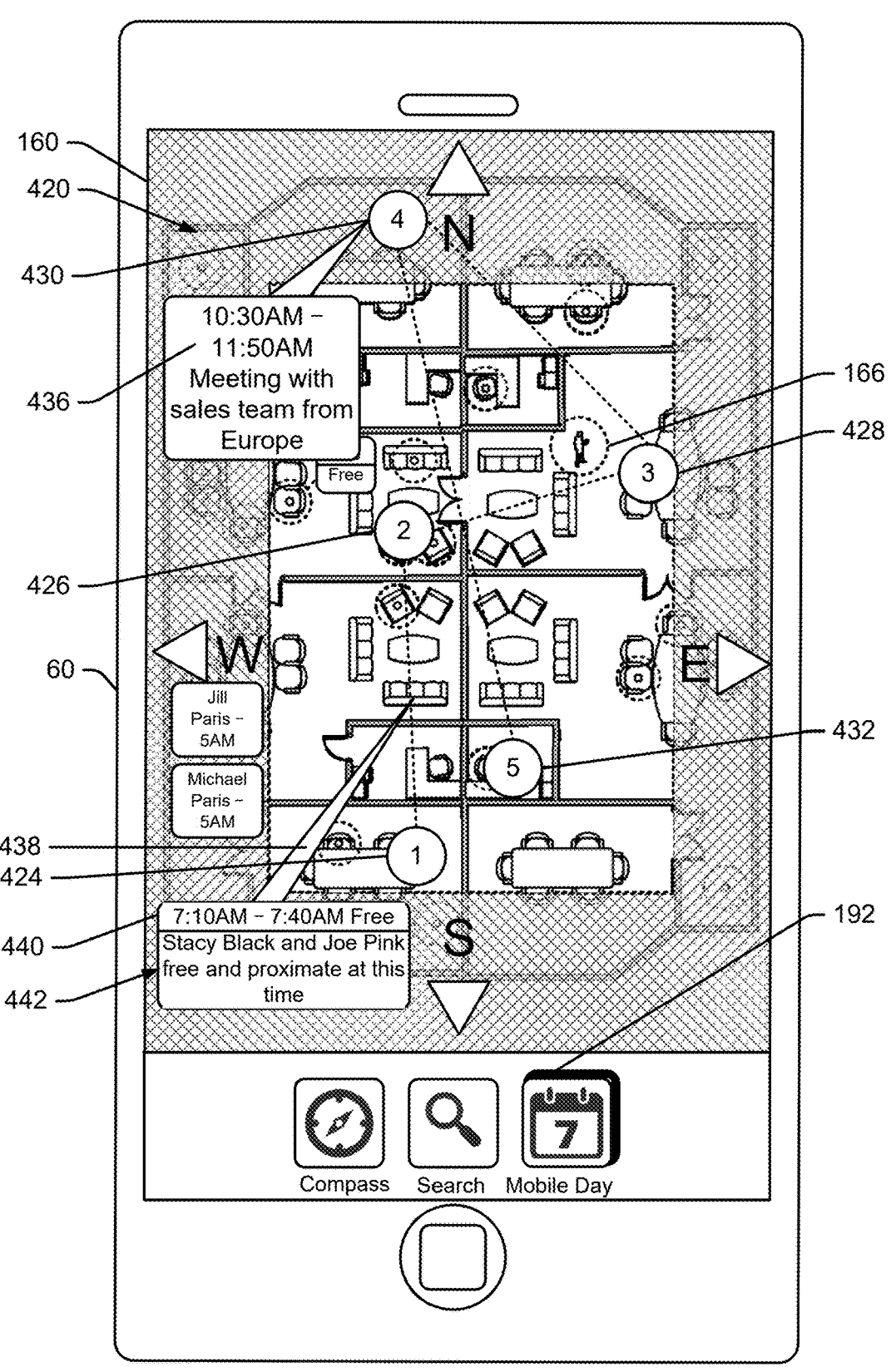
FIG. 24 is similar to FIG. 12, albeit illustrating a mobile day representation showing meetings that a device user is to attend during the course of a day.

Thus, in at least some embodiments it is contemplated that server 12 may be able to consider employee schedules as well as schedule locations and employee preferences (e.g., an employee's favorites list) when identifying opportunities for meetings to suggest to a specific employee. Where a first employee has indicated a desire to know when a second employee is going to be proximate and available or when two other employees are going to be proximate the first employee and available, server 12 may generate an indication via the mobile day view. In some embodiments a notification indicating a possible face-to-face meeting may also include a suggested space (see 442 in FIG. 24) for the possible meeting. In this regard, in addition to analyzing employee schedules, server 12 may be programmed to examine schedules for space within the vicinity of the location that will be common for each employee associated with the notification to identify one or more available spaces. In FIG. 24, selection of icon 442 may enable a device 60 user to reserve the space indicated (e.g., at the end of the pointer 438) and may transmit e-mail or text initiations to other employees in the notification automatically. Space and device 60 user schedules may indicate tentative busy status until at least one of the other initiated employees accepts the invite at which time schedules associated with the employees and the space would be updated as busy. Other notifications of such opportunities may also be transmitted via e-mail, text, etc., to an employee.

It has been recognized that, in at least some cases, a device user may prefer an interface that only periodically identifies open time slots and options for filling those time slots so that the options feature is not constantly pestering the device user to fill in their schedule. For instance, in some cases, a device 60 may be programmed to only present a device user with open time slots and options for filling those slots at 7 AM in the morning when the user is eating breakfast. Here, for instance, at 7 AM on a specific morning, the system and device 60 may recognize three open time slots greater than 30 minutes for the device user at 10 AM, 1 PM and 3 PM and may automatically present a screen shot to the device user at 7 AM for the day indicating the user's schedule as well as the three open slots. Where other employees are scheduled to be in the same general location as the device user during the open time slots and have unscheduled times in their schedules, the system may indicate those employees to the device user and facilitate conferences.

Referring again to FIG. 19, when person search icon 279 is selected, device 60 may present simple search tools for locating enterprise employees such as, for instance, a field in which a person's name can be typed. Once located, the location and other information associated with the employee like current status, city, weather, next available time on the employee's schedule, etc., may be presented to the device 60 user.

While the graphical map based interfaces described above are useful and will be advantageous for some applications, it has been recognized that much simpler and for at least some people, more intuitive interfaces can be provided for locating and scheduling resources. For instance, in many cases simple text based interfaces may be optimal for certain applications. For this reason, in at least some cases other tools for locating enterprise resources are contemplated. For instance, another general type of corporate maps interface may indicate approximate distances between an employee using a device 60 and enterprise resources. To this end see FIG. 25 that shows a different general type of interface screen shot or resource representation at 500 that includes an information field 501 and a navigation tool field 502. Navigation icons including a "compass" icon 570, a "search" icon 572 and a "favorites" icon 574 are provided in tool field

502. Compass icon 570 is a default icon in this case. Here, the compass symbol for the screen shot in FIG. 25 is meant to indicate that a device 60 user is given a bearing regarding relative positions of resources (e.g., spaces, other employees, etc.) relative to the device 60 user's current location.

The exemplary information field 501 includes information that is developed based on the current location of device 60 and the employee that uses the device 60. The information in field 501 includes an image 504 of the employee using device 60 as well as the user's name and a text description of the user's current location at 506 which is presented at the top of field 501. In addition, field 501 includes a distance scale at 508 that extends downward from image 504 and that includes distance labels along the scale to indicate distance from the user presented in image 504. Thus, for instance, the exemplary scale 508 indicates 10 m, 30 m, 50 m, etc., to indicate 10, 30 and 50 meters from the location of the device 60 user. Here, the distances may be direct (e.g., as the flies) or may be most direct path distances through facility spaces.

Figure 25:
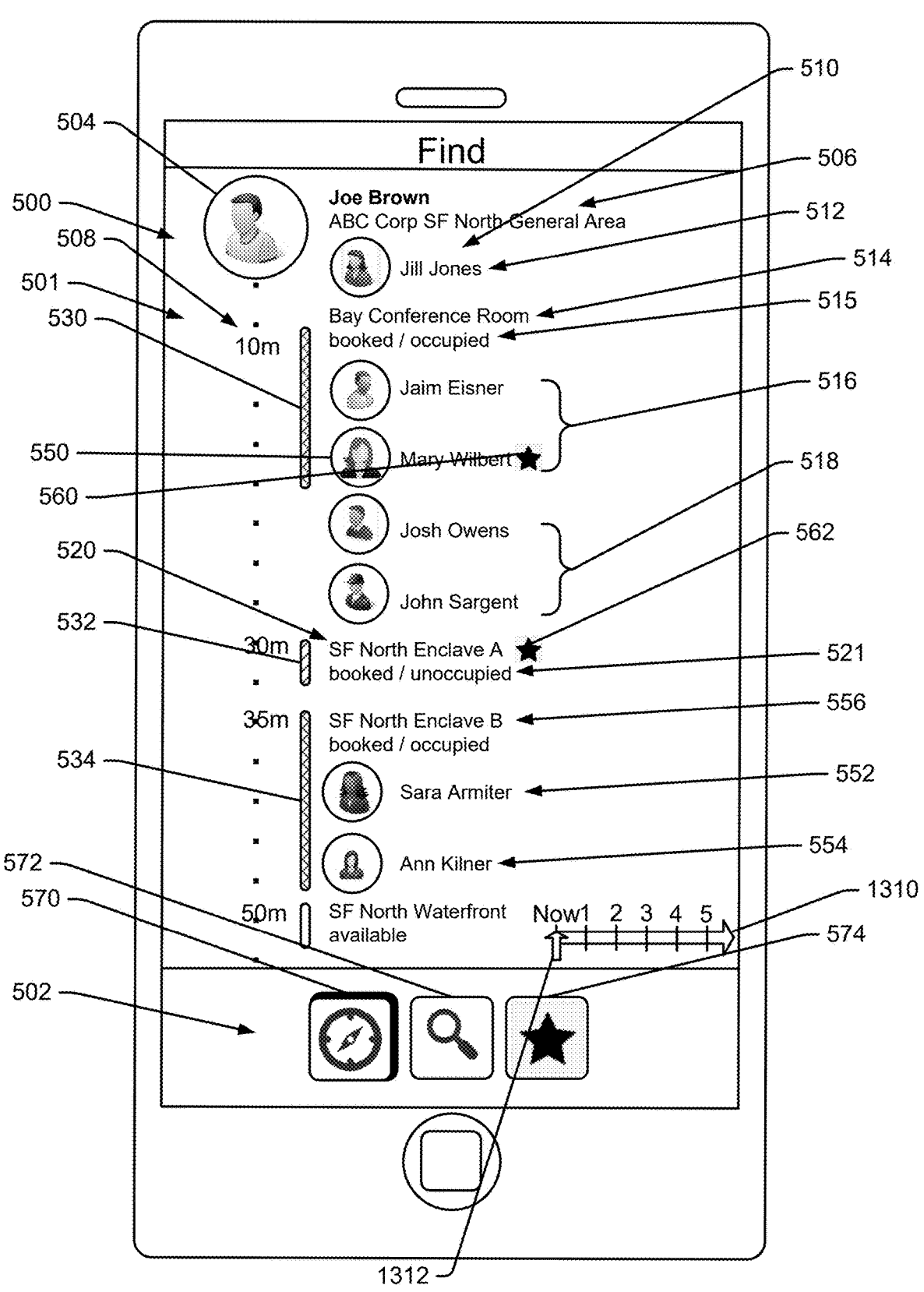
FIG. 25 is similar to FIG. 12, albeit showing a screen shot where resource locations relative to a device user are shown in list fashion with a distance scale.

Referring still to FIG. 25, field 501 further includes a list of enterprise resources in a resource column along the right side of scale 508 where resources are aligned with the scale at locations that are consistent with the actual distances of the resources from the location of the device 60 user. Thus, for instance, the resource column 510 includes the name "Jill Jones" and an associate image corresponding to Jill Jones at 512 near a 5 meter location on the scale 508 to indicate that Jill Jones is proximately 5 meters (e.g., may be in the next office) from the device 60 user. Other names and associated images are also provided in column 510 near other distance locations on the scale 508 to indicate the distance between the device 60 user and other enterprise employees. In addition to including employee designations, the resource column 510 also indicates other resources like conference spaces by name where each conference space name is provided at a location along the scale 506 that corresponds to the actual distance between the device 60 user and the conference space. For instance, a "Bay Conference Room" indicator is presented at 514 at approximately the 10 meter scale location to indicate that the Bay conference room is approximately 10 meters from the current location of the device 60 user, a "SF North Enclave A" indicator is presented at 520 at approximately the 30 meter scale location to indicate that the SF North Enclave A is 30 meters from the current location of the device 60 user, and so on.

A status indicator is provided just below each of the conference room indicators to indicate a current status of the conference room. For example, see indicator 515 below the Bay conference room indicator 514 that indicates that the current status of the Bay room is "booked/occupied" and the indicator 521 associated with the SF North Enclave A indicator 520 indicating that that conference room is also "booked/unoccupied".

A vertical occupancy bar 530, 532, 534 is provided for each conference room indicator that extends between the distance scale 508 and the resource column 510 to indicate which employees are currently located within each conference room. For instance, bar 530 extends from the Bay conference room indicator 514 downward to a location just below an image 550 of employee "Mary Wilbert" to indicate that all of the employees listed in the resource column 510 between indicator 514 and image 550 as well as Mary Wilbert are currently located within the Bay conference room (se 516). Employees listed at 518 below the bar 530 are not in the Bay conference room but are approximately 10 meters from the device 60 user's location. As another instance, bar 534 indicates that Sara Armiter 552 and Ann Kilner 554 are located in the SF North Enclave B conference room indicated at 556.

In the illustrated embodiment, the occupancy bars are color coded or otherwise visually distinguished to indicate different statuses of the conference rooms. For instance, in the illustrated example in FIG. 25 a double-cross hatched bar (e.g., 530, 534) indicates that an associated conference room is currently booked and occupied, a single hatched bar (e.g., bar 532) indicates a booked but currently unoccupied space, and an un-hatched bar indicates that the associated room is un-booked and available for use. Again, shading may correspond to different colors (e.g., red for booked and occupied, green for available, etc.). More than three types of highlighting or visually distinguishing characteristics for indicating other room statuses are contemplated such as, for instance, a unique highlighting color to indicate that a room will be occupied shortly (e.g., within the next 30 minutes), an indication that an occupied room will be unoccupied shortly, an indication that a room that is not scheduled is currently occupied, etc.

In addition to the information described above, "favorites" indicators are provided for resources in the resource column 510 that are on a favorites list for a device 60 user. For instance, in FIG. 25, a star 560 is provided adjacent the names Mary Wilbert and a similar star 562 is provided adjacent the "SF North Enclave A" indicator to indicate that Mary and the Enclave A are favorite resources of Joe Brown, the device 60 user. Thus, the device 60 user can locate proximate favorite resources quickly by identifying starts and associated resources via the screen shot 500.

Referring still to FIG. 25, it should be appreciated that the distance scale 508 shown is compressed in at least some cases so that the distance indicators may not reflect actual dimensions on the scale. For instance, if the closest enterprise resource is 50 meters from device 60, a 50 meter indicator may be located at the location of the 10 m indicator in FIG. 25. If five resources are located at the 50 meter distance from device 60, those five resources would be listed and then if the sixth closest resource is 100 meters from device 60, a 100 m designator may be presented with the sixth resource indicated in column 510, and so on, so that as much information as possible is presented on the screen of device 60 without any blanks in column 510.

The exemplary view in FIG. 25 presents resources in a list arranged by distance, indicates employees that are in conference together, indicates conference room availability or status and indicates favorite resources of a device 60 user. As device 60 is moved about within a facility or as resources (e.g., other employees) move about within the facility, in at least some embodiments the information in screen shot 500 is updated substantially in real time to reflect new spatial positions of resources with respect to device 60 as well as availability of conference rooms.

Although not shown, in at least some embodiments it is contemplated that every resource in column 510 may be presented as a hyperlink to additional information related to the resource. For instance, the Enclave A indicator 520 may be selected to open a pop up window akin to window 380 in FIG. 21 including information about the Enclave A room and a schedule and scheduling tools for reserving time within the Enclave A room. As another instance, selection of one of the employee indicators (e.g., 512, 534, etc.) may open up an employee communication window like window 290 shown in FIG. 16 or some other type of employee informational window including general or specific information about the associated employee.

Figure 26:
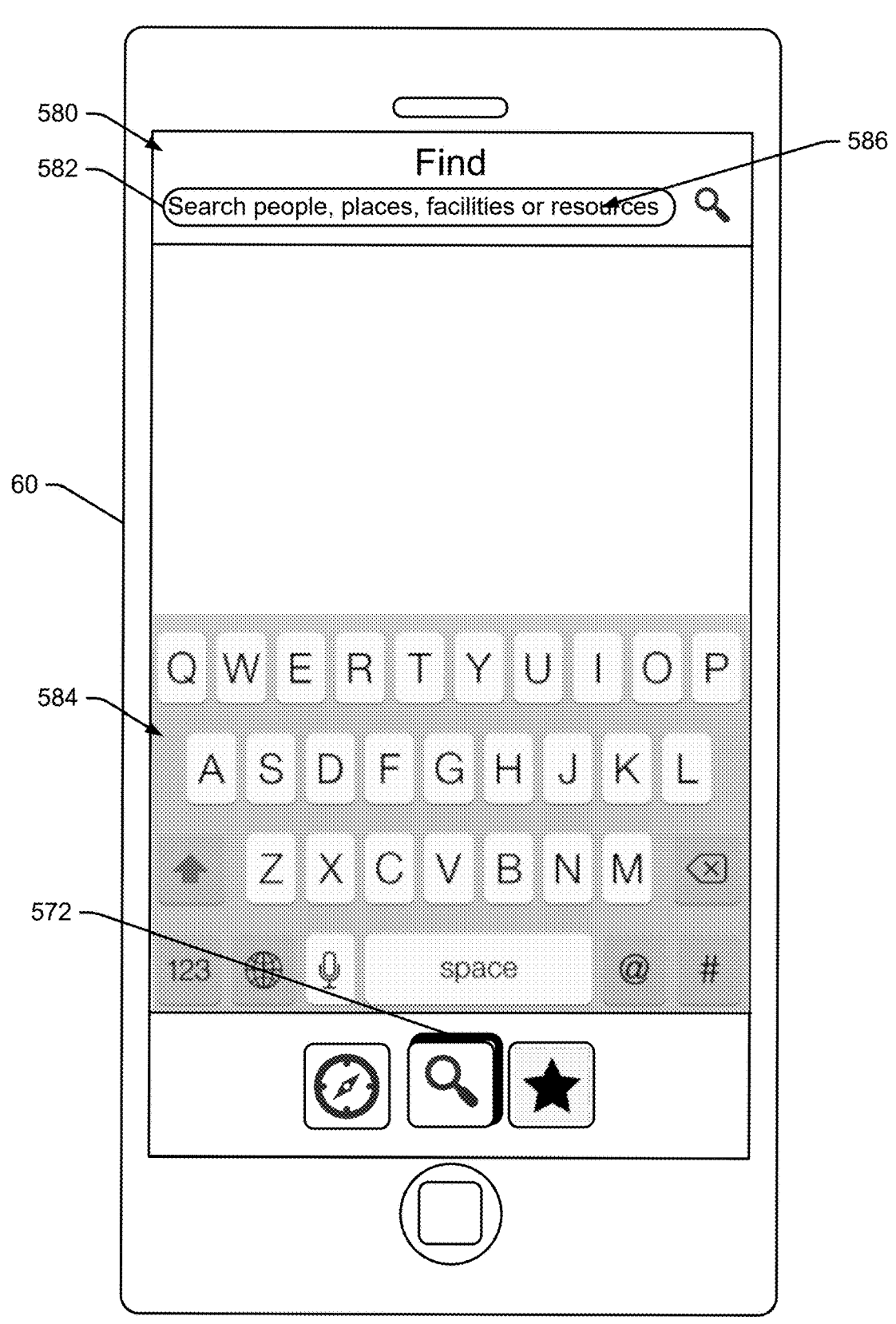
FIG. 26 is similar to FIG. 12, albeit showing resource searching tools that are consistent with at least some aspects of the present disclosure.
Figure 27:
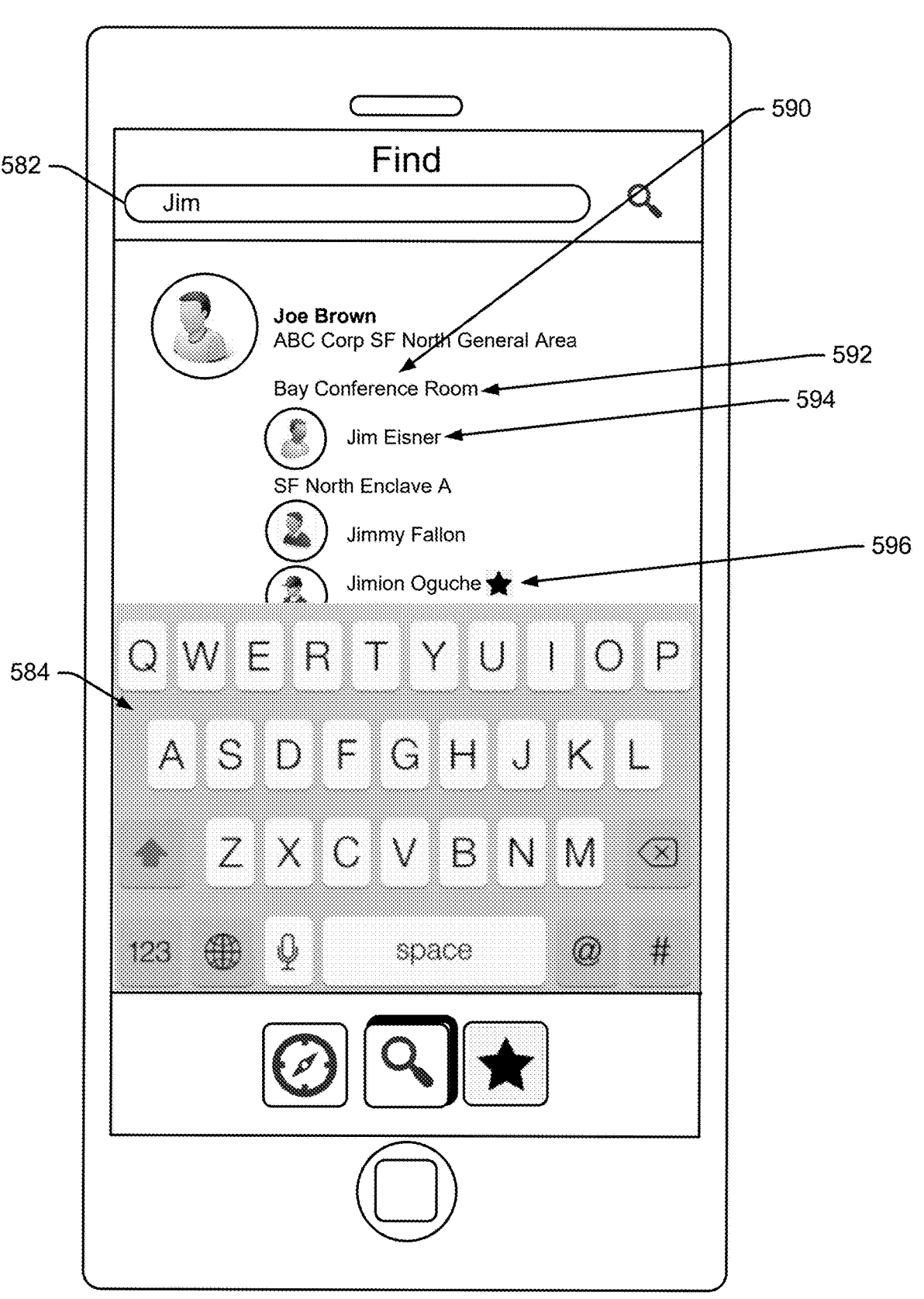
FIG. 27 is similar to FIG. 26, albeit showing dynamic search results generated as text is entered into a search field.

Referring again to FIG. 25, when the search icon 572 is selected, in at least some embodiments a simple search screen shot 580 like the exemplary one shown in FIG. 26 may be presented that includes a search field 582 and a virtual keyboard 584 for entering search terms. Field 582 initially includes text 586 (in at least some cases in phantom) to make clear that any enterprise resources can be searched including people, places, facilities, other resources. As shown in FIG. 27, as letters are entered into field 582, server 12 searches for resources matching the entered letters and presents the resources in a resource list or column 590. The list 590 indicates the current enterprise locations of each employee on the list. For instance, a "Bay conference room" indicator 592 is presented above an employee designator or indicator 594 to indicate that the employee associated with indicator 594 is located within the Bay conference room.

Figure 28:
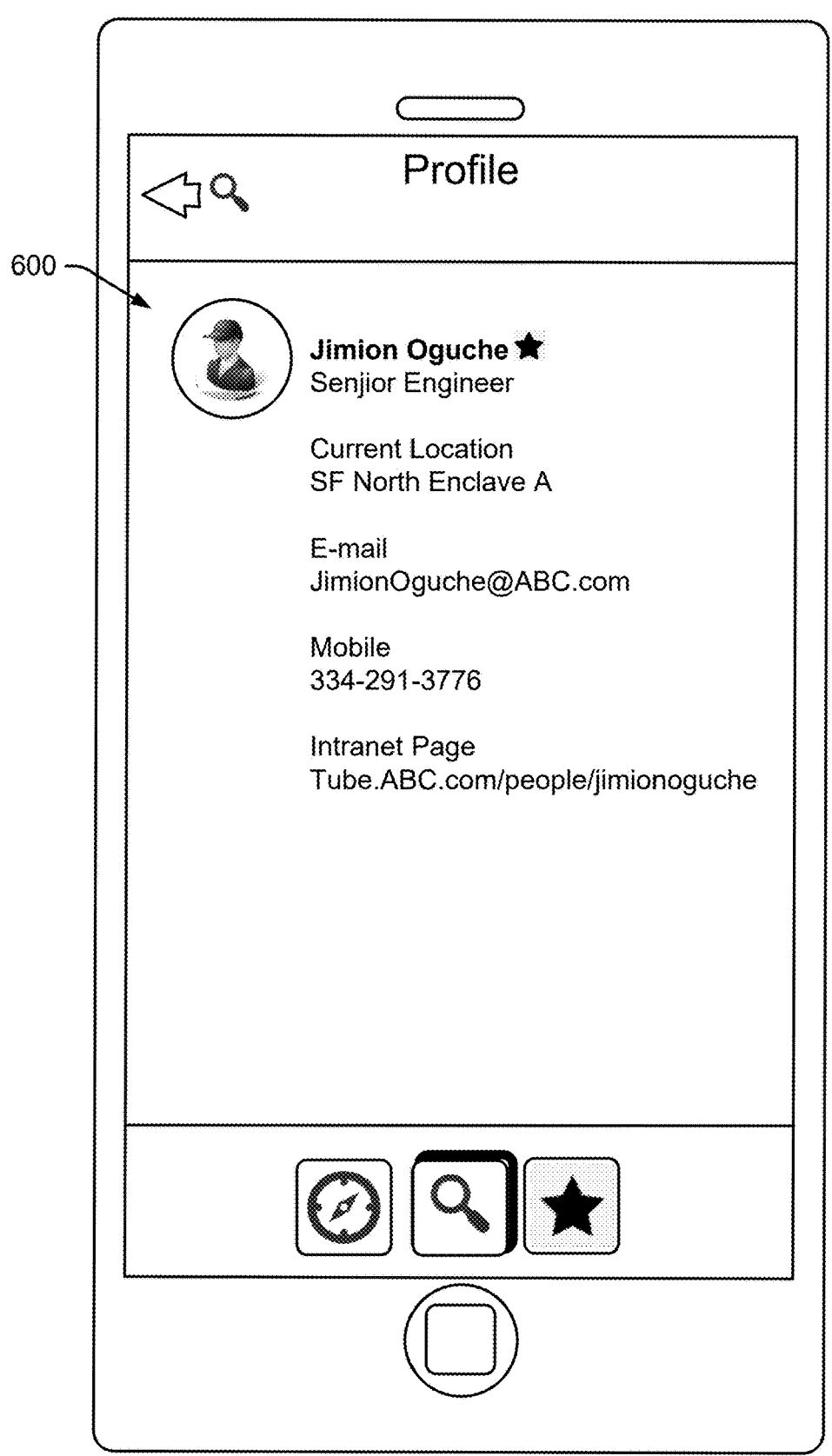
FIG. 28 is similar to FIG. 27, albeit showing employee information corresponding to an employee selected from a list of employees in FIG. 27.

Each name in the resource list 590 is presented as a selectable hyperlink for accessing additional information about an associated employee. For instance, if the name Jimion Oguchi 596 is selected in FIG. 27, device 60 may present the screen shot 600 in FIG. 28 that shows additional archived and real time information associated with the selected name 596. Contact information like the phone number, the e-mail address, etc., will be selectable in at least some cases to initiate a communication process with the employee indicated on the screen shot.

In at least some cases resources may be searched by specific name or a generic resource type. For instance, the Bay conference room may be searched for by typing in the name "Bay" or by typing in the phrase "conference room", either of which should yield the Bay conference room as at least one option on a list.

Figure 29:
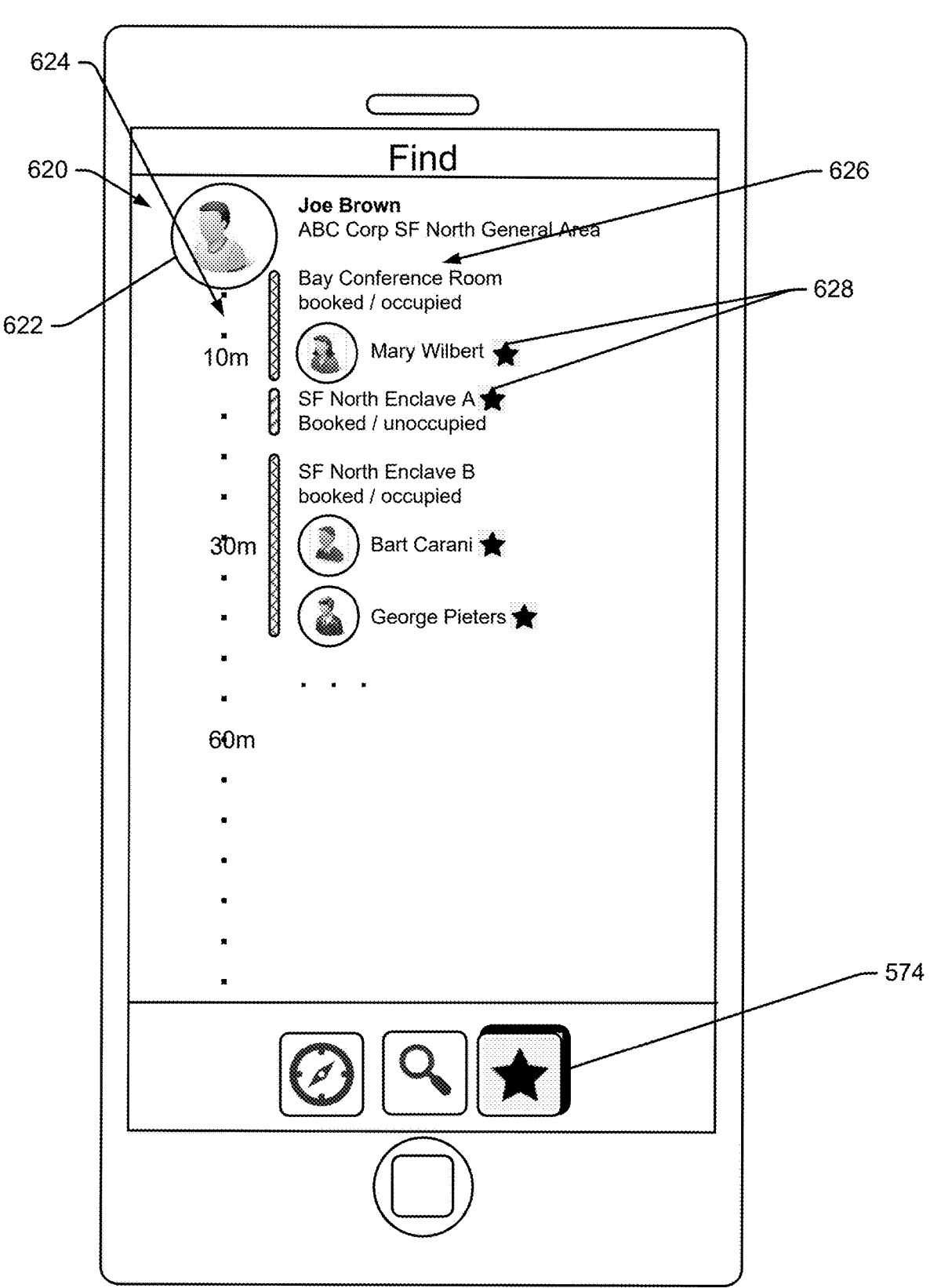
FIG. 29 is similar to FIG. 27, albeit showing a list of favorite resources relative to the location of a specific device user.

Referring to FIG. 29, when the favorites icon 574 is selected, the current locations of all resources on a favorites list for the device 60 user may be identified and used to create a screen shot similar to the screen shot shown in FIG. 25, albeit where all resources in a resource column include favorites or are somehow tied to favorites. To this end, see that screen shot 620 includes information regarding the device 60 user at 622 at the top of the image, a distance scale 624 extending down from the information 622 and a list of resources in column 626 arranged by distance where each resource is adjacent a location on the scale 624 that reflects a true distance of the resource from the device 60 and the device 60 user. Stars 628 indicate each favorite resource. Note that column 626 includes some conference room entries that are not starred. These conference room entries in column 626 are provided simply to indicate the locations of employees and not to indicate that those rooms are favorites. Similarly, where a favorite conference room appears in the resource column and is starred, in at least some embodiments all employees in that room will be listed under the conference room where favorite employees are starred and non-favorites are simply listed to give the device 60 user a sense of who is currently occupying the favorite conference room.

Figure 30:
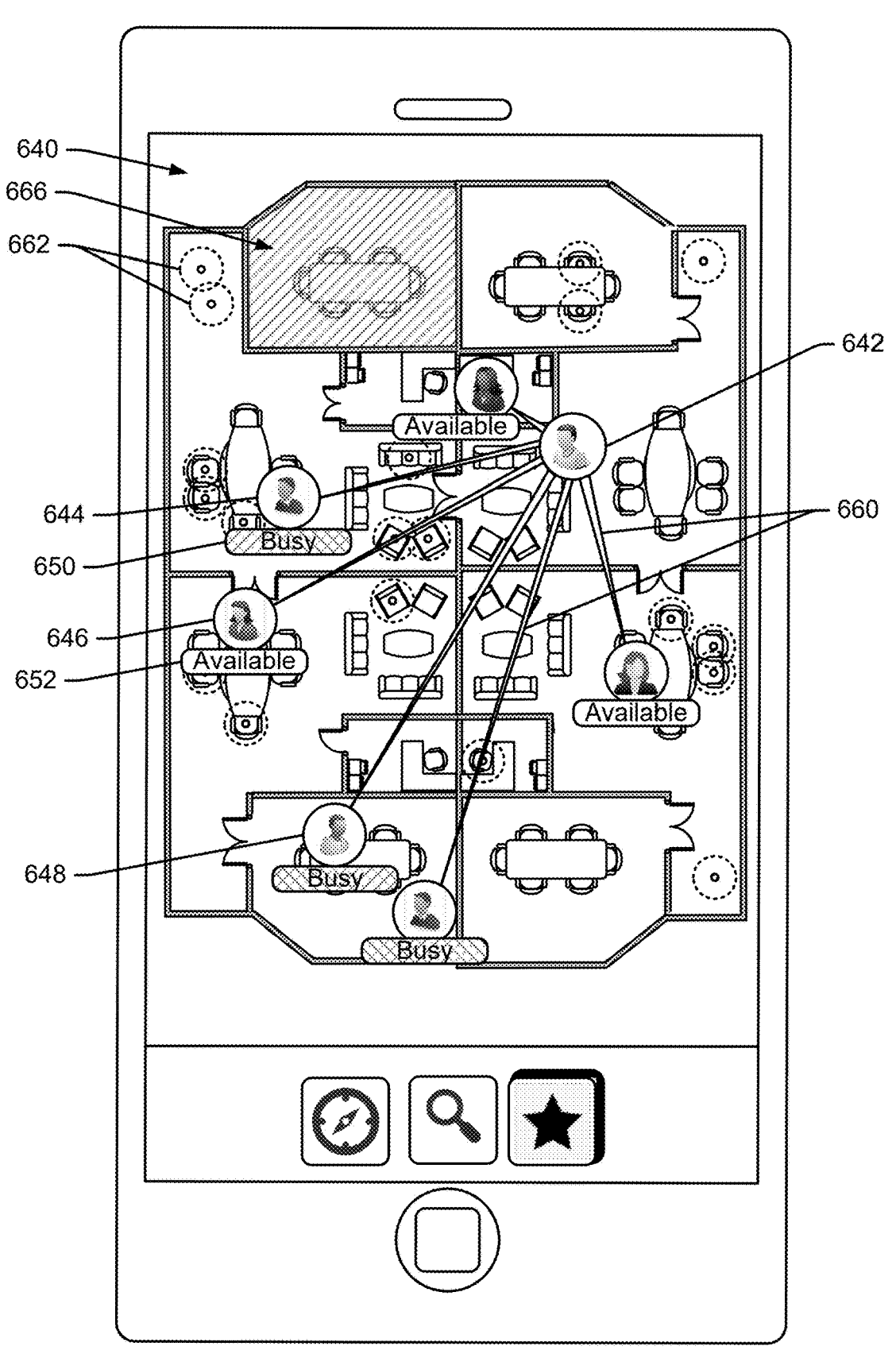
FIG. 30 is similar to FIG. 12, albeit showing a floor plan view with favorite employees' locations relative to a specific device user.

Another possible favorites view or screen shot 640 is shown in FIG. 30 where images 644, 646, 648 of each employee on a favorites list for the device 60 user are presented on a map at their current locations in relation to the location of the device 60 user at 642. For each image of another employee, a status indicator is presented such as "busy" 650, "available" 652, etc. The status indicators may be color coded to indicate different statuses. Here, lines, elongated triangles (see 660) or other connectors or links are provided between the image of the device user at 642 and images of each of the favorites to give the device user 60 a clear understanding of his position with respect to his favorites. As shown in FIG. 30, while images of each favorite are shown in the view 640, other non-favorite employees that appear on the view 640 are indicated via phantom circles (662) or otherwise are visually distinguished. Other ways to distinguish a device 60 user, favorite and non-favorite employees are contemplated. For instance, the image of the device 60 user may be highlighted in green while images of favorites are highlighted in yellow and non-favorites may be highlighted in red phantom color.

Referring still to FIG. 30, favorite spaces on the map shown may also be highlighted differently to distinguish those spaces from others. For instance, space 666 is shown cross hatched to indicate a favorite status that distinguishes space 666 from other spaces. In some cases current status of each space may also be indicated via some type of visually distinguishing appearance. For instance, any favorite space that is currently occupied may be colored red while open favorite spaces are colored green and currently occupied spaces that are scheduled to be unoccupied in the next 20 minutes may be colored yellow.

In addition to being used to locate and determine the current status of enterprise resources, in at least some embodiments portable or other computing devices like device 60 may be useable to set notifications to indicate changes in resource statuses. Here, many different types of status changes are contemplated. Two general types of status changes include employee initiated changes and tracked changes. Employee initiated changes are simply messages generated from one employee to others such as a message indicating that cookies are available at a specific facility location or that some information posted in a specific conference room should be reviewed by an employee.

Tracked changes include statuses of one employee or resource that another employee has indicated should be reported via a notice. For instance, an employee's status may change from busy to available when the employee leaves a conference room in which a conference was progressing. As another instance, an employee's status may change when the employee enters a specific enterprise facility or space or when the employee moves to within 30 yards of another employee. As still one other instance, when a conference room becomes unexpectedly available because a meeting therein ends early, the status of the room may change from occupied to unoccupied or even available.

Figure 31:
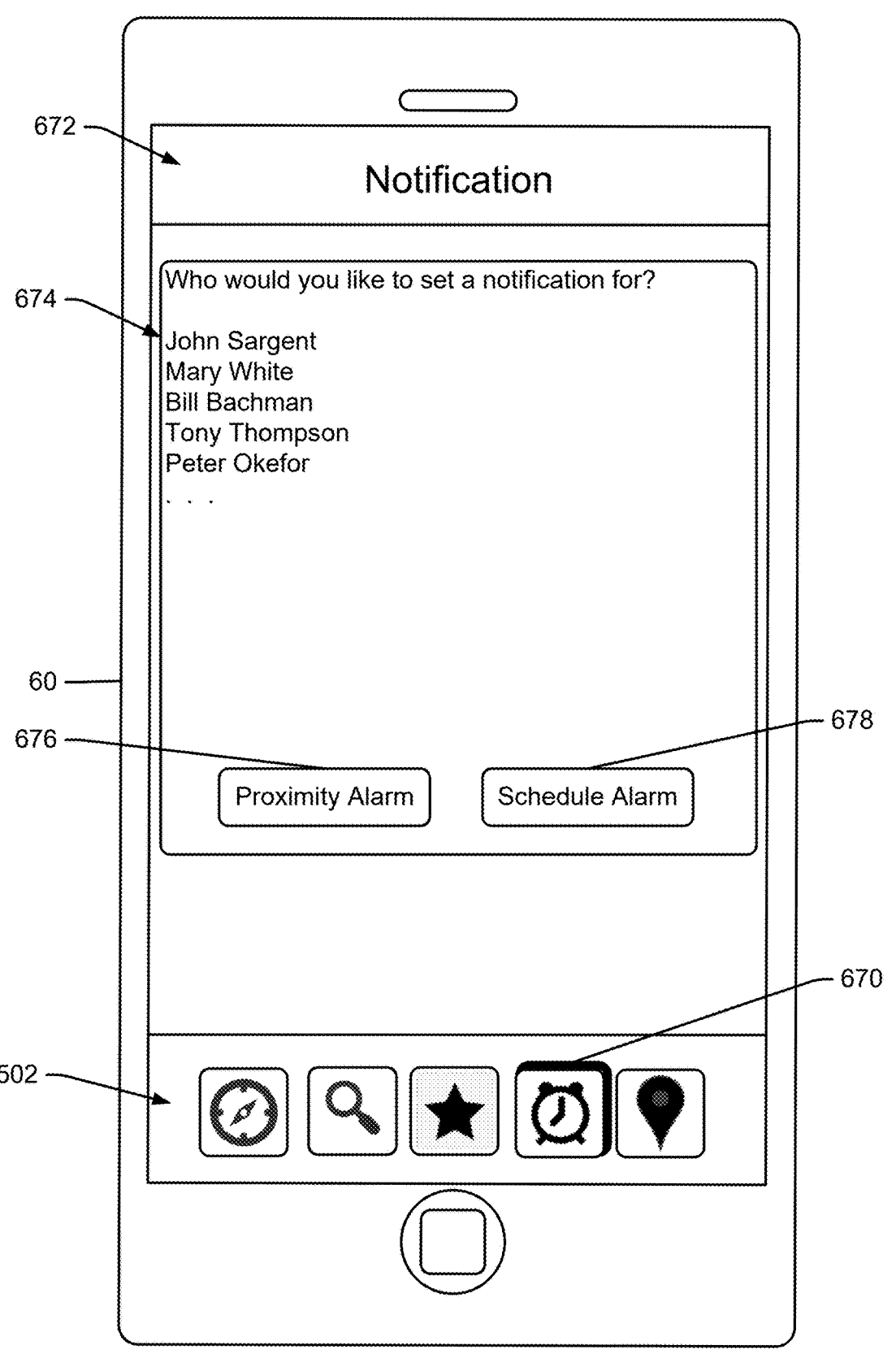
FIG. 31 is similar to FIG. 12, albeit showing a notification interface useable to set a resource status notification.

Referring to FIG. 31, in at least some cases a toolbar 502 may include a notification icon 670 that, when selected, causes device 60 to generate a screen shot 672 for setting different types of notifications. In FIG. 31, a list of employees for whom notifications may be set is presented at 674 and proximity and schedule alarm types are presented as options in icons 676 and 678. Here, a device 60 user selects an employee from list 674 for which an alarm or notification is to be set and then selects one of the two alarm types via icons 676 and 678. If a proximity alarm is to be set, other tools for specifying distance from the device 60 user or spaces are contemplated and if a schedule alarm is to be set, other tools for indicating specifics about the alarm type are contemplated.

Figure 32:
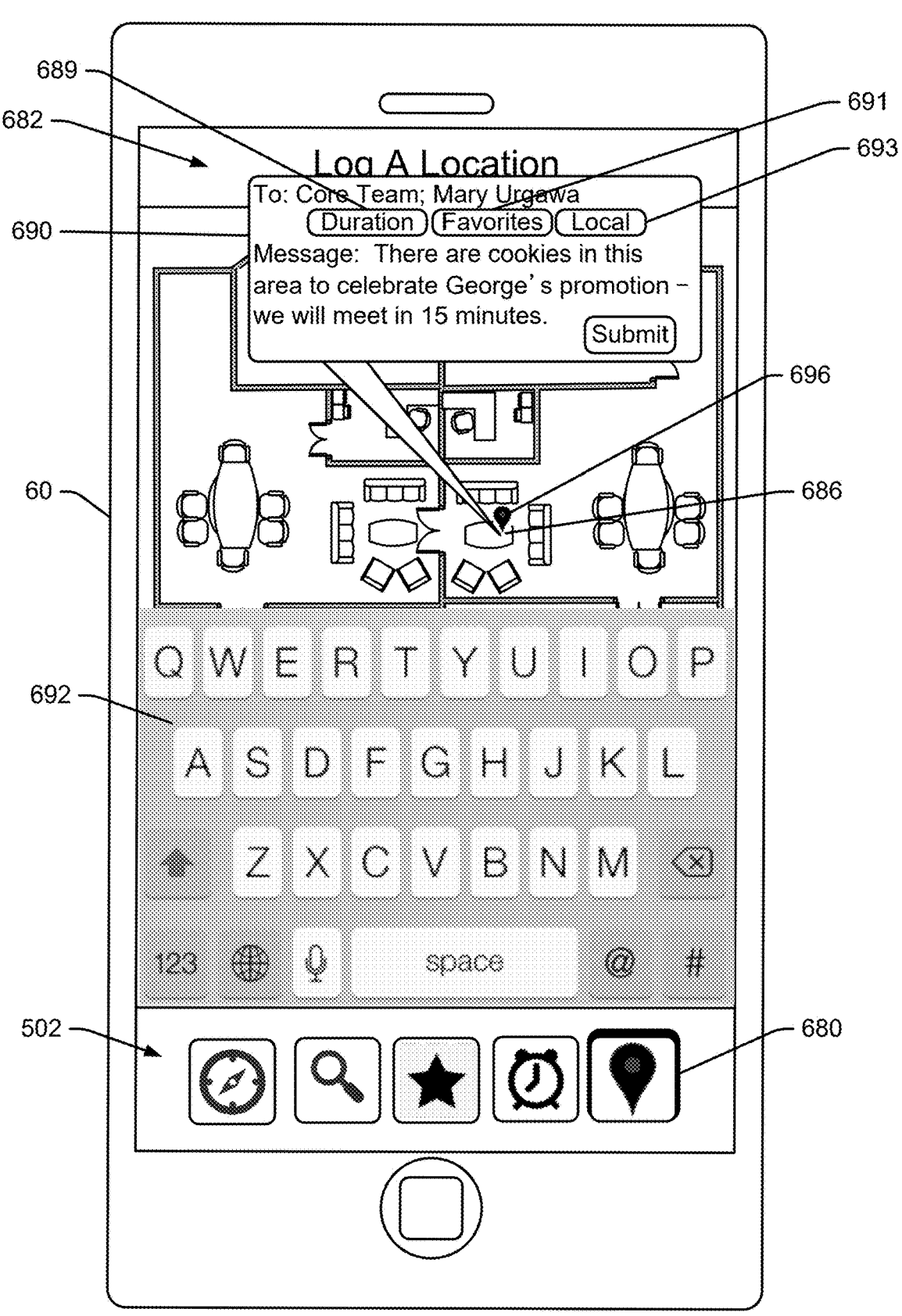
FIG. 32 is a view similar to FIG. 12, albeit showing tools for indicating a specific point of reference and related information on a floor plan view of a facility space.

Another function that may be performed within the system described above is to assign information or notices to specific locations within a facility that is associated therewith for some reason. For instance, where a specific travelling employee will be stationed in a remote office for a day, an administrator may want to mark the office and indicate that the employee will be generally around so that users of devices 60 can easily see the location of the space to be occupied by the employee. As another instance, where someone brings in cookies to celebrate another employee's promotion, the location of the cookies can be marked for others to see and as a guide to the cookies. To this end, see FIG. 32 where a point of interest icon 680 within the toolbar 502 has been selected to access a screen shot 682 for specifying a point of interest on a facility map. After icon 680 is selected, the device user would be instructed to select a point (e.g., 686) on the map after which the message window 690 is opened allowing an employee to select recipients of the point of interest message and to craft a suitable message. A keyboard 692 for navigating the window 690 and for typing in the message is provided as well as a submit icon 694 for submitting the message. Once a point of interest message has been submitted, the system provides a notice to each of the employees targeted with the message and, if one of those employees opens a map view as in FIG. 32, a point of interest icon 686 is presented to indicate the location of the point of interest.

In at least some cases when screen shot 682 is initially accessed, device 60 will present a default point of interest location corresponding to the current location of the device 60. Here, the default may be changed via touching another location on the presented map. In at least some embodiments, a favorite icon 691 may be presented in window 690 for adding all favorite employees to the recipient list for the message. In some cases a local icon 693 may be presented in window 690 for restricting the message to delivery only to recipients within a specific enterprise area such as, for instance, a local facility, a floor of a facility, an area of the floor, etc. Thus for instance, where "local" corresponds to a floor of a facility and both the local and favorites icons 693 and 691, respectively, are selected, the point of interest 698 may only be indicated to favorite employees of the device 60 user when the employees are located on the specific facility floor.

In some cases points of interest may only be set for finite periods. For instance, where a point of interest indicates cookies at a specific location, the notice related thereto may only be set to persist for 2 hours. In this regard see duration icon 689 that may be selected in FIG. 32 to set a notice duration for an associated point of interest.

While various aspects of at least some embodiments of the present disclosure are described above in relation to different types of interfaces, still other interface types that represent the described aspects are contemplated where the other interfaces types may be more intuitive to most system users. For instance, in at least some embodiments it is contemplated that different applications may be presented for locating and communication with employees on one hand and for locating and reserving other resource types (e.g., conference spaced, personal spaces, etc.). In this regard see again FIG. 3 that includes two other application icons including a compass icon 163 corresponding to an employee or personnel tracking/notification application and a room peak icon 165 corresponding to a space locating and reserving application.

Figure 3:
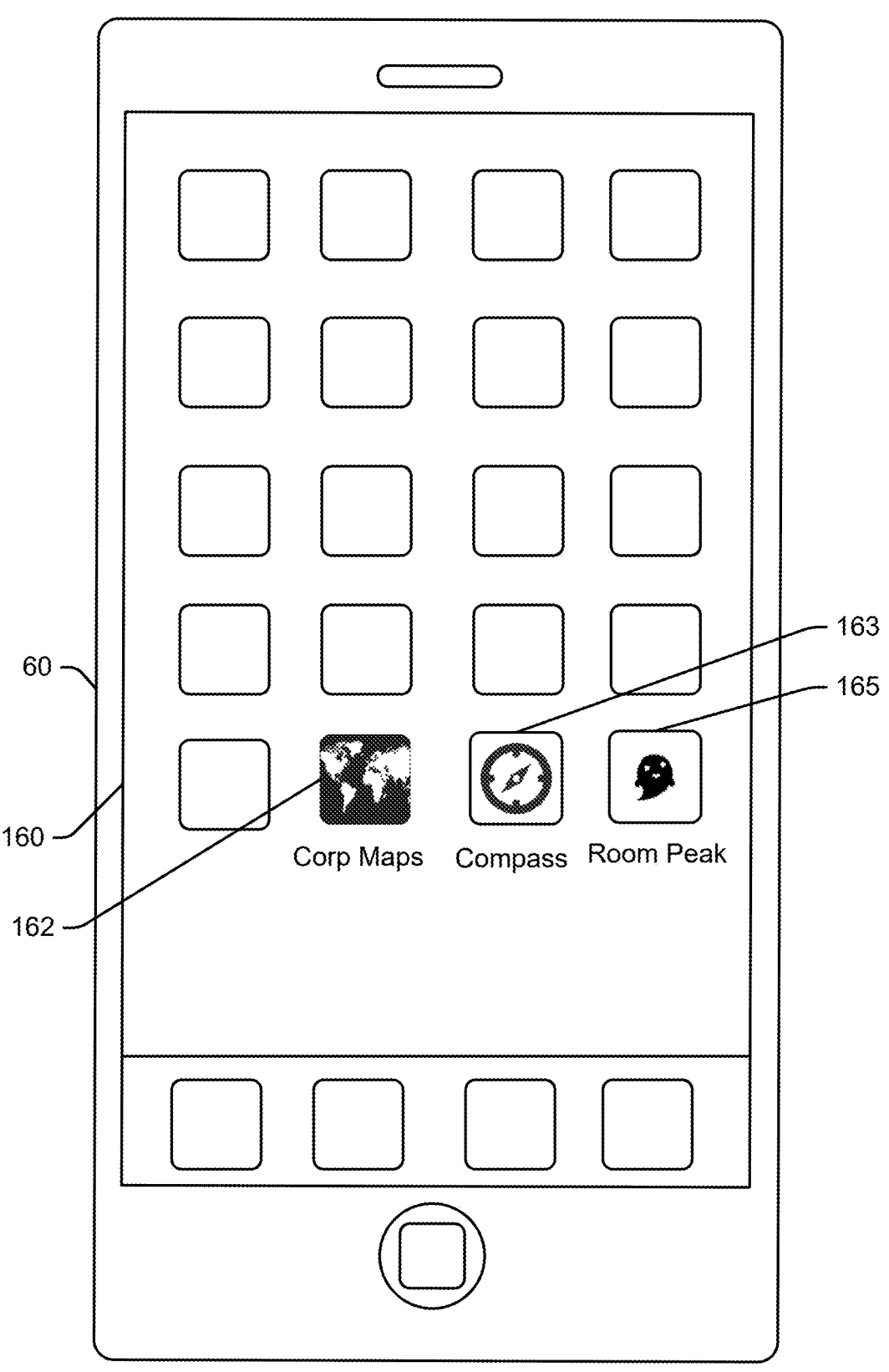
FIG. 3 is a schematic view illustrating a portable electronic computing device that may be used to facilitate various aspects of at least some embodiments of the present disclosure.
Figure 33:
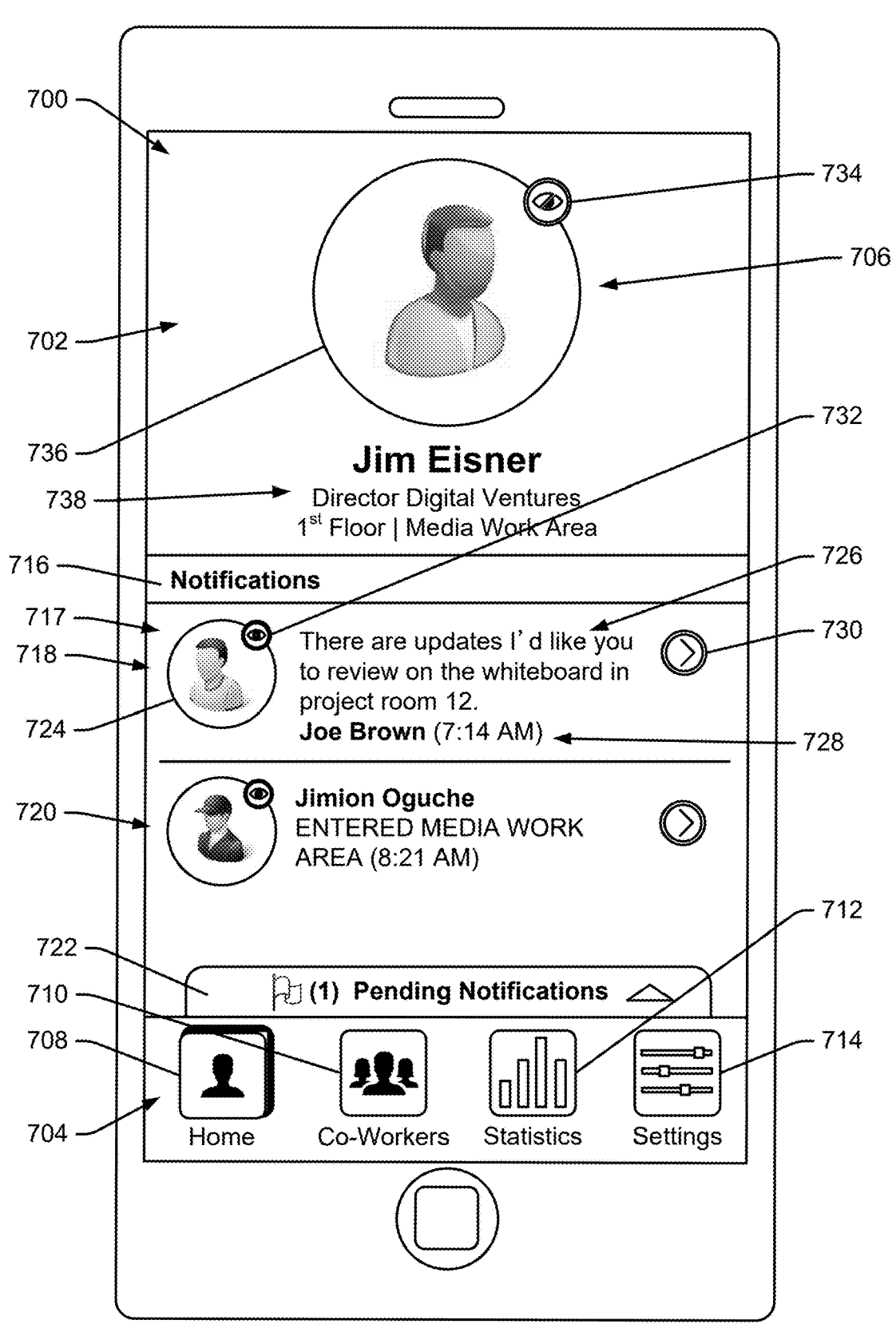
FIG. 33 is similar to FIG. 12, albeit illustrating a notifications interface consistent with at least some aspects of the present disclosure.

Referring to FIG. 33 a compass screen shot 700 for employee tracking is shown that may be presented when the compass icon 163 in FIG. 3 is selected. Screen shot 700 includes a lower tool bar section 704 and an upper information section 702. Tool bar section 704 includes four exemplary icons including a "Home" icon 708, a "Co-workers" icon 710, a "Statistics" icon 712 and a "Settings" icon 714, each of which is selectable to access a different compass functionality. The default functionality is associated with the home icon 708 which is initially highlighted or otherwise visually distinguished to indicate its initial default selection. The home view shown in the information section 702 includes information at the top related to the device 60 user as well as a notifications section 716 there below. The device user information includes an image of the device user at 736 and the user's name and title and current location at 738.

The notifications section 716 includes a list 717 of notifications received by the device 60 user as well as a tab 722 for accessing all notifications that the device 60 user currently has pending or specified. The exemplary notification list 717 includes notifications 718 and 720. Each of the notifications includes similar information and therefore, in the interest of simplifying this explanation, only notification 718 will be described here in detail.

Notification 718 includes an image 724 of an employee associated with the notification (e.g., the employee whose status the notification is associated with), a message 726, the name of the employee associated with the notification and the time 728 that the notification was generated. Notice 718 indicates that "There are updates I'd like you to review on the whiteboard in project room 12" and that the notice was generated by Joe Brown at 7:14 AM. An expander icon 730 may be selected to expand the notice to obtain additional information. For instance, the additional information may include a map to project room 12, a schedule for project room 12, a way to access a communication application for communicating with the employee associated with the notice, etc. Notice 718 is an example of an employee initiated notice (e.g., a notice generated by one employee for a second employee) while notice 720 is a tracked notice that was set by the device 60 user to indicate when the status of a second employee has changed. Thus, notice 720 indicates that a second employee has entered a media work area at 8:21 AM.

Referring still to FIG. 33, in addition to the information described above, "visibility" indicators 734, 732, etc., are provided for each of the employees shown in the view 700. While resource and specifically employee tracking and related notifications are useful tools, it has been recognized that at least some enterprise employees will not want their status to be tracked all the time, may only want certain statuses to be trackable or visible to others, or may only want a subset of other employees (e.g., favorites) to be able to view their status. Indicators 732, 734, etc., indicate currently set visibility of specific employees to other employees. For instance, indicator 732 that shows an open eye indicates that Joe Brown (e.g., the associated employee) has no visibility restrictions so that any enterprise employee has the ability to track any status of Joe Brown. As another instance, indicator 734 associated with Jim Eisner shows a half closed eye indicating that there are at least some restrictions to visibility of Jim Eisner's status to at least some enterprise employees. For instance, Jim Eisner's status may only be reported on a facility location basis and may not allow other employees to determine his specific location. As another instance, Jim Eisner's status may only be viewable by employees on Jim Eisner's favorites list and not by other employees. This sort of visibility control function is useful in the context of the notification features described herein and also in the context of other aspects of this disclosure such as, for instance, identifying employee locations in a view like the view shown in FIG. 25.

To view current visibility restrictions for any employee, a visibility icon (e.g., 732, 734) for the employee may be selected in at least some embodiments. The visibility indicators 734, 732, etc., presented may depend on which device

60 user is using a device 60. For instance, a first employee may restrict visibility to a second employee but not to a third. In this case, if the second employee is using her device 60, that employee would see a restricted visibility indicator (e.g., half closed eye) while the third employee using his device 60 would see an unrestricted visibility indicator (e.g., a fully open eye) for the first employee.

The pending notifications tab 722 can be selected to access specified notifications that are currently set for the device 60 user to indicate the status of other employees to that user. To this end, when tab 722 is selected, a sub-window 740 shown in FIG. 34 may be opened that includes a list of pending notifications. In the illustrated example only a single pending notification is shown at 742 that includes, consistent with the style of the notifications in section 716, an image 744 of the employee associated with the pending notification and the name 746 of the employee. A notification statement or specification 748 is presented in plain English (or in some other suitable language) for the device 60 user to examine. The exemplary notification statement 748 states "Notify me when Jimion is nearby."

Figure 34:
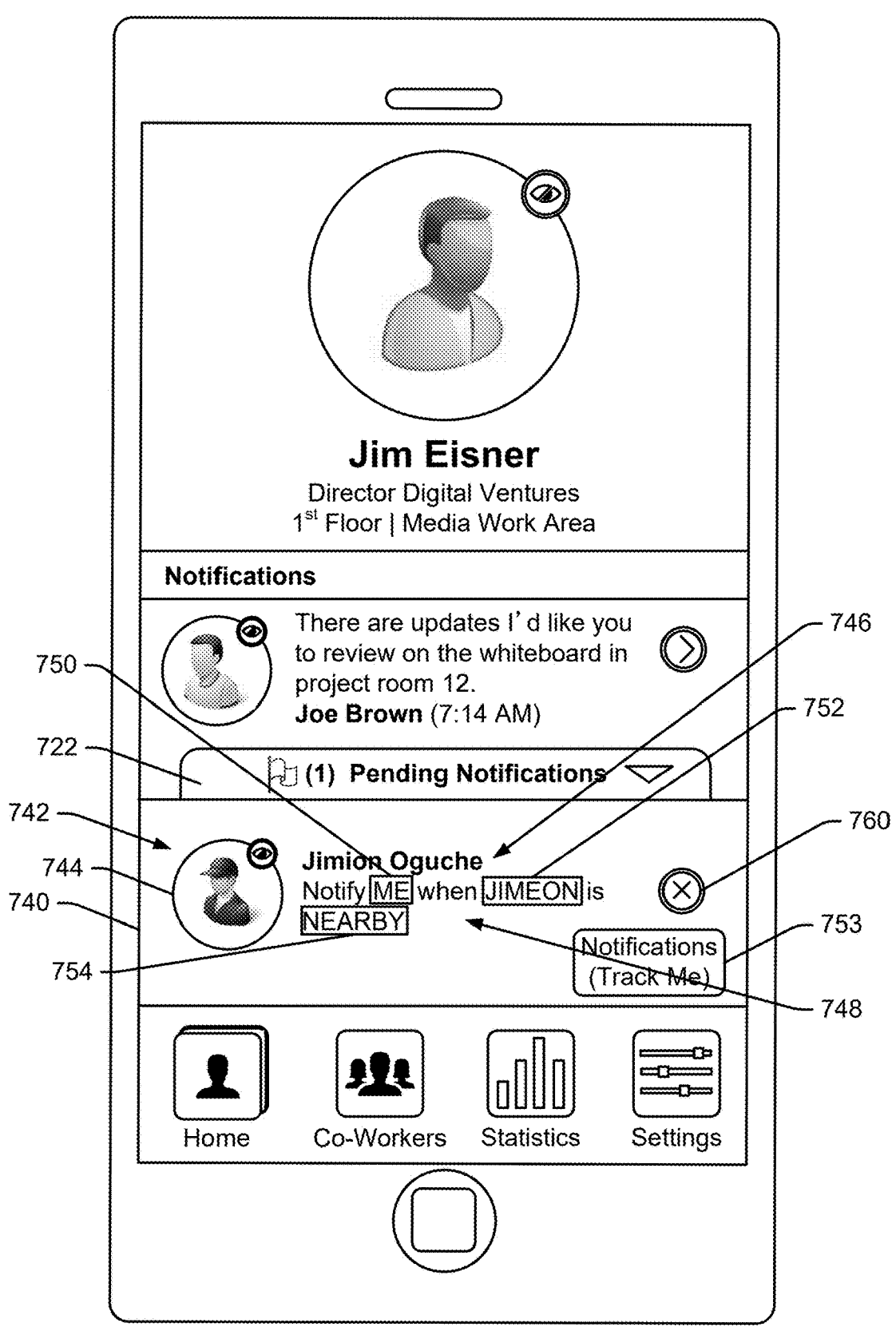
FIG. 34 is similar to FIG. 33, albeit illustrating a sub-window opened up to show pending notifications for a device user.

Referring still to FIG. 34, it has been recognized that there are a small set of notice factors or parameters that need to be specified in order to fully define a typical notification. In the statement 748 there are three parameters specifying fields 750, 752 and 754, for specifying different aspects of the notification. The fields 750, 752 and 754 are referred to herein as the "recipient" field 750, the "tracked" field 752 and the "status" field 754. The recipient field 750 specifies who should receive the notification once generated. Here, options typically include the device 60 user (e.g., "me") or some other enterprise employee. Other recipients are contemplated such as, for instance, "maintenance crew", "facility administrator", "caterer", "IT specialist", etc. The "tracked" field 752 specifies the resource for which status is being tracked. For instance, an employee's name, may be included in field 752. The status field 754 specifies the status of the resource in field 752 that should be reported or noticed. For instance, noticed statuses may include available, busy, nearby, within a specific facility, within a specific space, nearby and available, etc.

Referring still to FIG. 34, in at least some embodiments it is contemplated that a device 60 user may be able to select any one of the fields 750, 752 and 754 to access options for setting those parameters. For instance, a touch to field 750 may open a drop down menu enabling the device 60 user to select from a list of employees or other recipients for the notice, a touch of field 754 may open a different drop down menu enabling the device 60 user to select from a list of possible statuses (e.g., nearby, within 50 meters, within a specific facility, within a specific facility space, busy, available, travelling, with a specific second employee, etc.) to be noticed, etc.

Window 740 also includes a "Notifications (Track Me)" icon 753 that may be used to access a list of notifications that track the user of device 60 and that report to some other employee. This feature is useful for a device 60 user to determine if visibility or privacy settings should be modified. The track me list would likely be similar to the list 742 shown in FIG. 34.

In at least some embodiments it is contemplated that a device 60 user or other enterprise employee may be able to set notifications that notify other employees of resource statuses. For instance, a first employee may set a notification to report when a second employee is within 50 meters of a third employee and may have the notice delivered to the third employee when the triggering status or parameter occurs. Similarly, a first employee may set a notification to report when a second employee is within 50 meters (e.g., a triggering status) of a third employee and may have the notice delivered to the first employee (e.g., the employee that set the notice). Similarly, a first employee may be able to set a notice for a second employee to indicate when the first employee is within some facility area, is proximate the second employee, is available and within the vicinity of the second employee, is available for a call with the second employee, etc.

It should be appreciated that any status of any enterprise resource may operate as a triggering status for a notification, that the recipient of a notification may be any enterprise employee and that any employee may be able to set any of the notifications in at least some embodiments. Thus, while not illustrated in FIG. 34 and related figures, a notification may be set based on sensed or scheduled status of a conference room. For instance, an employee may set a notification to receive a notice when a specific conference room is next unoccupied and unscheduled for at least 30 minutes. Here, the trigger status is unscheduled for 30 minutes and unoccupied. Many other triggering statuses are contemplated.

Figure 35:
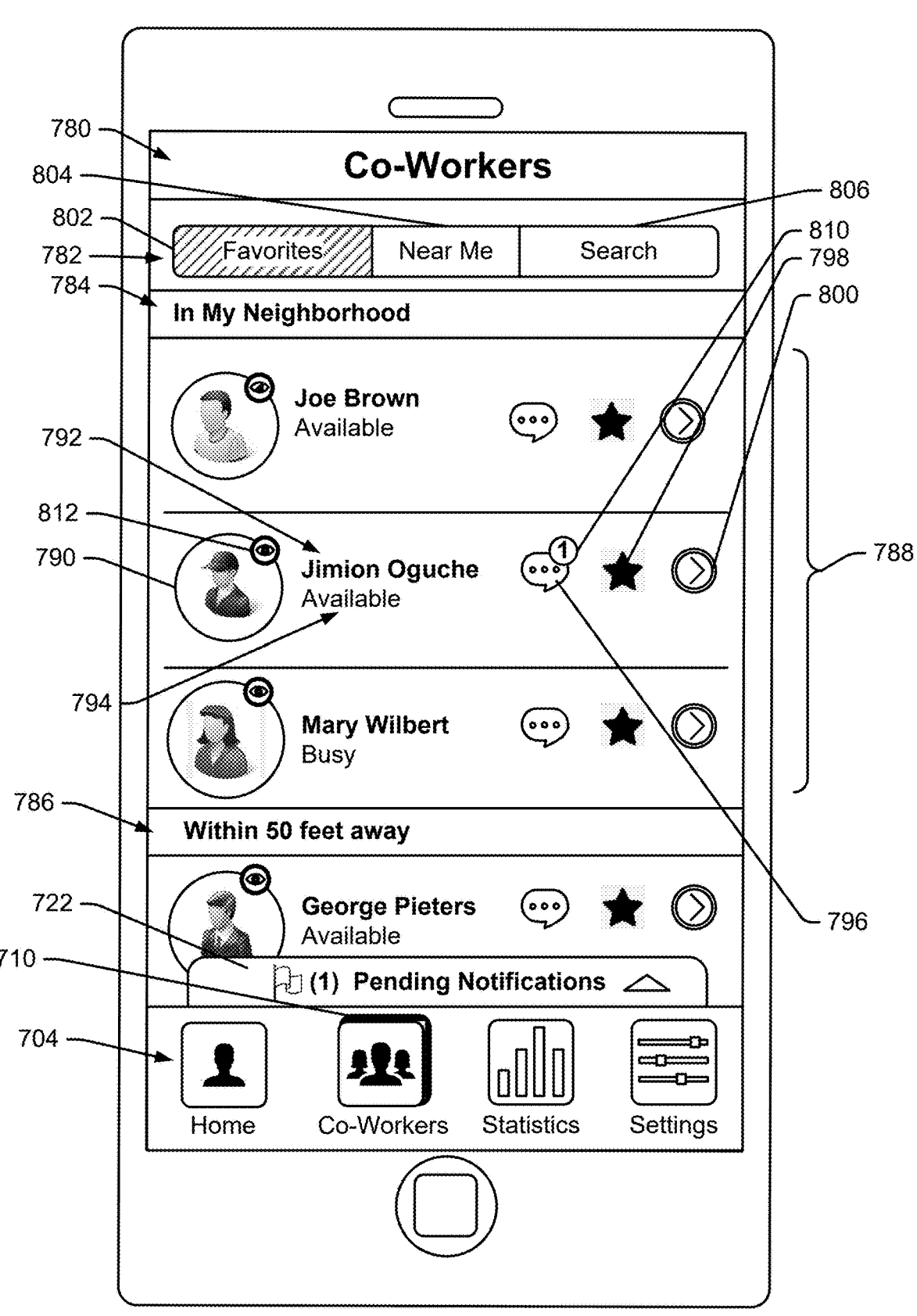
FIG. 35 is similar to FIG. 33, albeit showing a favorite co-worker's view presented to a device user.

Referring to FIG. 35, a screen shot 780 that may be presented in at least some embodiments of the present disclosure when the co-worker icon 710 is selected is illustrated. Screen shot 780 includes the same tool section 704 as describe above, albeit where co-worker icon 710 is highlighted as opposed to the home icon. The information section includes a sub-menu 782 and a current location reporting section including, in the exemplary shot, an "In my neighborhood" section 784 and a "Within 50 feet" section 786. The sub-menu section 782 includes a "Favorites" icon 802, a "Near me" icon 804 and a "Search" icon 806. Selection of favorites icon 802 causes a list of the device 60 user's favorite employees to be presented, selection of the near me icon 804 causes a list of employees near the device 60 user to be presented and selection of search icon 806 causes a search tool to be opened up as described in greater detail hereafter. In FIG. 35 the favorites icon 802 is shown highlighted to indicate selection thereof. In at least some cases the favorites icon 802 will be the default selection when co-workers icon 710 is selected.

Although icon 710 is a co-workers icon for searching for enterprise employees, in other embodiments the icon 710 may be a more general resources icon selectable to identify different resources proximate and available for use by a device 60 user. For instance, employees as well as conference and personal spaces may be locatable via icon 710 in some cases.

Referring still to FIG. 35, favorite employees are divided into groups as a function of their distance from device 60 where the groups include employees proximate the device 60 user and employees 50 feet or more away from device 60. For instance, three favorite employees are indicated at 788 within the device 60 user's neighborhood 784 (e.g., within 50 feet) and a single favorite employee is shown within the greater than 50 feet range. Other distance divisions are contemplated. Each employee listed includes an image 790 of the employee, the employee's name 792 and a status indicator 794 for the employee.

In addition, a notifications indication 796 and a favorites indication 798 as well as an expander icon 800 are provided for each listed employee. The notifications indication includes a count indicator 810 that indicates a number of notifications set by the device 60 user for an associated employee in the list. For instance, a "1" qualifier 810 spatially linked to the notification indicator 796 for a specific employee indicates that there is one notification specification set for the associated employee. Other notification indicators like 796 that do not include a number qualifier indicate that there are no currently set notifications for the associated employee.

A star 798 is provided for each of the employees in the favorites list because each of those employees is a favorite of the device 60 user. Again, each expander icon 800 can be selected to expand information related to the associated employee. A visibility indicator 812 is provided next to each image of an employee in the list to clearly indicate to the device 60 user whether or not notifications can currently be set for associated employees.

In at least some embodiments it is contemplated that where a notification tracking a specific employee is set but that employee is currently not visible or trackable (e.g., the employee has disabled the ability to track that employee or has at least disabled the type of tracking that the notification requires), inability to track the employee as required in the notification may be clearly indicated to a device 60 user so that the user knows not to rely on the notification features of the system. For instance, referring still to FIG. 35, where the employee associated with image 790 disables tracking of his location and status generally, the entire section of the screen shot associated with the employee may be shaded red to indicate that the currently set notification is not supported. This would give the device 60 user the option to attempt to contact the non-trackable employee in some other fashion. Other ways to notify a device 60 user that another employee has disabled tracking for that employee are also contemplated. For instance, referring again to FIG. 34 where notification 742 indicates that the device 60 user wants a notice when Jimion Oguchi is near him, if Jimion Oguchi disables tracking, the system may automatically identify any notifications associated with Mr. Oguchi and present an indication that the visibility or trackability of the employee has been altered.

In still other cases server 12 may be programmed to generate an e-mail, a text, a recorded voice message or some other type of communication to indicate to an employee whenever visibility required to support a set notification is disabled. Similarly, whenever one employee sets a new notification for another employee, server 12 may generate and transmit an e-mail or other communication to other the employee indicating that the notification has been set. In at least some cases the e-mail or other communication may enable the other employee to quickly and intuitively reject the new notification by, for instance, selecting a "reject" icon or the like in the e-mail. In other cases, prior to enabling a specified notification, a first employee receiving an e-mail or the like indicating that another employee has specified a notice to track the first employee may have to affirmatively agree to the tracking process via selection of an "accept" icon or the like in the electronic message.

Figure 36:
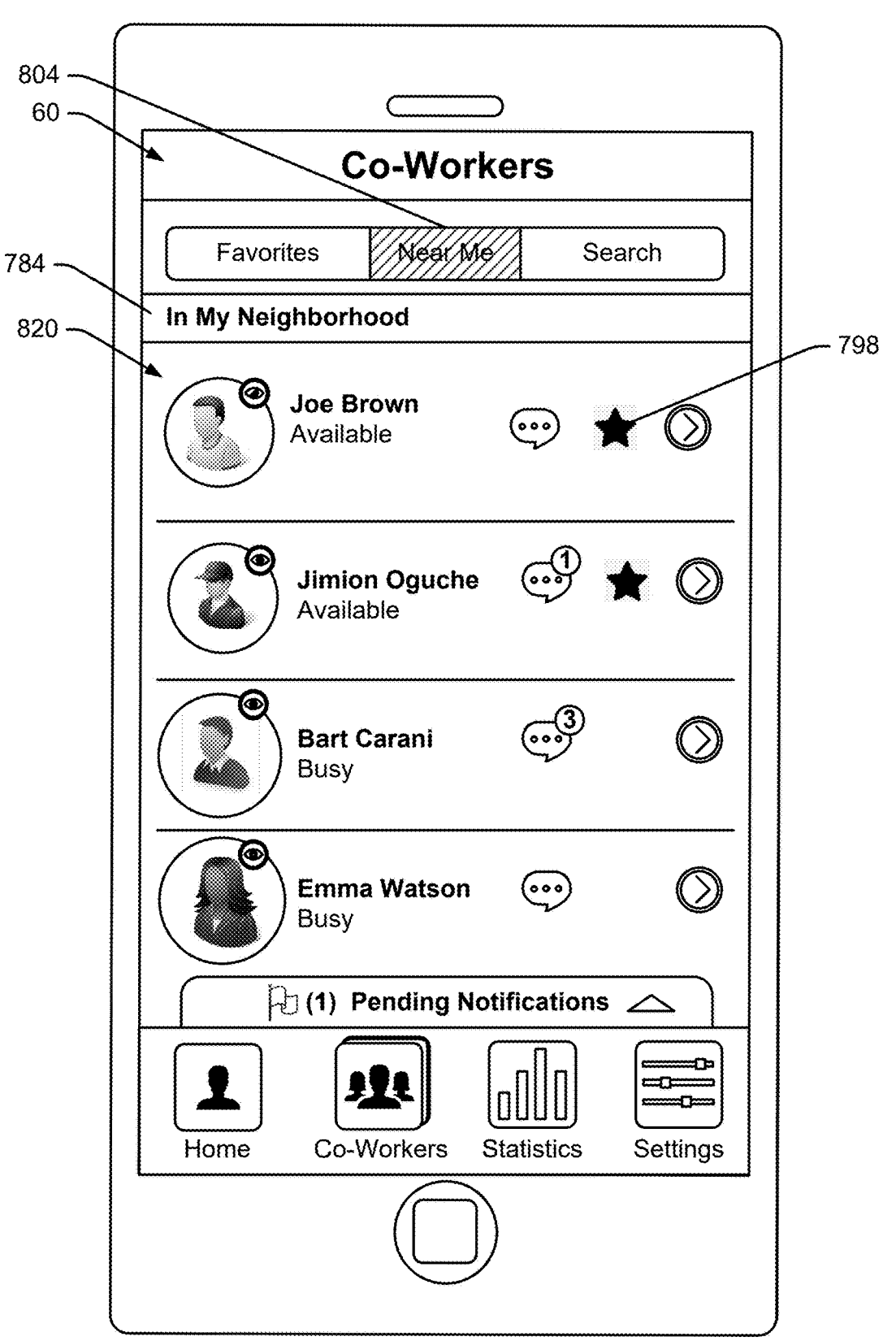
FIG. 36 is similar to FIG. 35, albeit showing a "near me" view of enterprise employees near a device user.
Figure 37:
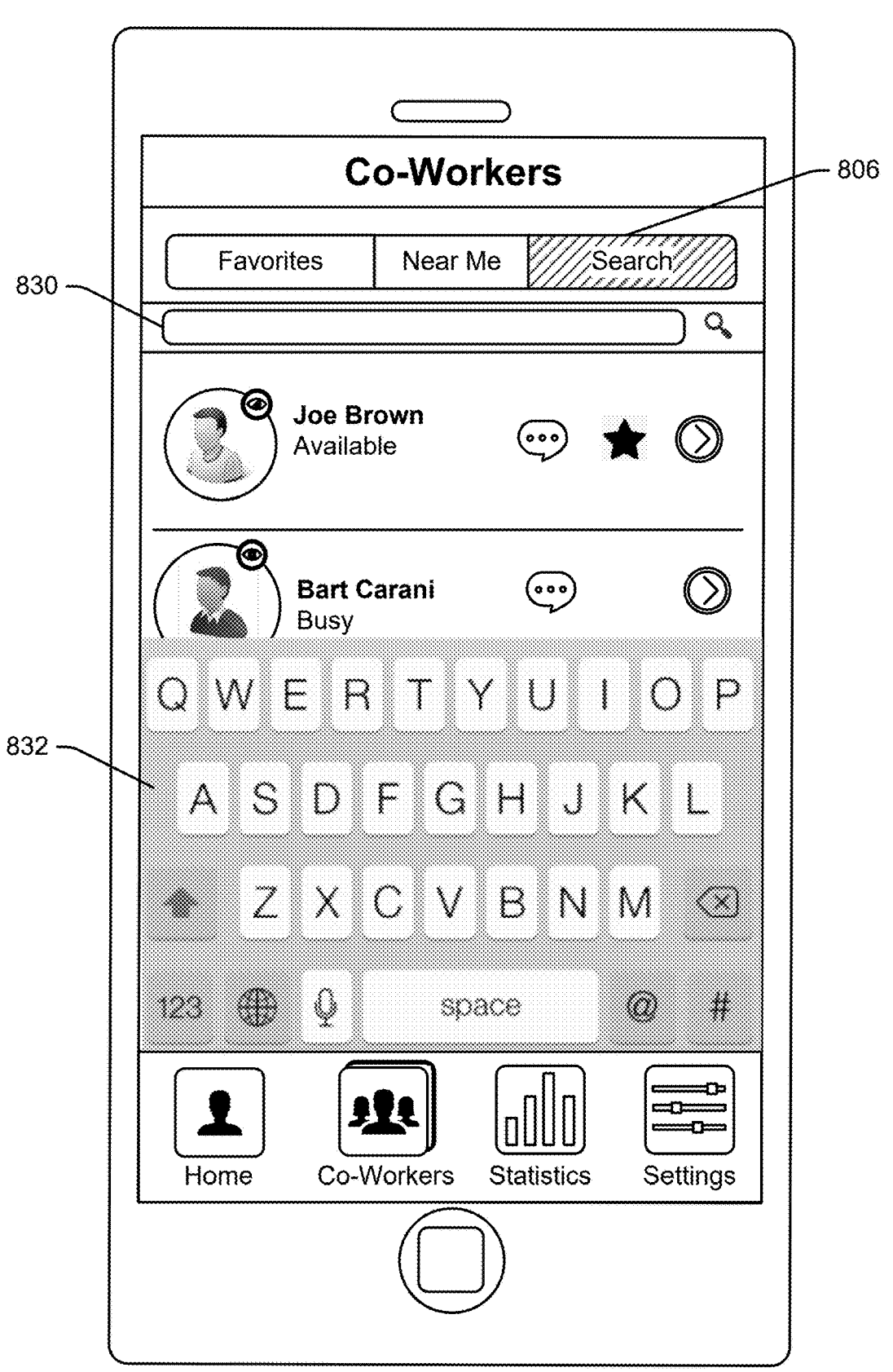
FIG. 37 is similar to FIG. 36, albeit showing a search view of co-workers for searching for co-worker proximate a device user.

Referring now to FIG. 36, when the near me icon 804 is selected, a list of employees ordered as a function of distance from device 60 is presented at 820. In this case, all employees and not just favorites are listed so that favorites indicating stars (e.g., 798) are presented only for employees on the favorites list for the device 60 user. When search icon 806 is selected, a search field 830 is opened and a virtual keyboard 832 is presented for entering search text for employees as shown in FIG. 37. Once a search is entered, a list of employees fitting the search criteria is presented below the search field 830.

Figure 38:
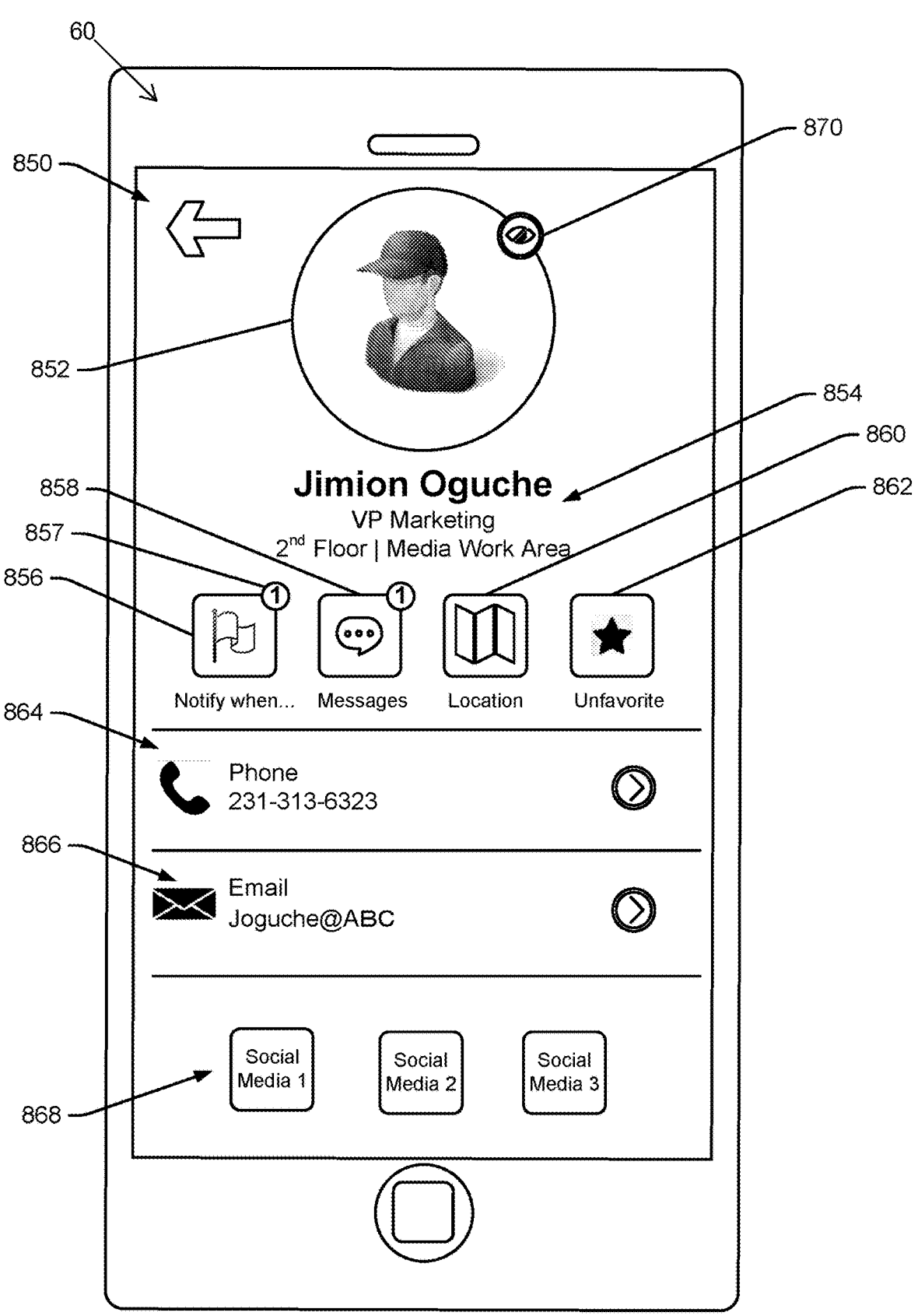
FIG. 38 is similar to FIG. 37, albeit showing notifications, messages and other communication tools corresponding to a specific employee of an enterprise.

Selection of an employee from any one of the lists in FIGS. 35 through 37 via one of the expander icons 800 or the like may open a screen shot akin to the screen shot 850 shown in FIG. 38 that includes expanded information related to the associated employee. The expanded information includes an image 852 and name and current location 854 for the associated employee along with a notifications icon 856, a messages icon 858, a location icon 860, a favorite (or un-favorite) icon 862 and contact information including a phone number 864, an e-mail address 866 and a set of social media applications 868 for contacting the employee via one or more applications. Any of 864, 866 or 868 may be selected to establish immediate contact with the employee. The notifications icon 856 includes a count indicator 857 that indicates that one notification is set where the "1" indicator can be selected to see the notification specification. Icon 856 can be selected to alter (e.g., add, delete or modify existing) notifications. The messages icon 858 can be selected to review existing messages or notifications from the associated employee the device 60 user. Location icon 860 is selectable to locate the associated employee on a virtual map like the ones described above. Icon 862 is selectable to toggle between favorite and un-favorite status for the associated employee. Again, a visibility indicator 870 is presented for the employee to indicate current ability to track the employee.

Figure 39:
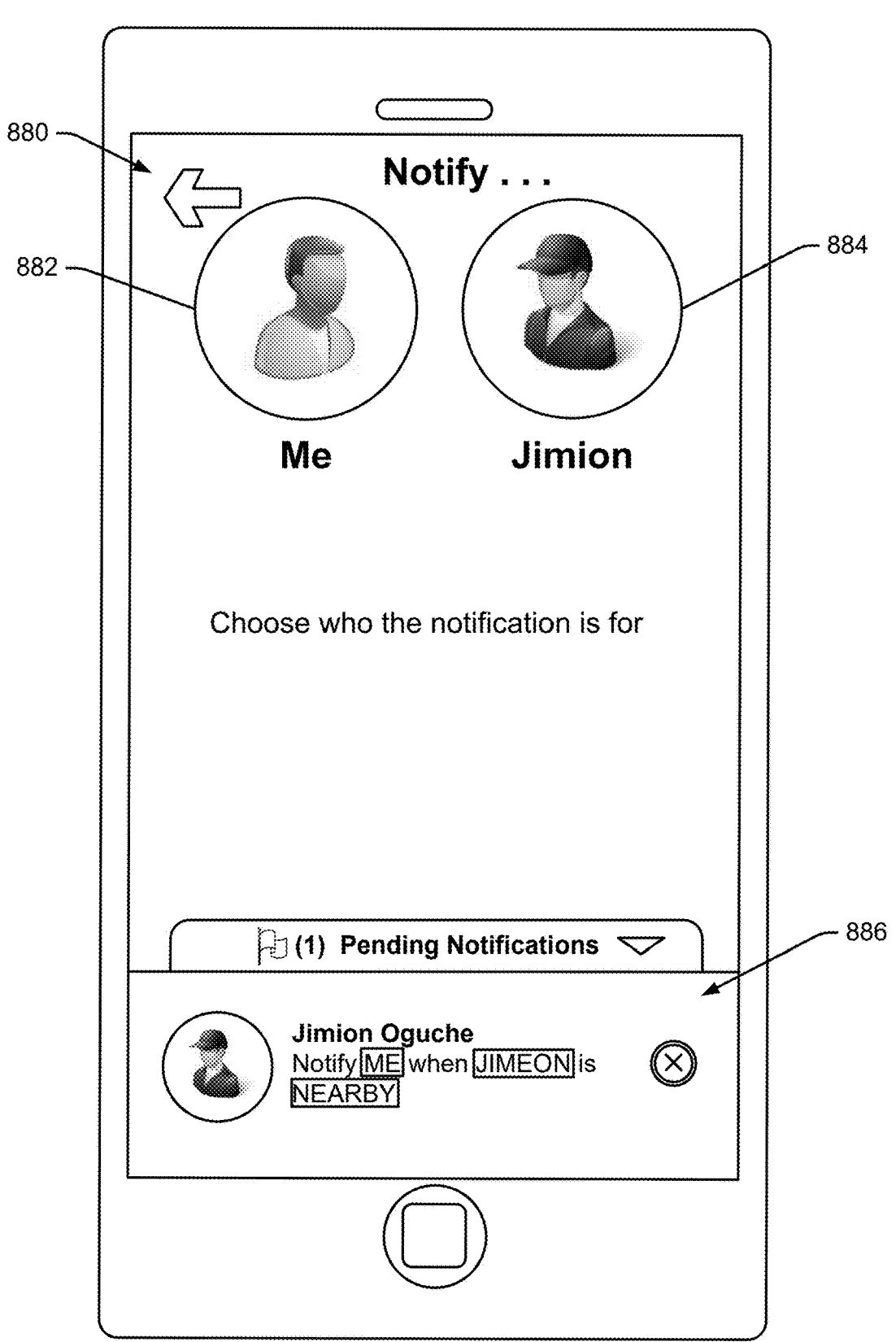
FIG. 39 is similar to FIG. 38, albeit showing an intermediate notification specifying interface.

In at least some embodiments setting a notification will be extremely simple and intuitive. To this end, see the set of figures beginning with FIG. 39 that show exemplary screen shots that may guide a device 60 user through the process of setting different types of notifications. In the case of any notification there is an employee (or other resource) being tracked and another employee being notified. To this end, when a device user selects icon 856 in FIG. 38 to specify a new notification associated with the employee in image 852, device 60 may present screen shot 880 presenting each of the device 60 user 882 and the other employee 884 as options (e.g., via images) to receive the notification. In addition, to help guide the device 60 user, device 60 may also present current notifications in a pending notifications window 886 related to the other employee 884 so that the device 60 user does not inadvertently specify a pending or substantially similar notification a second time.

Figure 40:
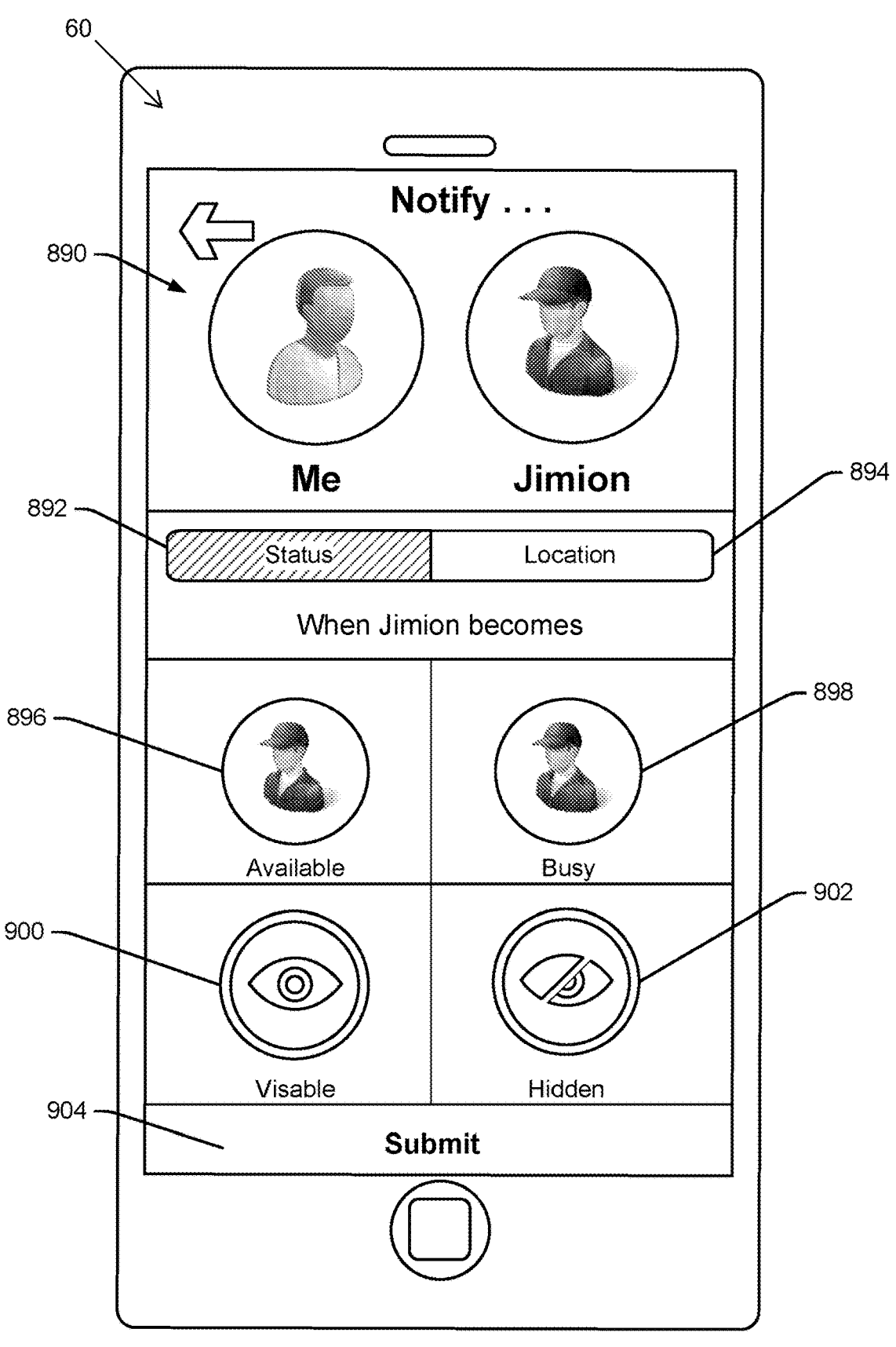
FIG. 40 is similar to FIG. 39, albeit showing an intermediate notification specification interface at a later point in the specification process.

Assuming the device 60 user want to specify another notification for himself tracking status of the other employee, the device user selects icon 882 and device 60 presents the screen shot 890 in FIG. 40. In at least some embodiments, notifications will be one of two types, either status based or location based. Location based notifications are related to the location, either actual or relative location, of an employee. For instance, is the employee within 50 feet of me or is the employee within a specific conference room, etc.

Status based notifications include all other non-location based notifications. For instance, is an employee currently available, is the employee currently busy, is the employee's visibility status currently set to visible or hidden, etc. In at least some cases notification type will automatically default to the status type or the location type to reduce the selections required by a device 60 user by at least one. In FIG. 40, notification type icons for status 892 and location 894 are shown with the status icon shaded or otherwise visually distinguished to indicate that the status icon has been defaulted to. Basic status options for selection are presented at 896, 898, 900 and 902 that correspond to available, busy, visible, and hidden, respectively. Once a status icon is selected, a submit icon 904 can be selected to submit the specified notification.

Figure 41:
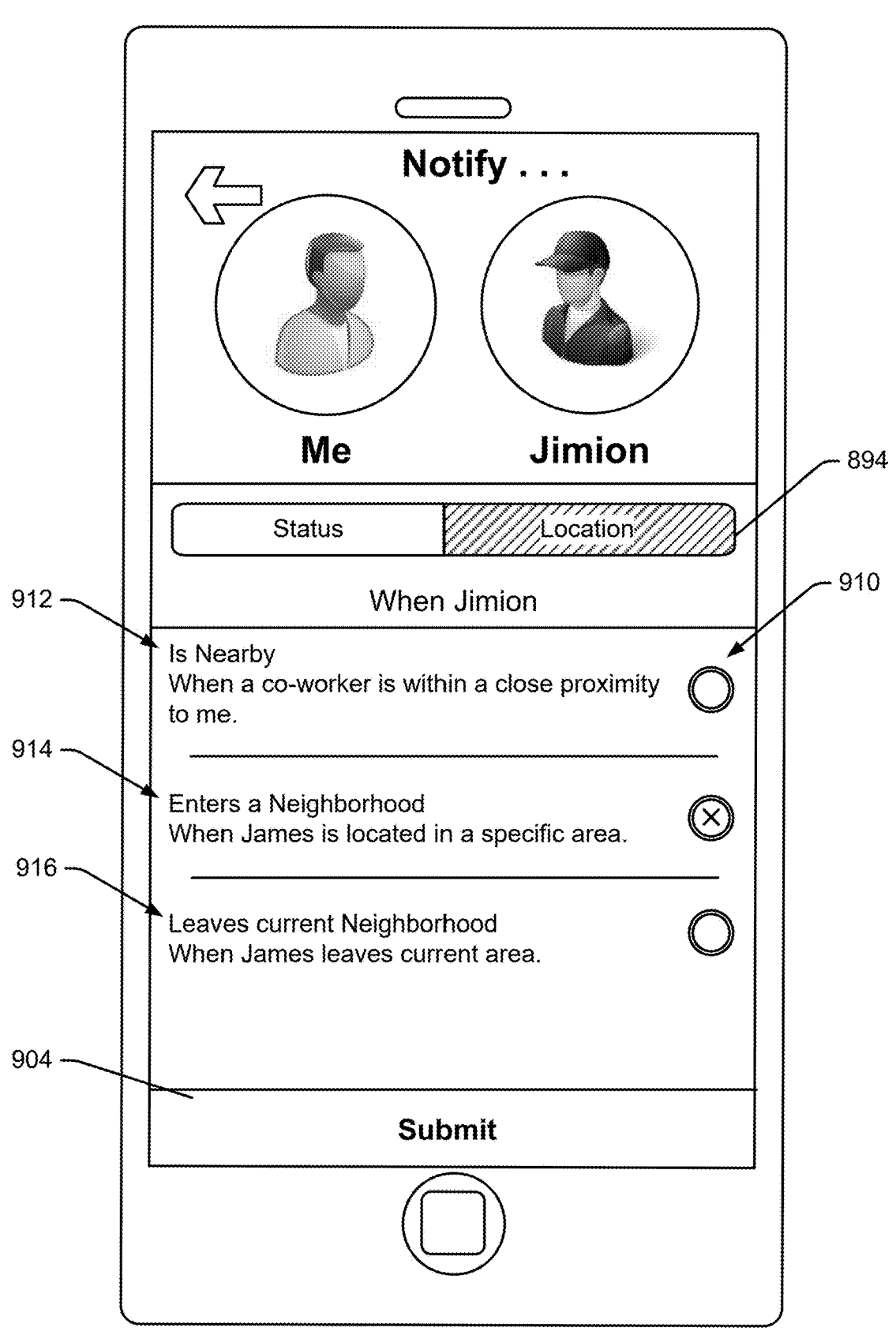
FIG. 41 is similar to FIG. 41, albeit showing a different notification specifying interface.

Referring to FIG. 41, when location icon 894 is selected, device 60, in at least some embodiments, presents a basic set of location options in a list 910 that includes "Is nearby" 912, "Enters a neighborhood" 914 and "Leaves current neighborhood" 916 options. Here, for instance, if the device 60 user wants to know when the other employee is near (e.g., within 50 feet of) the device 60 user, the device user would select option 912. If the device user wants to know when the other employee is in a specific neighborhood (e.g., a specific facility, a specific area of a facility, etc.), the device 60 user may select option 914, and if the user wants to know when the other employee leaves a specific (e.g., current or future) neighborhood, the device 60 user can select option 916. Icon 904 can be selected to submit a specified notification.

Figure 42:
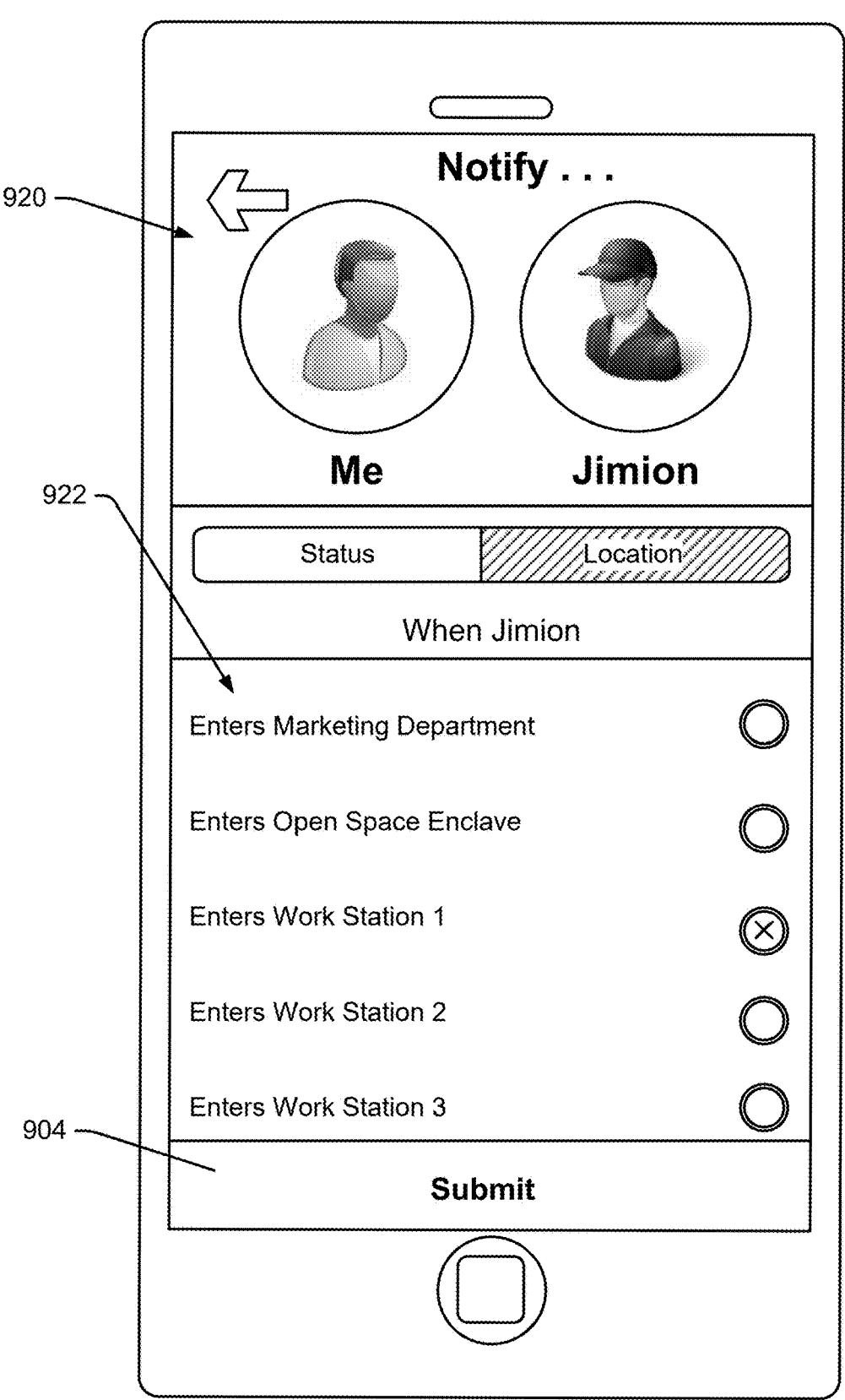
FIG. 42 is similar to FIG. 41, albeit showing a different time in the process of specifying a notification.

In FIG. 41, if the neighborhood option 914 is selected, device 60 may present a screen shot 920 as in FIG. 42 including a list 922 of possible neighborhoods (e.g., spaces) that can be selected as parameters for the notification specification. One or more of the spaces on the list may be selected and the notification specification can be submitted by selecting submit icon 924.

Figure 43:
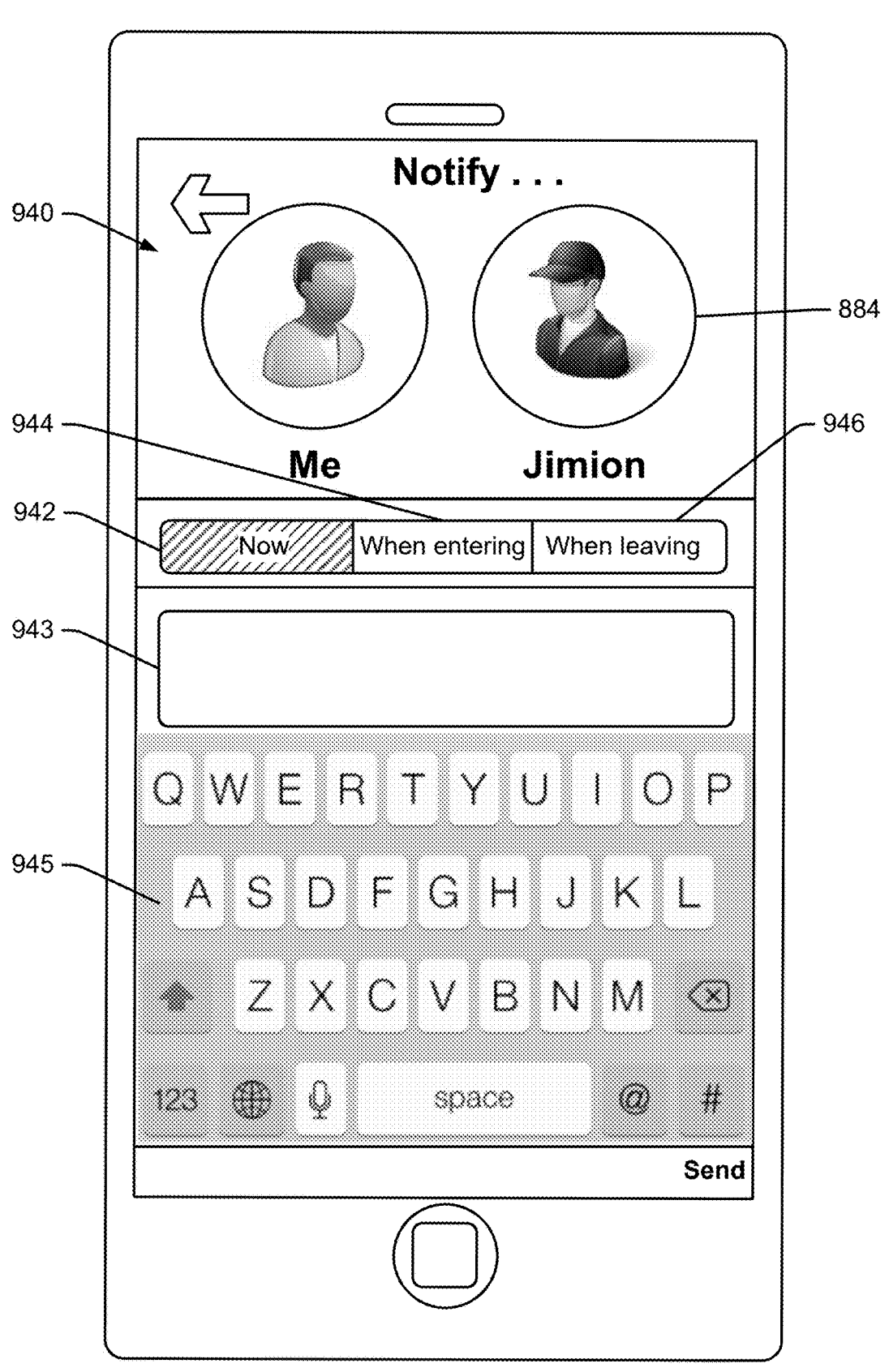
FIG. 43 is similar to FIG. 42, albeit showing an interface for generating a notification for another employee.

Referring again to FIG. 39, if the device 60 user selects the other employee icon 884, device 60 may present a screen shot 940 shown in FIG. 43 where icon 884 is highlighted or otherwise visually distinguished and options of notification types are presented as selectable "Now" icon 942, "Status" icon 944 and "Location" icon 946. In this embodiments, the status and location icons 944 and 946, respectively, may operate in a fashion similar to that described above. The now icon 942 and associated data entry tools are presented as an initial default enabling the device 60 user to generate a message for immediate delivery to the other employee indicated at 844. To this end the default tools include a field for entering a text message as well as a virtual keyboard 945 for text entry.

Figure 44:
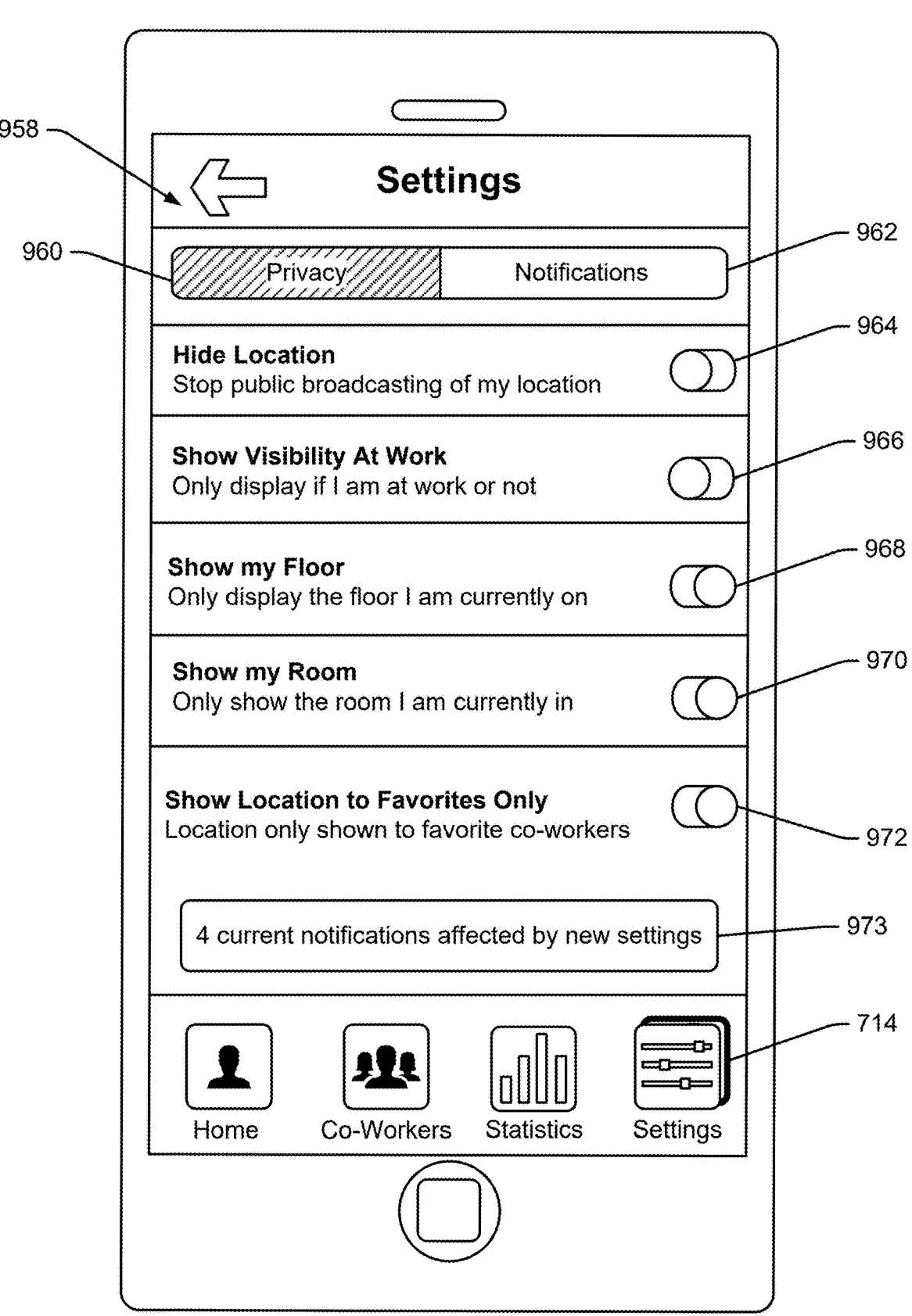
FIG. 44 is screen shot similar to the view shown in FIG. 33, albeit where a settings interface for specifying privacy and notification preferences is shown.

Referring to FIG. 44, when settings icon 714 is selected, a settings screen shot 958 is presented that enables a device 60 user to set privacy (e.g., visibility) and notifications settings. A default option may be that privacy icon 960 is highlighted and initially selected so that privacy setting tools are initially presented. The privacy setting tools include a "Hide location" setting toggle button 964, a "Show visibility at work" button 966, a "Show my floor" toggle button 968, a "Show my room" toggle button 970 and a "Show location to favorites only" toggle button 972. Button 964 either enables location tracking/visibility by other employees or turns the feature off. Button 966 enables or disables visibility of an employee while away from enterprise facilities (e.g., as reported by a GPS tracking application or the like to server 12). Buttons 968 and 970 enable or disable floor and room visibility, respectively. Button 972 allows a user to indicate whether or not all employees or only favorite employees have the ability to view or track the device 60 user's location. Other location or other status based privacy settings are contemplated (e.g., hide location when in specific facility space(s), hide location when with a specific other employee, show location when in scheduled meetings only, show location only when travelling between scheduled meetings when the travel time remaining is greater than 30 minutes, etc.).

Figure 45:
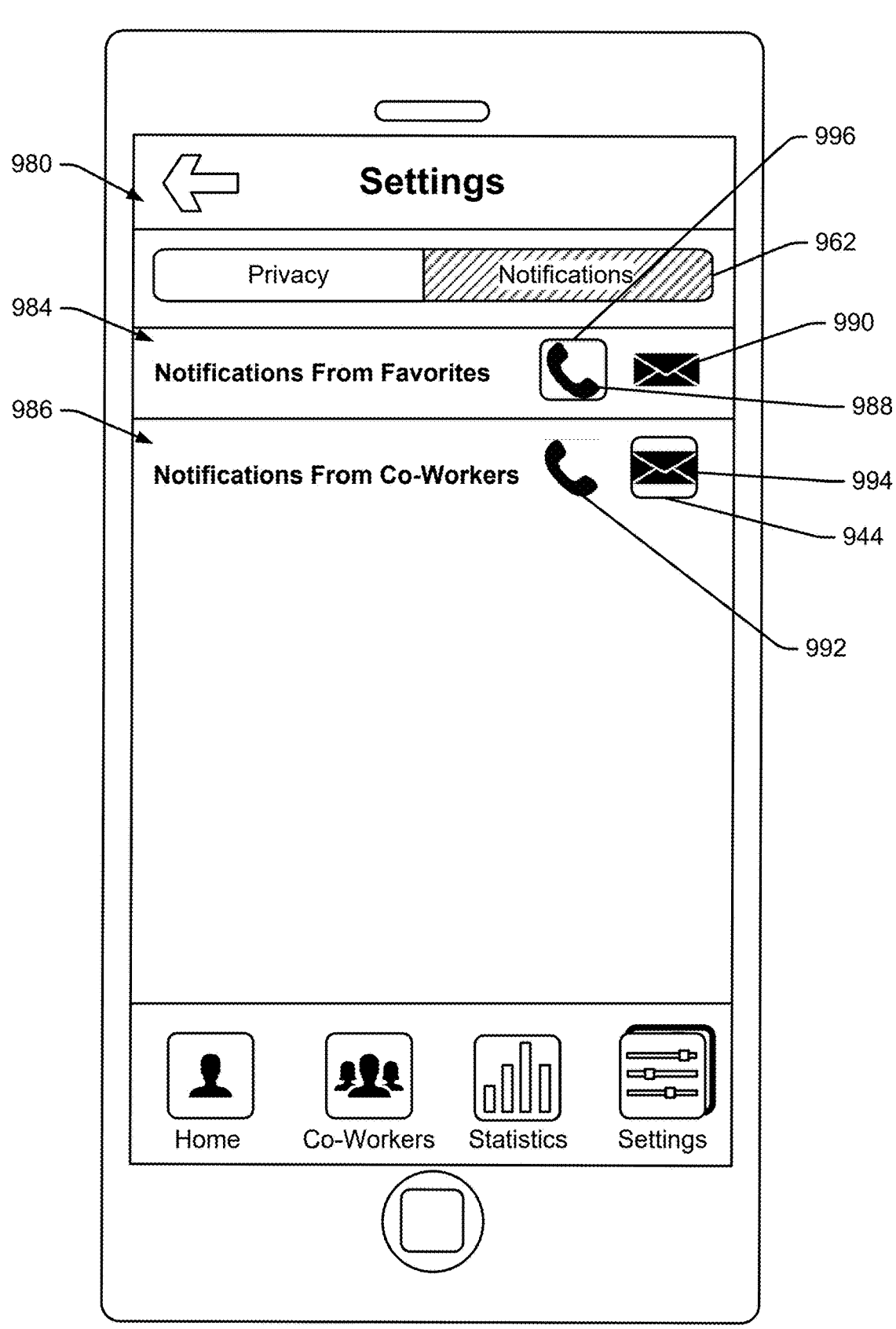
FIG. 45 is similar to FIG. 12, albeit showing another settings interface that is consistent with at least some aspects of the present disclosure.

In FIG. 44, when the notifications icon 962 is selected, device 60 may present the screen shot 980 shown in FIG. 45 that presents notification options for selection. In the illustrated example, the notification options include "Notifications from favorites" 984 and "Notification from co-workers" 986 designators along with notification type icons including phone icons 988 and 992 and e-mail options 990 and 994 for each of the designators 984 and 986. In FIG. 45, any of the icons 988, 990, 992 or 994 may be selected to toggle the notification types on and off for each of the designators 984 and 986. In FIG. 45 boxes or other highlighting 996 and 998 are shown to indicate currently selected notification types where non-boxed icons indicate notification types that are off. Thus, in FIG. 45, phone notifications are on for favorite employees while email notifications are on for all co-workers of the device 60 user. Other communication types (e.g., instant messaging, etc.) are contemplated and would be supported as options via screen shot 980.

Figure 46:
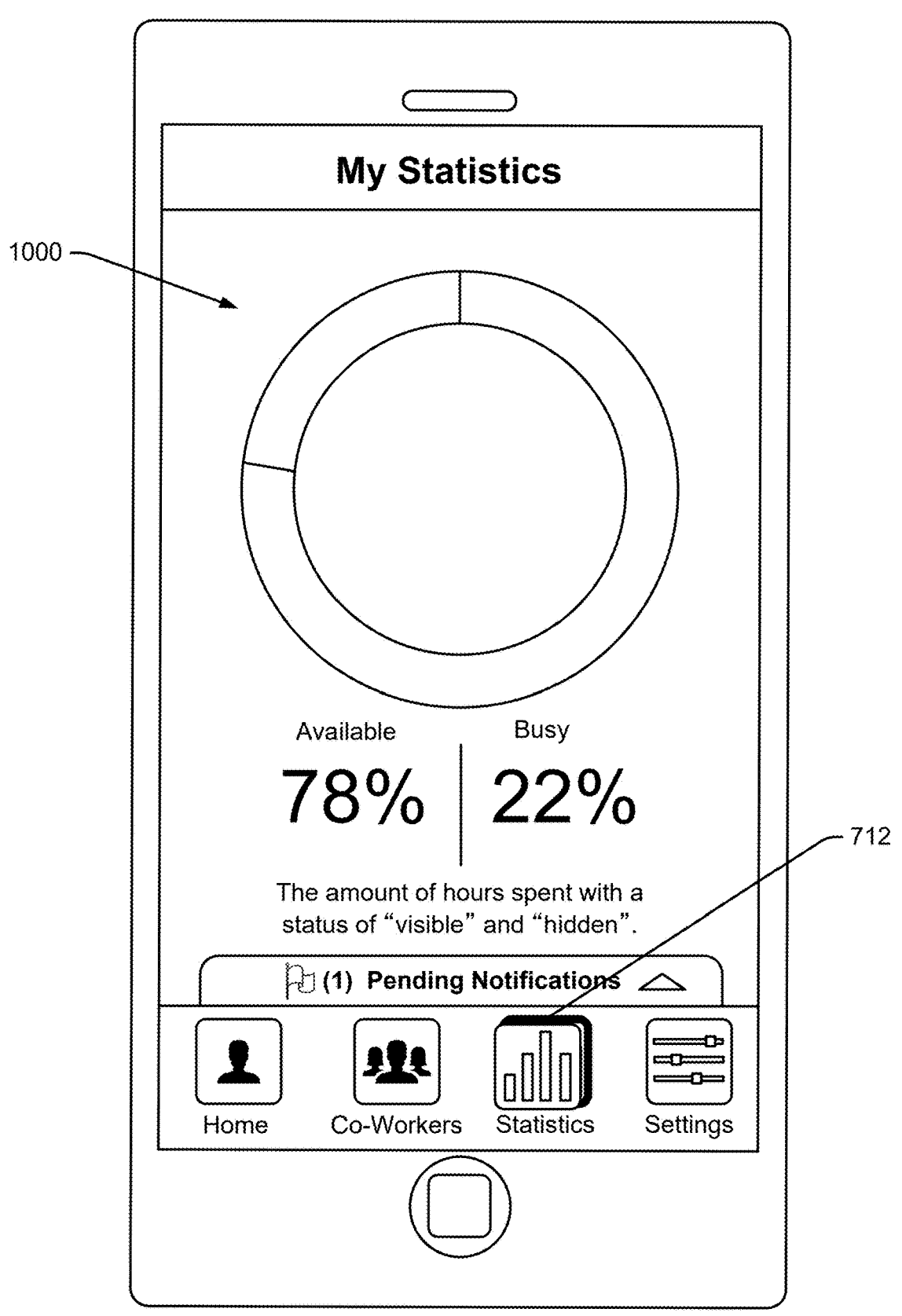
FIG. 46 is similar to FIG. 33, albeit showing a statistics screen shot that is consistent with at least some aspects of the present disclosure.

Referring yet again to FIG. 33, when statistics icon 712 is selected, a screen shot 1000 as in FIG. 46 may be presented that, for the device 60 user, shows various statistics. For instance, in FIG. 46 default statistics indicate the percent of a device 60 user's time that is scheduled as "available" and "busy". This view may help a device 60 user either maintain a more accurate schedule if the busy percent does not reflect the amount of actual scheduled time for the user or may help the user if the user recognizes that there is not enough available time in her schedule.

In at least some of the features described above the disclosed system attempts to optimize interface use by defaulting to a most likely set of selections. In other embodiments the system may be programmed to always default to likely selections to help expedite the specifying process. For instance, see again FIG. 40 that may represent a default most likely notification specification when "notify when" icon 856 in FIG. 38 is selected. As shown, the specification selects "me" as the employee to notify, selects the "status" type 892 of notification and selects the "available" status 896. Here, if the device 60 user likes the default notification specification, the user can simply select submit icon 904 to submit the notification to the system. Here, if the user changes any of the notification parameters, the system may again, based on the change, make a most likely selection of other parameters automatically. For instance, if screen shot 890 from FIG. 40 were presented and the device 60 user selected icon 884 so that the notice would be to Jimion, other most likely options in the other specifying fields (e.g., status or location, etc.) may be automatically selected.

Referring again to FIG. 3, room peak icon 163 corresponds to another application that may be used to identify space resource utilization and to schedule space use. The room peak application may present space options in yet another visual paradigm. To this end, it has been recognized that spaces can be generally categorized as a function of their affordances into a relatively small set of space type options and the type options can be presented to employees for selection so that the employees can forego the need to specify a list of preferred affordances. For instance, the space type "private phone booth" is sufficiently descriptive for an employee to know that a space of that type will include affordances optimized for a single person phone call without requiring further specification of desired affordances. Similarly, a space type descriptor "meeting room with video" is sufficiently descriptive for an employee to understand that the space is optimized for video conferencing.

Figure 47:
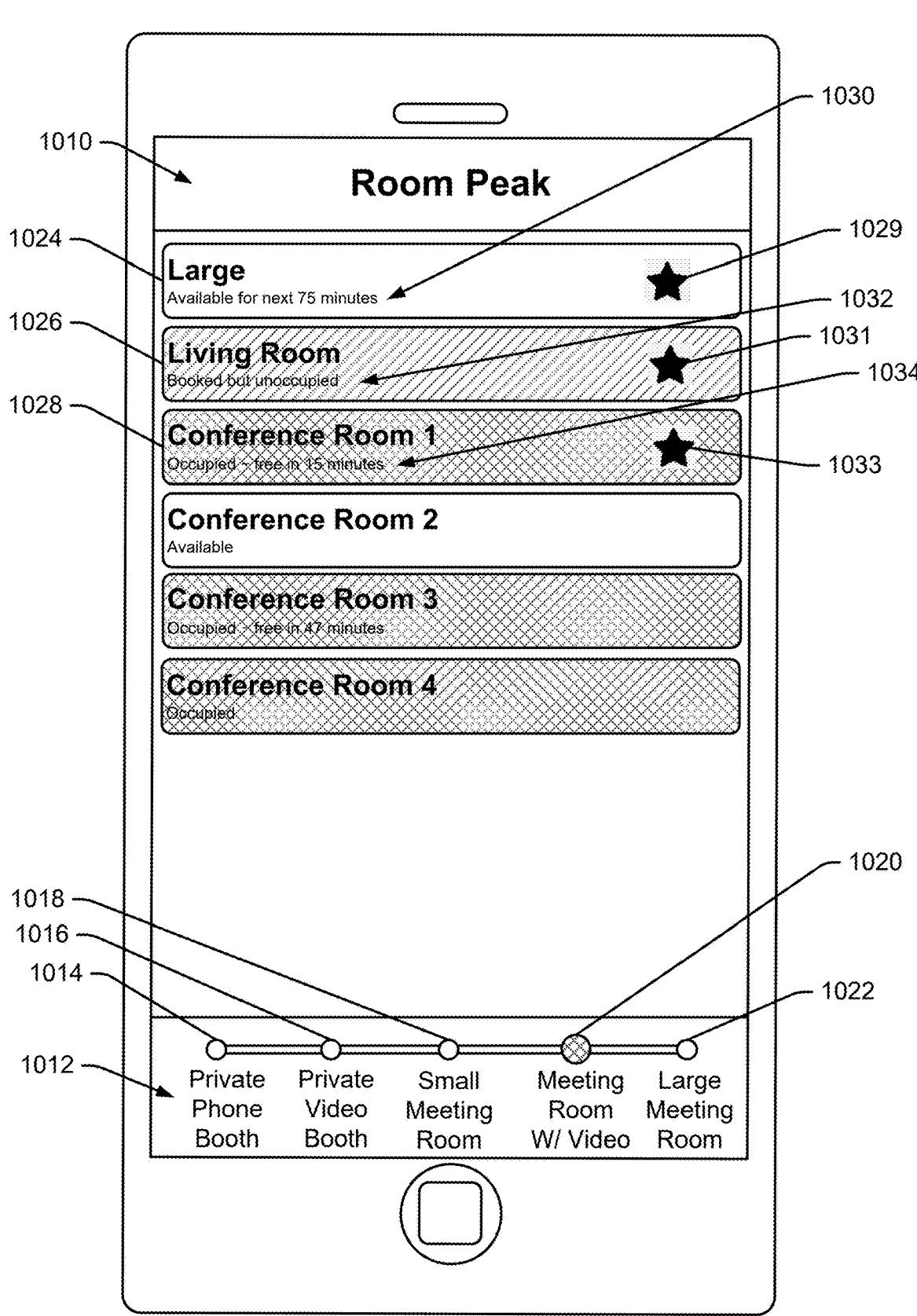
FIG. 47 shows another screen shot including yet a different view of facility space including information representing that status of each space.

Presenting space options based on general types is intuitive and can expedite use of search capabilities. See FIG. 47 that shown an initial room peak screen shot 1010 that may be presented when icon 163 in FIG. 3 is selected. Screen shot 1010 includes a list 1012 of basic space types along a bottom edge with associated selectable icons 1014, 1016, 1018, 1020 and 1022. Icon 1020 is shown highlighted to indicate selection but the highlight can be moved about from one space type option icon to another to select any one of the multiple different space types. Initially one of the selectable icons (e.g., 1014, 1016, etc.) may be selected as a default when the Room Peak application is accessed. The selected space type is visually distinguished in some fashion from other space types in the list 1012. In FIG. 47 the space type options include a private phone booth, a private video booth, a small meeting room, a meeting room with video and a large meeting room where icon 1020 indicates that the meeting room with video option has been selected to visually distinguish that space type from others.

A space list including spaces that are consistent with the selected space type at 1020 is presented at the top of the screen shot and, in the illustrated example, includes six options including, among others, a "Large" space option 1024, a "Living Room" option 106 and a "Conference Room 1" option 1022. For each option in the list, the option is presented with a status indicator. For instance, for the large space, a status indicator 1030 indicates that the space is available for the next 75 minutes while an indicator for the living room space indicates at 1032 that the space is currently booked but unoccupied. Another indicator 1034 indicates that the conference room 1 space is occupied but will be available in 15 minutes. Other status indicators indicate occupied, available, etc. Using the screen shot 1010, an employee can quickly view all spaces that meet basic criteria associated with a selected room type. While occupied spaces are indicated in FIG. 47, in some embodiments only available spaces may be indicated.

As in embodiments described above, different space options in the presented list may be colored, shaded, highlighted or otherwise visually distinguished to indicate their current statuses. For instance, as seen in FIG. 47, all occupied spaces shown as double-cross hatched may be shaded red, all booked but unoccupied spaces shown in single cross-hatch may be shaded yellow and all available spaced may be shaded green.

Figure 48:
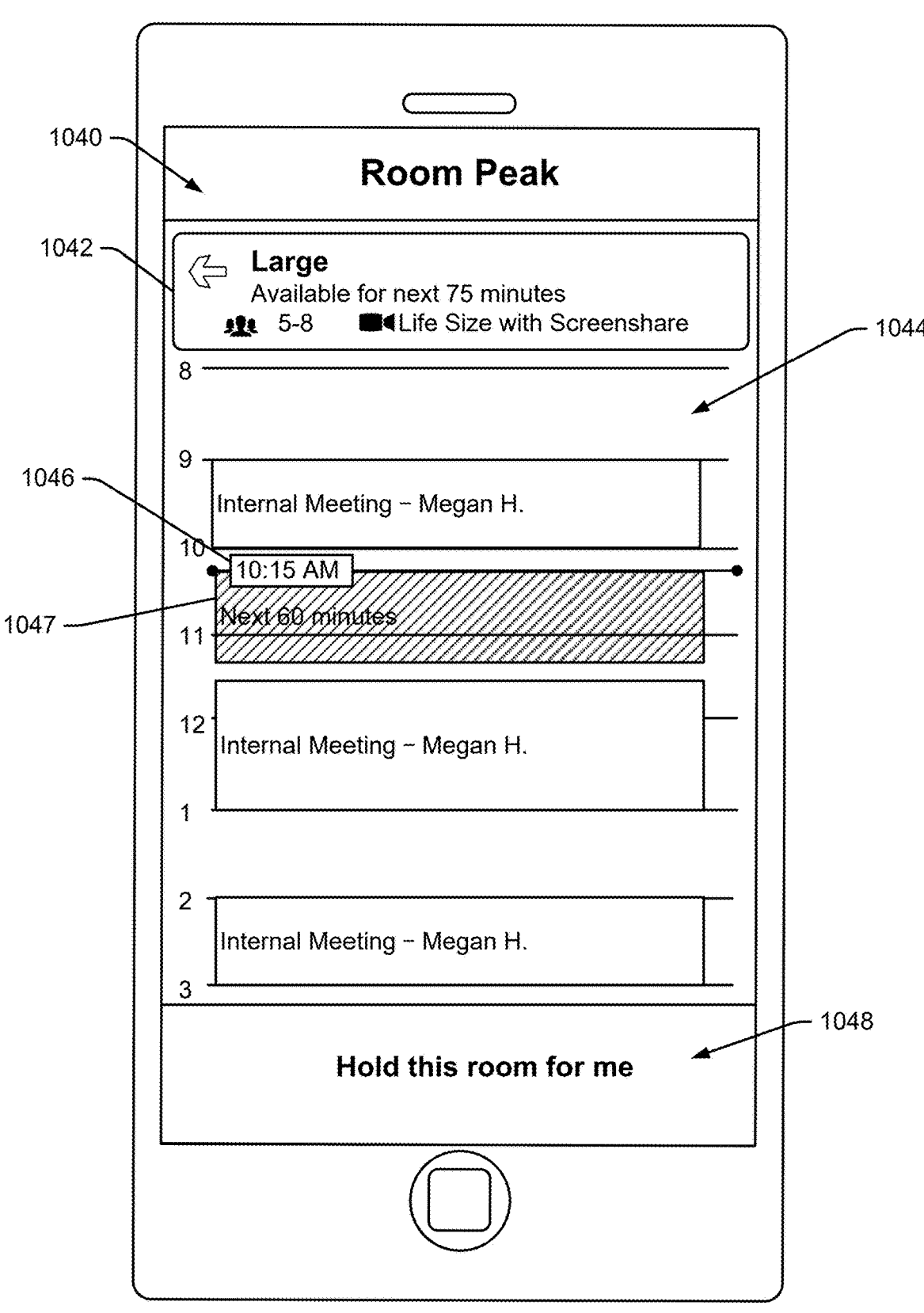
FIG. 48 is similar to FIG. 47, albeit showing information related to a specific one of the spaces represented in FIG. 47 after selection of that space representation in FIG. 47.

Referring to FIG. 48, once a space is selected from the list in FIG. 47, more information associated with the selected space is presented via a screen shot 1040. The additional information may include, for instance, a general description of the space 1042 and a schedule 1044 showing currently scheduled use of the space as well as a current time indicator 1046. A default duration (e.g., 60 minutes) suggested period 1047 may be indicated on the schedule to expedite a scheduling process. A selectable icon 1048 for scheduling use of the space within a free or available period is presented.

Figure 49:
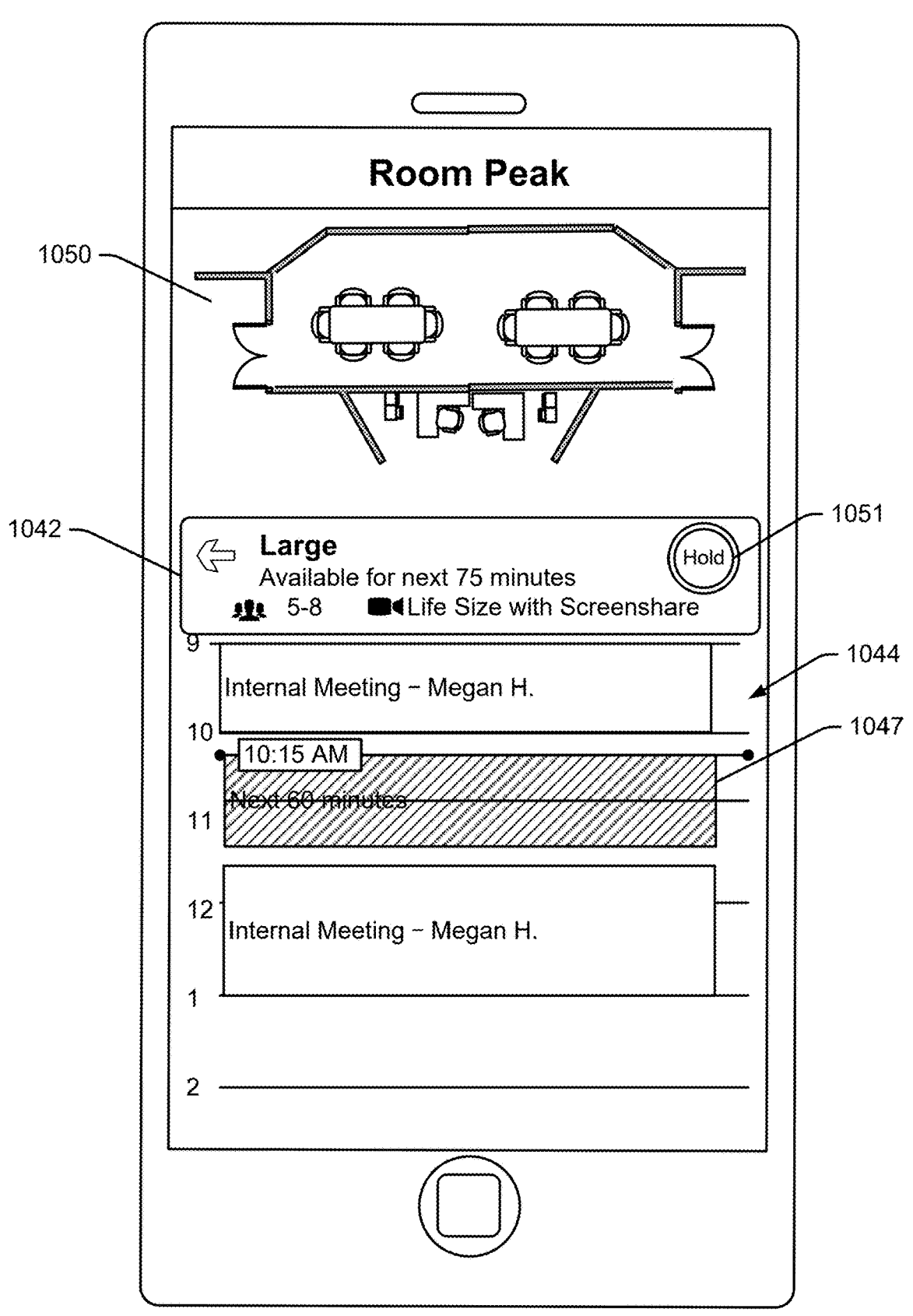
FIG. 49 is an alternate view that may be employed instead of the view shown in FIG. 48.

Referring to FIGS. 49, in other embodiments the additional information presented when a space is selected from the FIG. 47 list may include a map of a top plan view of the space selected along with the general information 1042 and the schedule information 1044 with a hold icon 1051.

Figure 50:
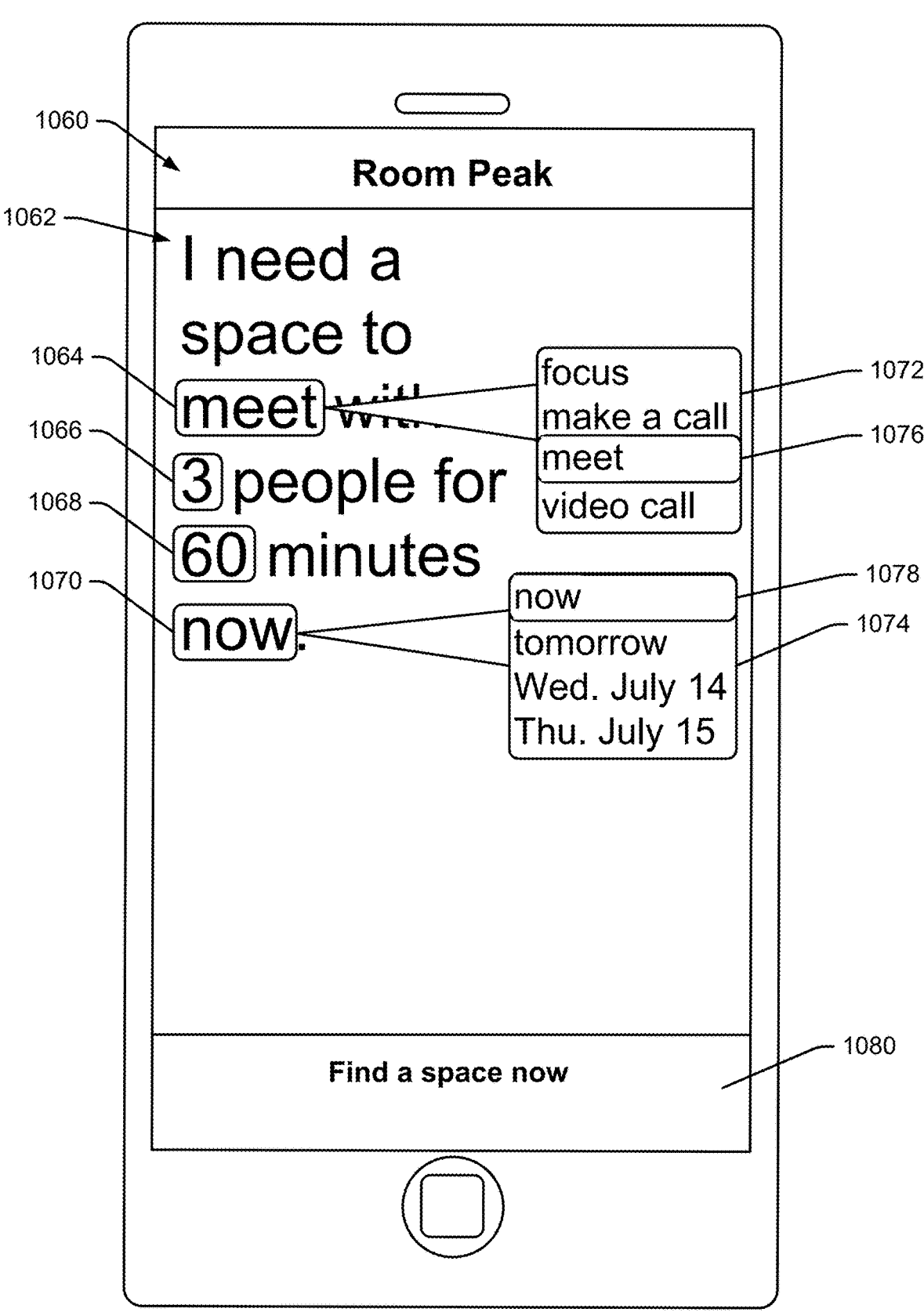
FIG. 50 shows a device screen shot presenting a space query or search in sentence form where different search parameters can be modified in an extremely intuitive fashion.

It has been recognized that many device 60 users prefer a natural language interface for searching for available resources. In at least some cases the room peak or other applications may be based on natural language searches as opposed to other specifying types of interfaces. To this end, see FIG. 50 that shows one screen shot 1060 of a natural langue type interface for locating an enterprise space that is available for use. In FIG. 50, the interface includes a simple natural language statement 1062 with some default parameters initially set in an attempt to expedite the space locating process. The exemplary statement 1062 states "I need a space to meet with 3 people for 60 minutes now". Here, the statement includes four qualifiers or parameters that may be altered from the initial default settings to customize the search statement where each of the qualifiers is shown in a rectangular field. In at least some embodiments, instead of showing a rectangular field about each qualifier, the qualifier may be visually distinguished in some other fashion such as, for instance, via highlighting with yellow or a different color, underlining, bolding, etc. The four fields include an activity qualifier field 1064, a number of participants qualifier field 1066, a time field 1068 and a start field 1070.

The activity field 1064 is for specifying an activity type for the space sought which may affect which spaces are suggested as options for a device 60 user. For instance, where the activity is a video call, only spaces including hardware for facilitating a video call may be identified. The participant's field 1066 allows a user to specify a number of persons that need to be supported within the space and the time field 1068 allows the user to specify the duration of the meeting to occur. The Start field 1070 allows a user to indicate when the meeting has to start (e.g., now, tomorrow, some future date, etc.).

Any of the fields 1064, 1066, 1068 and 1070 may be selected to open a drop down selection window with options to be selected by the user. For instance, two drop down windows 1072 and 1074 are shown for fields 1064 and 1070, respectively, where a box 1076 and 1078 in each window can be moved to change the selection in the associated field 1064 or 1070. After a statement 1062 has been altered to reflect a space required by the device 60 user, a search or submit icon 1080 near the bottom of the screen shot 1060 is selectable to submit the search query to the system server 12.

Figure 51:
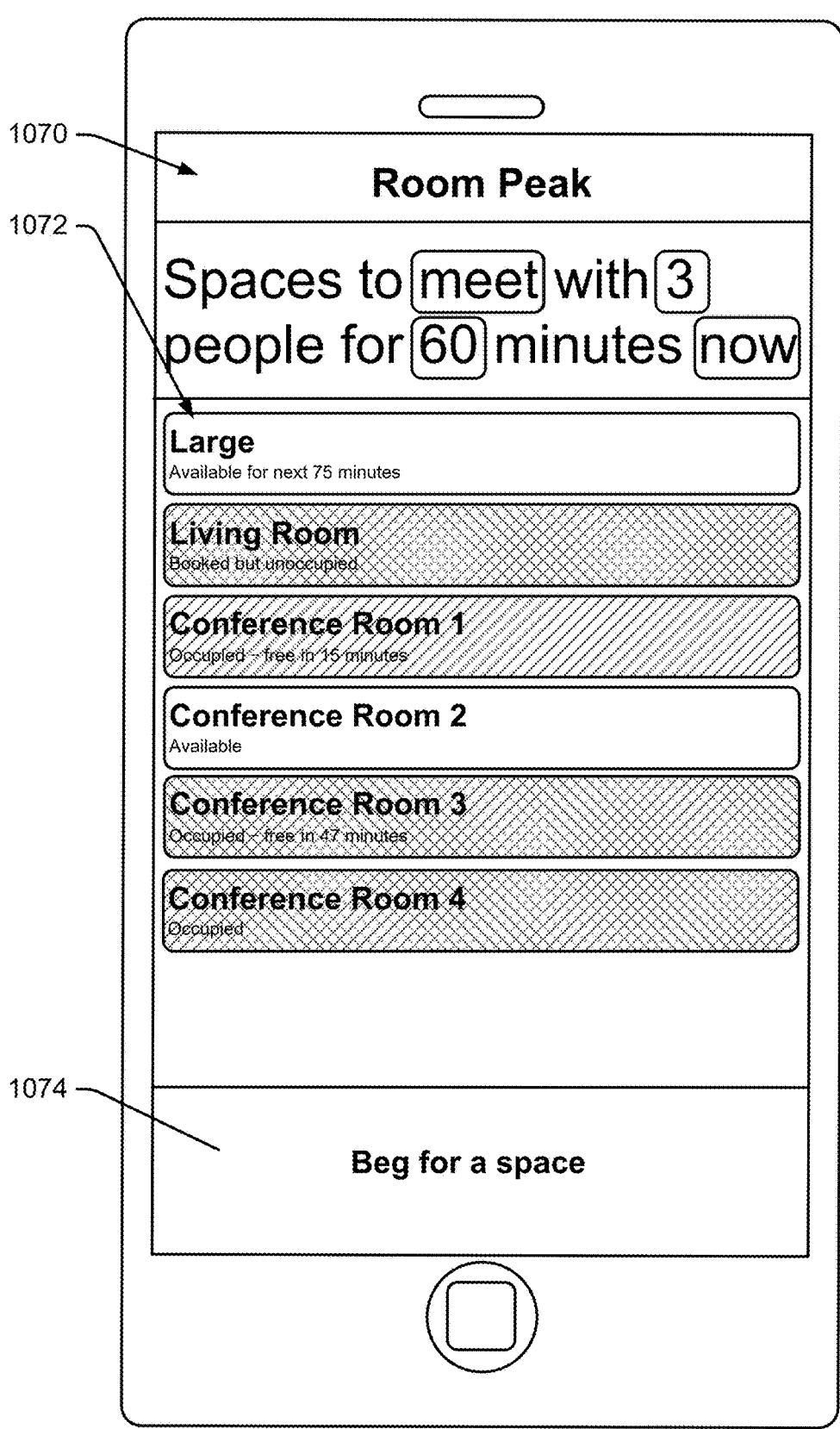
FIG. 51 shows the results of a search performed via the interface of FIG. 50 in yet another screen shot.

Once the statement from screen shot 1060 has been submitted, server 12 identifies all facility spaces that meet the required characteristics and presents those spaces in another screen shot 1070 as a list 1072 as shown in FIG. 51 along with status indicators similar to those described above.

The screen shot in FIG. 51 also includes a "Beg for a space" icon 1074 that can be selected by a device 60 user to request a space with specific affordances. For instance, if all spaces in a facility that include video conferencing capabilities are currently scheduled for a specific time, an employee may use icon 1074 to specify a request to other employees that have space with video conferencing capabilities reserved in an attempt to free up one of the spaces for use. Where a specific occupied space is required or strongly desired for some reason, an employee may be able to request the specific space. For instance, in FIG. 51, an employee may be able to select icon 1076 corresponding to conference room 4 to highlight that space and then select the beg for a space icon 1074 to send a message to the occupier of that space to request use.

While the interface in FIG. 50 includes four query parameter fields 1064, 1066, 1068 and 1070, in other embodiments less or more fields may be provided. While more fields may be provided, the idea here is to require the minimal number of fields to identify a reasonable number of available space options and therefore less fields are often better. Thus, while particularly useful interfaces include four or even three fields, in other embodiments it may be useful to have eight or less fields.

Figure 52:
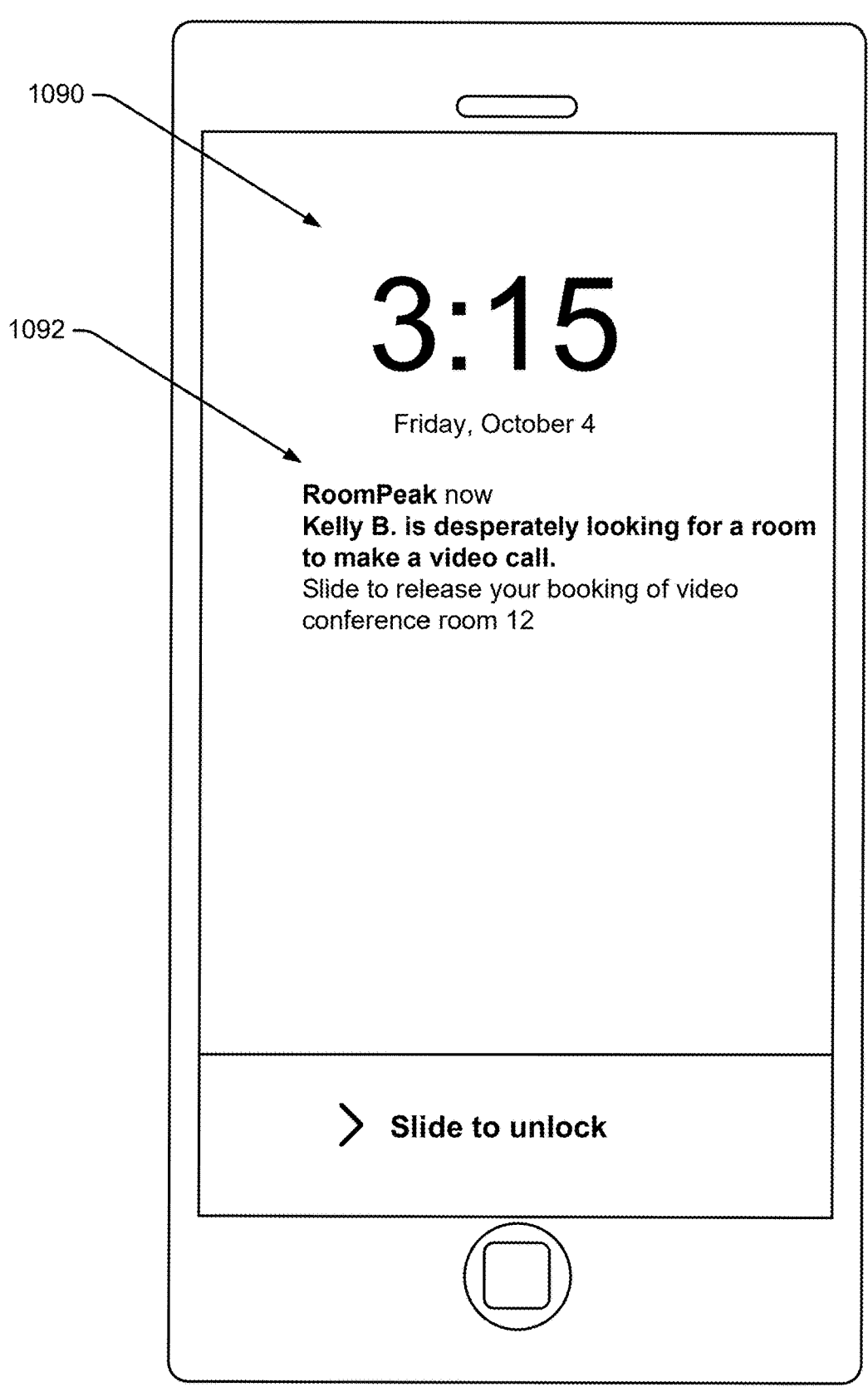
FIG. 52 shows a screen shot including a text message that is consistent with at least some notification aspects of the present disclosure.
Figure 53:
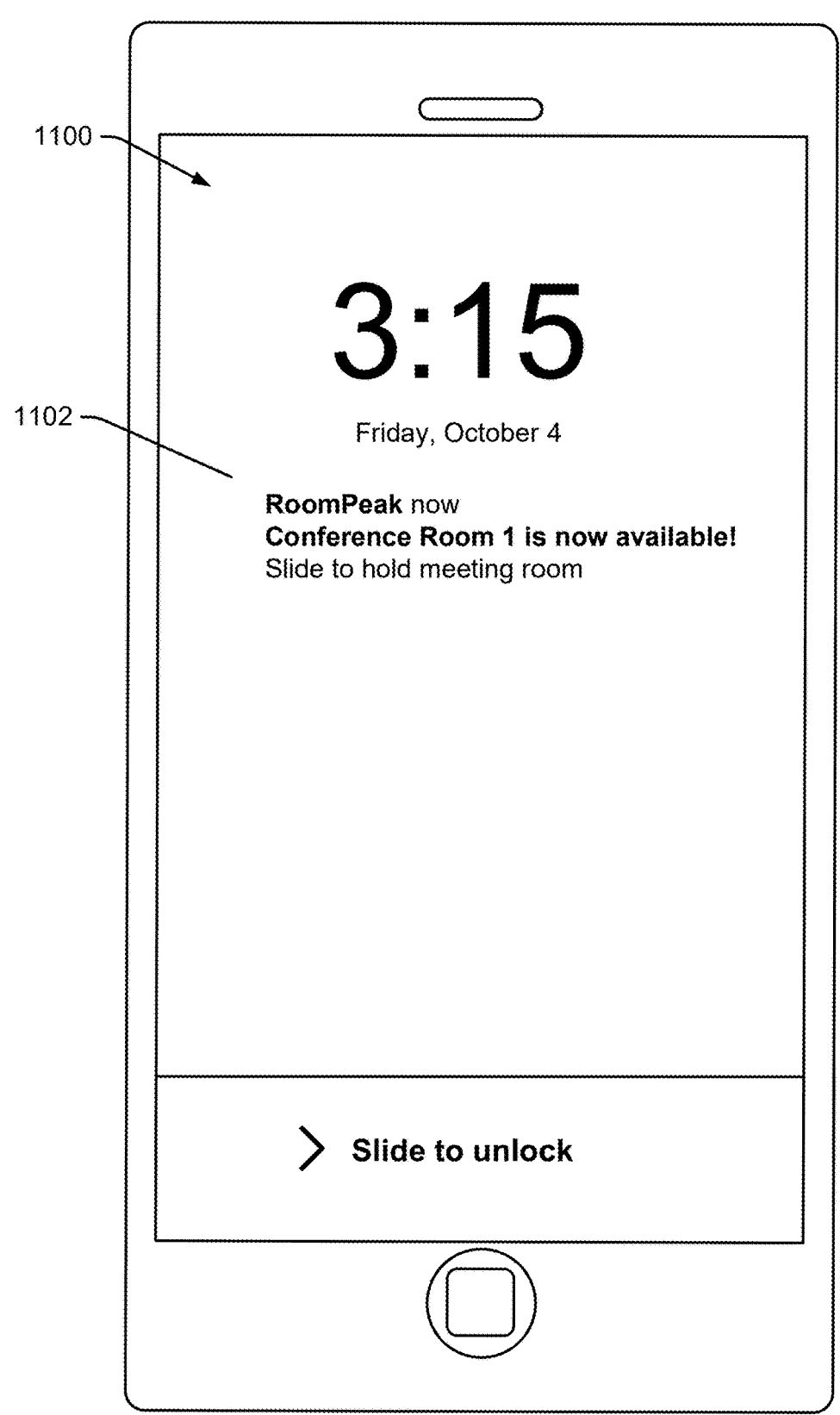
FIG. 53 is similar to the FIG. 52 illustration, albeit showing a different text message.

As described above, in at least some cases notifications related to tracked resources may be issued via communication applications that reside outside the corporate maps, compass and room peak applications that initiate the notices. For instance, see FIG. 52 that shows a screen shot 1090 including an exemplary text message 1092 that would be transmitted to and presented by a device used by an employee currently occupying a space that has video call capabilities when another employee (e.g., Kelly B) is begging for such a space. The text message indicates the need for the space and offers a simple way to release the space. As another instance see FIG. 53 where a screen shot 1100 includes a text message 1102 indicating that a conference room 1 is now available to a device 60 user that also includes instructions for holding the room. Text message 1102 would be generated by the room peak or perhaps corporate maps application and transmitted via an existing text message application.

Figure 54:
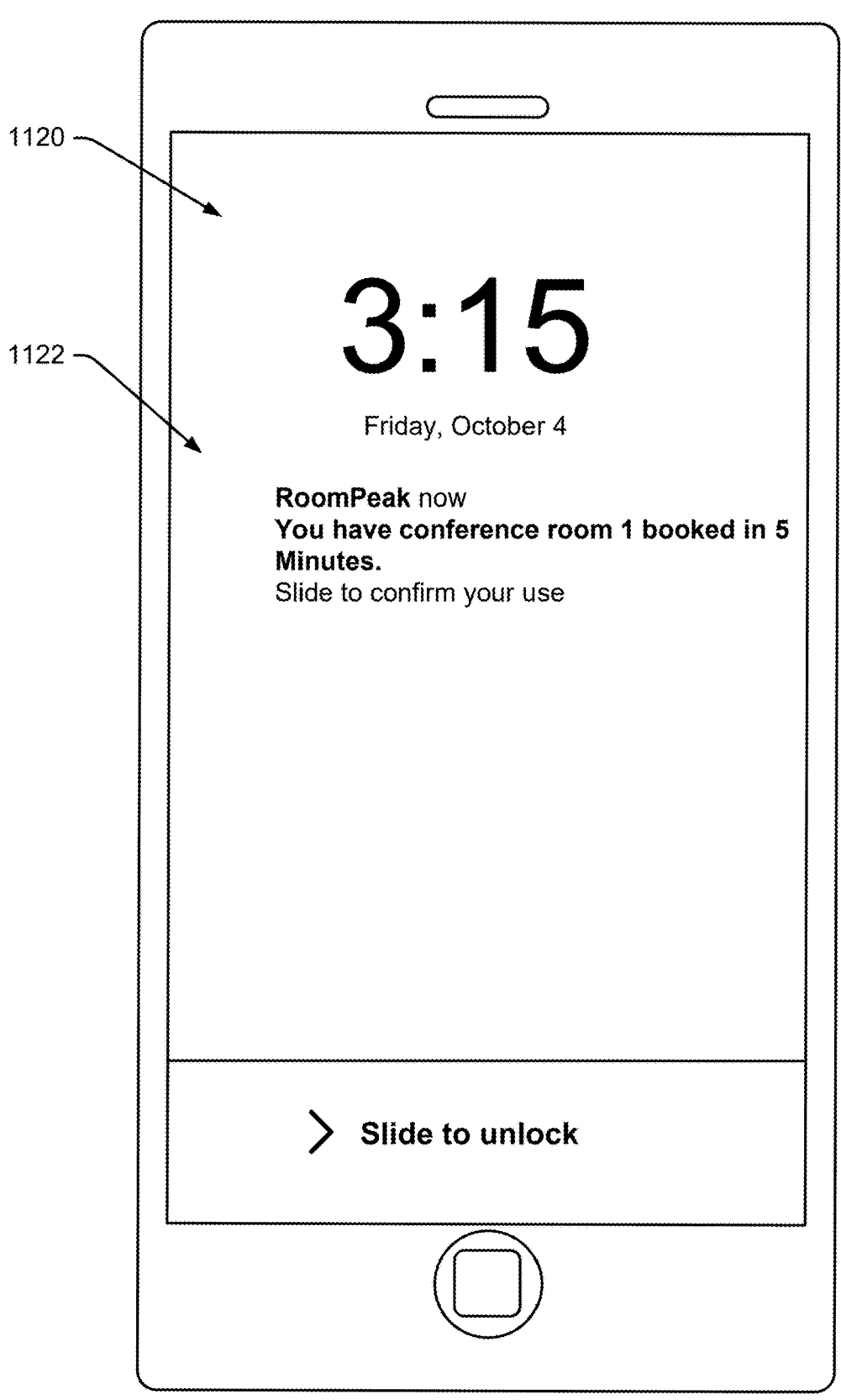
FIG. 54 is similar to the FIG. 52 illustration, albeit showing another text message.
Figure 55:
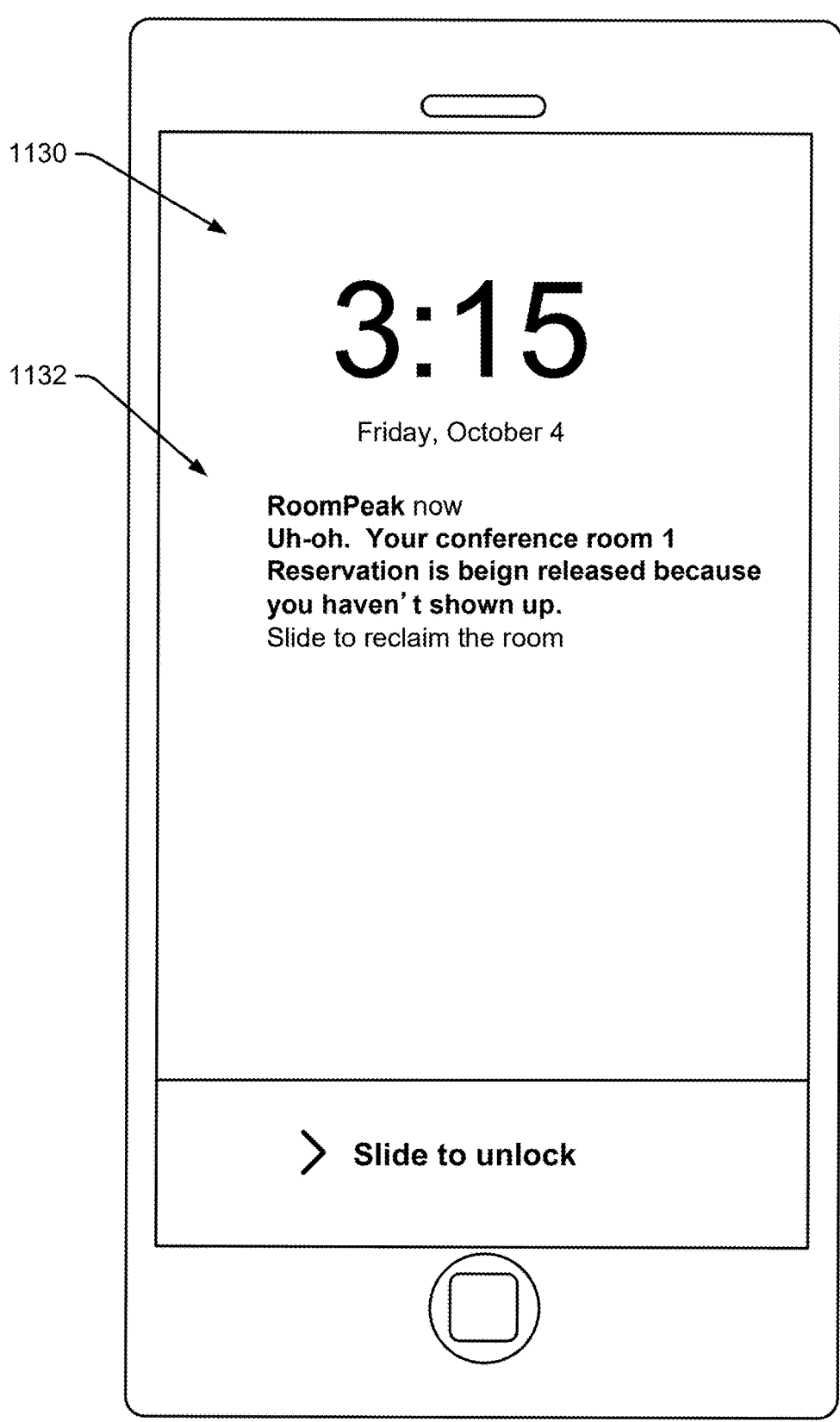
FIG. 55 is similar to the FIG. 52 illustration, albeit showing yet another text message.

In addition to supporting the concepts described above, the room peak or other applications may provide other functionality to manage resources. For instance, where an employee has booked a conference space for a specific time period but has not entered the booked space within some threshold period prior to the booked period, server 12 may generate screen shot 1120 in FIG. 54 including text message 1122 indicating that the employee has the space (e.g., conference room 1) booked in 5 minutes and may allow the employee to confirm a need to maintain the booking or to release the booking. As another instance, if an employee that has reserved a space has not entered the space within 10 minutes of the reserved time, server 12 may generate a screen shot 1130 as in FIG. 55 notifying the employee via text 1132 that the space is being released unless some affirmative step is performed to reclaim the space.

The rules for when to generate different text messages may be far more complex. For example, where an employee has not entered a booked space within 5 minutes prior to the booked time, if the employee is located proximate the booked space (e.g., in a hallway outside the space), server 12 may forego the text message shown in FIG. 54. If other employees that were invited to a meeting in a space are located in the space during a scheduled time even if the employee that booked the space is missing, the server 12 may forego the text message in FIG. 57. Similarly, if there are many non-booked spaces that are comparable to a space that is booked by a first employee that are in the general area of the booked space, the system may forego any notice to the bookee querying about intent to use the space or in an effort to free up the space as, in this case, it is highly unlikely that the booked space would be needed.

Other views of enterprise space availability and affordances are contemplated. For instance, see the screen shot 1200 in FIG. 56 that includes general space descriptors "private phone booth" 1202, "private video booth" 1204, "small meeting room" 1206, "meeting room w/video conference" 1208 and "large meeting room" 1210 in a top row and separate columns of space representations under each general space descriptor listing facility spaces that are consistent with the general space descriptors. For instance, under the "private phone booth" descriptor 1202, five phone booth type spaces are listed at 1212 through 1216. Similarly, for the "small meeting room" descriptor 1206, five spaces are labeled 1220 through 1224. Each space representation also includes a capacity indicator and a video capability indicator. To this end, see exemplary capacity indicator 1230 that indicates that two people can be supported in space 1220 and video indicator 1232 indicating that space 1220 has video capability.

Figure 56:
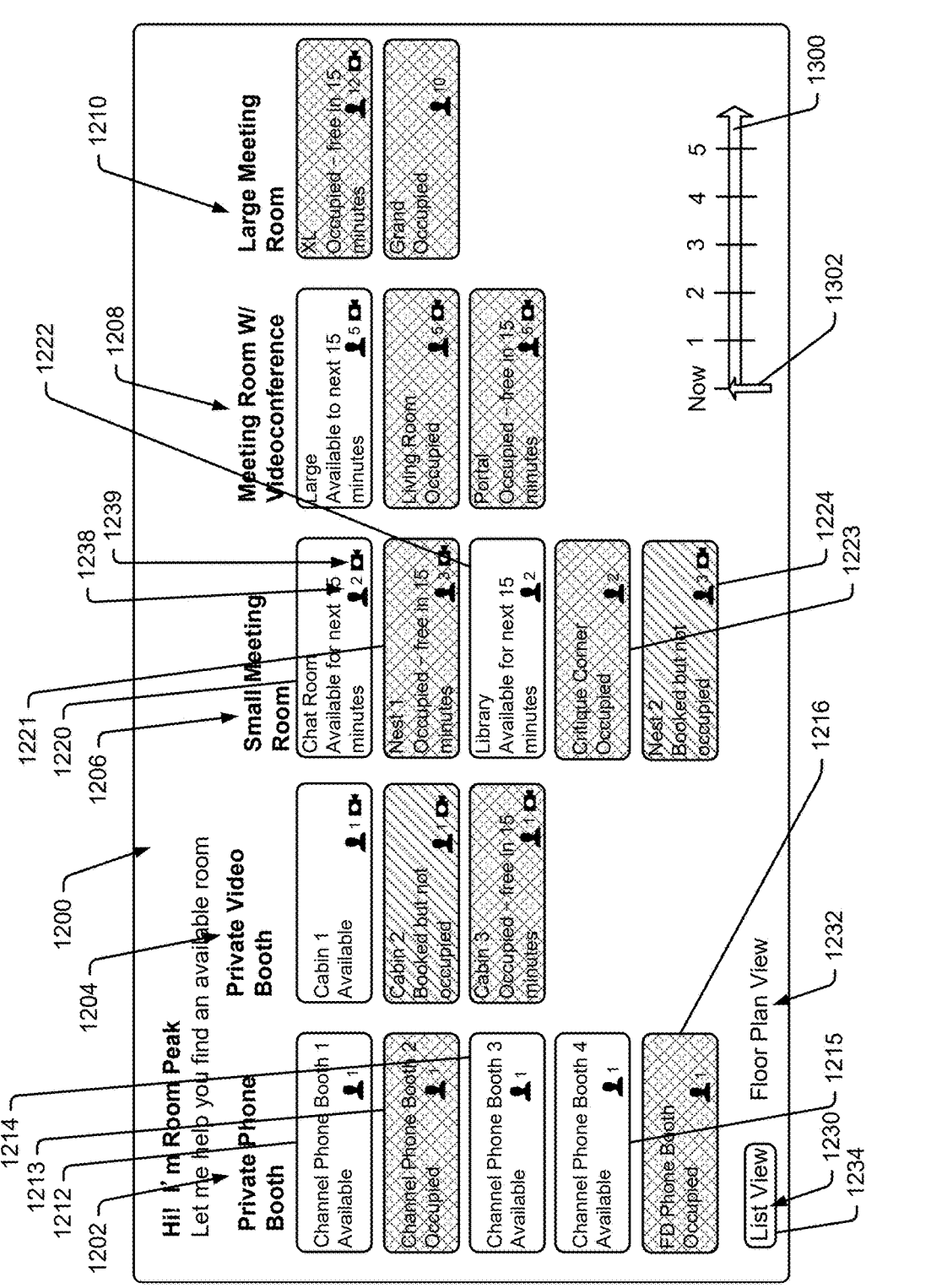
FIG. 56 is a schematic illustrating a device screen shot or interface representing facility space and indicating and status and affordances within each space.

Referring still to FIG. 56, each space representation also includes text indicating current status as occupied, available, etc. In addition, each representation is shaded or otherwise visually distinguished to indicate space status. For instance, all representations associated with occupied spaces are shown double-cross hatched to indicate red shading, all representations associated with booked but unoccupied spaces are shown cross-hatched to indicate yellow shading and all representations associated with available spaces are shown unfilled to indicate green shading. Thus, a device 60 user viewing screen shot 1200 can quickly identify general space types within a facility, can identify specific instances of each space type, can assess which spaces are available, occupied or booked and unoccupied and can assess space capacity and at least availability of video affordances within each space. If a space of interest is identified, the device 60 user can select the space representation to access additional information.

Again, while occupied and unoccupied spaces are all included in the FIG. 56 view, in other cases only available spaces or spaces that will become available shortly may be presented. While other views are contemplated, it is believed that showing the status of all spaces as in FIG. 56 may be advantageous as an employee can confirm statuses of all spaces and may avoid being confused if occupied spaces are off the lists. In some cases, available spaces may be presented at the top of each column followed by scheduled but unoccupied spaces, followed by soon to be available spaces and then occupied spaces. Where certain spaces are favorites of a device 60 user, those spaces may be presented above others generally or within their status grouping (e.g., favorite available spaces may be presented above non-favorite available spaces). In some cases, spaces may also be organized in the columns as a function of other parameters. For instance, other parameters may include duration of current status (e.g., spaces available longer may be above spaces available for shorter periods; spaces to be available relatively quickly may be above spaces to be occupied for shorter periods, etc.), capacity (e.g., spaces with video capability or some other affordance may be listed above spaces that do not have such capabilities).

Figure 57:
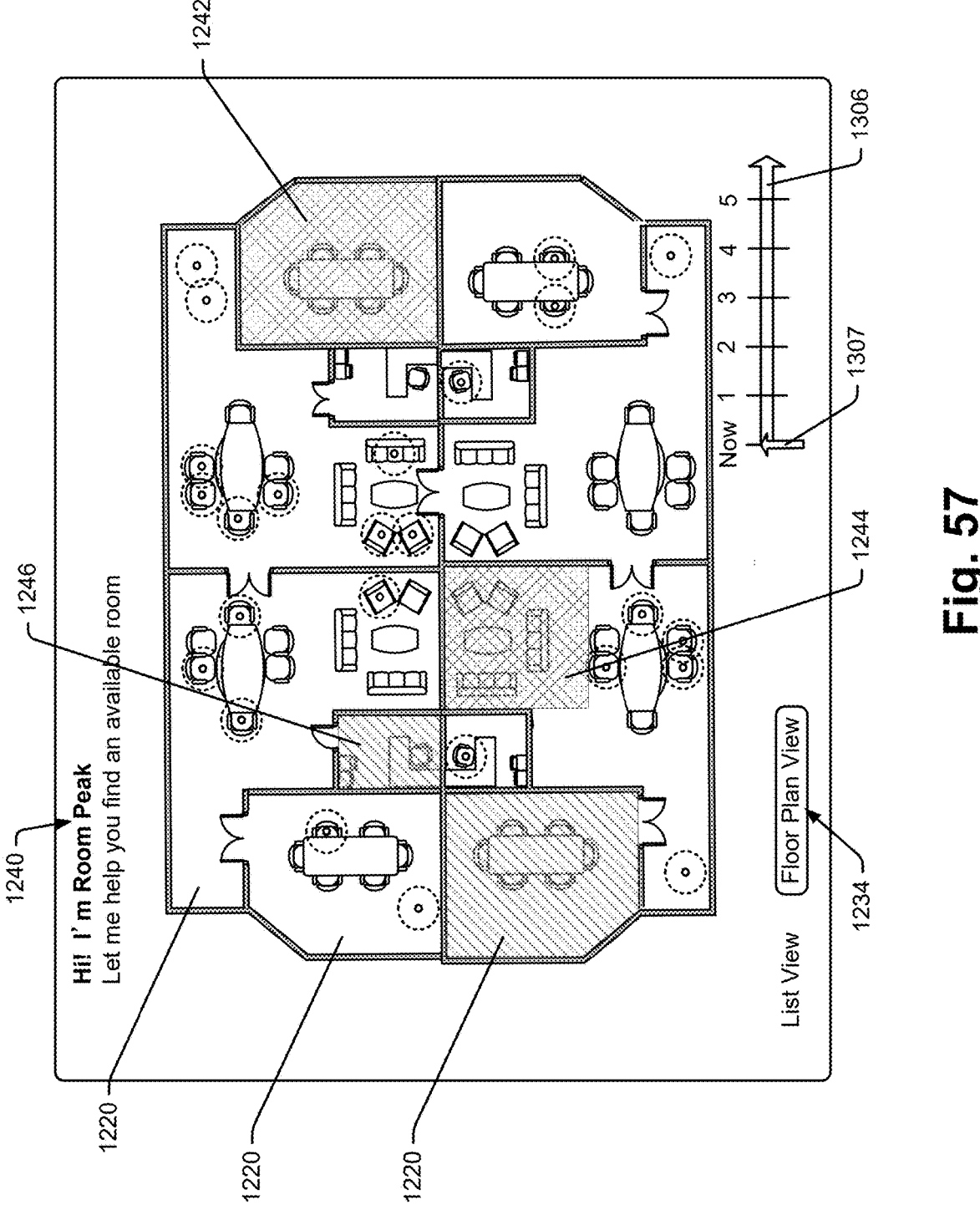
FIG. 57 is similar to FIG. 56, albeit showing similar information in a graphical floor plan view.

In FIG. 56, there are two view specifiers including a "list view" corresponding to the view shown in FIG. 56 and a floor plan view 1232. The two views are alternatives and can be selected by touch or some other interface to move a selection box 1234 from one to the other. When specifier 1232 is selected, device 60 may present screen shot 1240 as shown in FIG. 57. Screen shot 1240 shows a map or floor plan view showing facility space where the different spaces are shaded to indicate current status (e.g., available, occupied, booked but unoccupied, etc.). To this end, double-cross hatched spaces 1242 and 1244 indicate red shading associated with occupied space, single cross-hatched spaces 1246, 1248 indicate booked but unoccupied spaced that may be yellow and spaces 1250 and 1252 that are not filled indicate available spaces that may be green.

While the invention may be susceptible to various modifications and alternative forms, specific embodiments have been shown by way of example in the drawings and have been described in detail herein. However, it should be understood that the invention is not intended to be limited to the particular forms disclosed. For example, the collector subassembly 49 shown in FIGS. 6 and 7 may have other forms. For instance, in some cases the assembly may not include separate satellite units 50*a*, 50*b* and instead the base 52 may include collectors for obtaining data directly from devices 40. While this type of system may not work well in some environments, it may be sufficient in others (e.g., a small personal office) where devices 40 are relatively proximate bases 52.

As another example, while many of the views described above are current or real time views of resource statuses, other embodiments contemplated may enable system users to specify a temporal aspect to a view to obtain other useful resource status information. For example, see in FIG. 56 that a time line 1300 is provided that indicates a current time (e.g., now) at a left and a rolling time indicator to the right thereof. Here, a selected time is indicated by arrow 1302. Arrow 1302 (e.g., a time selection tool) can be moved along line 1300 to select a different time. The time indicated by arrow 1302 in FIG. 56 is a current time. When arrow 1302 is moved to a different time on the line 1300, the statuses of the spaces represented in screenshot 1200 would be modified to reflect scheduled statuses for the spaces. For instance, an occupied space that is available at a future time selected via line 1300 would be indicated as available. Here, in addition to changing the status indicators, where rules (e.g., available listed prior to occupied, etc.) govern the order in which spaces are represented in the columns, the orders of the columns would be reshuffled accordingly. Similar time selection controls 1306 and 1307 are provided in FIG. 57 where space shading in the image presented would be changed to reflect future use.

As another example, see FIG. 25 where the screen shot includes a time line 1310 like the timeline 1300 in FIG. 56 that can be used to select a subsequent time to view scheduled locations of other employees related to the scheduled location of a device 60 user. When selector 1312 is moved on line 1310 to select a different time, the information at 501 is altered to reflect scheduled locations of employees relative to the scheduled location of the device 60 user.

A temporal aspect may also be added to notifications in at least some embodiments. For instance, see FIG. 58 that is similar to the view shown in FIG. 34, albeit where the plain English notification specification 1390 includes a fourth parameter field 1400 for specifying a time associated with the notification. Here, it has been recognized that in at least some cases a first employee will want to know in advance when another employee will be in the vicinity of the first employee. For example, a first employee may want to know any time a second employee is scheduled to be within the vicinity of the first employee in the next hour, in the next twelve hours, etc., to give the first employee an opportunity to attempt to schedule a face-to-face meeting with the second employee.

Figure 58:
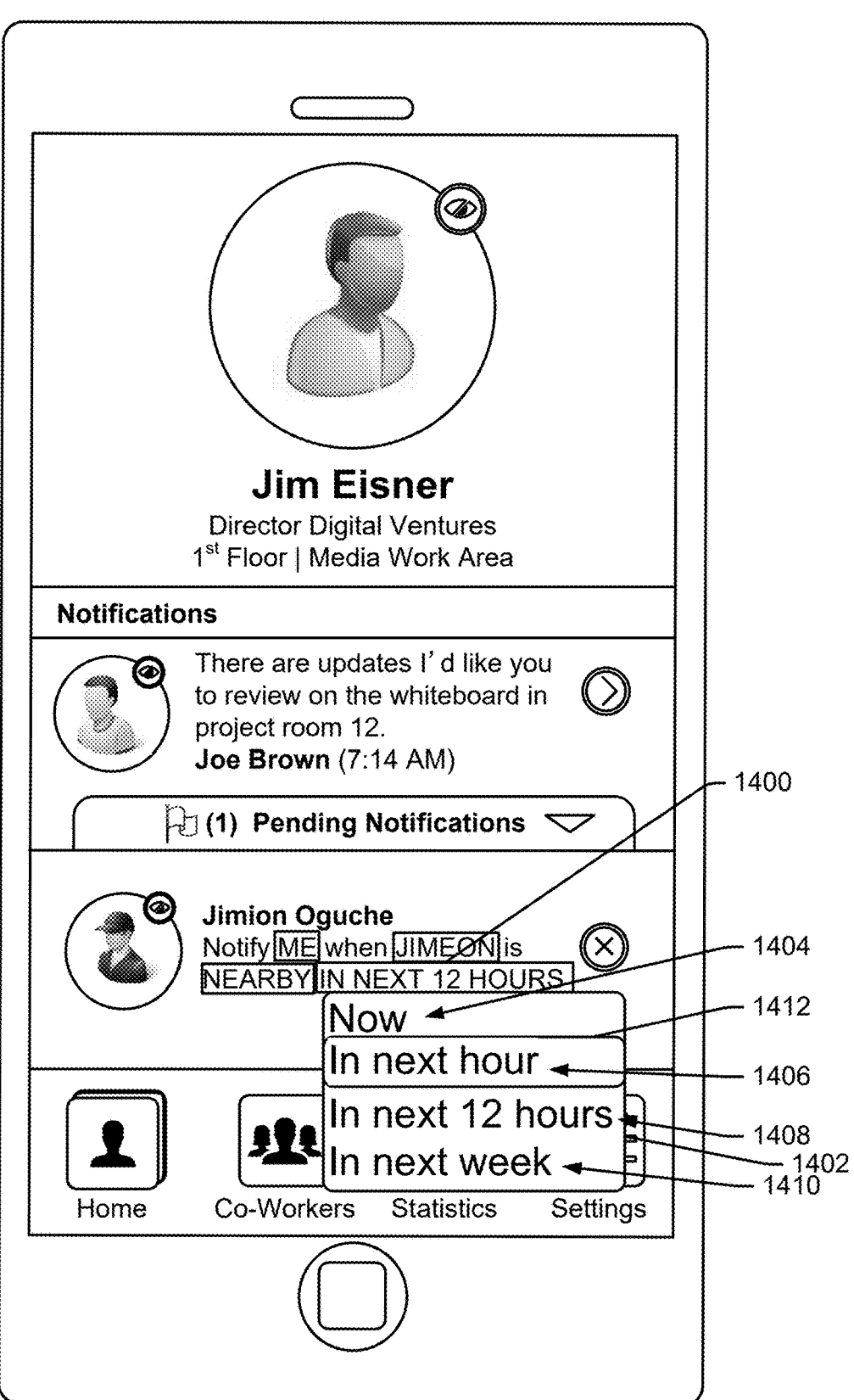
FIG. 58 is a schematic similar to FIG. 34, albeit including a fourth parameter setting field.

In FIG. 58, a pop-up window 1402 is shown that may be presented when parameter field 1400 is selected which includes a set of pre-canned period options including "now" 1404, "in the next hour" 1406, "in the next 12 hours" 1408 and "in the next week" 1410. A period selection box 1412 can be moved about to select one of the four options. Where, for instance, the "in the next 12 hours" option 1408 is selected, server 12 monitors schedules of both the device 60 user and the other employee whose location is being tracked during a following rolling 12 hour period and generates a notification (e.g., in a list as at 717 in FIG. 33, via a text or e-mail, etc.) when the schedules indicate that the two employees are generally in the same location (e.g., in the same facility).

As still one other example, when an employee adjusts privacy setting, server 12 may be programmed to indicate to that employee any notification that will be affected by the newly selected setting. In this regard, see again FIG. 44 where a selectable icon 973 reports the number of notifications affected by new settings. In FIG. 44 it is assumed toggle button 970 has been toggled and icon 973 reports that four notifications are affected by the change. Here "affected" may mean enabled or disabled. To obtain more information on the affected notifications the device 60 user can select icon 44. In still other embodiments it is contemplated that other data collector devices may be used in the above described system such as, for instance, space or room cameras (see 9 in FIG. 1) for collecting information useable to drive processes described above. For instance, a Kinnect camera as sold by Microsoft or other camera device 9 may be able to obtain images of a space useable to detect occupancy, number of persons in a space, locations and juxtapositions of affordances, etc., for driving resource locating, notifications and scheduling. Camera images may be used in conjunction with data collected by other devices. For instance, where signals from a portable device 60 received by an access point 38 cannot be used to distinguish if the device 60 is located in space 20*b* picks up an image of a single employee in space 20*b* and no employee is located in the images generated by camera 9 in FIG. 20*e*, server 12 may be programmed to recognize that the device 60 is located in space 20*b*. Here, in at least some cases, the locating algorithm may be modified as a function of feedback based on the camera images to better tune the location process. Other combinations of camera data and other sensed data are contemplated.

In at least come cases stationary or mounted display screens may be used to present resource information and interface tools to employees instead of or in addition to portable computing devices. For instance, a Room Wizard (TM Steelcase) as manufactured and sold by Steelcase Corporation, mounted outside a conference space may present resource availability information including information akin to any of the types of information described above as well as scheduling, notification and other parameter setting tools. In still other cases Room Wizard type devices may be presented at individual desks or work spaces within a larger open space. As another instance, larger Room Wizard type screens may be presented at entry locations to various spaces such as in front of an elevator to a floor, a doorway into a specific department, etc., to greet employees, present resource information (e.g., who is on premise, open and occupied or scheduled spaces, etc.).

Figure 59:
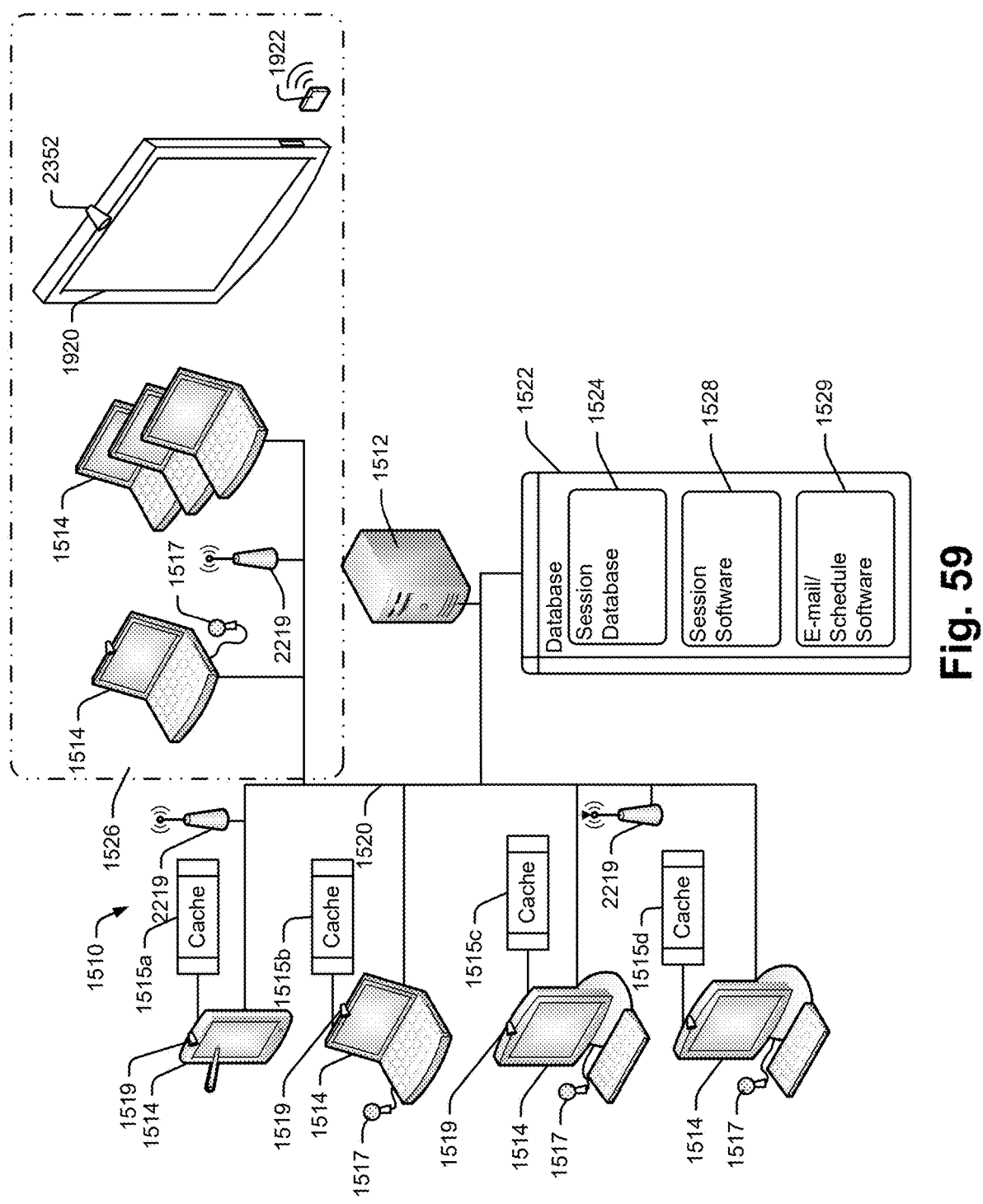
FIG. 59 is a schematic view of a communication system including components that may be used to perform various aspects of methods of the present disclosure.

Referring to FIG. 59, another aspect of the present disclosure will be described in the context of an exemplary system 1510 that includes a session server 1512, a database 1522 and a plurality of personal computing devices collectively identified by numeral 1514 that are linked together via the internet or some other communication network 1520. The server 1512 can be any type of computer server and may be located at the same location as any of the personal computing devices 1514 or at a location remote from all of the devices 1514. The server 1512 may include a single server or may include two or more servers that cooperate to perform various aspects of the present disclosure. Although not illustrated, server 1512 includes, among other things, one or more processors for carrying out methods and processes that are consistent with at least some aspects of the present disclosure. Server 1512 may be operated by an entity that employs the users of devices 1514 or may be operated by a third party provider or, where processes performed by server 1512 are performed by two or more servers, different entities may be responsible for performing different steps or sub-processes of the methods and processes described herein.

Figure 66:
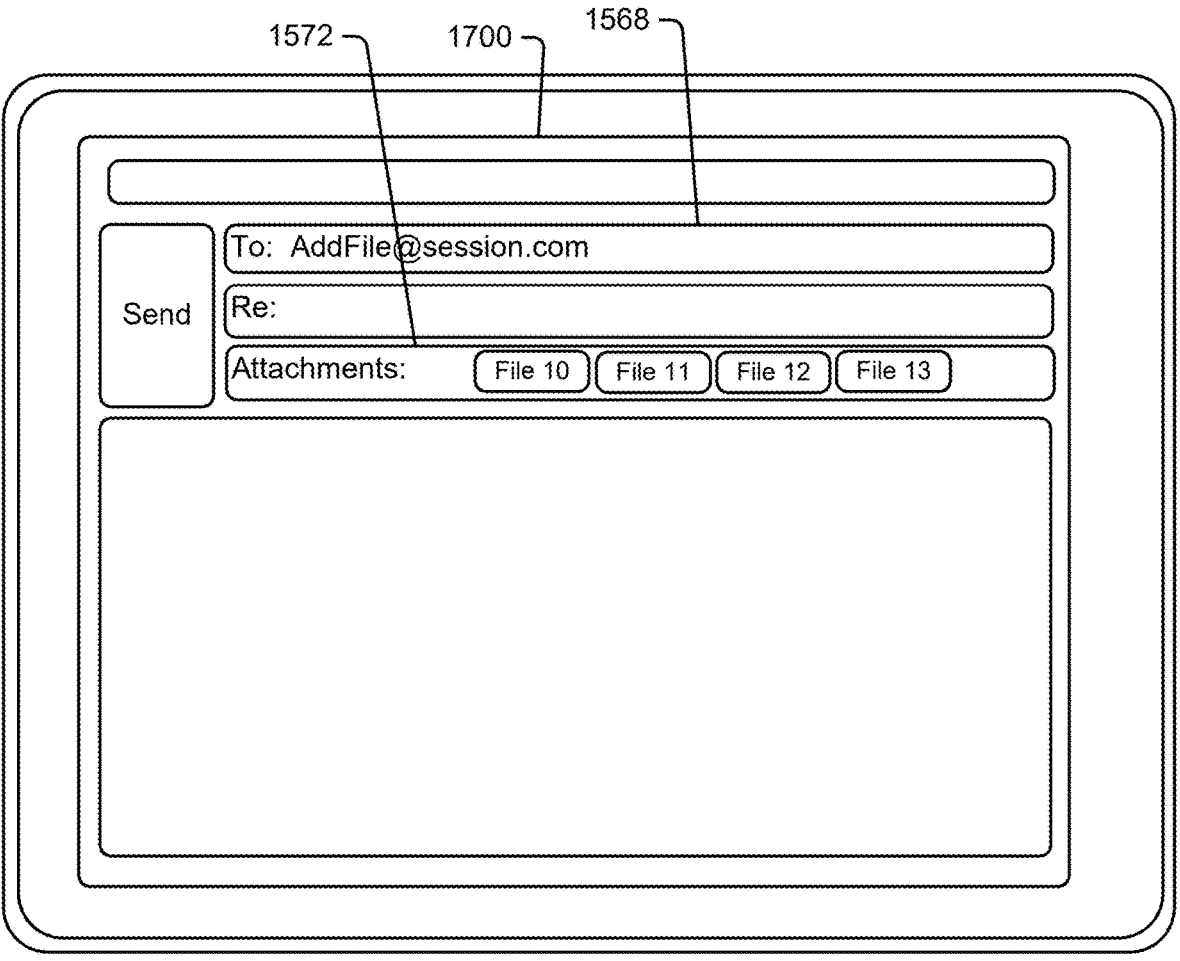
FIG. 66 is screen shot of an E-mail template to be used to add files to a session or conference queue.

While database 1522 is shown as a separate component in FIG. 59, it should be appreciated that database 1522 may be provided as part of one or more of the servers 1512. The database 1522 may either be at the location of the server 1512 or at a remote location in which case the database would be accessible via the network link 1520. As shown, database 1522 includes a session database 1524. An exemplary simplified session database 1524 is shown in FIG. 66 and is described in greater detail hereafter. In addition to the session database 1524, session software 1528 is stored on database 1522 that can be run to perform the disclosed methods and processes and E-mail/scheduling software 1529 is also stored on database 1522.

Unless indicated otherwise, hereafter it will be assumed that a single entity operates the E-mail and scheduling software 1529 and the session software 1528 and that each of the device 1514 users uses the E-mail and scheduling software 1529 to facilitate E-mail communications and to electronically calendar events, sessions, etc. Nevertheless, it should be appreciated that in at least some cases different device 1514 users may be associated with different entities and therefore different users may use different E-mail and personal calendaring software to facilitate communication and calendaring functionality described hereafter.

Referring still to FIG. 59, the computing devices 1514 may take any of several different forms including but not limited to personal or desktop computers, laptop computers, tablet type computers, smart phones, personal digital assistants, etc. In FIG. 59 several laptops 1514 are shown in a phantom box 1526 to indicate that those laptops are at a single location. For example, the location corresponding to box 1526 may correspond to a conference room within a facility owned by an employer of persons that use devices 1514. The devices 1514 in FIG. 59 that are located outside box 1526 are assumed to be remotely located from conference space 1526 and from each other.

According to one session scheduling function that is consistent with at least some aspects of the present disclosure, when server 1512 runs session software 1528, server 1512 can be used to schedule and manage conference sessions involving conferees at remote locations. More specifically, the session software 1528 can use E-mails from system users to schedule and manage conference sessions. To this end, at least one unique session domain name is assigned to server 1512 such that all E-mails addressed to the session domain name are received by server 1512. Different qualifiers (i.e., the portion of an E-mail address before the "@" sign) in received emails are used by server 1512 to initiate different session management functions. For instance, where the term "session" is the domain name, the qualifier "schedule" may be added to the domain to provide the address "schedule@session.com" where the server is programmed to recognize a request to schedule a new session whenever an E-mail addressed to the address "schedule@sesion.com" is received. As another example, whenever an E-mail addressed to "response@session.com" is received, server 1512 may be programmed to recognize a response to an invitation to participate in a session and may process the response accordingly. As still one other instance, whenever an Email addressed to "AddFile@session.com" is received, server 1512 may be programmed to recognize that files attached to the E-mail are to be added to an existing session queue and may process the response accordingly. As another instance, an Email to "startsession@session.com" may cause server 1512 to start an immediate session and E-mail to "join@session.com" may cause server 1512 to add a conferee to an ongoing session. Many other E-mail addresses may be associated with other session functionality.

Figure 60:
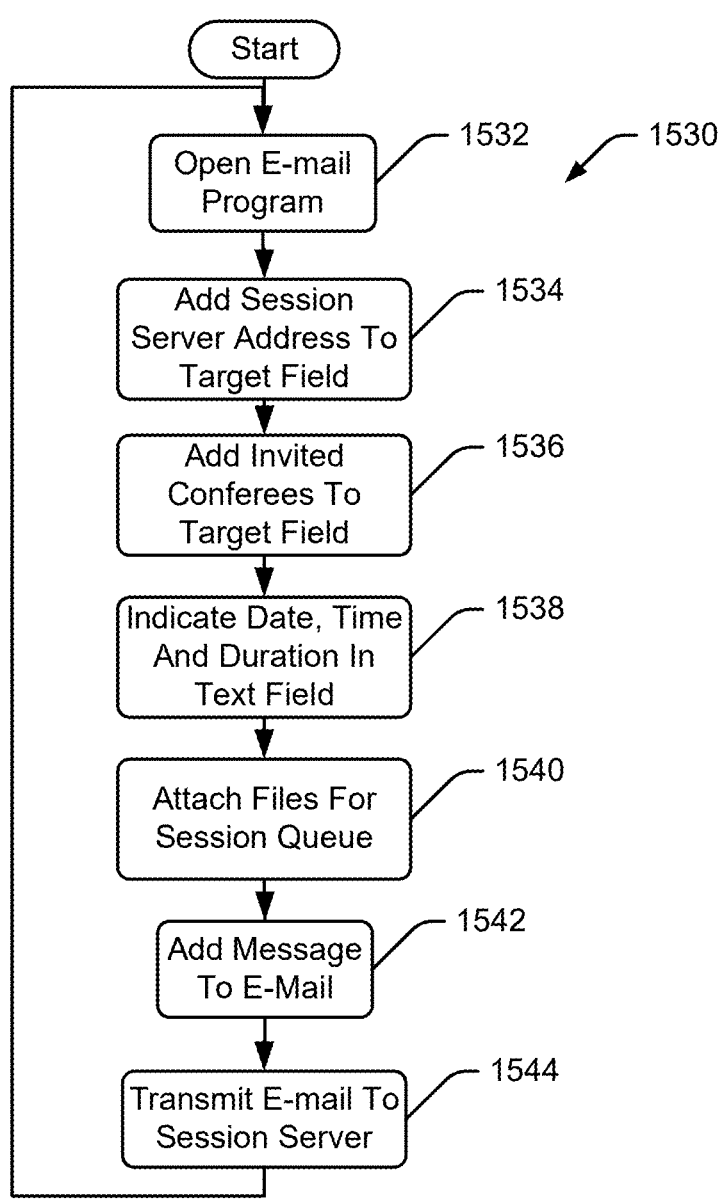
FIG. 60 is a flow chart illustrating a process that may be performed using a personal computing device to initiate a conferencing session among a plurality of conferees using an E-mail system that is consistent with at least some aspects of the present disclosure.
Figure 61:
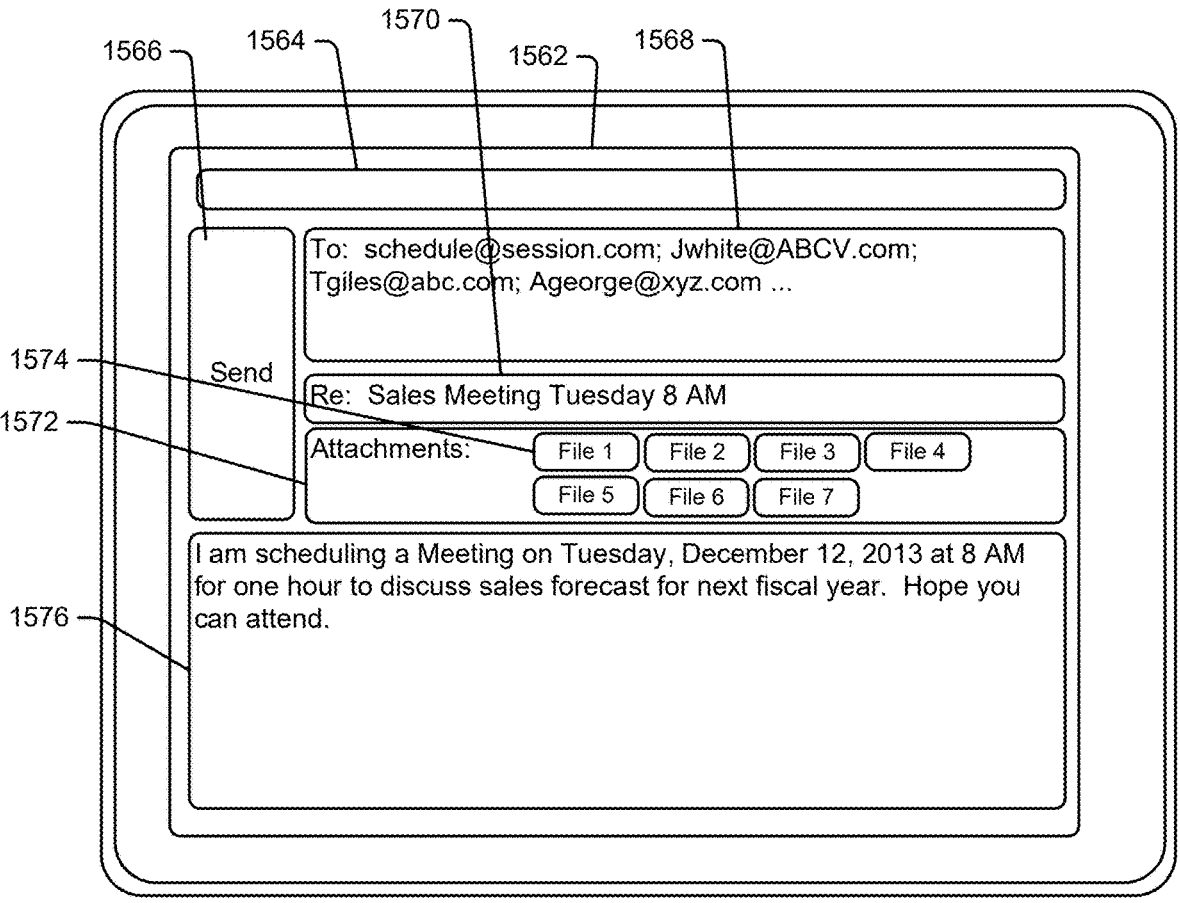
FIG. 61 is a screen shot that may be presented to a conference initiator via an E-mail system including some content that may be used to schedule a conferencing session.

Referring now to FIG. 60, a process 1530 for using an E-mail system to schedule a conferencing session that may be performed via any one of the personal computing devices 1514 shown in FIG. 59 is illustrated. At process block 1532, a device user opens an E-mail program and selects a "New" icon (not illustrated) via an E-mail menu in order to create a new E-mail message. Referring also to FIG. 61, when the "new" E-mail icon is selected, a new E-mail window 1562 is opened as in any conventional E-mail software application. As shown in FIG. 61, the new E-mail window 1562 includes standard E-mail fields including a tool bar field 1564, a "Send" field 1566, a "To" or target field 1568, a "Regarding" field 1570, an "Attachments" field 1572 and a message field 1576. Although the tool bar field 1564 is shown as blank, it should be appreciated that various selectable icons may be presented within field 1564 including a font selection icon, an address book icon, standard tools for attaching files, etc. The send icon 1566 can be selected to send an E-mail after other fields have been filled in.

The "To" field 1568 is used to indicate recipients of the E-mail message. As shown, one of the recipients listed in field 1568 is "schedule@session.com". Here, the domain portion of the address (e.g., session.com) corresponds to session server 1512 in FIG. 59 and the qualifier or mailbox portion "schedule" corresponds to session server scheduling functionality. In at least some embodiments the E-mail address feature can be used to select conferees to be added to an invite list for a session in the normal way that the address feature would be used to select recipients of an E-mail. The other recipients in field 1568 include other potential conferees that are being invited to the session corresponding to E-mail 1562. In FIG. 60, the step of addressing the Email to the session server schedule mailbox is shown at process block 1534. The step of addressing the E-mail to other invited conferees is shown at process block 1536.

At block 1538, the initiating conferee adds information to message field 1576 and other fields. In at least some embodiments it is contemplated that the initiating conferee may simply add conversational text to block 1576 that includes information required to schedule a conference session. Here, it is assumed that server 1512 would be able to parse the conversational text to glean information needed to schedule the session. The exemplary information in field 1576 in FIG. 61 indicates the date, time and duration of the session to be scheduled. Other descriptive information may be added to the "Regarding" field 1570 as shown. At block 1540, the initiating conferee attaches files to the E-mail using conventional E-mail file attachment tools from tool bar field 1564. In FIG. 61, seven exemplary files 1574 are shown attached in field 1572. The files 1574 maybe any type of digital content including documents, images, video clips, audio clips, spreadsheets, presentation documents, applications, etc.

Continuing, at block 1542, any additional information such as a more detailed message, an agenda for a session, etc., may be added to the E-mail in field 1576. After the initiating conferee is satisfied with the information entered into the Email fields in FIG. 61, at block 1544, the conferee selects "send" icon 1566 to transmit the E-mail to session server 1512.

Figure 62:
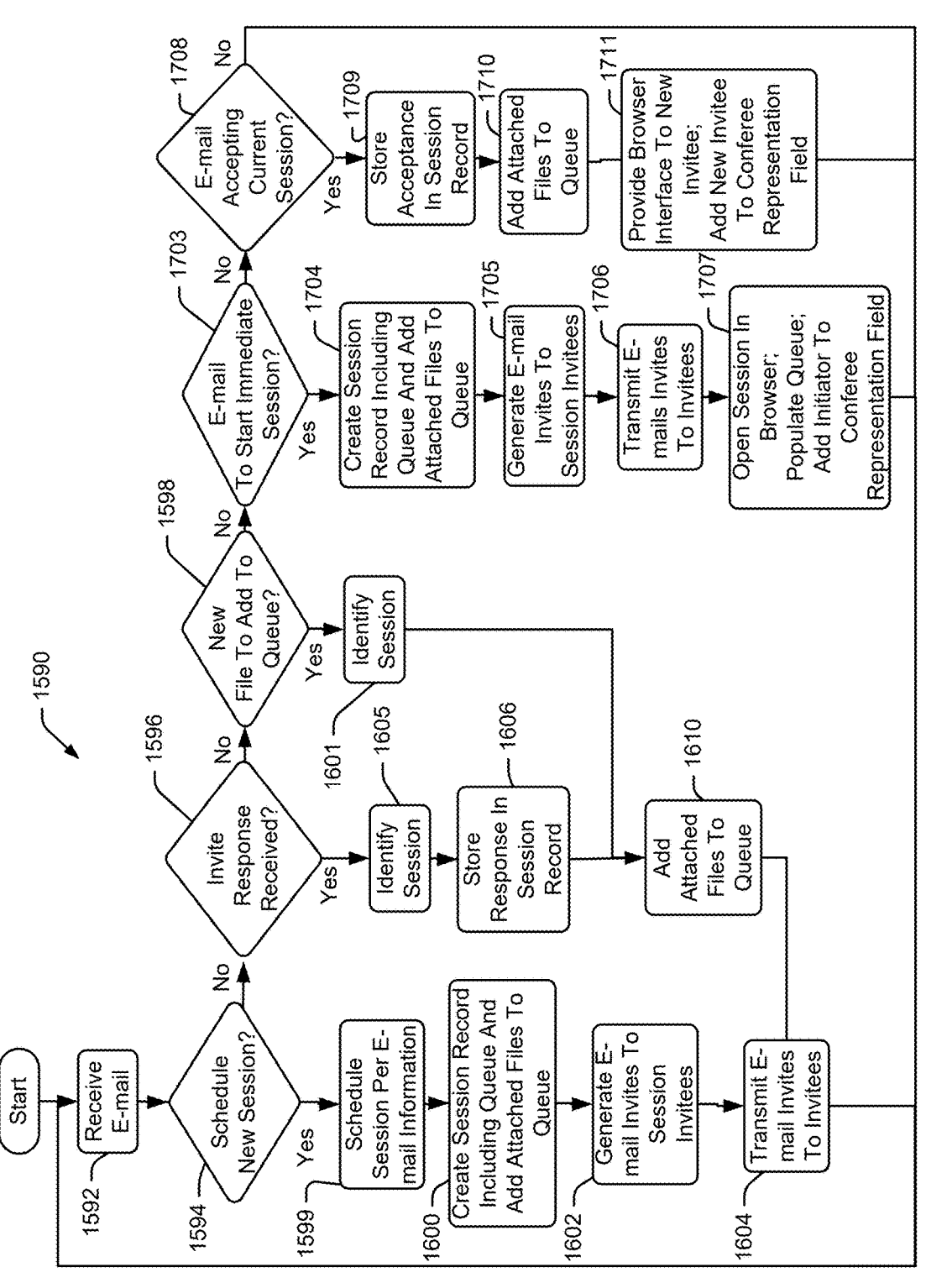
FIG. 62 is a flow chart illustrating a process that may be performed by a session server for facilitating various session management functions that is consistent with at least some aspects of the present disclosure.

Referring now to FIG. 62, a process 1590 that may be performed by server 1512 when any E-mail is received from one of the computing devices 1514 is shown. At block 1592, server 1512 receives an E-mail. At blocks 1594, 1596, 1598, 1703 and 1708 server 1512 identifies the address of the received E-mail and delivers the E-mail to an appropriate E-mail box associated with software for implementing various session functionality. At block 1594 where the mail is a request to schedule a new session (i.e., addressed to "schedule@session.com"), control passes down to block 1599. At block 1599, server 1512 schedules a new session per the E-mail information and at block 1600, server 1512 creates a session record for the new session.

Figure 65:
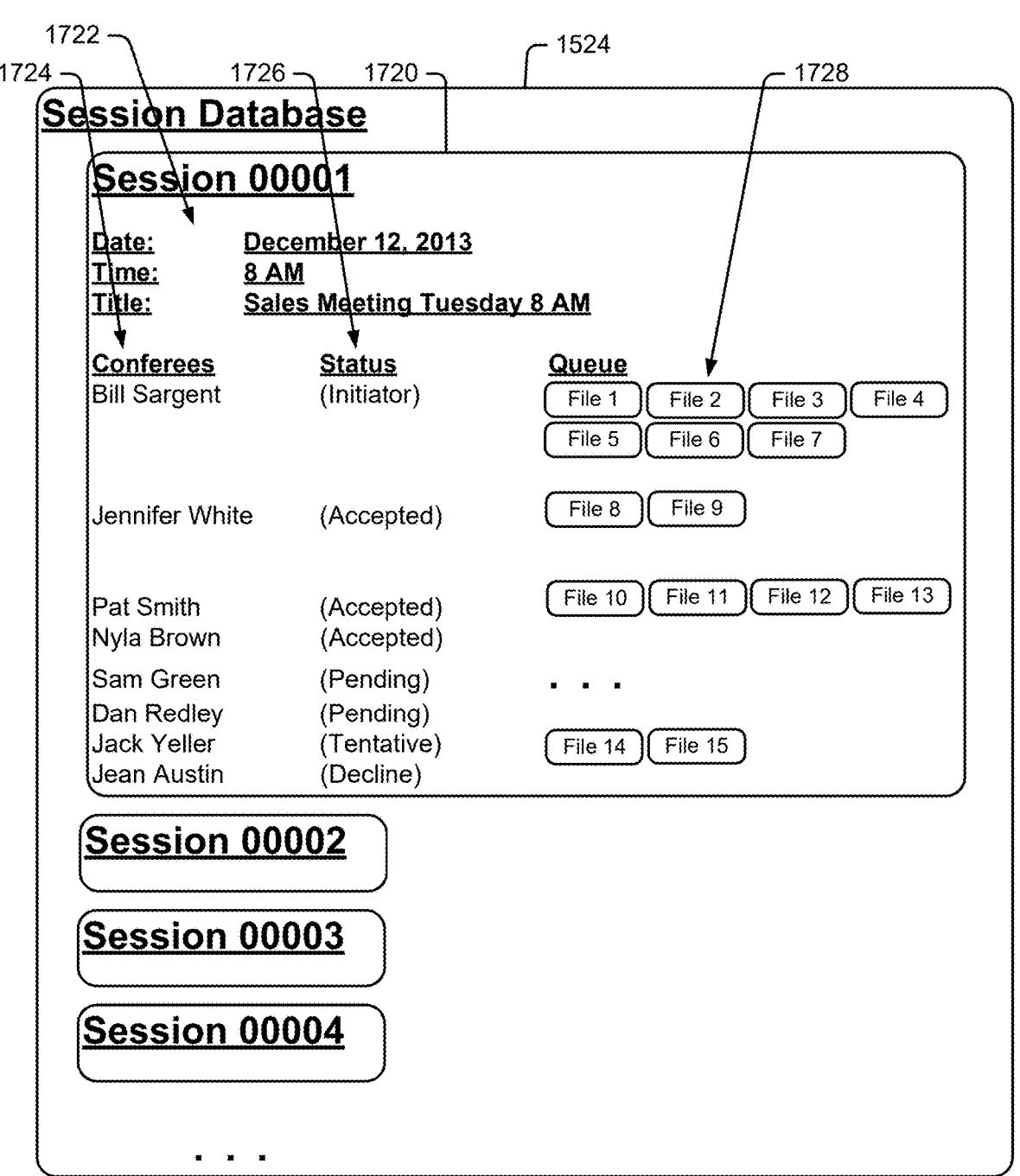
FIG. 65 is a schematic of an exemplary session database that is consistent with at least some aspects of the present disclosure.

Referring FIG. 65, an exemplary session database 1524 including a plurality of session records is illustrated. An exemplary first session record is identified by numeral 1720 and other session records are represented below record 1720. As shown, the exemplary session record 1720 includes date, time and session title fields collectively identified by numeral 1722 that specify the date, time and duration of the session associated with the record 1720. In addition, the exemplary record 1720 includes a list including the session initiator and conferees invited to the session at 1724 and status indicators (see 1726) for each of the conferees 1724 indicating a current "intent to attend" status. The exemplary current statuses include an "Initiator" status corresponding to the conferee that initiated the session, an "Accepted" status indicating conferees that were invited that have already accepted and scheduled the session, a "Pending" designation indicating conferees that have been invited but have yet to accept the invitation to participate in the session, a "Tentative" designation indicating invitees that have responded with a tentative response and a "Decline" designation indicating that an invitee declined an invitation to the session.

In addition to including conferee and status information, the session record 1720 also includes a session file queue 1728 which stores all of the files that have been added by either the initiator or one of the conferees to be shared during the session once the session commences. Consistent with the above example, the queue 1728 lists seven files corresponding to the session initiator. In addition, other files 8 through 15 are shown listed in the queue and associated with other conference invitees. Two of the other files, File 14 and File 15, have been added to the queue by one of the tentative conferees. In at least some cases even declining conferees may add files to the queue to be considered by others during a session.

In at least some cases server 1512 may arrange files in the queue based on the status indicators associated with conferees that added the files to the queue. For instance, files may be arranged with initiator files first, accepted conferees second, tentative conferees third and declined conferees last. Other factors may be used to arrange queue files. For instance, file types may be used to arrange files, conferee characteristics (e.g., titles) may be used to arrange files, file names may be used, combinations of factors may be used. In some cases conferees may be able to designate the order of files in the queue.

Other information may be stored in the session record 1720 such as messages received from conferees in E-mails corresponding to the session, an agenda if provided by the initiator or some other conferee that was invited, etc. Although other session records are shown in simplified form in FIG. 65, it should be appreciated that each of the other session records would include information similar to that described above with respect to record 1720.

Figure 64:
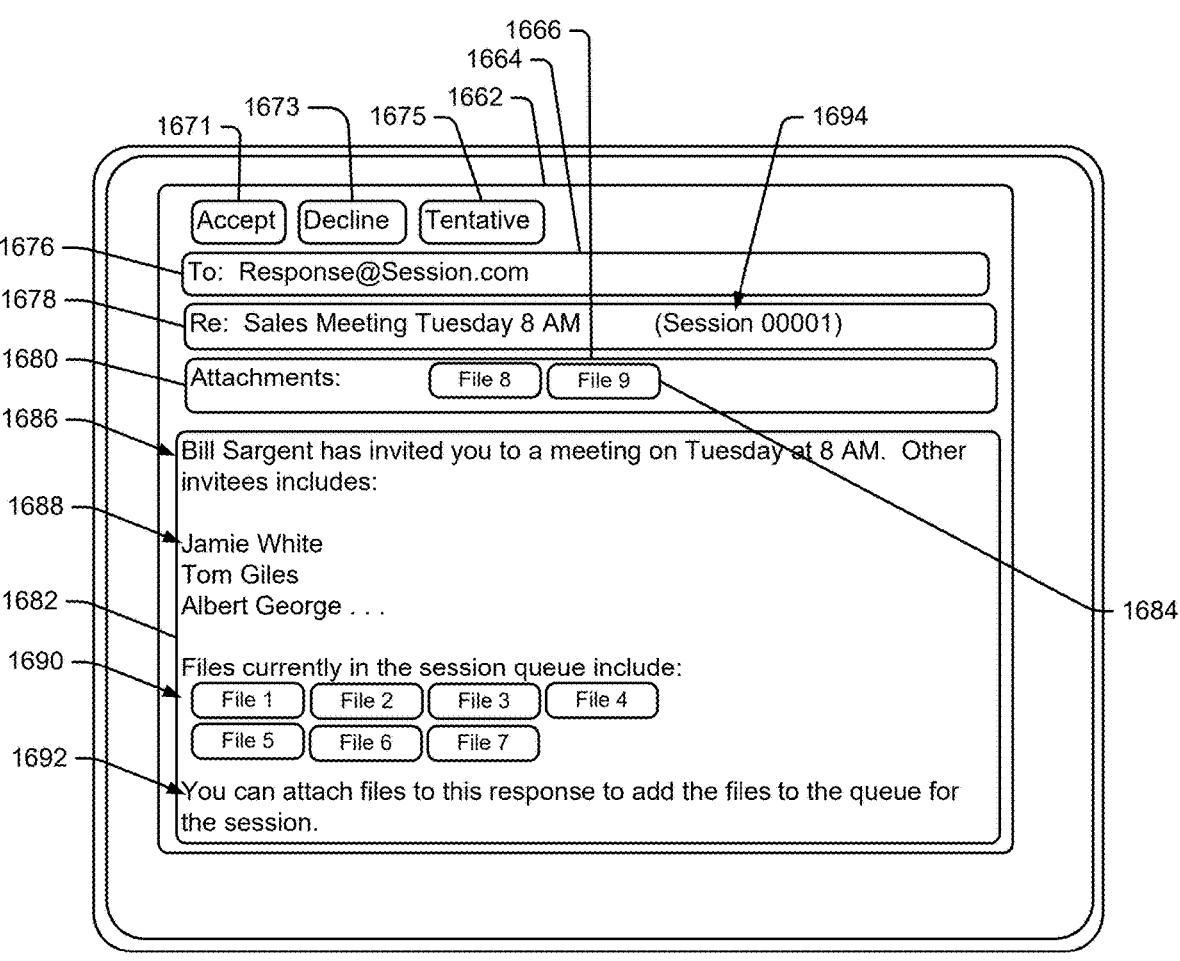
FIG. 64 is a screen shot of an invite E-mail template that may be presented to a conference invitee according to at least some aspects of the present disclosure.

Referring once again to FIGS. 59 and 62, after the session record has been created at block 1600 or simultaneously therewith, server 1512 generates and transmits invite E-mails to each of the session invitees listed in the session record. An exemplary invite E-mail that may be constructed by server 1512 using information gleaned from the initiating E-mail is shown in FIG. 64 and is described in greater detail below. At block 1604, server 1512 transmits the invite E-mails to the invitees after which control passes back up to block 1592 as shown.

Although not shown, when a conferee initiates scheduling a conference as described above, in addition to scheduling a session in the session database 1524, the session software may also interact with scheduling or electronic calendaring software used by the initiating conferee to maintain a personal schedule. For instance, when a session is scheduled, server 1512 may transmit a meeting or session notice to the server maintaining the initiating conferee's E-mail system requesting that a session be added to the conferee's personal schedule. Similarly, when an invited conferee accepts or tentatively accepts an invitation to participate in a session as described hereafter, server 1512 may transmit a meeting or session notice to the server maintaining the Email system used by the invited conferee requesting that the session be added to the conferee's personal schedule. In the present case it is assumed that server 1512 operates all E-mail and scheduling software for all potential conferees (see FIG. 59) and therefore session scheduling on personal calendars can be completed by server 1512 itself.

Figure 63:
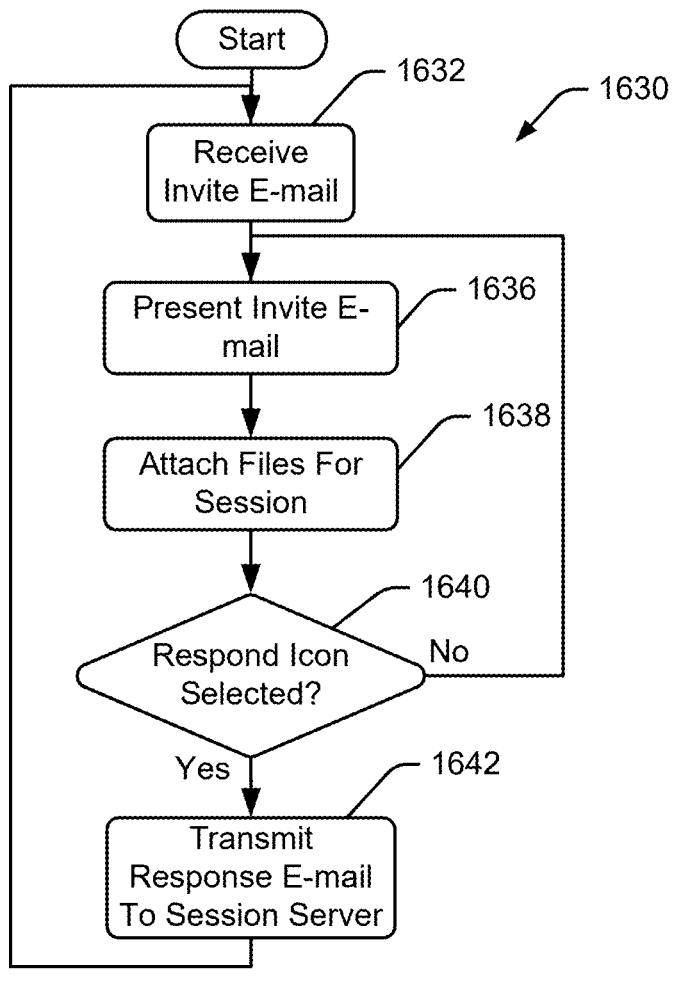
FIG. 63 is a flow chart illustrating a process that may be performed via an invitee computing device that is consistent with at least some aspects of the present disclosure.

Referring still to FIG. 59 and now also to FIG. 63, a process 1630 for handling a session invite E-mail that may be performed by a session invitee's computing device 1514 is illustrated. At block 1632, the invitee's device 1514 receives an invite E-mail from server 1512 and, at block 1636, presents the invite E-mail in an E-mail window on the invitee's device 1514. Referring also to FIG. 64, the exemplary invite E-mail 1662 includes "Accept", "Decline" and "Tentative" icons 1671, 1673 and 1675, respectively, a "To" or target field 1676, a "Regarding" field 1678, an "Attachments" field 1680 and a "Message" field 1682. As in conventional scheduling and E-mail systems, the Accept, Decline and Tentative icons 1671, 1673 and 1675 can be selected to indicate a desire to accept a scheduled session, decline a scheduled session or tentatively accept a scheduled session. The target field 1676 is automatically filled in with a mailbox address corresponding to session server 1512 and more specifically corresponding to functionality to be performed when an invitee responds to a session invite. To this end, the exemplary address in target field 1676 includes "response@sesion.com". The "Regarding" field 1678 provides a title for the session which, in most cases, will simply include the identifier provided by the conference initiator "Regarding" field 1570 as shown in FIG. 61.

Referring still to FIG. 59 and FIG. 64, the "Attachments" field would initially be blank when a conference invitee opens the invite E-mail. In at least some embodiments, at block 1638, files can be added by the invitee to the "Attachments" field 1680 to add those files to the session queue for subsequent access during a session. In FIG. 64, two exemplary files, "File 8" and "File 9", are shown attached in field 1680.

Message field 1682 includes a message composed by session server 1512 inviting the invitee to join the conference session that has been scheduled. To this end, the composed message indicates the identity of the session initiator as well as the day and time at which the session is to take place at 1686. In addition, the composed message indicates the names of conferees invited to the session at 1688 which can be gleaned from the E-mail addresses of the invitees received in the initiating E-mail by the server 1512. The message field 1682 may also include icons corresponding to each one of the files currently in the system queue at 1690. The exemplary files at 1690 include files 1 through 7.

Here, it is contemplated that any one or a subset of the file icons at 1690 may be selected for accessing those files to gain additional information about what is to be presented or discussed at the scheduled session. The message field 1682 also includes an invitation at 1692 and instructions to the invitee for adding additional files to the attachment field 1680 that can be added to the queue. In at least some cases a session identifier may also be included in the invite E-mail. For instance, in FIG. 64, numeral 1694 indicates a session identifier "Session 00001" at the end of the "Regarding" field. Other identifiers may be provided in other fields or may simply be associated with but not presented as part of the invite E-mail.

Referring still to FIG. 64 and again to FIG. 63, if any of the response icons (e.g., accept, tentative, decline) is selected at block 1640, control passes down to block 1642 where the response E-mail is transmitted to server 1512.

Referring again to FIG. 62, where an invitation response is received by server 1512, control passes through blocks 1592, 1594 and 1596 to block 1605 where server 1512 uses the session identifier (see 1694 in FIG. 64) to identify the session associated with the response. At block 1606, server 1512 uses the response to update the session record 1720 shown in FIG. 65 by changing the status indictor in column 1726 for the respondent. Files from the response E-mail are added to the session record queue to block 1610 after which control passes back up to block 1592.

After a session is scheduled and prior to commencement, any conferee may be able to add files to the session queue at any time, even after accepting a session. To this end, see FIG. 66 that shows an exemplary E-mail template 1700 that may be used to add files to a queue. E-mail template 1700 is essentially identical to the conventional or standard E-mail format shown in FIG. 61 including a tool bar, a target field 1568, a "Regarding" field, an "Attachment" field, a message field and a "Send" icon. Here, the "AddFile@session.com" address has been entered into target field 1568 and four files have been attached to "Attachments" field 1570.

Referring again to FIG. 62, when an add file E-mail as in FIG. 66 is received, server 1512 control passes through block 1596 to block 1598 and on to block 1601. At block 1601 server 1512 attempts to identify which session the files attached to the E-mail are related to. To this end, a conferee sending files to attach to an already scheduled session, while knowing that she is scheduled for a session, may have no way of independently distinguishing the session from other sessions. In some cases a conferee may be scheduled to participate in multiple sessions further complicating the task of identifying which session queue files should be added to.

Where a conferee adding files to a queue is only associated with one scheduled session, server 1512 may be programmed to use conferee identification information from the received E-mail to identify the session at block 1601. In some cases, server 1512 may simply move on to block 1610 once a single session is identified. In other cases, server 1512 may generate and transmit a confirmation E-mail to the conferee that sent the add file E-mail to confirm the conferees intent to add the files to the identified session queue. Where server 1512 identifies two or more sessions that the conferee is scheduled to participate in, server 1512 may generate and transmit a query E-mail asking the conferee to select one of the plurality of sessions to which the files should be queue for. Referring still to FIG. 62, at block 1610, files attached to the received E-mail are added to an appropriate queue.

While not shown, a process similar to that described above may be supported for using an E-mail system to remove files from a session queue. For instance, another E-mail address associated with server 1512 may be "RemoveFile@session.com". In response to this type of E-mail, server 1512 may identify a session associated with the conferee and provide an E-mail including attached files previously added to the session by the conferee where files can be removed by detaching those files from the E-mail and re-sending the E-mail to server 1512 to update the queue.

In some embodiments it is contemplated that a session initiator may want to immediately start a conferencing session instead of scheduling a session for a future time period. To immediately start a conferencing session, a process similar to that described above with respect to scheduling a session may be performed. The primary differences between starting an immediate session and scheduling a session would be that, to start an immediate session, an E-mail would be transmitted to a different server mailbox, such as, for instance, "startsession@session.com" and the initiator would not have to provide information describing the session start time or date. Referring again to FIG. 62, at block 1598 if the received E-mail is an immediate start session E-mail, control may pass to block 1703 and then to process block 1704. At block 1704, server 1512 creates a new session record (see again FIG. 65) and instantiates a queue by adding files attached to the E-mail to the queue. At block 1705, server 1512 generates invite emails to invitees listed in the target field of the session initiating E-mail which are transmitted at block 1706. At block 1707, server 1512 opens a session in a browser screen on the initiator's computing device 1514, uses queue files from the session record to populate a file queue in the browser and adds the initiator to a conferee representation field in the browser after which control passes back to block 1592.

If an invitee accepts an immediate session via an invite E-mail, referring still to FIG. 62, when the response E-mail is received, control passes to block 1708 and on to block 1709. At block 1709, server 1512 updates the session record to reflect acceptance. At block 1710 server 1512 adds any files attached to the response E-mail to the queue. At block 1711 server 1512 provides a browser interface to the invitee that accepted the invite and then control passes back up to block 1592 in FIG. 62.

In at least some embodiments an immediate session invite E-mail may include a simple selectable icon or the like enabling a conferee join an ongoing session with selection of a single icon. To this end, see exemplary invite E-mail template 1712 in FIG. 67 that includes "Join now", "Join in 10 minutes", and "Decline" icons 1713, 1715 and 1714, respectively, an "Attachments" field 1717, a "Regarding" field 1716 and a message field 1718. Server 1512 generates the invite message in field 1718 automatically. Server 1512 also automatically generates the text in field 1716 indicating the nature of the session. Files can be attached in field 1717 to add to the queue. The invitee can immediately join the session and open a browser interface by selecting icon 1713. The invitee can decline the invite by selecting icon 1715. The invitee can indicate a desire to join the session in 10 minutes by selecting icon 1714. If icon 1714 is selected, an automatic message would be sent to all conferees already linked to the session notifying them that the one conferee will be delayed.

In at least some embodiments it is contemplated that the information included in an E-mail to the session server to initiate (e.g., schedule or start) a new conference session may not include all of the information required to initiate the session. For example, a plain English E-mail composed by a conference initiator to initiate a session may not indicate the date on which the session is to be scheduled or may not indicate conference invitees for the session. In fact, in at least some cases it is contemplated that the process of initiating a session may be started by simply sending a start or schedule E-mail to session server 1512 without adding any information to other E-mail fields.

Where insufficient information for initiating a session is received within an E-mail, in at least some cases, session server 1512 will be programmed to request missing information from the initiating conferee. To this end, a sub-process 1730 that may be substituted for a portion of the process shown in FIG. 62 for obtaining additional required information for initiating a session from an initiating conferee is illustrated in FIG. 68.

Figure 68:
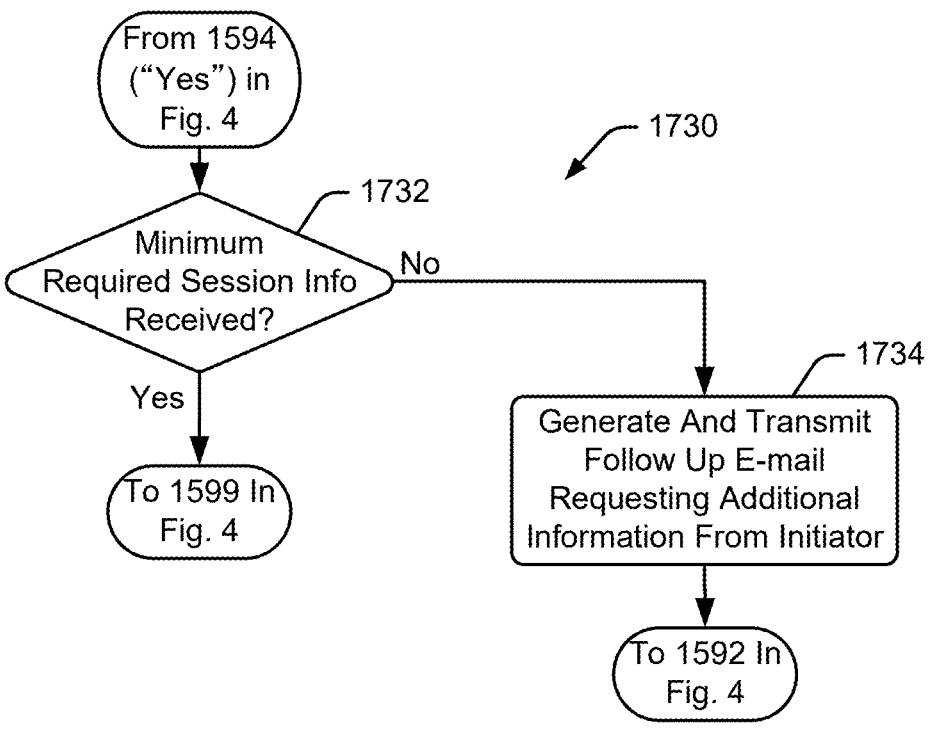
FIG. 68 is a flow chart illustrating a sub-process that may be substituted for a portion of the process of FIG. 62.

Referring to FIGS. 59, 62 and 68, after server 1512 determines that a received E-mail is related to a new and unscheduled session, control passes to block 1732 in FIG. 68. At decision block 1732, server 1512 determines whether or not the minimum required session information for scheduling a session is included in the received E-mail. Where the minimum required session information is included in the Email, control passes to block 1599 in FIG. 62 where the process described above continues.

At block 1732, if the minimum required session information has not been received, control passes to process block 1734 where server 1512 generates and transmits a follow-up E-mail to the initiating conferee requesting additional information. Although not shown, the follow-up E-mail may include a precanned reply E-mail with specific fields for entering required information. For instance, where an initiating conferee failed to indicate the date on which a session should be scheduled, the precanned reply E-mail may include a field labeled "date" that includes space for entering the session date. As another example, where the initiating E-mail failed to identify at least one other conference invitee, the reply E-mail may include a field labeled "invitees" and space for entering E-mail or other identifier information for invited conferees. After block 1734, control passes back up to block 1592 in FIG. 62 where the server waits to receive another E-mail message and the process described above is repeated. Although not shown, a sub process similar to the sub process shown in FIG. 68 may also be performed whenever an E-mail to start an immediate session is received where the E-mail does not include all information to start the session.

Figure 69:
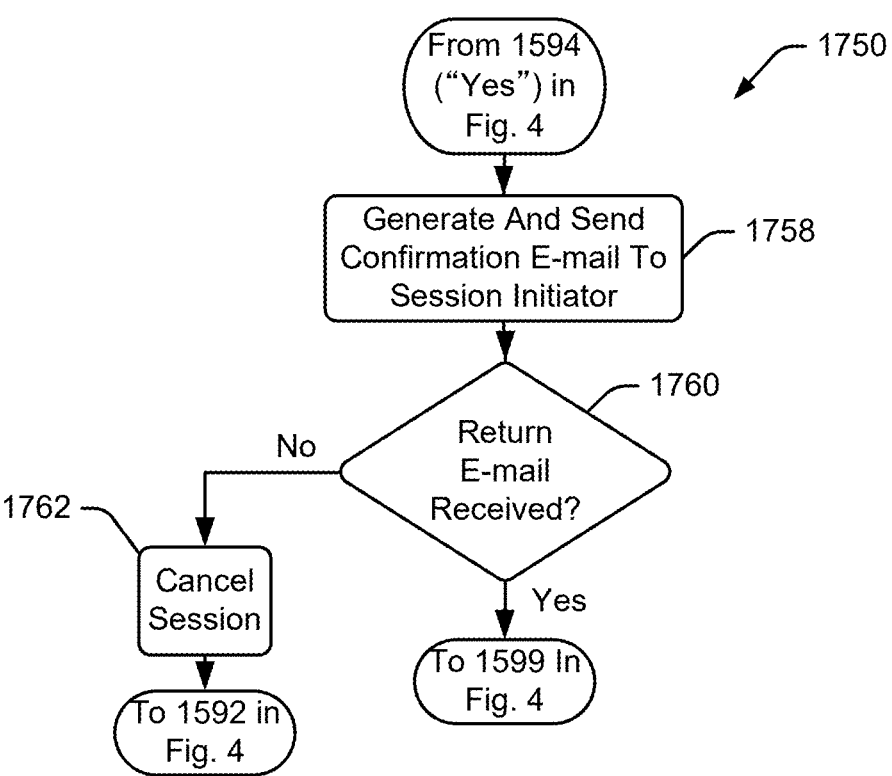
FIG. 69 is a flow chart illustrating a sub-process that may be substituted for a portion of the process of FIG. 62.

Even in cases where a conference session initiation E-mail includes all of the information required to initiate a conference, in at least some cases, server 1512 may be programmed to send a confirmation E-mail to an initiating conferee to confirm that the session should be schedule. To this end, see the exemplary sub-process 1750 in FIG. 69 that may be substituted for a portion of the process shown in FIG. 62 for generating a confirmation E-mail for an initiated session. Referring also to FIGS. 59 and 62, after server 1512 recognizes that a received E-mail is related to a new and yet to be scheduled session at block 1596, control may pass to block 1758 in FIG. 69. At block 1758, server 1512 uses the information gleaned from the initiation E-mail received at block 1594 to generate a confirmation E-mail to be sent to the initiating conferee. Here, the confirmation E-mail includes all of the details related to the session to be initiated and would include an "accept" icon or the like to be accepted by the initiating conferee. At block 1760, server 1512 monitors for a return E-mail in response to the confirmation E-mail. Where a return E-mail is not received, control passes to block 1762 where the session is canceled after which control passes back up to block 1592 in FIG. 62 where the process described above continues to cycle. At block 1760, if a return E-mail is received, control passes to block 1599 in FIG. 62 where the process described above continues to cycle.

Figure 67:
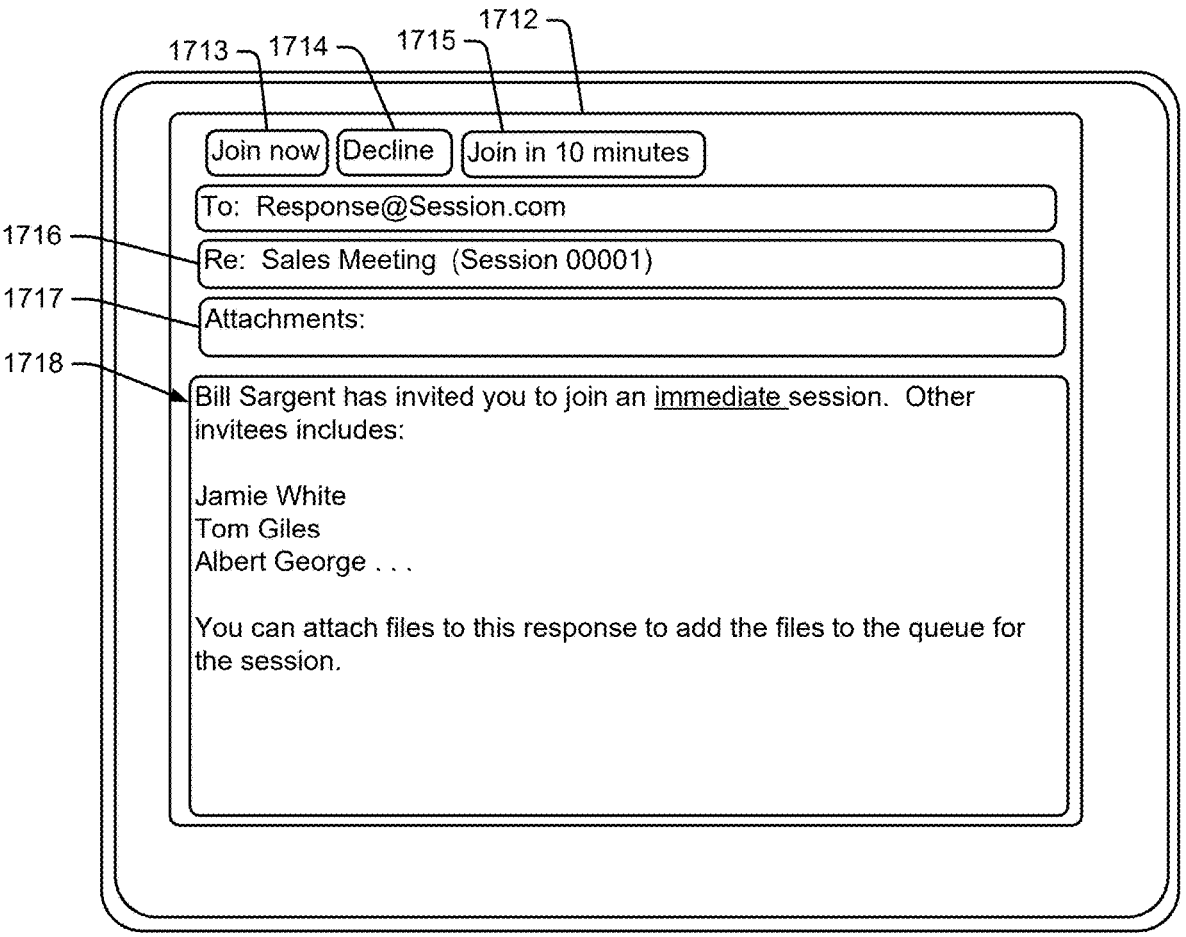
FIG. 67 is a screen shot illustrating an E-mail that can be used by a conference invitee to join a conference.

After a session has been scheduled and invitees have responded, a few minutes before (e.g., 15 minutes) a session is scheduled to commence, an E-mail may be transmitted to each of the conferees that agreed to participate with a selectable hyperlink that, when selected, opens a browser page associated with the session (see again, for instance, FIG. 67). In addition, upon selection of the selectable hyperlink, server 1512 may start downloading all of the session queue files to the device used to select the hyperlink so that access thereto can be expedited during the session. Thus, for instance, in the present example, referring again to FIG. 65, all of the files in the session 00001 queue 1728 may be downloaded to each of the user devices 1514 as those devices link to server 1512 to participate in the session. In the alternative, the queue files may be downloaded to each device 1514 automatically before the session commences, at the time associated with the scheduled session or just after the session commences. In still other cases session queue files may be downloaded to user devices 1514 hours before a session commences so that conferees have the chance to review session files prior to the session commencing. Downloading or caching files on all user devices should expedite the process of accessing all session content during a session.

Figure 70:
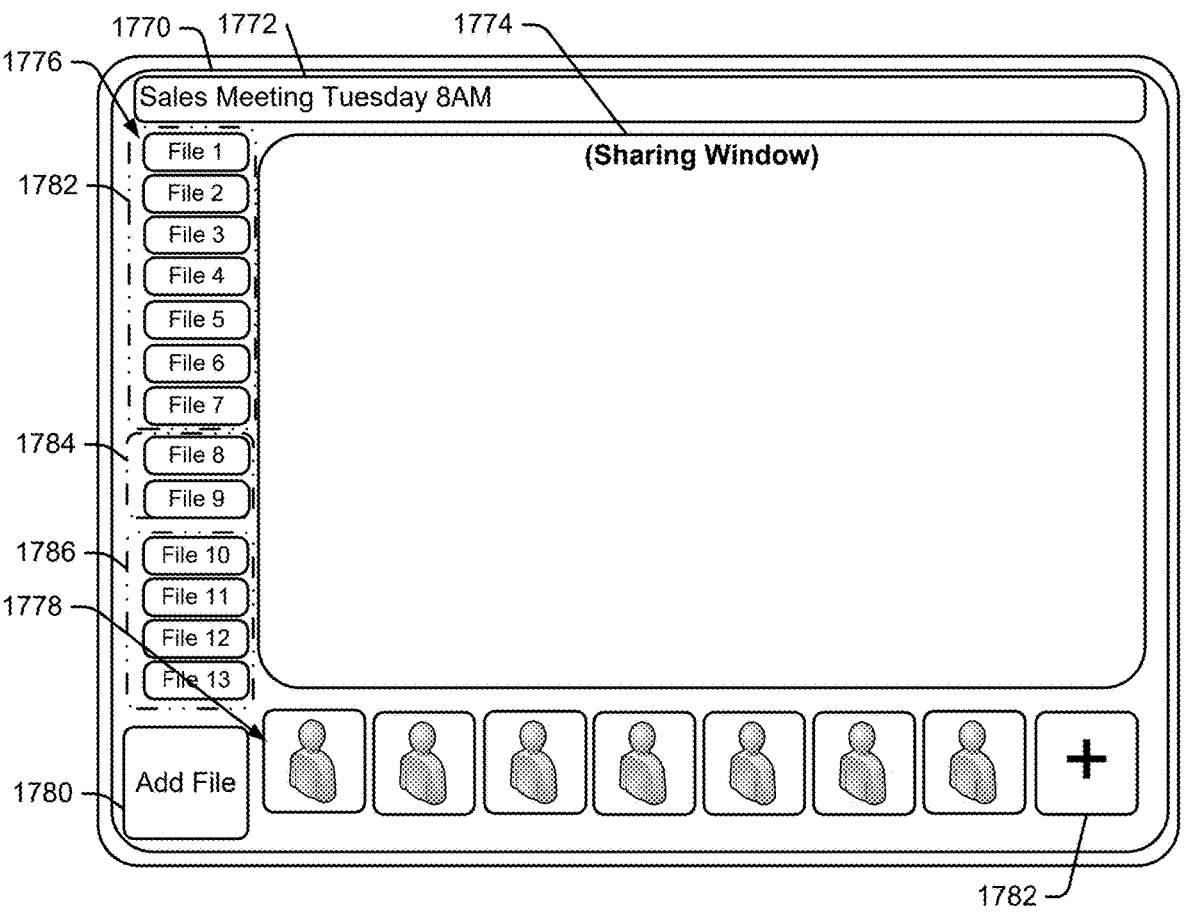
FIG. 70 is a screen shot showing a session interface that is consistent with at least some aspects of the present disclosure.

Referring now to FIG. 70, an exemplary session browser page is illustrated in a window 1770. The exemplary page includes a session title or name field 1772, a common or sharing field or window 1774, a session file or document queue 1776, conferee icons presented in a conferee queue identified by numeral 1778, an "Add File" icon 1780 and an add conferee or invitee icon 1782. The session title field 1772 includes the title of the session and is used by conferees to confirm that they have linked into an intended session. Any currently shared visual content or files including documents, videos, images, application output, etc., is presented in sharing field 1774. In at least some cases it is contemplated that the content within field 1774 will be the same for all conferees participating in a session. In these cases the difficulties associated with trying to make sure all conferees are viewing or at least have access to the same content during a session can be eliminated.

The conferee icons in queue 1778 include a separate icon for each of the conferees that participates in a session. In at least some embodiments each conferee icon 1778 will include an image of the associated conferee or some other identifier such as a name, an office association, etc. In at least some cases different colors will be associated with different conferees and the icons 1778 may have some colored characteristic associated with the conferee color. For instance, the border box around a first conferee icon may be red, the border around the second icon may be blue, the border around a third icon may be green, etc. Actions performed by conferees that appear on the browser page or information associated with conferees may have subtle color related earmarks to help conferees distinguish activities by other conferees. For instance if a conferee uses a drawing tool or the like to highlight content in a file presented in field 1774, the highlighting may be color coded to the conferee's related color (e.g., the conferee associated with red may highlight in red, the conferee associated with blue may highlight in blue, etc.).

Referring still to FIG. 70, thirteen files are shown in queue 1776. If the queue includes more than the illustrated files, scrolling arrows could be provided enabling conferees to move up and down in the queue to access other files. The illustrated thirteen files include files 1-7 added to the queue in the above example by the session initiator, files 8 and 9 added to the queue by a first conferee Jennifer White and files 10 through 13 add to the queue by a second conferee Pat Smith (see again FIG. 66). In at least some embodiments the file icons in queue 1776 may be color coded to indicate which conferee added the files to the queue. To this end, three phantom boxes 1782, 1784 and 1786 are shown about the file subsets added to the queue by the conference initiator, Jennifer White, and Pat Smith, respectively. Here, the borders about each group 1782 file may be highlighted red, the borders about each group 1784 file may be highlighted blue and the borders about each group 1786 file may be highlighted green to indicate conferees that added the files.

Figure 71:
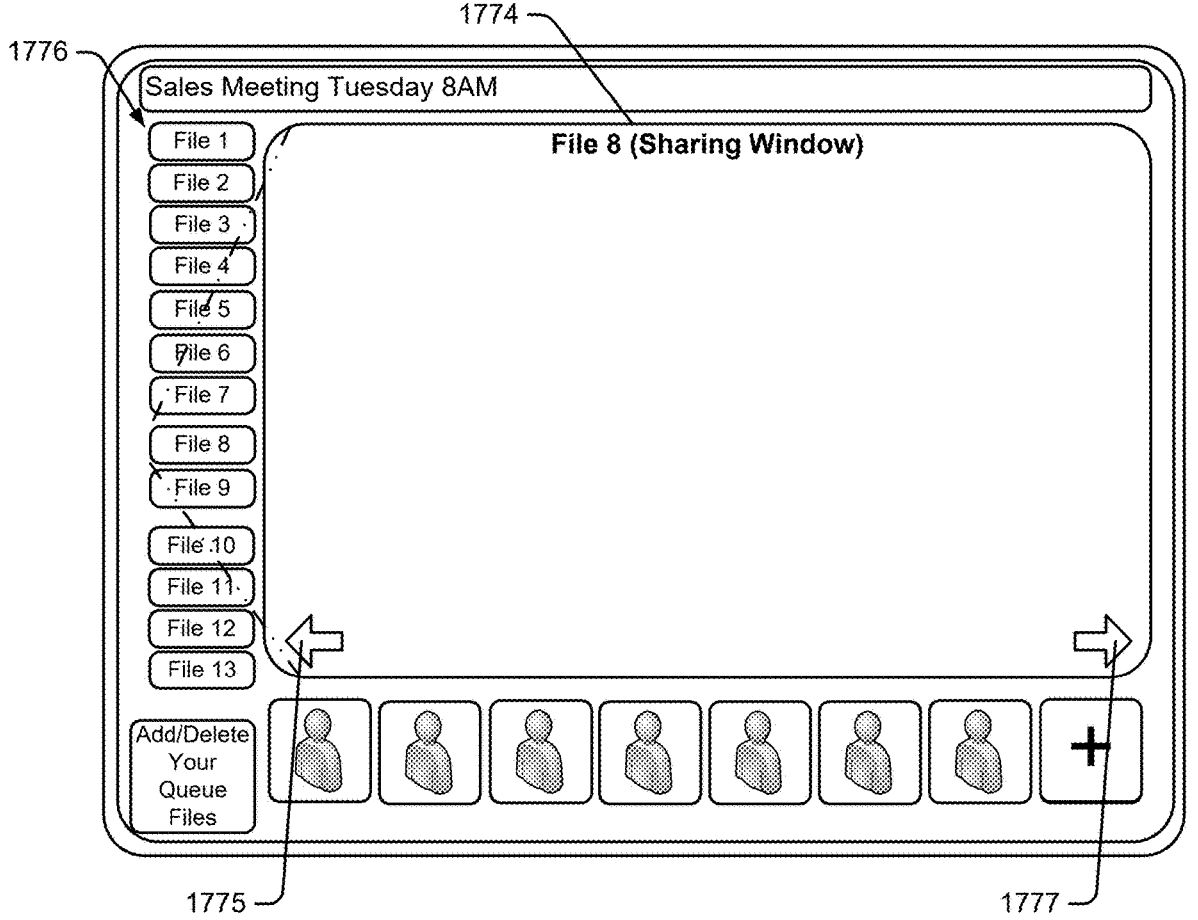
FIG. 71 is similar to FIG. 70, albeit showing another screen shot where a specific file has been opened in a common display space.

In at least some embodiments, regardless of which conferee added a file to the session queue, any conferee may be able to select any file from the queue to open the file for common viewing in common field or sharing window 1774. Standard graphical interface tools may be used to select files. For instance, a mouse controllable pointer icon may be used to drag a file into sharing window 1774, to double click on a file icon to open the file in window 1773, etc. See FIG. 71 that shows File 8 opened in window 1774. Here, the term "drag" is used to refer to selecting the iconic representation of a file from queue 1776 and moving a pointing device from that selected point to the sharing window 1774 where, upon release, an instance of the file or document is opened in the sharing space 1774, where the iconic representation of the file in queue 1776 persists within the queue. In other parts of this specification the term "drag" or the term "dragging" are used in a similar fashion where an icon dragged to another location still persists and the original location while an instance of a file, object or other data construct associated with the icon is then opened at the end location of the dragging action. In these cases, while an original object may not move during the dragging action, In some other cases in this specification the term "drag" may refer to actually moving a selected object from one location to another.

The feature that enables any conferee to take session control by opening a file in common field 1774 is referred to generally as egalitarian control because no one conferee controls who has control at any time. In effect, any conferee can assume control of the common field 1774 at any time and all conferees see the same content or file in the common field at all times and any conferee can open any queue file regardless of which conferee added the file to the queue.

When a file is opened in common or sharing window 1774, the file icon in queue 1776 is highlighted or otherwise visually distinguished from the other file icons in the queue. Where an open file has several pages as in a Power Point presentation or the like, scrolling icons 1775 and 1777 (see FIG. 71) may be presented for moving back and forth within the open file to show other pages. In at least some cases, while the file icon in queue 1774 may be color coded to indicate the conferee that added the file to the queue, a border about common field 1774 may be color coded to the conferee that opened the file currently presented in field 1774. Thus, for instance, where a first conferee is associated with the color red and a second conferee is associated with the color blue, if the second conferee added file 8 to the queue and the first conferee opened file 8 in the common field 1774, the file 8 icon in queue 1774 would be bordered blue while the border about the open file 8 in field 1774 may be red.

Figure 72:
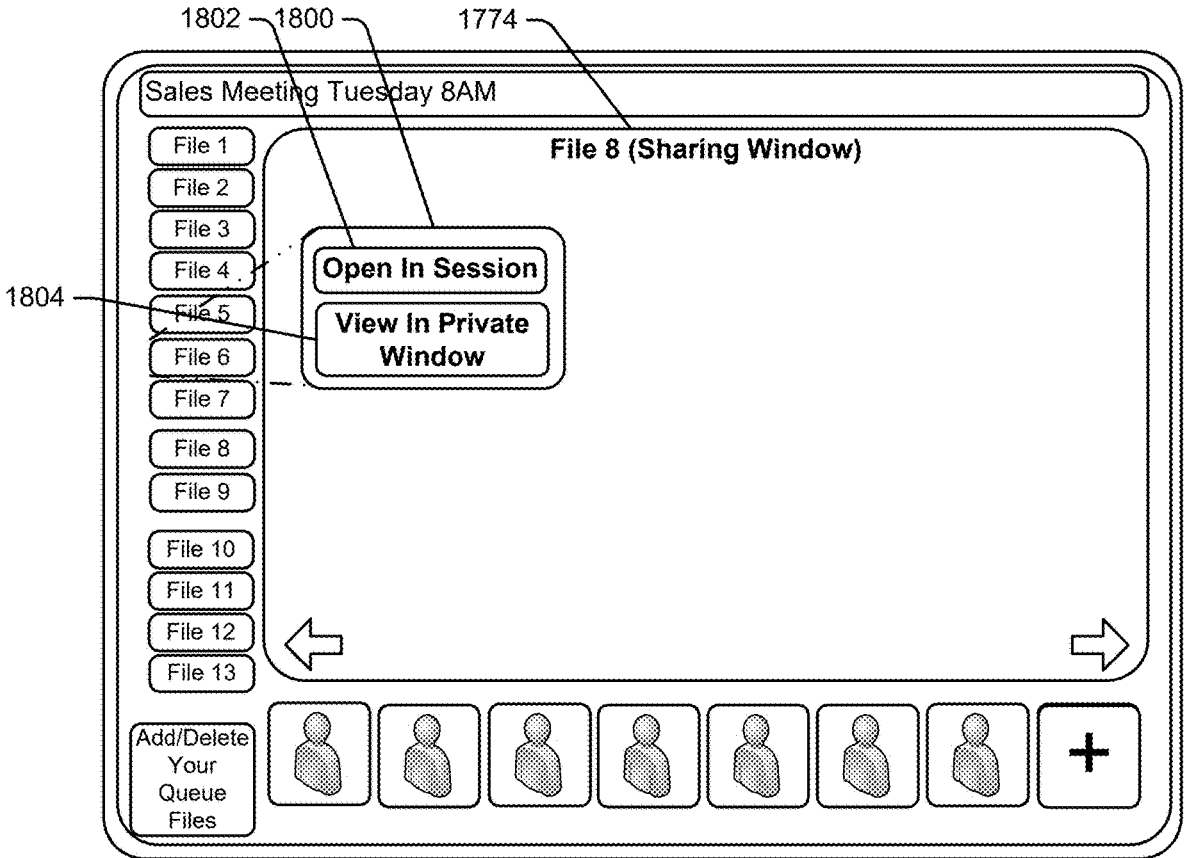
FIG. 72 is similar to FIG. 70 albeit showing another screen shot.

In at least some embodiments any conferee may be able to open any file in the queue in either the common field 1774 or in a private window for independent and private viewing and consideration. To this end, see FIG. 72 where, when the file 6 icon is selected by a conferee on the conferee's display (i.e., via touch, mouse controlled cursors, etc.), an option tool or window 1800 is opened giving the conferee the option to either open file 6 in the common field 1774 by selecting icon 1802 or to open file 6 in a private viewing window by selecting icon 1804. Selection of icon 1802 opens the selected file in common window 1774. Selection of icon 1804 opens the selected file in a private viewing window as shown in FIG. 73.

Here, private means that only the conferee that elected to open the file in the private window can see the instance of the file in the private window (i.e., no other conferee sees another conferee's private window). If two or more conferees open the same file in private windows at the same time, each can independently view a different instance of the file in their own private window. Similarly, if a file is opened in the common field and a conferee opens the same file in a private window, the conferee sees a different instance of the file than the instance viewed by all conferees in the common window. Because different conferees can view different instances of the same file at the same time, different conferees can view different parts of the same file at the same time. For instance, a first conferee may be viewing a first page of a Power Point presentation while a second conferee is viewing a tenth page of the same Power Point presentation at the same time.

Figure 73:
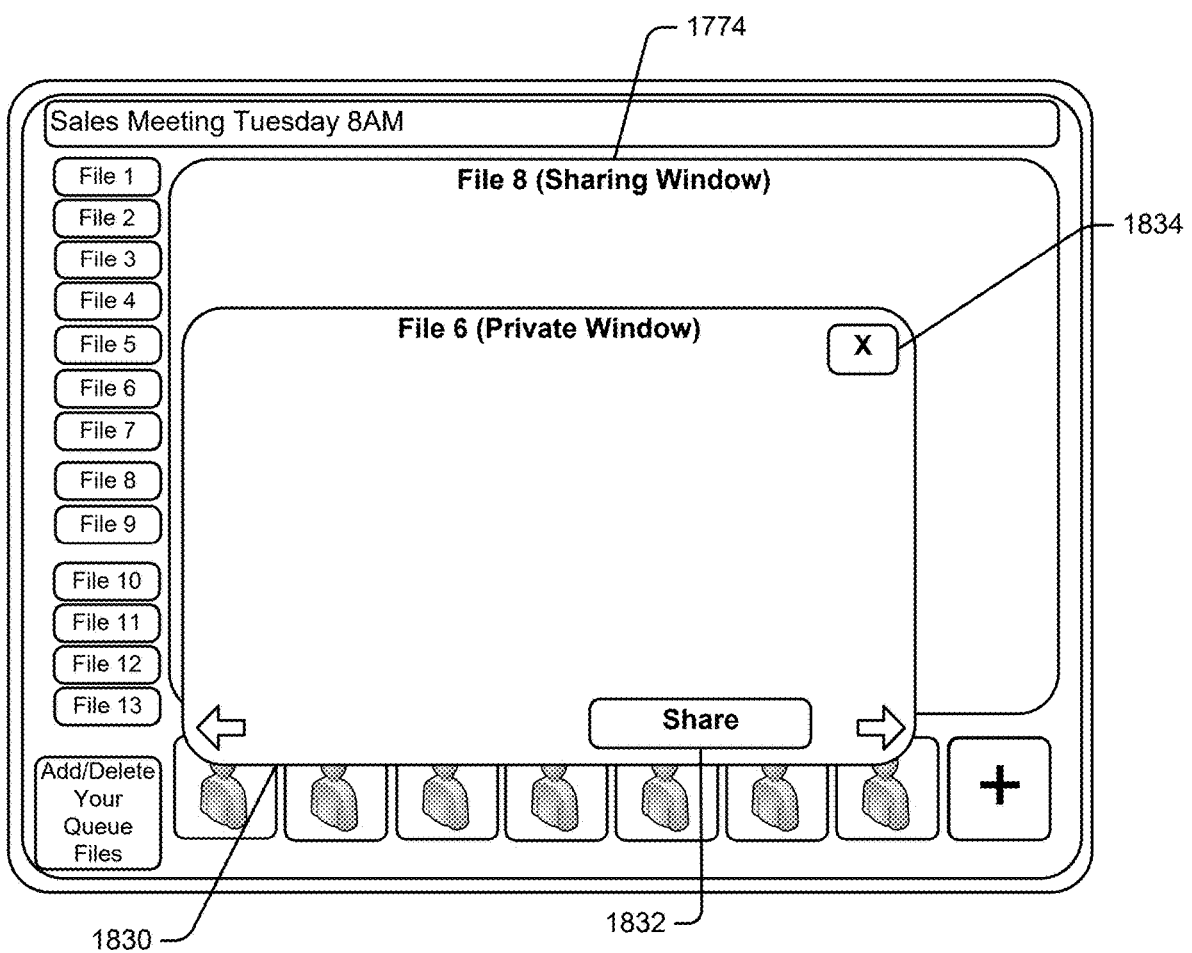
FIG. 73 is a screen shot showing a private window opened for viewing by a conferee.

Referring still to FIG. 73, while viewing a file in a private window 1830, a conferee may select a share icon 1832 to share the privately viewed file with other conferees in the sharing window 1774. In at least some cases when a privately viewed file is shared, the view of the file when sharing is commenced will be the same as the view in the private window. Thus, for instance, where a conferee is viewing a tenth page of a document privately when sharing commences, the shared instance of the document will be presented with the tenth page open for viewing in field 1774.

Figure 74:
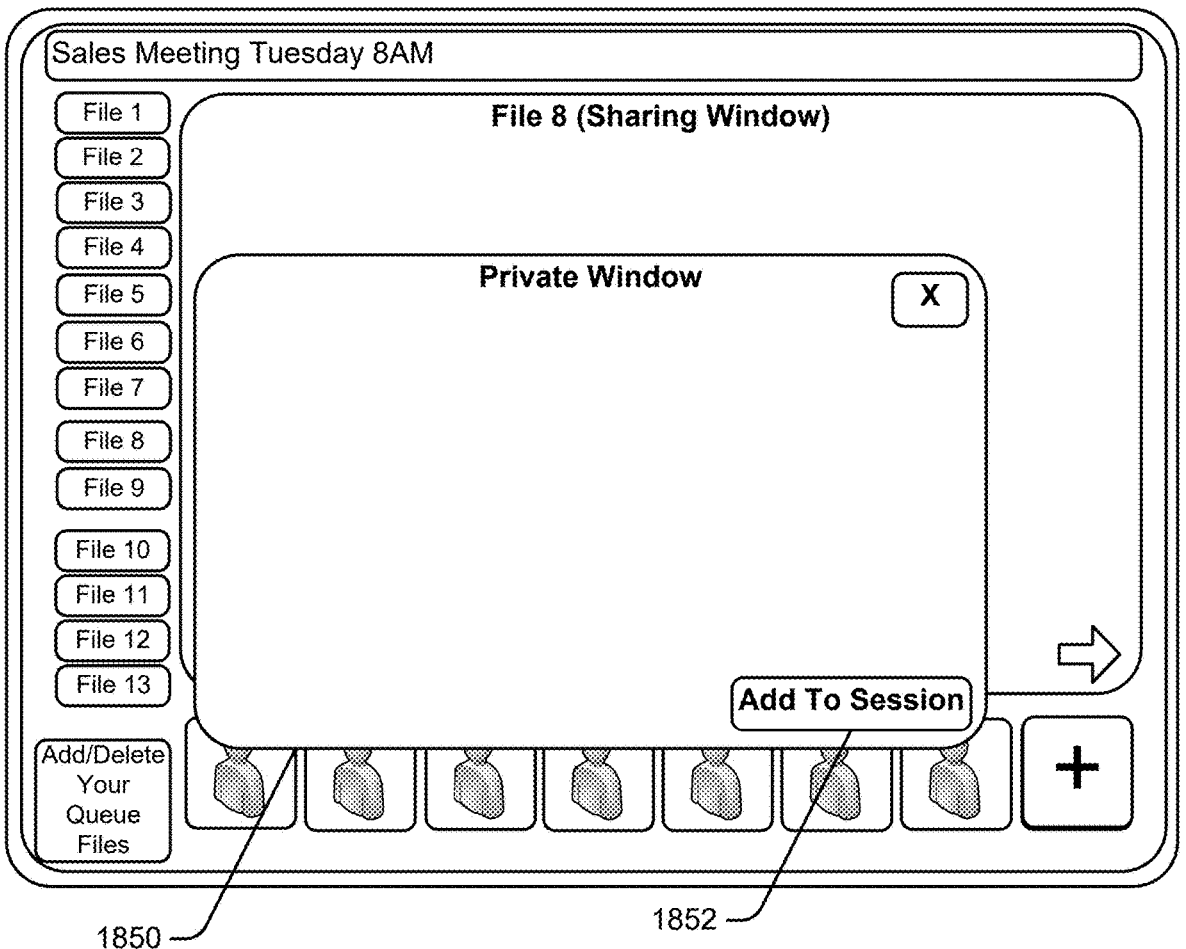
FIG. 74 is similar to FIG. 73 albeit where the screen shot enables a conferee to add a privately viewed image to a conference queue.

The browser representation in FIG. 70 is provided in a software window and therefore other windows can be opened up simultaneously if a device 1514 user wants to view content that is not in a session queue and that is independent of the content viewed in common field 1774. For instance, if a device 1514 user wants to review a non-queued word processor document independent of the file opened in field 1774, the user can simply open the document in a different private window either over the top of browser window 1770 or to the side thereof if window 1770 is reduced in size. To this end, see FIG. 74 where a private window 1850 is shown opened over the browser interface.

In at least some embodiments, server 1512 enables conferees to add files to or remove their files from a conference queue during a session. For instance, referring again to FIG. 74, when a conferee opens a file that is not already in the queue in a private window 1850, server 1512 may automatically provide an "Add To Session" icon 1852 in the private window that, when selected, causes the file opened in the private window to be added to the session queue 1776. It is contemplated that files added to the queue will be added sequentially and that any file added will be color coded per the colors associated with specific conferees. When a file is added to the queue, instances of the file are immediately and automatically cached in memory associated with each of the devices 1514 so that the newly added file can be rapidly accessed when required.

Figure 75:
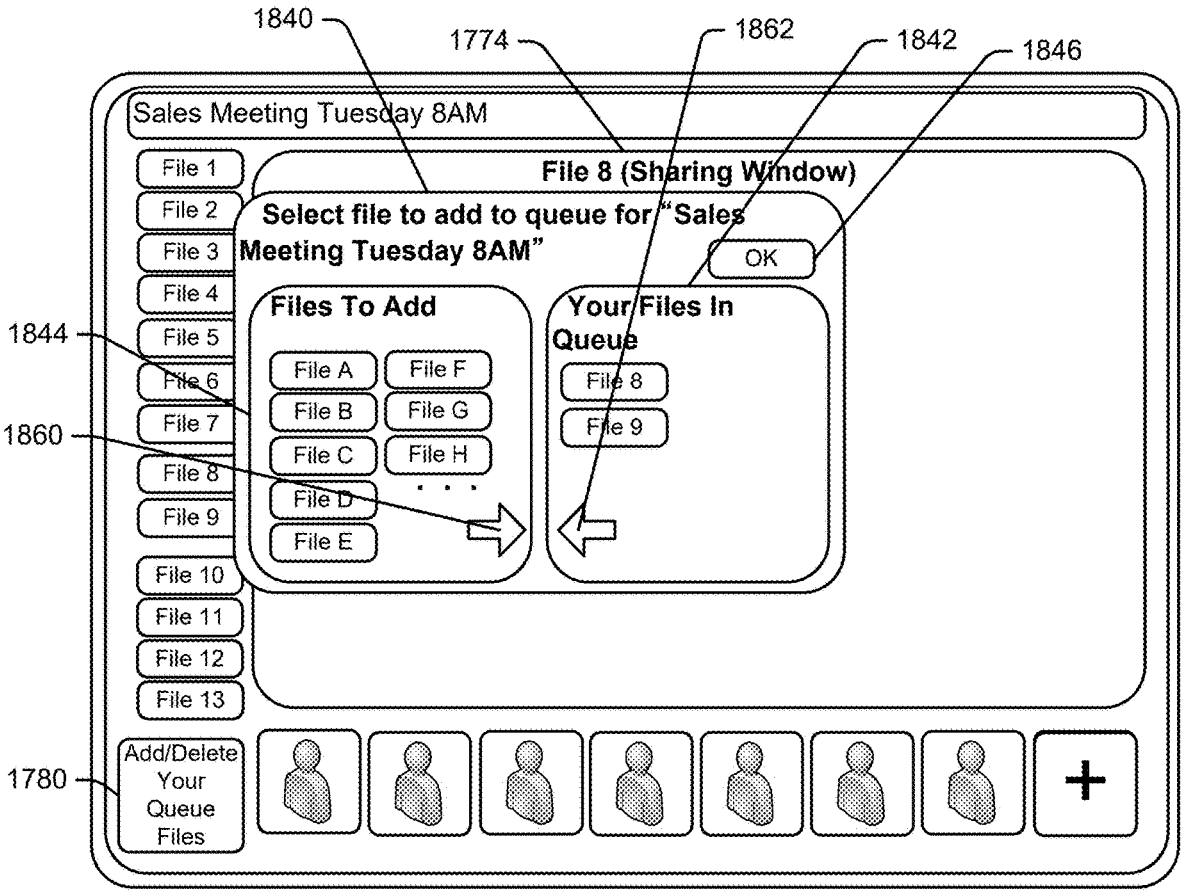
FIG. 75 is similar to FIG. 70 albeit showing another screen shot where a conferee can add or delete files from a conference queue.

Referring again to FIG. 70, the Add File icon 1780 may also be used to add or delete queue files by name. Referring also to FIG. 75, when icon 1780 is selected, in at least some embodiments, a queue management window or tool 1840 may be opened for adding files to or deleting files from the session queue. The exemplary window 1840 in FIG. 75 includes two lists of files including files 1842 that have already been added by the conferee to the session queue and files 1844 that have yet to be added to the queue. One or more files in either list can be selected to highlight the file icons and then arrow icons 1860 or 1862 can be selected to move the selected files from one list to the other. After a conferee is satisfied with the conferees files in the queue, the conferee can select an "OK" icon 1846 to make the file swap into and/or out of the queue. When a new file is added to the queue 1774, instances of the new file are cached on each of the linked devices 1514, as at caches 1515*a*, 1515*b*, 1515*c*, and 1515*d*. When a file is removed from the queue, in at least some embodiments the instances of the removed file in the device 1514 caches are deleted therefrom.

In still other embodiments a session application may be downloaded onto a conferee's device and used to add files or other content to a session queue at any time. For instance, a session application may be downloaded to a smart phone or tablet type device that integrates with device content posting applications. For instance, here, after a picture is taken with a camera, if a conferee wants to post the picture to a session queue, the conferee can select a "Post" icon presented by the camera software interface to access sharing options for the obtained image like "Message", "E-Mail", "Twitter", "Facebook", etc. Once the session software is integrated with the posting application, another option called "Session" may be provided as a selectable icon for sharing by posting to a session queue. Here, if the "Session" icon is selected, the image may be transmitted to the session server 1512 with conferee identifying information. Where the conferee is only associated with a single scheduled conference, the image may be added to the queue automatically. If the conferee posting the image is associated with more than one scheduled session, server 1512 may respond with a query about which session queue to add the image to.

This simple application based process of adding an image to a session may be performed either prior to a session or during a session. For instance, if a conferee has a hard copy image that the conferee wishes to share with others during the session, the conferee may take an image of the hard copy with the conferee's device 1514 and post the image essentially real time to the queue for sharing. Camera videos can be shared and posted to a session queue in the same fashion. As another example, the session posting option may also be used to share a news article, an internet link, a blog site, etc. To this end, the same posting icon can be presented via a smart phone, tablet device or any other type of device and may be selected to access a session posting icon to add any content to a session queue.

Figure 76:
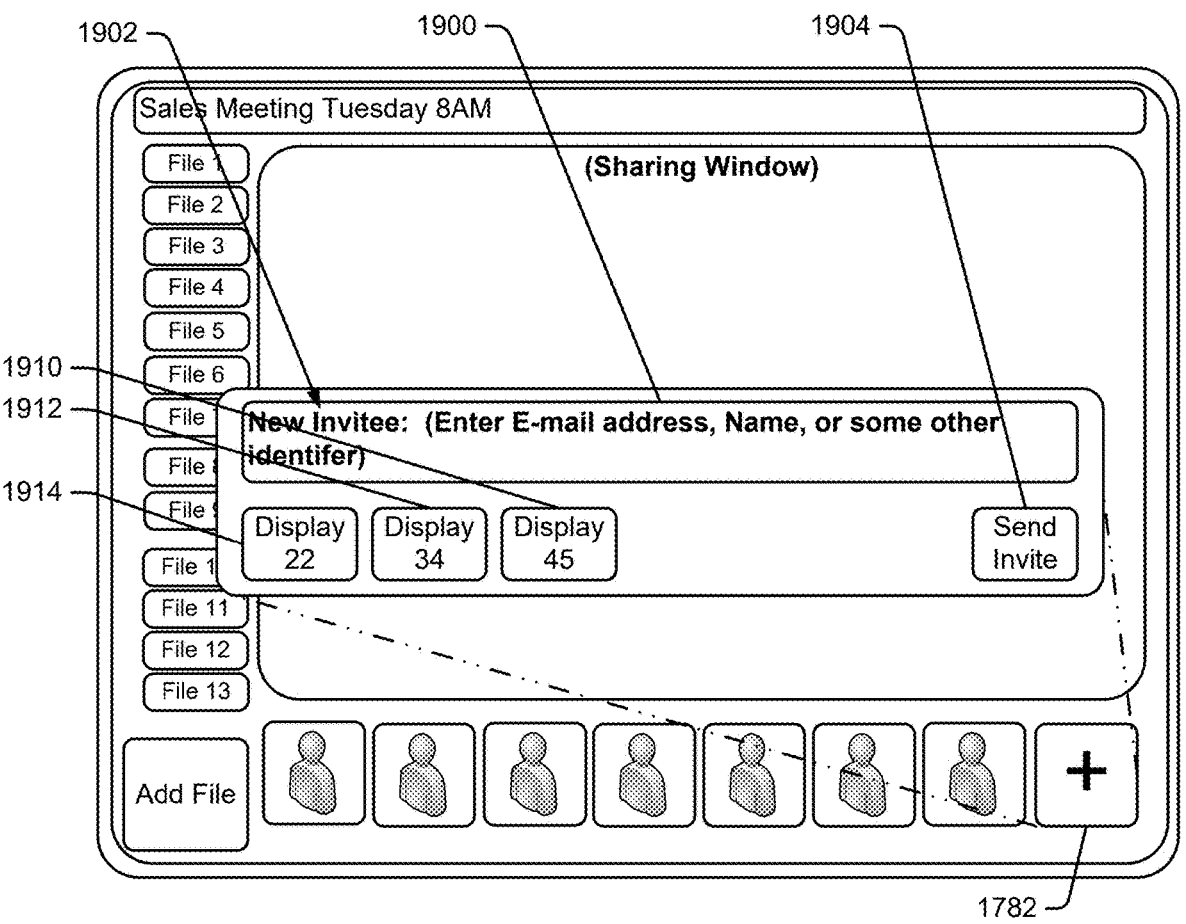
FIG. 76 is a screen shot showing an on screen tool for adding invitees and additional common display screens to a session.

Referring again to FIG. 70, other conferees can be invited to join an ongoing session by selecting icon 1782. When icon 1782 is selected, referring also to FIG. 76, a conferee adding tool or window 1900 may be opened including a field 1902 for identifying others to be invited to join the ongoing session and a "Send Invite" icon for sending invites to conferees identified in field 1902. A user's contact storing software (e.g., often E-mail software) may be used to identify potential contacts to invite via a search tool associated with field 1902. In at least some cases an invite to another conferee to be added will be in an E-mail form as described above and the conferee will be able to join the ongoing session by accepting the invite as described above.

Referring again to FIG. 59, it has been recognized that many personal computing devices like smart phones, tablets and even laptops have relatively small display screens that make it difficult to view large amounts of content. It has also been recognized that often times there are large unused display screens in the vicinity of personal device users that are not being utilized. In many cases large display screens are now being equipped with processors and software for running display programs and many are linked or linkable to computer and communication networks so that the large displays are independently addressable.

Even where a display is not independently addressable, most displays have input ports (e.g., HDMI) that can receive wireless processing dongles or devices (e.g., Chrome Cast by Google) that are independently addressable. To this end, see FIG. 59 that shows a large display 1920 in a space (e.g., a conference room) corresponding to location 1526 at which several personal computing devices are located. Here, display 1920 either has a processor and a wireless transceiver built in or those components are provided in dongle 1922 receivable in an HDMI or other type of port so that display 1920 can be independently addressed for receiving content to store and/or display.

In at least some embodiments, a conferee simply invites display 1920 to a session in some fashion and the session server adds the invited display to the session "conferees". Thereafter the display operates like any of the personal device displays to present session information to conferees in a large format. For example, if a conference initiator knows the address corresponding to display 1920 or can identify display 1920 in some other way useable by server 1512 to identify the display address, the address or identifier may simply be added to the target field in a session initiation Email. For instance, display 1920 may be labeled with a persistent display identifier such as "Display 22". Here, "Display 22" may be added to the target field in the initiation Email and may be useable by server 1512 to discern the display address which is added to the list of session participants.

As another example, when dongle 1922 is inserted in the display HDMI or other port, the dongle processor may boot up software to run an application that presents an address or associated identifier via display 1920 that could be added to an E-mail target field. Here, a conferee may simply enter the displayed address into an Email target field and transmit the E-mail to server 1512.

As one other example, referring again to FIG. 76, when icon 1782 is selected by a conferee to add a new conferee to an ongoing session, server 1512 may cause the conferee's device to wirelessly or otherwise identify large screen/display options in the near vicinity and the options may be provided as an option list to be added to the invitee field 1900. To this end see the screen option icons 1910, 1912 and 1914, any of which may be selected to add a proximate large display to an ongoing session. Although not illustrated, it is contemplated that large screens could also be added to scheduled sessions in a similar fashion to effectively reserve the screens for future use during a scheduled session. Where a screen is reserved for use during a future session, each screen or the system as a whole may be programmed to maintain its own schedule and to report scheduled activities to conferees attempting to use the screens for other sessions.

For instance, if a particular screen is scheduled to be used in 20 minutes for a first session, if another conferee attempts to use the screen for a second session, the system may not allow use for the second session or may provide notice that the screen is only available for the next 20 minutes or some sub-period thereof. Where the system does not allow a screen to be used because of a conflict with scheduled use, the system may provide notice that the screen cannot be used. In more complex systems the system may enable users to view an entire schedule for a screen on the display itself so that a user could view open times and then select a specific time slot for scheduling and the system could enable scheduling via the screen itself.

In at least some cases, when a conferee initiates the process of scheduling a conference and invites other conferees to a subsequent session at a later time, server 1512 may perform additional functions to identify various resources for each or at least a subset of the invited conferees to use that are intended to enhance the subsequent session. For instance, if the session is scheduled for a Tuesday morning in two weeks from 8 AM to 10 AM, when a first conferee invites five other conferees to the session via an e-mail invite or the like as described above, for the second conferee, server 1512 or another server in the system may automatically access the personal schedule of the second conferee and determine that on the Tuesday selected for the conference, the second conferee is available at the selected time (e.g., 8 AM) and will be located in a Palo Alto office facility. Server 1512 or another system server may also access a space schedule for the Palo Alto office facility and identify that a space including one or more large flat panel displays suitable for viewing session content is available for use by the second conferee during the scheduled session time period. Here, the server may be programmed to identify the smallest space possible for the second conferee that has an optimized set of affordances so that larger spaces can be reserved for larger sets of conferees that may need conference space during the session. For instance, where a single person work station is available, the server may identify and suggest the single person space to the second conferee. The server may also take into account the second conferee's preferences also if those are stored within a system database when selecting a space for use during the session.

Referring again to FIGS. 21 and 64, when the accept icon 1671 on the email invite screen is selected, server 1512 may present a virtual space reservation screen akin to the view shown in FIG. 21 to the second conferee that suggests the available space in Palo Alto for the session. Here, the second conferee can use the virtual space reservation tool to select the suggested space or perhaps to search for another space in the same facility that may be preferred by the second conferee for some reason. Here, the space reservation may be handled separate from the response e-mail associated with FIG. 64 or may be processed as part of the FIG. 64 e-mail. In either case, once the space is selected, a return e-mail akin to the e-mail shown in FIG. 64, may be generated and transmitted back to the server 1512 for updating the second conferee's schedule as well as the session content where appropriate.

In at least some cases it is contemplated that two or more conferees invited to a session may, during the time scheduled for the session, be scheduled to be in the same general location such as the Palo Alto facility. Here, in many cases, it will make sense for conferees in the same general location to be co-located during a session. To this end, in at least some embodiments, when a session invite e-mail is generated and transmitted to conference invitees and a system server identifies spaces with suitable affordances available for invitees to use during the session, the server may be programmed to identify any conferees that will be in the same general location during the scheduled session time and may identify a space large enough and with sufficient affordances to support the sub-set of conferees at the general location. For instance, where four of the invited conferees will be located in the Palo Alto facility, the server may identify a Palo Alto space large enough to support the four conferees and may suggest the identified space in a manner akin to that described above with respect to the second conferee (see and consider again FIGS. 21 and 64).

Where a system server suggests a multi-person space for co-located conferees, after one of the co-located conferees accepts the suggested space, the system server should reserve that space and modify invite e-mails or the like to other conferees. For instance, where a session invite is transmitted to four conferees that will be located in the Palo Alto facility during the scheduled session time and the invite suggests a suitable conference space XX for the group of four conferees, one of the four conferees will open and consider the e-mail invite first. Where a first of the four conferees opens, considers and accepts the session and the suggested conference space XX, the system updates the session and schedules for the space XX and the first conferee to reflect the acceptance. Here, when a second of the four conferees to be located in Palo Alto opens her e-mail invite, the invite should reflect that space XX has been scheduled for use by the first of the four conferees in the Palo Alto facility. In this case, when the second of the four conferees accepts the invite, the second conferee may not be presented with the option to select a suitable space in the Palo Alto facility and instead, the system may simply add the space XX to the second conferee's schedule for the session at the scheduled session time.

Similarly, when the third and fourth conferees that are scheduled to be in the Palo Alto facility during the scheduled session time access their e-mail invites, the invites may reflect acceptance of a suggested space by one or more of the other conferees that will be co-located and the accepted space will be used as a default for each of those additional conferees.

Where a second subset of conferees will be co-located at a different location, a system server may perform a process similar to that described above with respect to the Palo Alto facility space to identify an optimized space for use by the second subset and that space may be suggested in e-mail invites to the second subset.

When a first of a sub-set of co-located conferees invited to a session considers a suggested multi-party space, in at least some embodiments the first conferee will be able to select a different space for the session. Here, the different space may be suitable for use by the entire co-located subset or may be a smaller space that cannot support the entire co-located conferee subset. Where the space selected is too small (e.g., a single person workstation) to support the entire co-located subset, a system server may alter continue to suggest the larger space to the other co-located conferees or another suitable space via the e-mail invites to those conferees.

Where a session is not scheduled to occur for a long time (e.g., 2 or more weeks), the system servers may not present space options for the session until some subsequent time closer to the scheduled session period. Here, for instance, one week before a session is scheduled to occur, a system server may be programmed to generate a space suggesting e-mail or other electronic notification. The space suggesting e-mail may simply include a hyperlink to a virtual space reservation tool akin to the FIG. 21 tool that indicates a specific session, the scheduled session time and a suggested suitably afforded space. Here, the e-mail receiving conferee can select the suggested space or may select a different suitable space. By waiting to generate a space suggesting e-mail until a time closer to a scheduled session period, the chances of suggesting spaces at conferee locations is increased. For instance, if a conferee accepts a suggested space four weeks prior to a session, there is a good possibility that the conferee will be located at a completely different facility when the session occurs. The likelihood of a conferee's location being set one week prior to a session period is much greater and therefore suggesting a space at that time should increase the value of the suggestion feature appreciably.

Where a conferee has accepted a conference space at a first facility for a session period, a system server may track scheduled locations of the conferee and if the conferee's scheduled location during the scheduled session is inconsistent with the accepted space, the system may generate an e-mail or the like to request that the conferee either confirm a desire to use the scheduled space or select a different space. Here, the server may also suggest a different space at a different location that is consistent with the conferee's scheduled location during the session. Again, the e-mail include a hyperlink to a virtual scheduling tool akin to the one shown in FIG. 21 and the conferee may select a different suitable conference space. Once a different space is selected, the server may release the previously scheduled space.

In at least some embodiments it is contemplated that if conferees previously accepted a session and a space and then subsequently indicate that they will not attend the session or will not use the accepted space, a server may determine that a smaller or differently afforded space for a co-located conferee subset would be more suitable. Here, the server can identify an optimal space change for a conferee subset and generate space changing e-mails or the like to one or more of the conferee subset in a manner akin to that described above.

In at least some embodiments, after a space is scheduled for use during a subsequent session, session content including records and/or files may be automatically downloaded and cached on a memory device associated with the scheduled space some time prior to or proximate the start time of the session so that content access can be expedited.

Figure 77:
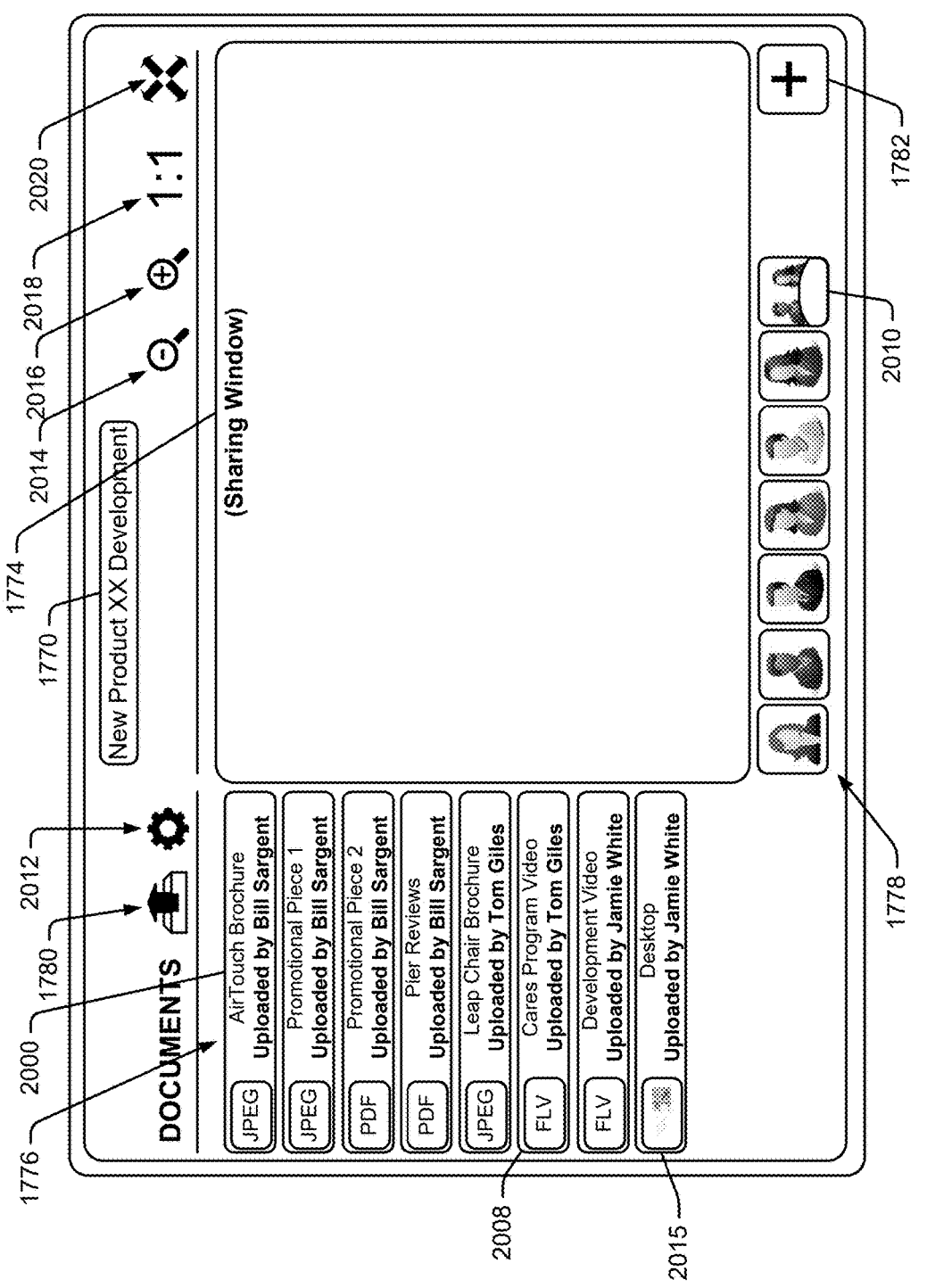
FIG. 77 is a screen shot showing another version of a conferee's interface that is consistent with at least some aspects of the present invention.

Referring now to FIG. 77, another exemplary screen shot showing a session display screen is illustrated that includes a session title field 1770, a session queue 1776, a conferee queue section or area 1778, a sharing window or field 1774 and various intuitive tool icons. The title field 1770 indicates the title of a session related to the screen shot which, in the exemplary illustration, is "New Product XX Development". The session queue 1776 includes icons that form a list of documents added to the queue by different conferees. The exemplary list includes JPEG documents, PDF documents, flash video files, etc. For instance, a first exemplary icon 2000 indicates a JPEG document that was uploaded to the system by Bill Sargent that is titled "AirTouch Brochure", an exemplary flash video file icon is labeled 2008, etc.

The conferee queue section 1778, as described above, includes an image icon of each of the conferees that is currently linked into the session. In some cases where conferee devices include video cameras (see exemplary cameras 1519 in FIG. 59), the images can be replaced by live streaming video of each of the conferees. Where a common display screen 1920 for possible use by multiple local conferees includes a camera 2352, one of the icons 2010 may include an image of a general space in front of the common screen so that a scene including two or more local conferees can be presented in the conferee queue section 1778. Where only some user devices include video capturing capability and others do not, a hybrid system is contemplated where video icons are provided when available and images are provided for other conferees. Referring still to FIG. 77, sharing window 1774 operates in a fashion similar to that described above.

When a page of a document or the like is opened in space 1774, icons 2014 and 2016 can be used to zoom out and zoom in on the image within the window. Icon 2018 can be used to return to a full page image where the currently viewed page of the document is fully exposed in sharing space 1774 for viewing. Icon 2020 can be selected to expand the sharing window 1774 to cover substantially the entire screen (e.g., so that the document and conferee queues and the on screen tools are removed from the screen). Icon 1782 can be used to invite another conferee or another screen to the session.

Figure 78:
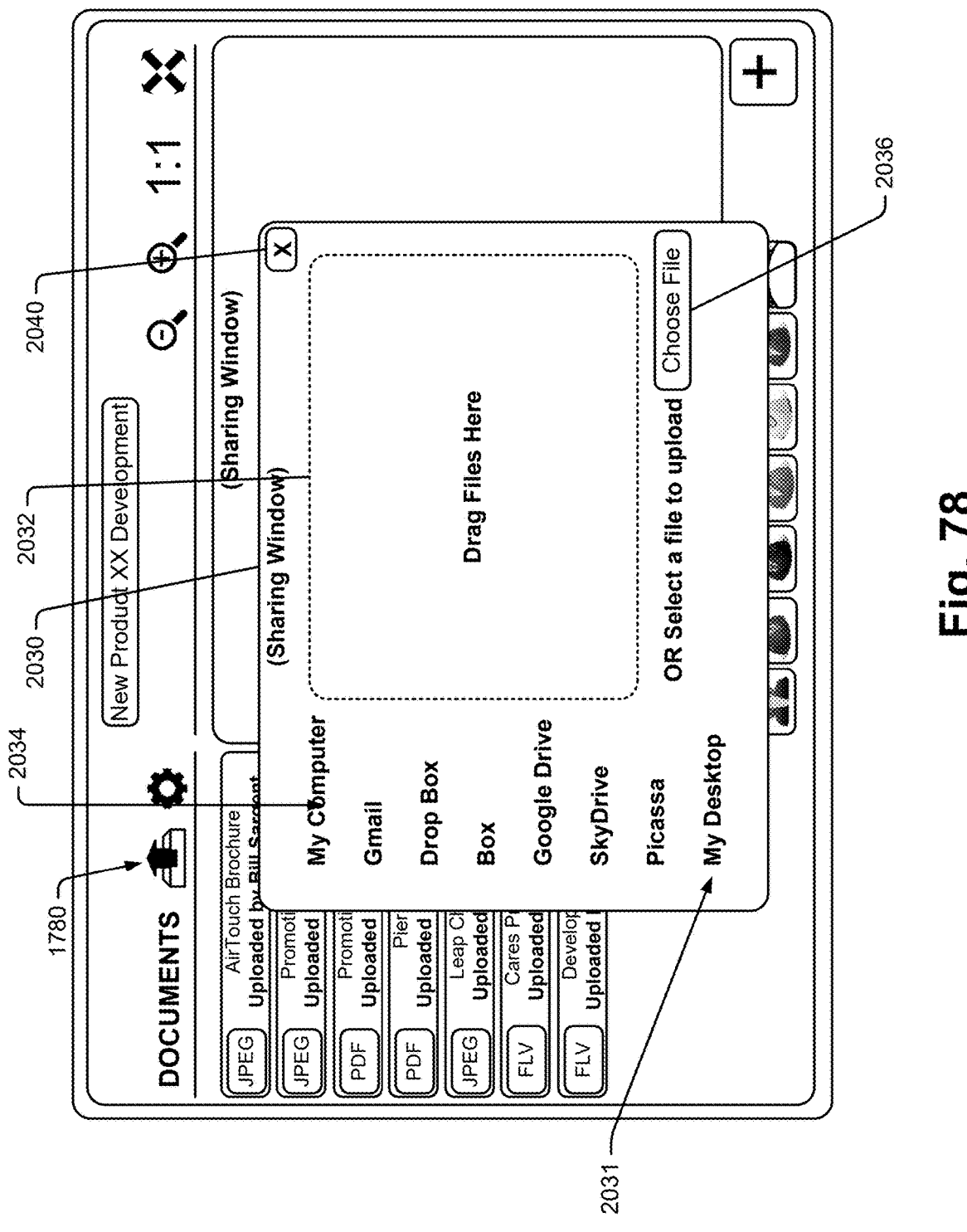
FIG. 78 is a screen shot showing a window for adding content to a session queue.

Referring still to FIG. 77, icon 1780 is an upload icon which can be used to add another document to the queue 1776 at any time. For instance, referring also to FIG. 78, when icon 1780 is selected, the system may open an upload window 2030 that includes a list 2034 of document sources from which a document may be retrieved, a receiving field 2032 for receiving a selected document and a "Choose File" icon 2036. Exemplary sources in the list 2034 include "My Computer", "Gmail", "Drop Box" "Box", "Google Drive", Sky Drive" and "Picassa". Many other sources are contemplated. To select a document to be added to the queue, a conferee may select one of the sources in list 2034 followed by selection of icon 2036 to access all of the files within the selected source. Once a source is opened to view documents within the source, one of the documents may be selected by either dragging the document icon into space 2032 or by double clicking the document to indicate selection. Close icon 2040 can be selected to close upload window 2030.

Figure 79:
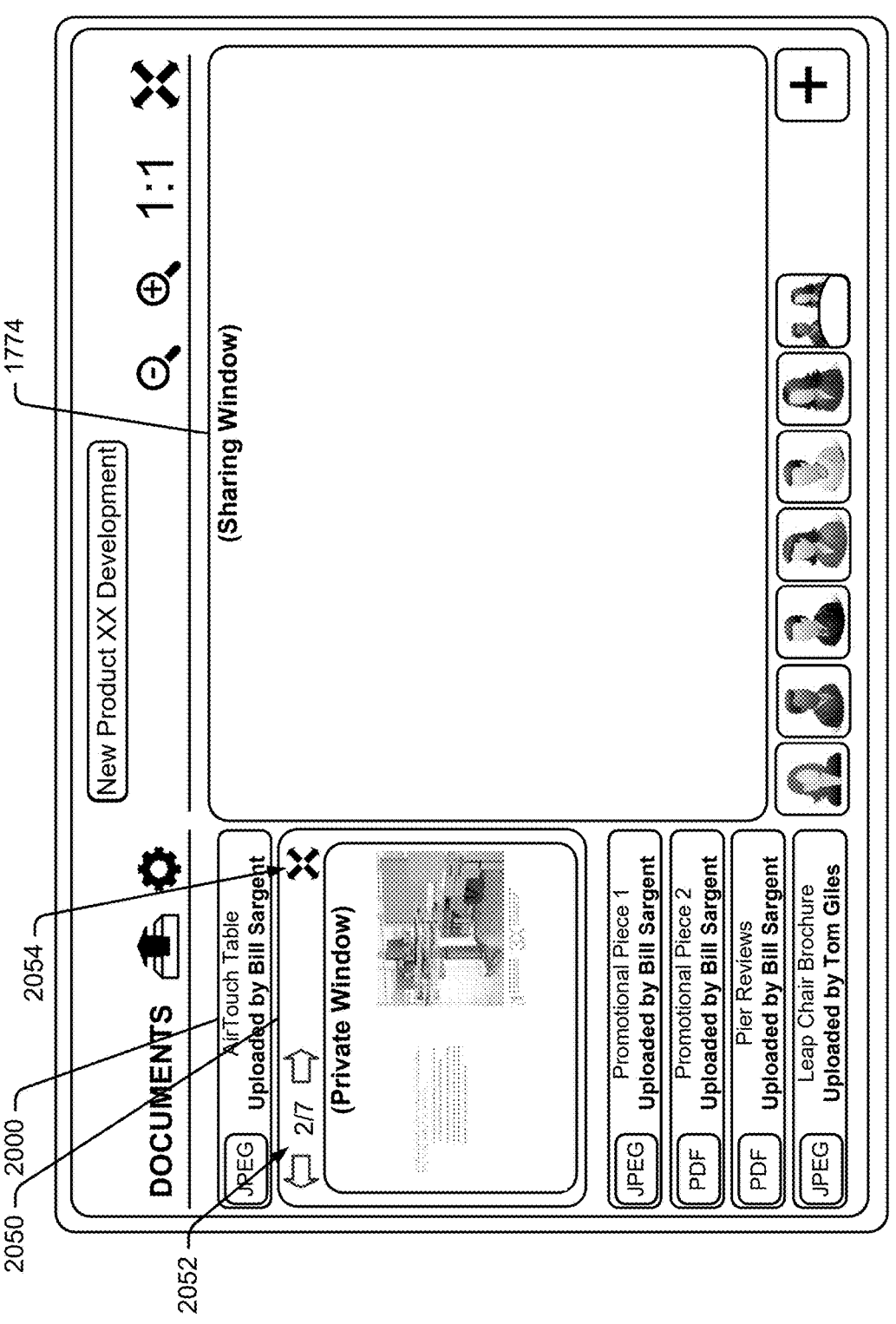
FIG. 79 is a screen shot showing a sharing window, a private window and a document queue that is consistent with at least some aspects of the present invention.

In the FIG. 77 embodiment, when one of the document icons in queue 1776 is selected via a double clicking action or the like, the document associated with the icon is opened in a private window or field as described above and the selected document icon is highlighted or otherwise visually distinguished in some fashion. To this end, see FIG. 79 where private window 2050 has been opened and selected document icon 2000 is shown with a highlighting shadow to change the visual appearance of the icon on the display. As can be seen, window 2050 is relatively smaller than sharing window 1778 and in fact is opened, at least initially, within the queue field 1776 so that the private window does not overlap or interfere with observation of the sharing window 1774. To make room for the private window in the document queue, document icons below the selected document icon are slid downward so that the private window 2050 can be opened within the queue without obstructing a view of the other document icons. While smaller than the sharing window 1774, the private window is still large enough on most display screens for a conferee to comprehend the content in the window 2050.

When the private window 2050 is opened, additional tools for manipulating the document in the private window are provided at the top of the window. For example, in FIG. 79, the exemplary tools include a page counting and progression tool 2052 and an expanding window icon 2054. Tool 2052 includes arrow icons that can be selected to move backward and forward within the document opened in the private window (see also tool 2108 with arrow icons in FIG. 85). For instance, in the case of a PDF, the PDF may include seven pages and the currently presented page can be changed via the arrows. Tool 2052 also reports which page of the total number of pages is currently being presented. The expanding window tool 2054 can be selected to increase the size of the private window. To this end, see also FIG. 80 where the private window 2050' has been expanded to a larger size for easier viewing. Here, the private window overlaps the sharing window 1778 at least somewhat to accommodate the larger size for more detailed viewing.

Figure 80:
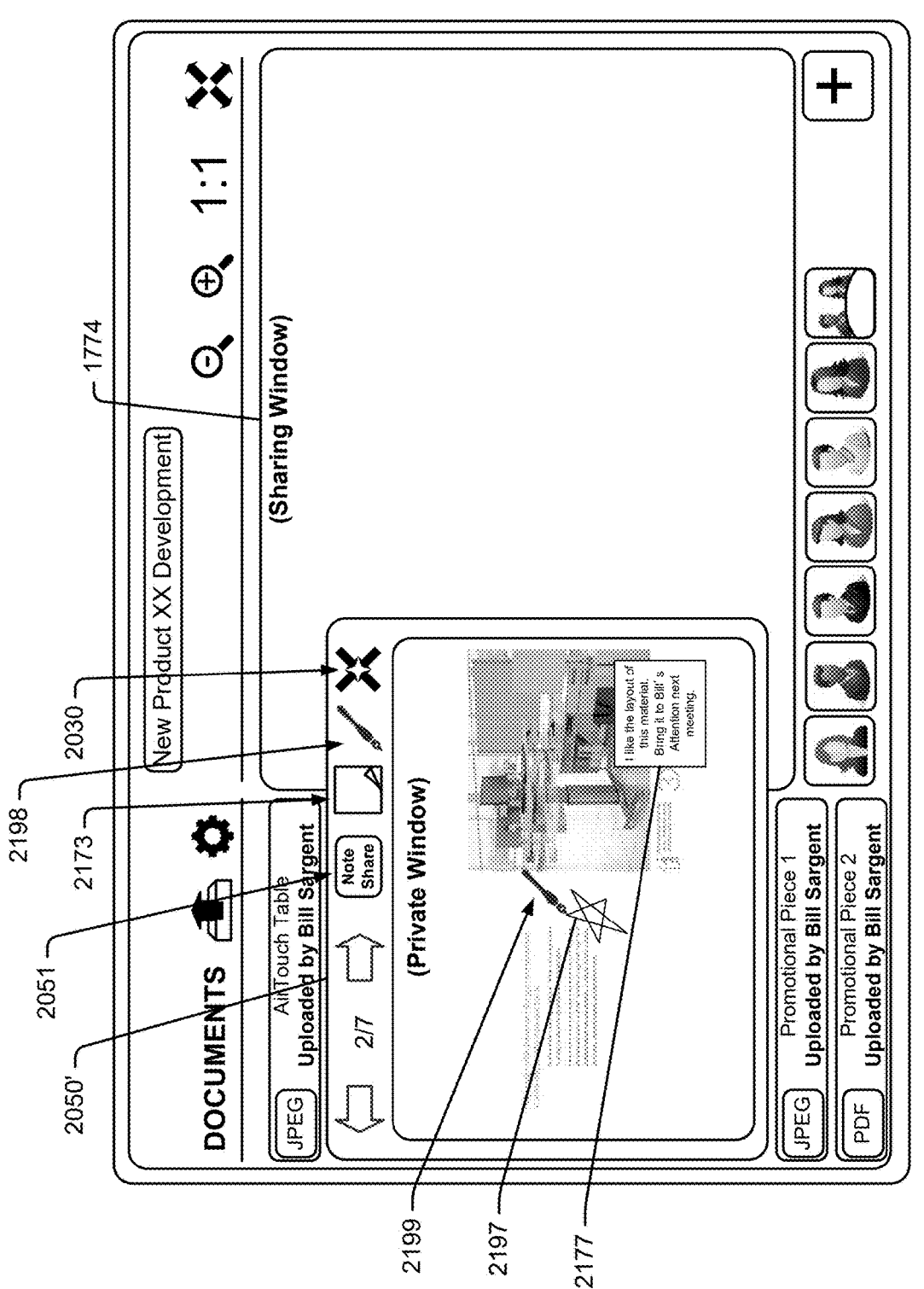
FIG. 80 is a screen shot showing the private window of FIG. 79 enlarged.

Other tools that may be presented for use in the private window are represented as icons in FIG. 80 and include a post note icon 2173 and an annotation icon 2198. The post note icon 2173 can be selected to add a note to any one of the document pages as shown at 2177. Each post note 2177 may be dragged about on the page presented in the private window via touch, an on screen cursor, etc., and dropped at a location at which the note should be posted. Annotation icon 2198 can be selected to enable annotation or drawing tools such as the pen shown at 2199 in FIG. 80 that can be moved via a mouse, touch of a user's finger or a stylus or in some other fashion to annotate a page in the private window. Annotations and post notes are stored along with the pages on which they are applied and can be removed and modified if desired. While tools 2173 and 2198 are shown presented as part of the larger private window 2050', those tools may also be provided as part of the smaller private window 2050 shown in FIG. 79. A shrink window icon 2030 is also provided along with the private window 2050' for shrinking larger window 2050' back down to the size of smaller window 2050.

Referring still to FIG. 80, when annotations (e.g., notes and markings) are added to a document page within private window 2050', in at least some embodiments those annotations may be added to all other instanced of the document maintained by the system regardless of whether or not those instances are currently being viewed by any of the conferees. For instance, where five conferees are patched into a session and one of the conferees opens a private window and annotates the fifth page of a seven page document, the system may automatically add the same annotation to the fifth page of each instance of the document maintained by the personal devices used by the other four conferees to participate in the session even if none of the conferees is currently viewing the fifth page of the document. In this manner any annotations or other comments added to documents within the queue can be annotated by anyone and any time any of the documents is opened by any conferee, the annotations can be viewed.

In other cases conferee annotations made on documents in the private window will remain private and will never be shared with other conferees. This private notation feature is useful as it would enable any conferee to think freely while taking notes on a document without concern for how annotations may be perceived by others.

In still other cases conferee notes and annotations made on documents in the private window may remain private until the conferee that authored the annotations moves a document or a page including the annotations into the sharing window 1776. By enabling a conferee to control when privately authored notes are presented to others, the system may enable a conferee to reveal private thoughts at a staged time as opposed to whenever any other conferee independently views private thought.

In still other cases, notes and annotations made in a private window may remain private and only be made public when a conferee takes some affirmative step to publish those notes to the larger group. For instance, referring again to FIG. 80, if a conferee annotates or adds a note to a document page in private window 2050' and then moves the document to sharing window 1774, the document may be moved to the sharing window and sent to other session linked devices without the annotations or notes. In this case, if the document is still open in the private window 2050', the conferee can use the notes in the private window to talk about the instance in the public sharing window 1774. If, at some point, the conferee wants to share the notes or annotations on a document page, a mechanism may be provided for doing so. For instance, in FIG. 80, a "Note Share" icon 2051 in the private window 2050' may be selected to publish notes and annotations from an instance of a document page in the private window 2050' to an instance of the document page in the sharing window 1774. Similarly, icon 2051 may be selected in some embodiments to publish notes and annotations to all instances of a document page regardless of whether or not a page is currently viewed in the sharing windows. Thus, for example, where annotations and notes are added to a document page in a private window 2050', at least initially the annotations and notes may not be added to other instances of the page cached by other session linked devices. Then, upon sharing notes via icon 2051, the annotations and notes may be transmitted to the other session linked devices to be added to the other instances of the page.

Other ways to empower a conferee to control when private annotations and notes are revealed to other conferees are contemplated. For instance, when a document including notes or annotations is moved to a shared window, the system may be programmed to provide a pop up window that presents the option to either show the document with or without annotations and notes. Here, the pop up window may pop up only when an annotation authoring conferee moves a document to the sharing window in some cases.

In other cases the system may be programmed so that, whenever any conferee moves a document to the sharing window, any conferee that has privately annotated an instance of the document being moved is presented with a pop up window to control if the private annotations should be shared. For instance, where five different conferees have privately annotated a ten page document in various ways, when any conferee moves an instance of the document to the sharing window, each of the five conferees that annotated the document may be presented with the pop up window for indicating if the private annotations should be shared. Here and in other cases, one or any subset of the conferees may share their private notes and if two or more share, the private notes of each sharing conferee would be added to the document in the sharing window and to each instance of the document stored by the system. In some cases the annotations may be color coded to the conferees that added the annotations. For instance, where conferee images or videos in conferee queue 1778 are highlighted with different colors, the annotations or notes may be color coded to the conferees that added the annotated or notes.

In still other cases separate notes and annotations on a document page in a private window may be published individually or as a subset of a larger group of annotations on the page. To this end, see again FIG. 80 where one annotation 2179 and one note 2177 have been applied to a page in the private window 2050'. If the document is moved to the sharing window 1774, at least initially, the document may be presented in space 1774 without the note and without the annotation and the instance of the document in the private window 2050' will persist along with the note and annotation. Then, the conferee may discuss the instance of the document in window 1774 with linked conferees. After a few minutes, if the conferee decides she would like to share note 2177 with the larger group but does not want to share annotation 2179, the conferee may drag note 2177 to the sharing window 1774 and drop the note in space 1774. Upon dropping the note, the note may be placed in the same relative location in window 1774 from which the note was moved in window 2050. In other cases the note may be dragged to the "Note Share" icon 2051 to place the note on the page in the sharing window 1774. Other tools for replicating a note or an annotation on a document page in the sharing space 1774 are contemplated.

In some cases a tool for selecting more than one annotation or note but not all on a page for publishing is contemplated. For instance, a lasso type selection tool may be provided so that, if there are five annotations on a page, a conferee can select two of the five by drawing a circle around the two. Thereafter the combined two annotations may be published together without the other three annotations.

Figure 81:
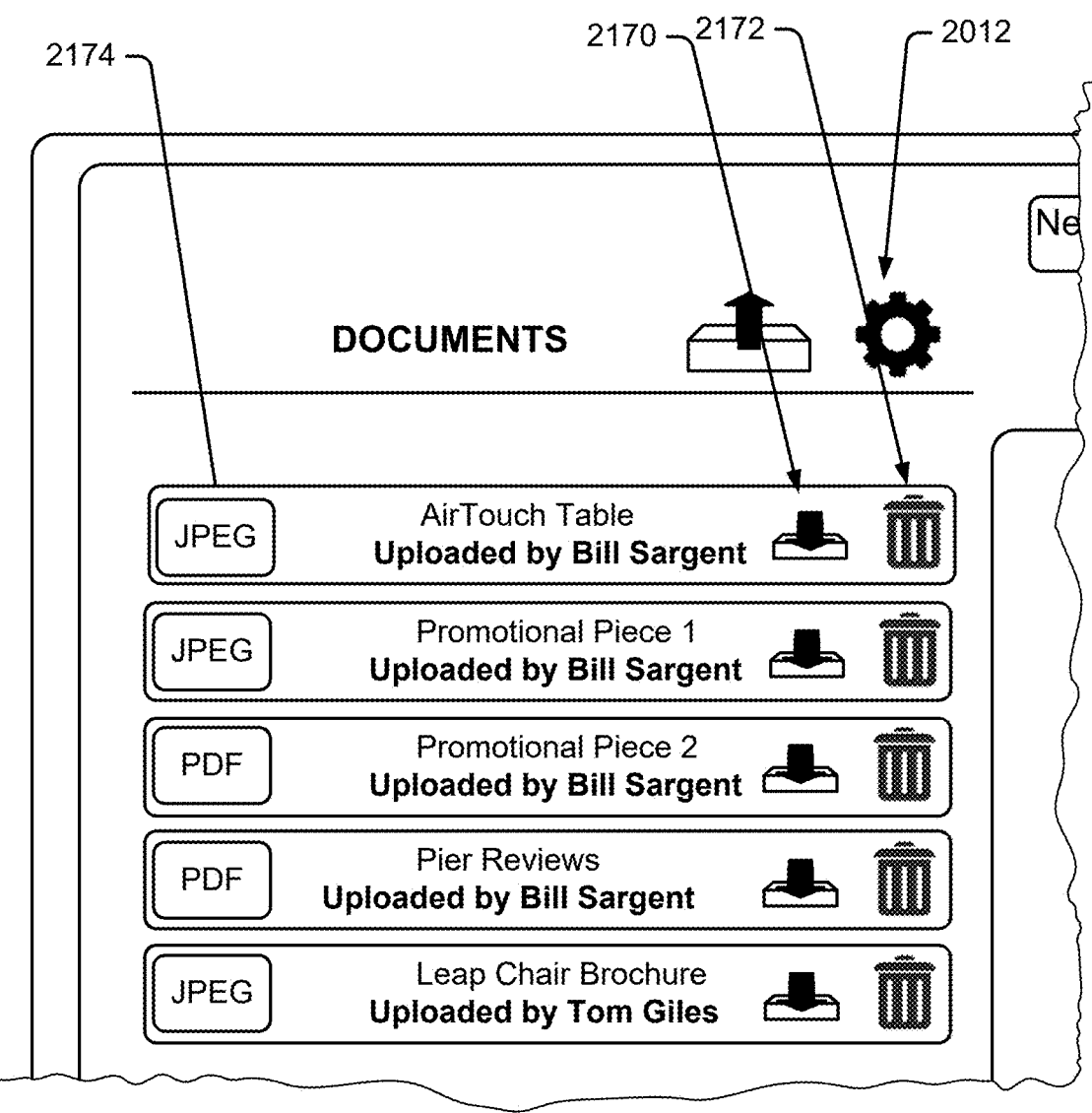
FIG. 81 is a partial screen shot showing download and trach tools for each queue document.

Referring again to FIG. 77, a utilities icon 2012 is also provided above the document queue that can be selected to further manage queue documents. In this regard, see FIG. 81 where icon 2012 has been selected and a download icon 2170 and a trash icon 2171 have been added to each of the document icons (e.g., 2174) in the document queue. Download icon 2170 can be selected to download an associated document to a conferee's own computer outside the session browser. For instance, in the case of a PDF, selection of icon 2170 causes a PDF viewer to open outside the session browser and an instance of the selected PDF document to be opened in the viewer via a single action (e.g., selection of icon 2170). The conferee can then privately store the open instance on the conferee's computer or perform any other function on the instance of the document (e.g., e-mail the document to someone else, annotate the document in a drawing program, run a tool like an optical character recognition program on the document, etc.). Any queue document can be trashed by selecting trash icon 2171 associated with the document icon.

To open a document in sharing window 1774, a conferee can select a document icon from queue 1776 and drag into window 1774. Here, the dragging action will cause a ghost version of the document icon to move along to window 1774 while the original document icon remains in queue 1776.

Figure 82:
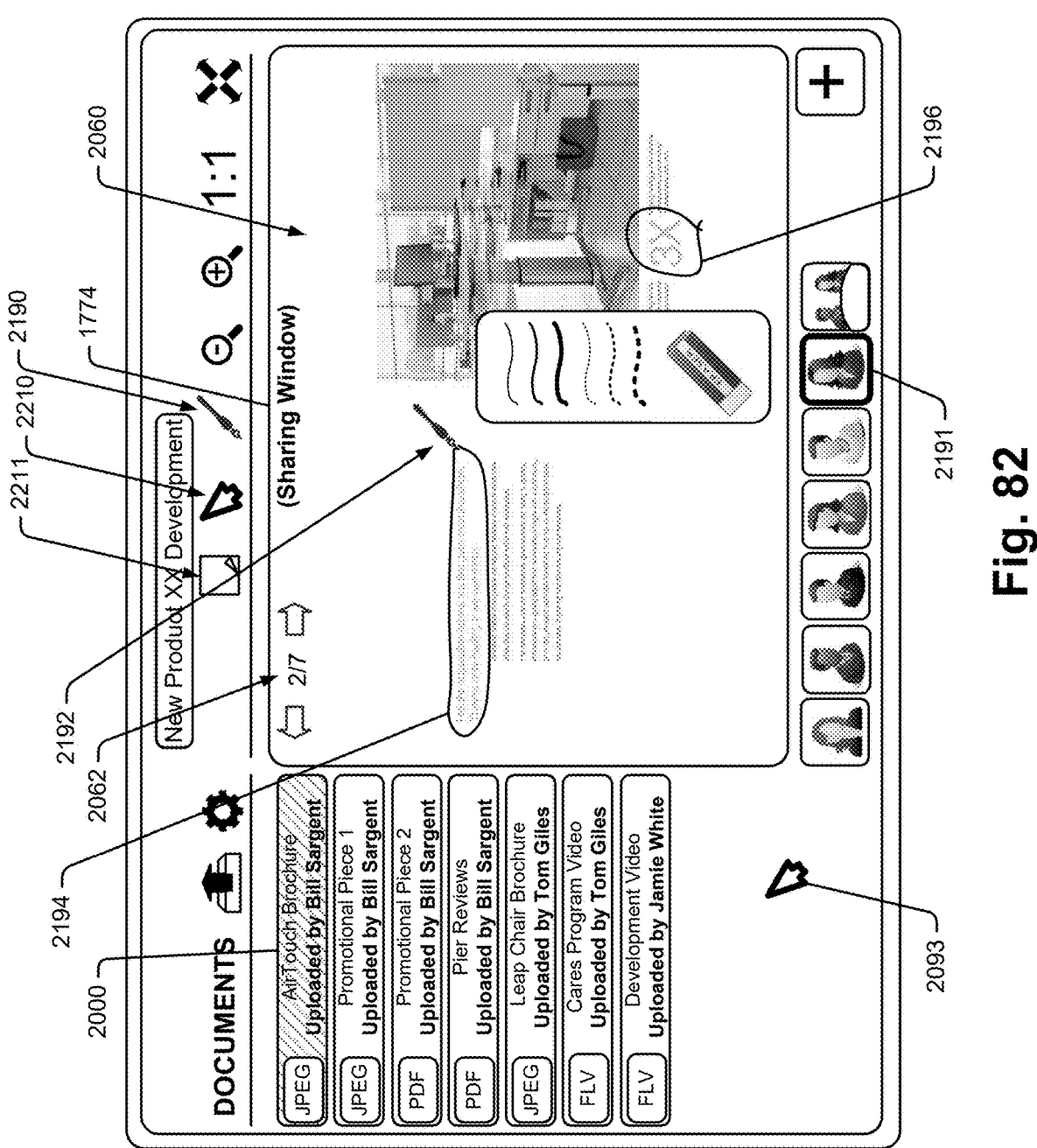
FIG. 82 is a screen shot showing a document opened in a sharing window with some annotations on the document.

As shown in FIG. 82, in at least some cases, when a conferee opens a document in sharing window 1774, the image or video icon showing the conferee that opened the document in the window may be highlighted or otherwise visually distinguished in some fashion (see cross-hatched icon at 2191). The icon may only remain highlighted for a set period of time (e.g. 7 seconds) or may remain highlighted until another conferee moves a different document into the window 1774, changes the page of the document within window 1774 or performs some other function like annotating or applying a note to a page in window 1774. Thus, the highlighted conferee icon may persistently indicate the last conferee to move a document to space 1774, the last conferee to annotate a document in space 1774 or the last conferee that performed any action in space 1774.

When a document is moved to space 1774, the document icon in the queue may be visually distinguished in some fashion. For instance, in FIG. 82, icon 2000 corresponding to the document in space 1774 is shown as cross hatched to indicate a change in color or some other visually distinguishing change. Compare the shadow box highlighting of icon 2000 in FIG. 79 which indicates a document opened in a private space with the cross hatched icon in FIG. 82 which indicates a document opened in the sharing window 1774 where the different highlighting is to convey the fact that a document is opened in different windows. As described below, a single document may be opened in a private space and in the sharing space 1774 and both highlights (e.g. cross hatching and the shadow box) may be applied to a single icon. Thus, in FIG. 82, the highlighted document icon indicates which document is opened in the sharing window 1774 as well as the conferee that initially uploaded the document to the session queue while the highlighted conferee icon 2191 in the conferee queue may indicate the last conferee to perform any function within sharing window 1774.

Annotation, note and pointing tools may also be provided for use by conferees within the sharing window 1774. To this end, see FIG. 82 where a screen shot includes annotation tool icon 2190, a pointing icon 2210 and a post note icon 2211. These icons 2190, 2210 and 2211 would be provided to all conferees in at least some embodiments. To use annotation tool icon 2190, a conferee selects the icon 2190 and is presented with an on screen pop up drawing window 2195 that enables the conferee to select a drawing effect. For instance, exemplary effects may include different thickness lines, solid or spaced lines, different color lines, an eraser, etc. The conferee can select a drawing effect and can then move a drawing icon 2192 about on the conferee's device display to annotate as shown at 2194 and 2196.

In at least some cases, when any conferee annotates a document page in sharing space 1774, the annotations are added to each instance of the document page shown by each of the other session linked devices essentially in real time and the annotations persist until they are erased. In other cases the annotations may be removed from a page when the document presented in space 1774 is replaced with another document. In still other cases annotations may be removed when a page in space 1774 is replaced by another page in the same document or by another document. In still other cases at least one of the drawing tools may only result in a temporary timed annotation. For instance, if the temporary drawing tool is used to apply annotation 2196 in FIG. 82, the annotation may only last 7 seconds and then fade away. This temporary annotation feature enables conferees to point out some aspect of a display in common space 1774 on all screens for a short time and then removes the annotation so that the page remains uncluttered. As in the case of the private window annotation tools, annotations in sharing window 1774 may be color coded to specific conferees (e.g., where the borders around conferee icons associated with Bill Sargent and Jamie White are red and blue, respectively, annotations by Bill and Jamie may be red and blue, respectively).

To use the post note tool 2211, a conferee can select icon 2211 causing a post note instance (not illustrated in FIG. 82 but see 2177 in FIG. 80) to be presented in sharing window 1774. The note can be dragged via a pointing icon 2093, the touch of a finger, etc., to a target location and dropped. When a note is dropped, in some cases a virtual keyboard may be presented to enable the conferee to type in text for the note. In other cases the note instance may be enlarged and enable a conferee to scribble via a stylus, a fingertip, etc., on the face of the note to add content. In this case, once the content has been added, the conferee can indicate completion and the note will be shrunk down to its original size (e.g., the conferee may signal completion by double tapping the note).

Notes may persist and may be mirrored on other session device displays in any of the manners described above with respect to annotations.

Referring still to FIG. 82, at least some conferee devices 1514 (see again FIG. 59) include a mouse or other device controlled pointing icon 2093 for selecting or moving (e.g., dragging) other icons about on a conferee's device display. When the pointing icon 2093 is outside sharing window 1774, the pointing icon is private and its location is not presented on the displays used by other session conferees. Here, however, in at least some cases, when a conferee moves a pointing icon 2093 into sharing window 1774 on the conferee's device display, the icon will appear in the sharing windows on other conferee display screens so that the conferee can point to distinct content or sections on a page. Each pointer icon in a shared window 1774 is duplicated in all other shared windows. Thus, for instance, where four conferees have located their pointer icons in space 1774, each of the four would be shown in each of the sharing windows on each display linked to the session. The pointing icons in at least some embodiments will be color coded so that conferees can comprehend which conferee is pointing at which sections of a shared page. Pointer tool icon 2210 can be selected to switch from the annotation tool to the pointing tool.

Referring yet again to FIG. 82, a progression tool 2062 akin to the progression tool 2052 described above is presented in sharing window 1774 for moving forward and backward within the document presented in space 1774. Any conferee can use tool 2062 to advance or move backward within a document.

Figure 83:
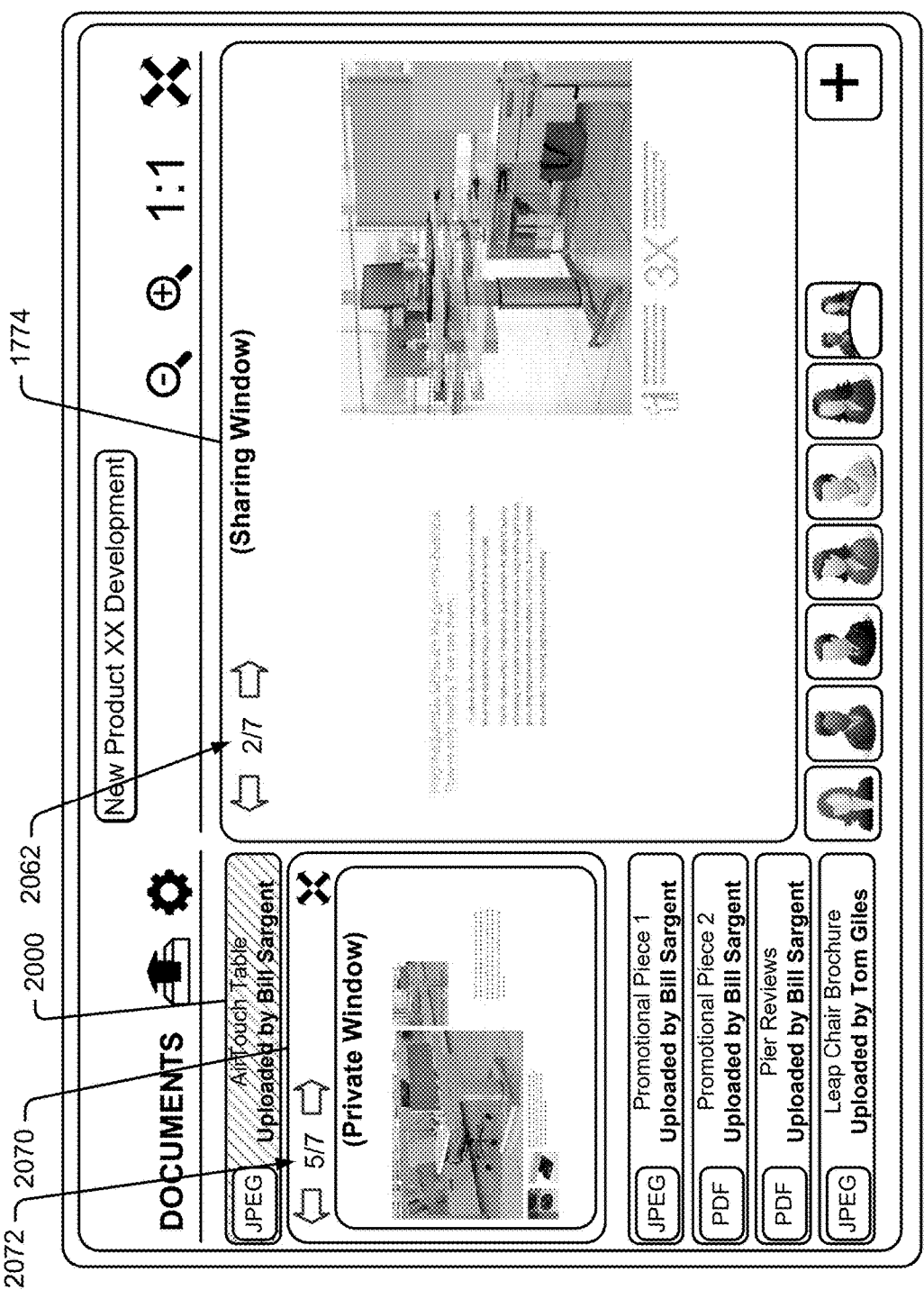
FIG. 83 is a screen shot showing different pages of the same document opened in a private window and a sharing window.

Referring now to FIG. 83, an exemplary screen shot from a device linked to a session is illustrated where a single document is opened in both a private window 2070 and in the sharing window 1774. The document icon corresponding to the opened document is highlighted in cross hatch to indicate that the document is open in the sharing window and is also highlighted with a shadow box to indicate that the same document is opened in the private window 2070. The progression tool 2052 associated with the private window indicates that the instance of the document in the private window is on page 5 of 7 while the progression tool 2062 associated with the sharing window 1774 indicates that the instance of the document in the sharing window is on page 2 of 7. Again, private window 2070 is only presented to the specific conferee that opens that window while any documents in sharing window 1774 are mirrors in the sharing windows on other devices linked to the session.

Figure 84:
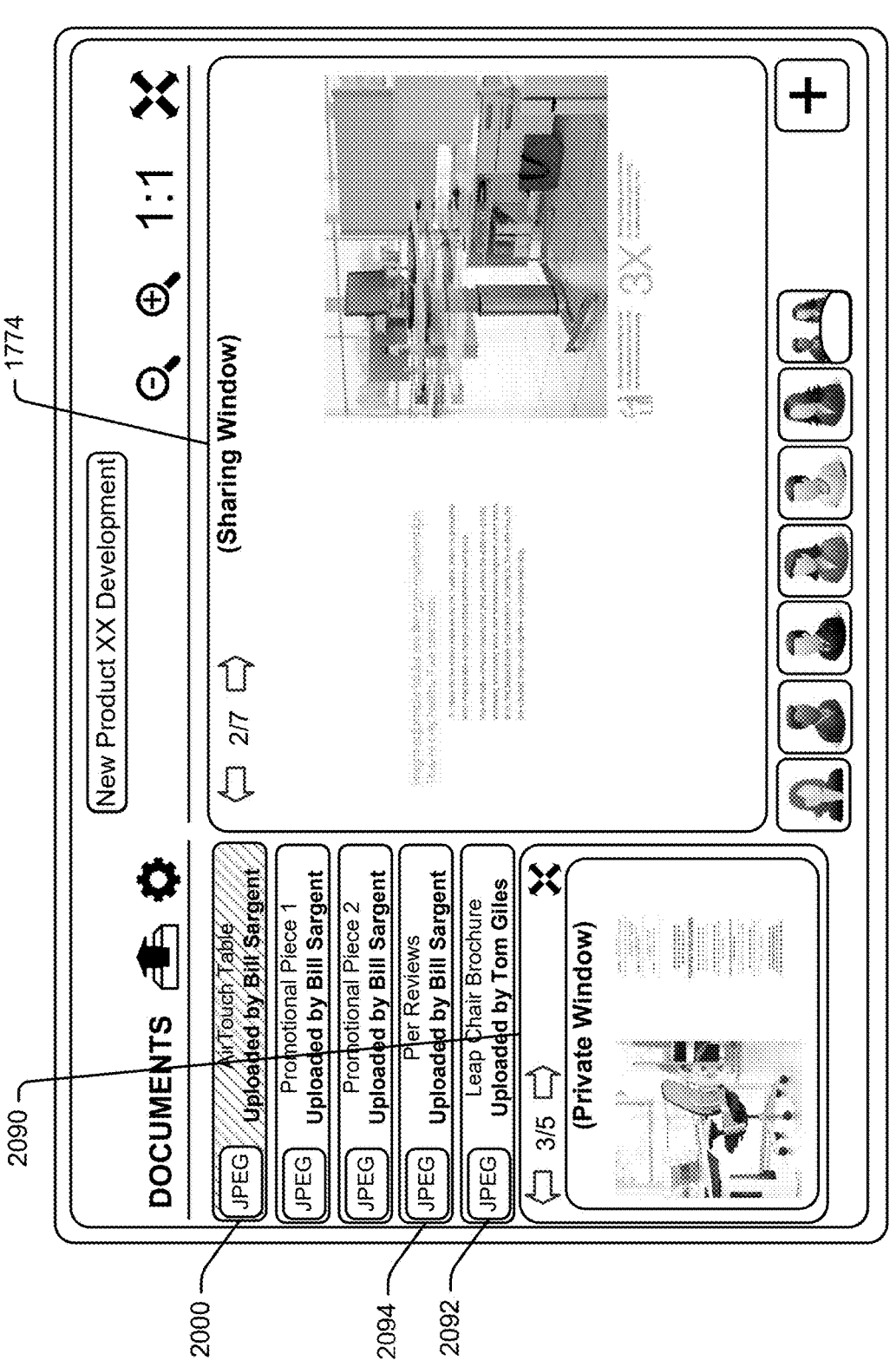
FIG. 84 is a screen shot showing different documents opened in a private window and in a sharing window.

Referring to FIG. 84, another screen shot of a session device display is shown where a first document is opened in the sharing window 1774 and a second document different from the first is opened in a private window 2090. Again, icon 2000 is shown cross hatched to indicate that the document associated therewith is shown in the sharing window 1774 while icon 2092 is shown with a shadow box to indicate that the document associated therewith is shown in the private window. As can be seen, the private window is always opened below the associated document icon to help a conferee understand which document is currently presented within the private window. Thus, in FIG. 84, if a conferee where to select a different document icon 2094, the private window 2090 under icon 2092 would close and a different private window (not illustrated) would be opened under icon 2094 for private viewing of the document associated with icon 2094 by the conferee.

Referring to FIG. 85, two partial screen shots 2100 and 2150 from two different device displays used by first and second different conferees linked to a single session are illustrated. In FIG. 85, a first document associated with icon 2000 is open in the sharing windows 1774 and therefore icon 2000 is shown in cross hatch in a manner consistent with that described above in each of the two partial screen shots. In addition, the second conferee using screen 2150 has opened the first document associated with icon 2000 in a private window 2156 and therefore icon 2000 in screen shot 2150 is also shown with a shadow box 2152 to indicate private viewing on the second conferee's display screen. Moreover, the first conferee using screen 2100 has opened a second document associated with icon 2104 in a private window 2106 and therefore icon 2104 in screen shot 2100 is shown with a shadow box to indicate private viewing on the first conferee's display screen. In the illustrated embodiment the private viewing highlights (e.g., shadow boxes) are only presented on screens used by conferees that opened a private screen and are not replicated for others to see.

In some other embodiments it is contemplated that at least some subtle indication of what other conferees are doing during a session may be replicated. For instance, referring again to FIG. 85, a shadow box (not illustrated) that is color coded to the first user using screen 2100 may be presented about document icon 2160 on screen 2150 to subtly indicate to the second conferee using screen 2150 that the first conferee currently has the document associated with icon 2160 open in a private window. A similar shadow box color coded to the second conferee may be presented about icon 2000 on screen 2100 to indicate to the first conferee using screen 2100 that the second conferee has the document associated with icon 2000 open in a private window. Here, while a subtle indication is presented, conferees are not distracted by more invasive indication (e.g., by making private windows more public).

Thus, in at least some embodiments, while all conferees linked to a session see the same document and page in sharing windows 1774 on their devices, each conferee has the option to view any queued document in a private window regardless of which document is in the sharing window and regardless of which documents are being viewed by other conferees in private windows.

In at least some cases it is contemplated that a conferee may not want to share a document with others in a session prior to presenting the document at a specific time during the session for some reason. For instance, a conferee may want to reveal a document for the first time during a session to make a specific impression. As another instance, a conferee may be unclear if a document will be of interest during a session and may want the option to not reveal the document until its importance becomes apparent. For example, a conferee may want to have relatively quick access to any of 40 documents during a session but may believe 5 of the 40 are important enough to be added to the common public session queue. As yet another instance, a conferee may want to privately gather many documents in a queue and then, prior to a session, may want to trim back the document set to a smaller subset for posting to the common public queue. To accommodate document gathering in a private way but nevertheless in a way that associates documents with a session, at least some embodiments of the disclosure contemplate providing a private queue for each conferee in addition to the common public queue where a conferee could select one or the other of the private and public queue for posting documents.

Figure 86:
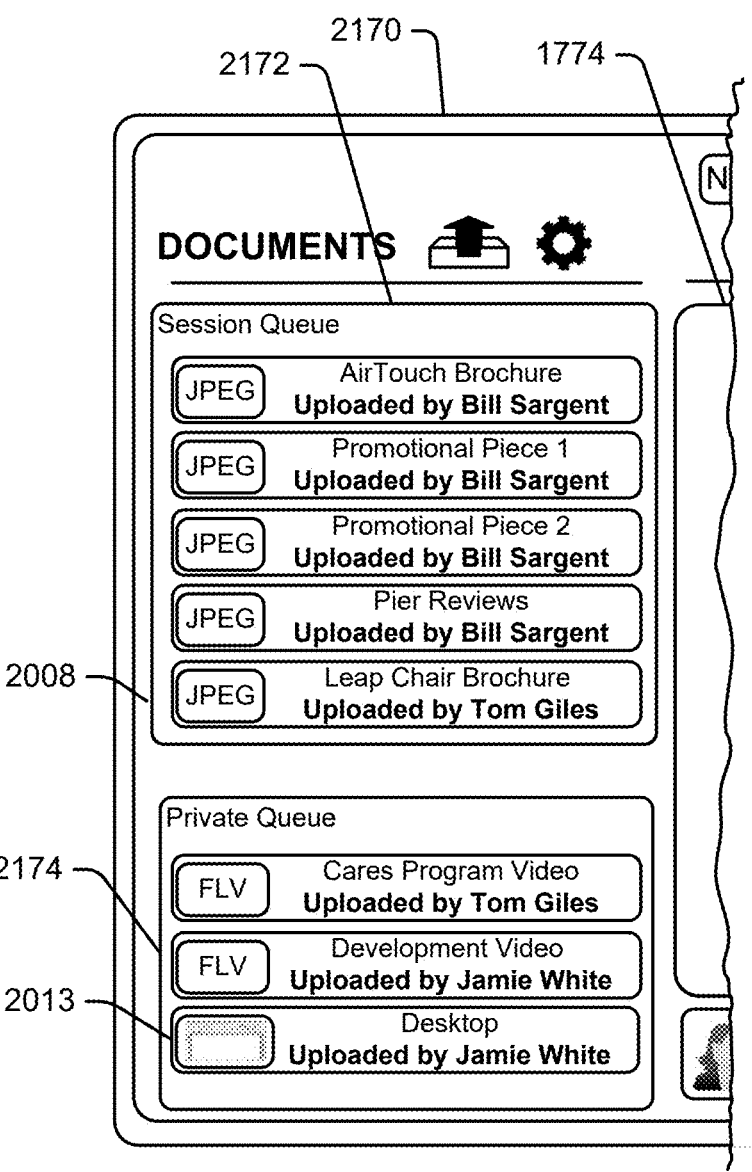
FIG. 86 is a partial screen shot showing a session queue and a separate private queue that is consistent with at least some aspects of the present disclosure.

Referring to FIG. 86, a screen shot 2170 including both a public queue 2172 and a private queue 2174 are illustrated. Here, it is contemplated that when a conferee adds a document to a session queue, there may be one additional step requesting the conferee to identify if the document is to be added to the conferee's private queue for the session or to the session public queue. Where a conferee selects private, the document is added sequentially to queue 2174 and an associated document icon is only presented to the conferee associated with private queue 2174. Where the conferee selects public, the document is added to queue 2172 and an associated document icon is added to the public queue for all conferees linked to the session to see. Here, it is contemplated that a conferee may move a document from the private queue 2174 to the public via dragging the document icon from queue 2174 to queue 2172. Here, icon dragging results in actual movement of a document icon from queue 2174 to public queue 2172. In addition, movement of an icon from queue 2174 to queue 2172 causes the system to transmit a copy of the document associated with the icon to each device linked to the session to be cached for quick access thereafter. Similarly, in some cases conferees that posted documents to public queue 2172 may be able to drag those documents out of queue 2172 to private queue 2174 to remove those documents from the public queue. In at least some embodiments a conferee would be prohibited from moving a document from the public queue that was posted there by a different conferee.

Figure 87:
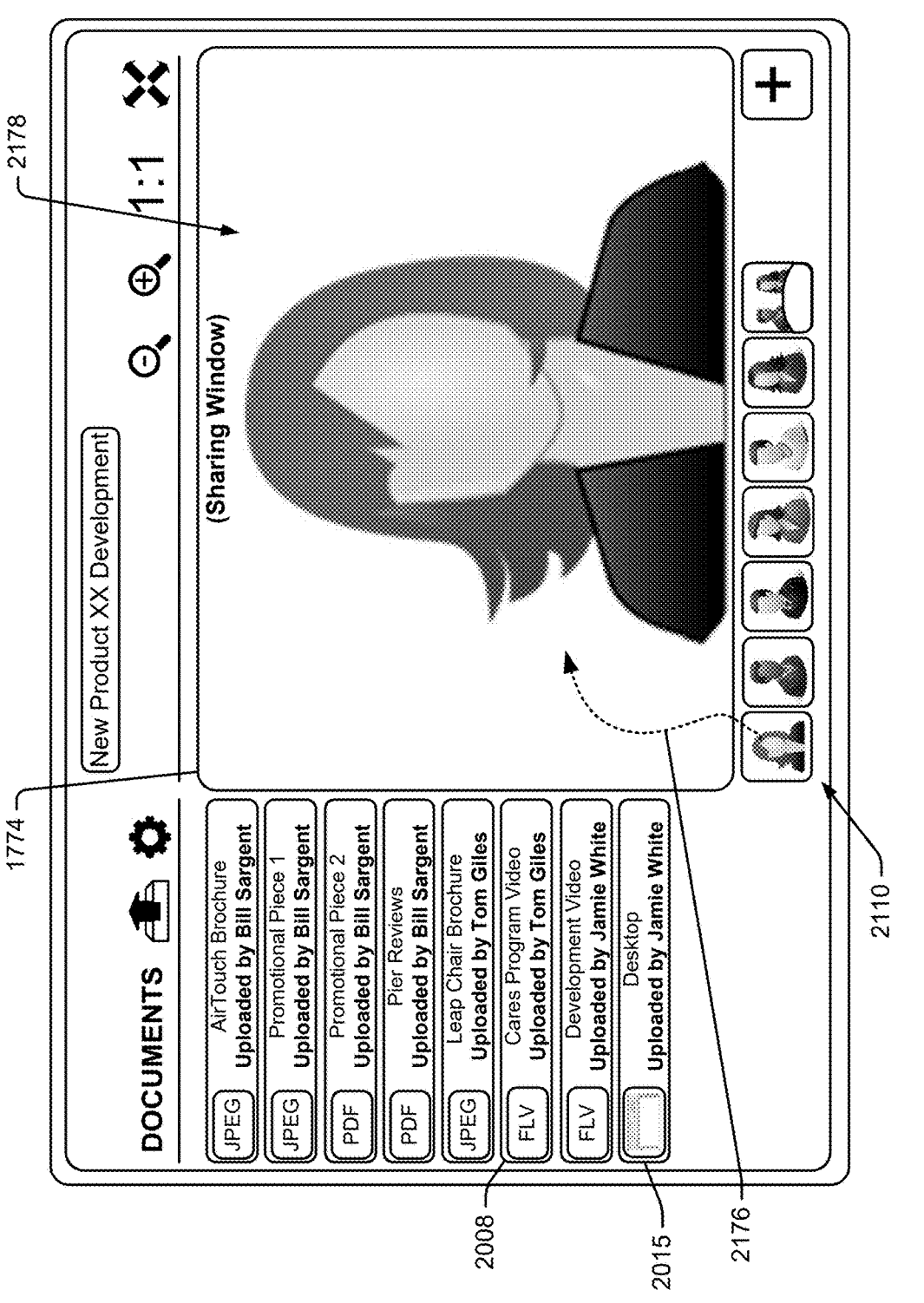
FIG. 87 is a screen shot showing a conferee's real time video image in a sharing window.

In addition to being able to present documents in sharing window 1774, in at least some embodiments where conferee devices are equipped with cameras, video of conferees may be presented in space 1774. To this end see FIG. 87 where a dragging action is indicated by arrow 2176 from a conferee icon 2110 to space 1774 to present video of the conferee associated with icon 2110 in space 1774.

In particularly advantageous embodiments of the present disclosure, prior to commencement of a conferencing session or just thereafter, all documents in the public session queue are transmitted to conferee devices for caching. Where the system server is "aware" of devices that will be used during a session, the server may transmit documents prior to commencement of the session. For instance, if certain conferees always use the same device or link to the same intermediate server when joining a session, document may be pre-transmitted and cached. In other cases, immediately upon a conferee linking to a session, queue documents may be cached. In most cases the caching process will only take tens of seconds and therefore can be accomplished at the beginning of a session while conferees are linking up and waiting for other conferees to join.

Figure 88:
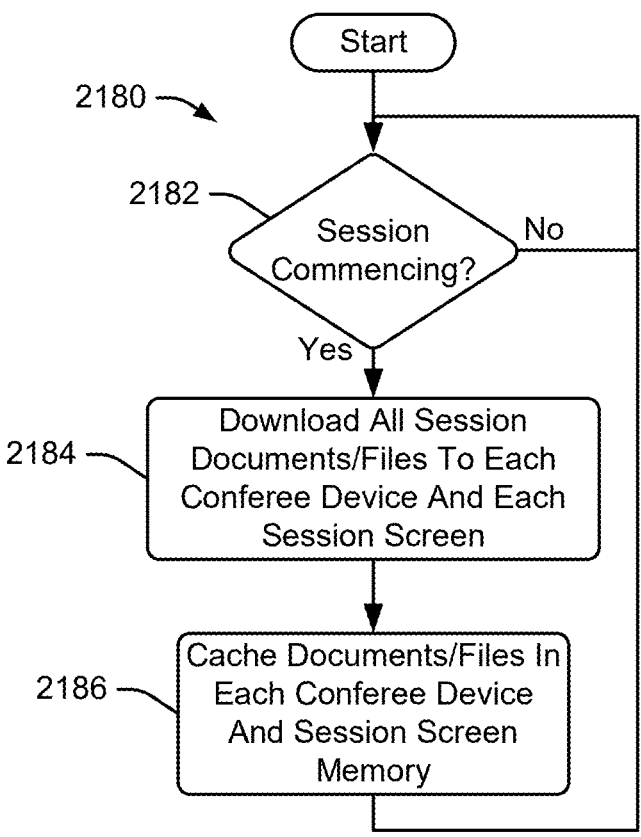
FIG. 88 is a flow chart illustrating a document caching process that is consistent with the present disclosure.

A simple caching process 2180 is illustrated in flow chart form in FIG. 88. At block 2182, the session server determines if a session is commencing and, if so, at block 2184, the server downloads all session documents or files to each conferee device and to each memory associated with each screen that has been invited to the session. At block 2186 the documents received by devices and invited screens are stored in caches associated with each device for subsequent use during the session.

Figure 89:
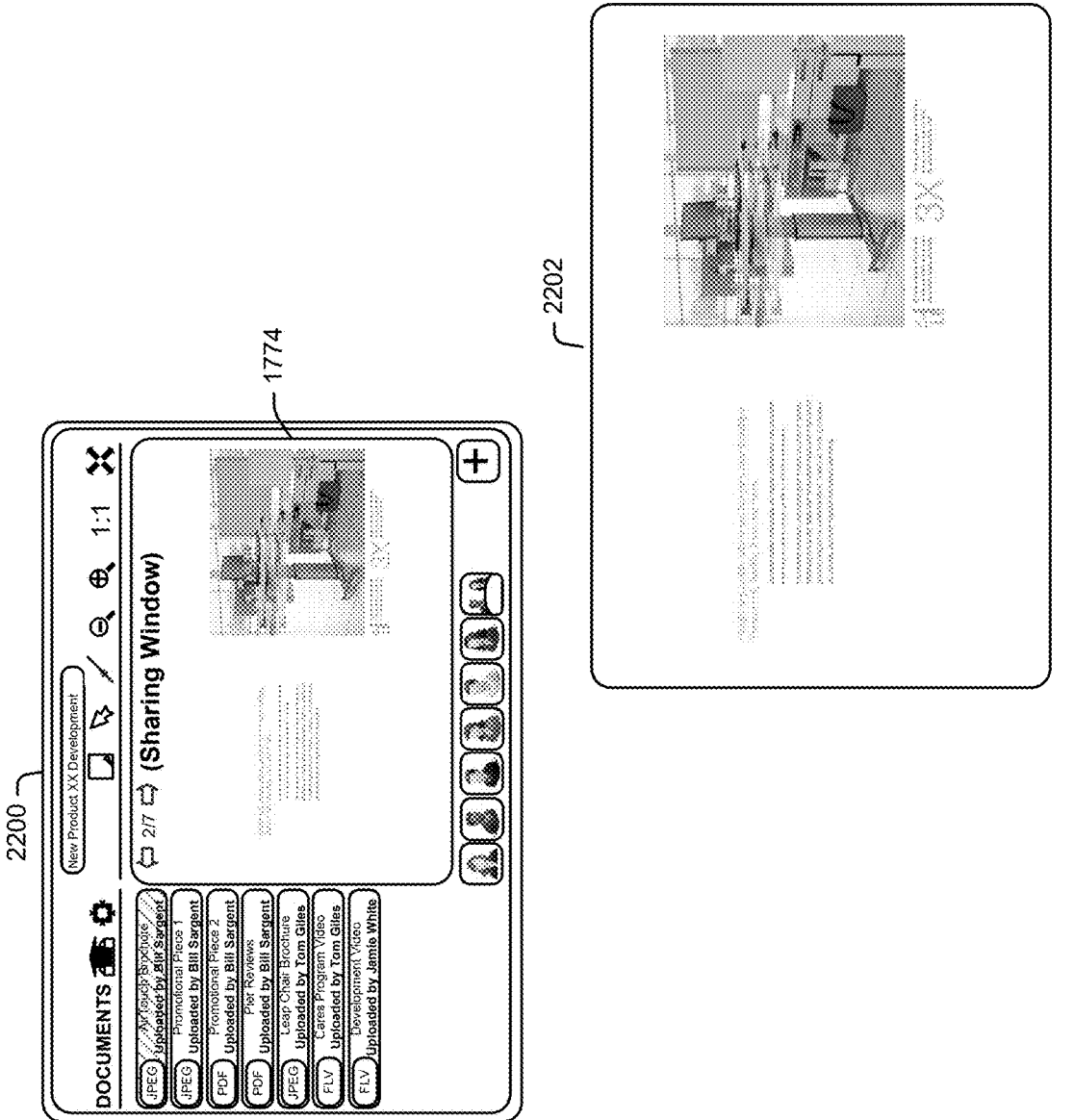
FIG. 89 shows a conferee device screen shot and a large display screen shot where the large display screen shot does not include session navigation tools while the device screen shot includes session navigation tools.

Referring again to FIG. 59, in many cases large common screens 1920 will only be equipped to operate as output devices and will have no input capability. In these cases, there is no reason to present input tools and icons on the common screens as they would be unusable. For this reason, it is contemplated that, in at least some cases, screens invited to sessions that do not have input capabilities may present only a shared window view instead of the conferee interface view described above so that the shared content can be presented in a larger format. For instance, see FIG. 89 where the conferee interface view is shown at 2200 and an exemplary invited large screen view is shown at 2202. The large screen or output view 2202 mirrors the content shown in sharing window 1774 on view 2200 and may not include any of the other information (e.g. the document queue, the conferee queue, the tools for page manipulation, etc.)

Figure 90:
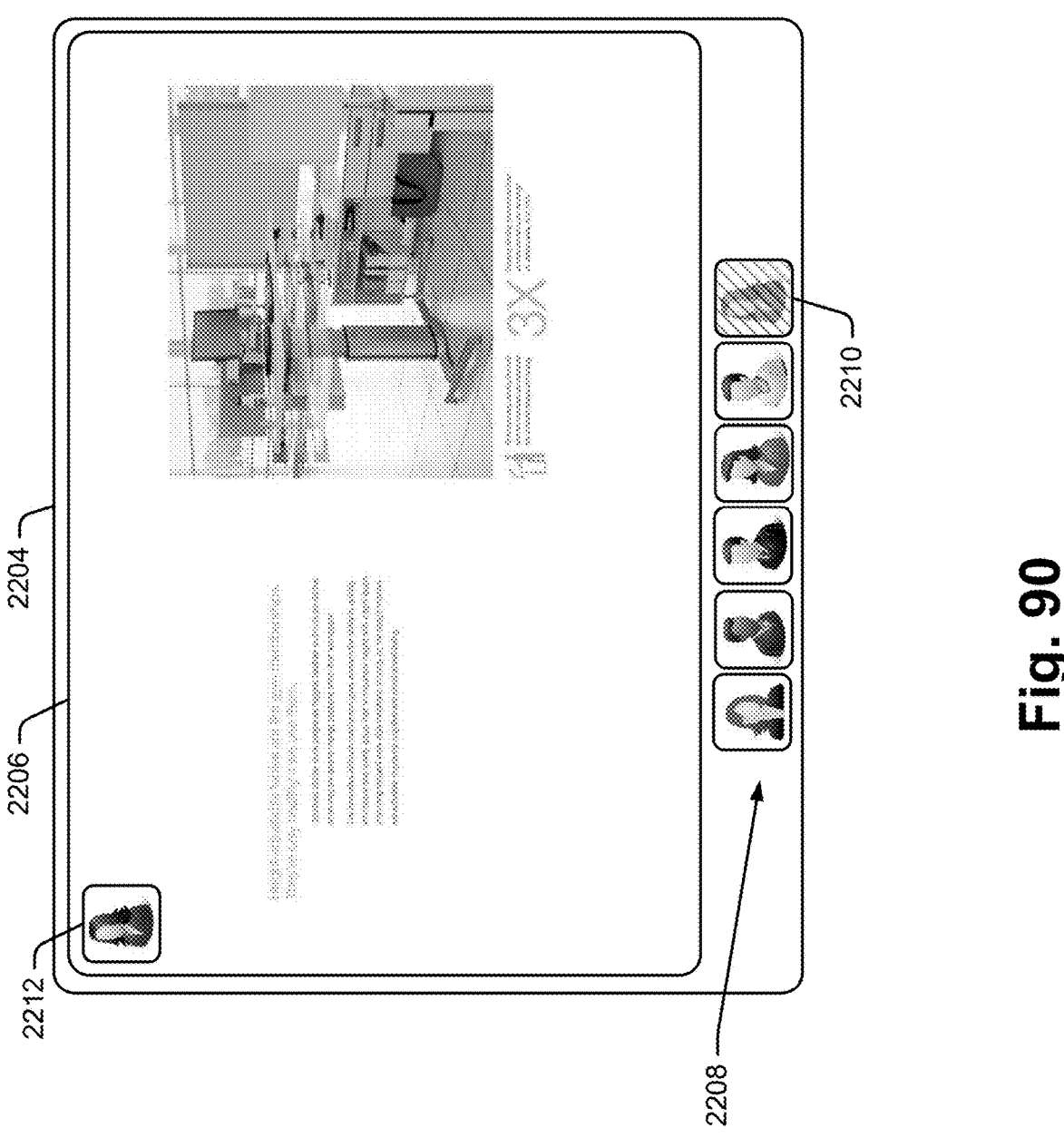
FIG. 90 is a large display screen shot that, in addition to showing a large representation of a session sharing window, also includes a conferee queue representation that shows conferees currently linked to a conference where a conferee icon associated with the conferee that opened the document currently in the sharing window is highlighted.

In other cases, the output view may include at least some indication of who is linked to a session and/or who has control of the session at any specific time. To this end, for instance, see FIG. 90 that shows an output view 2204 including a shared window 2206 and a conferee queue 2208 that shows images of videos of conferees currently linked to the session associated with the view. In addition to showing linked conferees, a currently active or more recently active conferee may be indicated via cross-hatching 2210 or otherwise visually distinguishing the conferee's icon in queue 2208. For instance, if the conferee associated within icon 2210 is the most recent conferee to have presented the page in space 2206, icon 2210 may be highlighted either for a short time or persistently until another conferee switches the page or the document shown in shared window 2206. In the alternative, a supplemental or "indicator" image 2212 of the conferee controlling the sharing window may be presented in a peripheral area of the sharing window or at some other discrete location outside the sharing window to indicate a current controlling conferee.

In other cases at least some of the large common displays used for a session will be interactive including a touch screen or the like so that one or more conferees can interact therewith to manipulate a session in ways described herein. In these cases a view similar to the view shown in FIG. 77 may be presented on a large common screen including queues and tool icons. In at least some cases it is contemplated that the system server 1512 may keep track of screen capabilities and automatically provide either a sharing window view or a user interface view depending on screen capabilities. In other cases each device linked to a session may indicate its capabilities to the server causing the server to select the interface to display.

In at least some cases it is contemplated that a location tracking system may be linked to the system server so that locations of personal and portable conferee devices used to link to sessions can be determined. Conferee device location could then be used to help a conferee identify resources available proximate a conferee's location that could be used to enhance a session. For instance, a conferee's device location and hence the conferee's location could be used to identify large display screens in the vicinity of the conferee that are available for linking to a session.

Referring again to FIG. 59, wireless access points or other sensors that can generate information useable to identify the locations of conferees within buildings or other spaces are shown at 2219. In the case of wireless access points, signals from several of the access points can be used to triangulate the location of a conferee's device within a space. In other cases the sensors 2219 may include entry or exit sensors in a doorway associated with a conference space or other proximity sensors that sense when a conferee's device is in a relatively specific area. Signals from the sensors are received by server 1512 and used to track device locations. In the alternative, a separate device tracking system may track and provide location information to server 1512. Then, when a conferee joins a conference session, the server can offer specific proximate large screens to the conferee for use to help the conferee narrow down optimal options.

Referring to FIG. 91, a schematic shows first and second large display screens 2220 and 2222 that may be mounted within a conference room as well as a conferee device display screen shot 2224 where a conferee has selected the add device icon 1782 to identify at least one common display screen proximate the conferee to be invited to the session. When icon 1782 is selected, invite window 2226 is opened which, among other things, enables the conferee to select additional screens to invite to the session. Window 2226 includes a "Proximate Screens" sub-window 2230 and a "Remote Screens" sub-window 2232. Any screen that is in the near vicinity of the conferee as recognized by server 1512 will be listed in sub-window 2230 and all other screens that may be invited are listed in sub-window 2232. In addition, screen identifiers XJ7002 and PJ6001 are displayed or presented on screens 2220 and 2222, respectively, to help the conferee distinguish one from the other. The identifiers are also presented in screen selection icons 2234 and 2236 which can be selected to invite one or both of screens 2220 and 2222 to the session.

It has been recognized that many common large display screens within space generally may have several different uses and the conferencing use may only be one of several uses. For instance, when not used for conferencing, a common screen may simply present a news program or may be programmed to loop through various advertisements or to present an interesting blog or may be programmed to perform any of several other functions. In these cases, a screen identifier like XJ7002 should not be presented all the time and should only be presented when a conferee is seeking a large screen for viewing a presentation. In this regard, referring again to FIG. 91, when a conferee selects icon 1782 to invite a proximate large screen, server 1512 may identify proximate large screens and control one or more of those screens to present a screen indicator like XJ7002 to aid in selection and on the fly configuration of session devices. This process of presenting other information and only presenting a screen identifier when a user indicates the need to link to a screen enables unfettered use of a screen to present any content while still enabling a conferee to link to the screen to facilitate a session when desirable.

Figure 92:
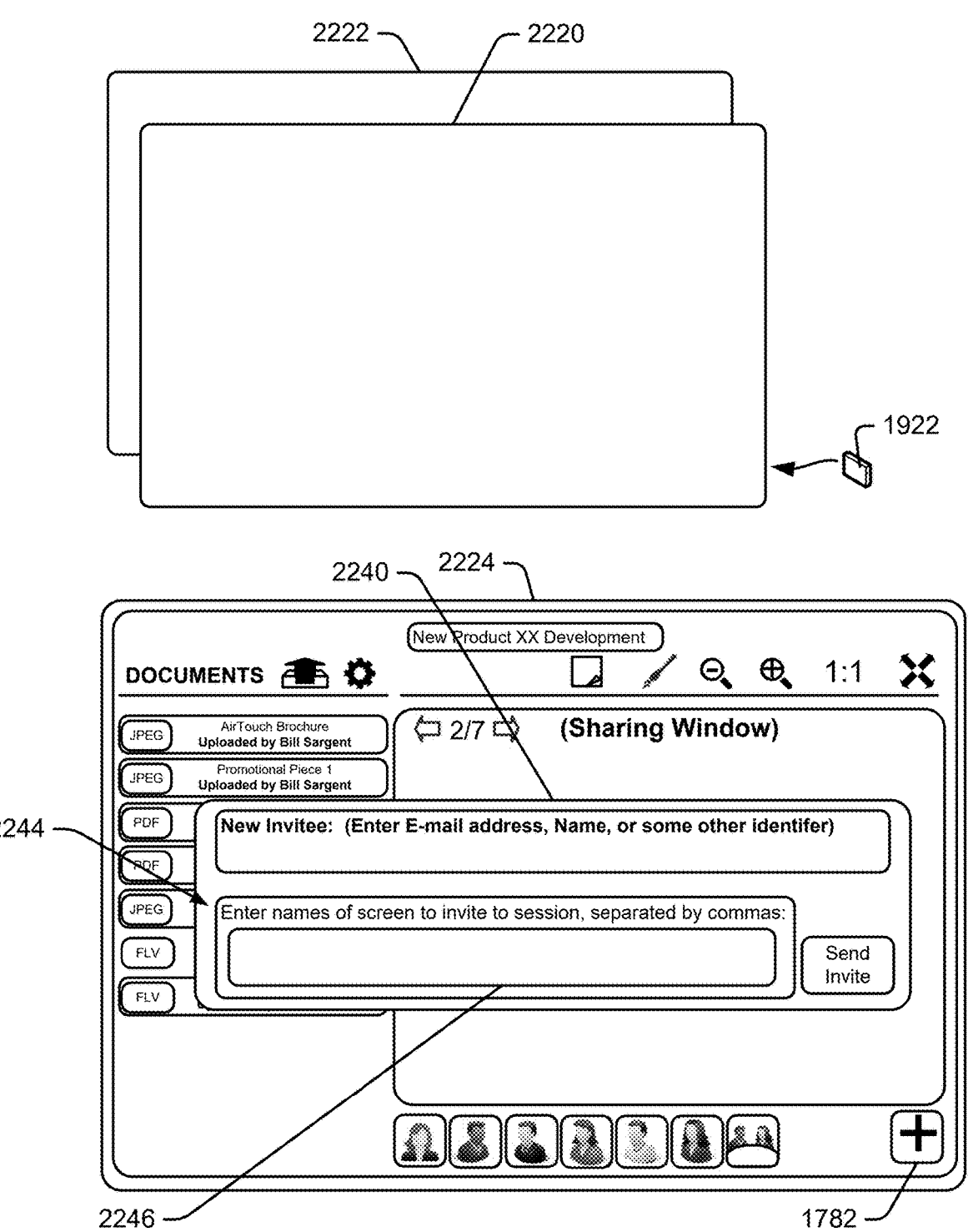
FIG. 92 is similar to FIG. 91, albeit where a dongle is used to render a large display screen linkable to a session where the dongle has not been linked to a large screen.

As described briefly above, in some cases a dongle or other portable wireless transceiver device may be linked to a common display screen to render the display addressable during a session. For instance, see FIG. 92 where large screens 2220 and 2222 are again shown along with a screen shot 2224 from a conferee's device display and a dongle 1922. In FIG. 92, the dongle has not been plugged into one of the screens. The conferee has selected icon 1782 to invite a large output screen to a session and that selection has opened window 2240 that requests that the conferee enter a screen name or identifier in a field 2246 to invite the screen to the session.

Figure 93:
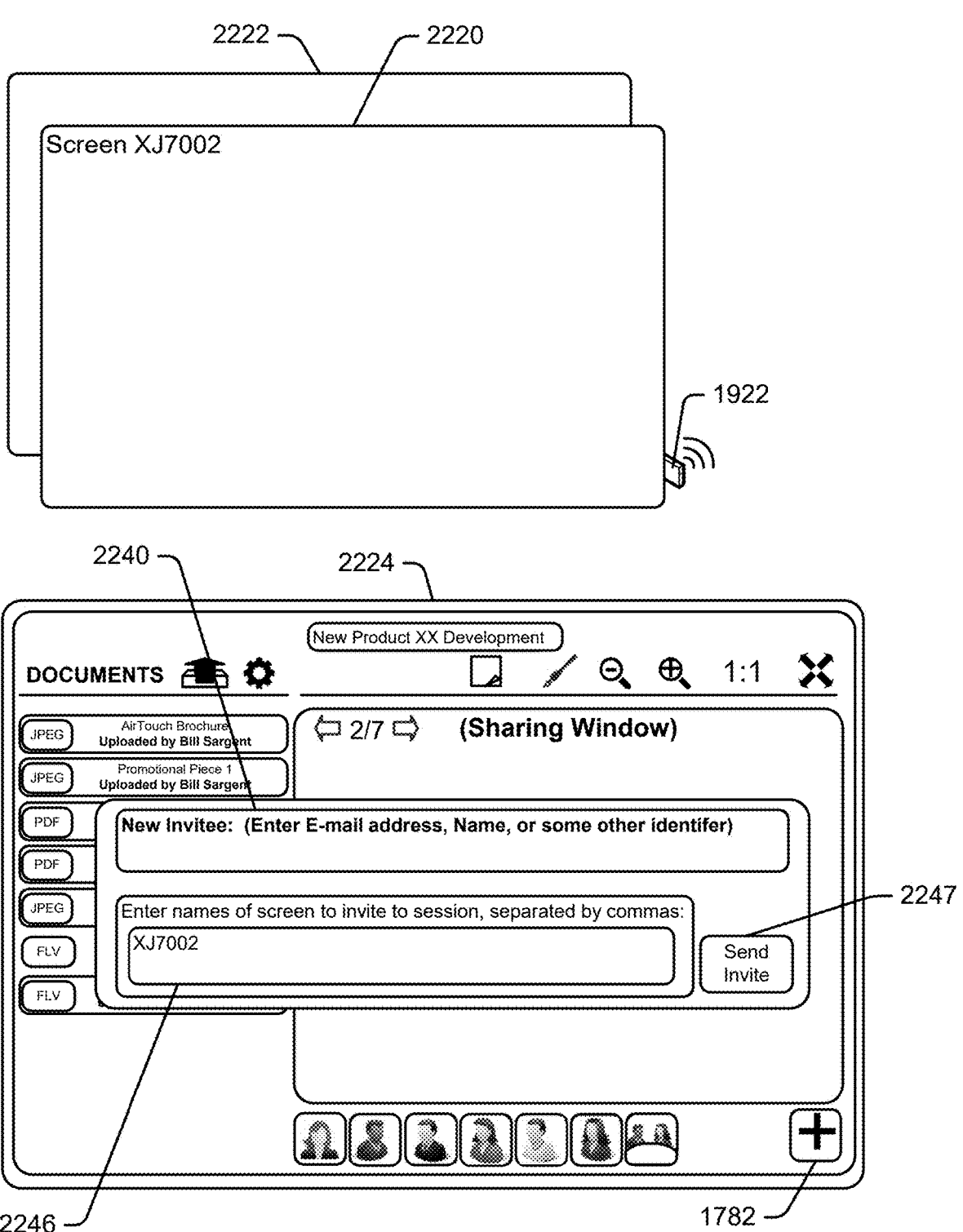
FIG. 93 is similar to FIG. 92, albeit where the dongle has been inserted and a conferee has entered a display screen indicator into an invite field.

Referring also to FIG. 93, the conferee plugs the dongle 1922 into an HDMI or other input port on the screen 2220. When the dongle is plugged in, the dongle runs a software program and, among other things, generates an identifier XJ7002 which is presented on the screen 2220. The conferee can enter the screen name in field 2246 to specify the screen to be invited. In the alternative, the dongle 1922 may transmit its identifier to proximate conferee devices and the conferee device having window 2240 open may automatically fill in field 2246. Once send invite icon 2247 is selected, server 1512 links to screen 2220 via a virtual network address, transmits session documents to the screen 2220 and a processor either in the screen 2220 or in the dongle 1922 caches the documents in memory for rapid access during the session.

Figure 94:
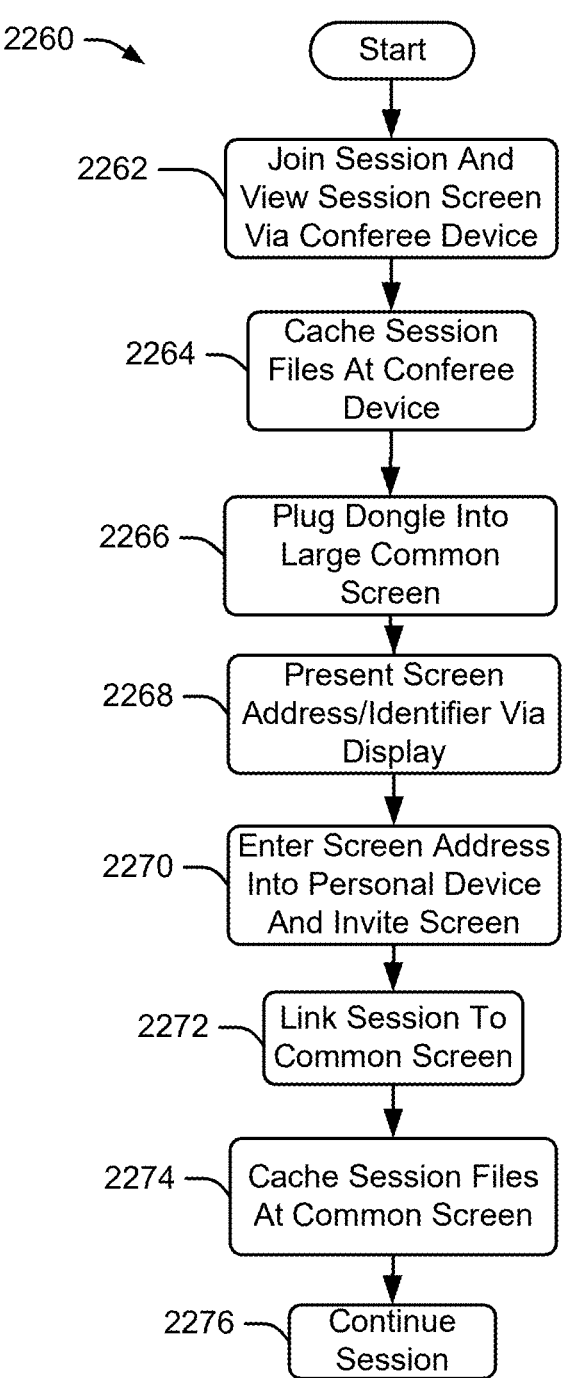
FIG. 94 is a flow chart illustrating invitation of a large screen to a session and a caching process whereby session documents in a queue are cached in a large screen memory or an add on dongle.

A process 2260 for using a dongle to link a screen to a session is shown in FIG. 94. At block 2262, a conferee uses the conferee's personal portable or other personal computing device to link to a session. At block 2264, the server 1512 (see again FIG. 59) transmits all of the session files to the conferee's device which are cached in a memory associated with the conferee's device. At block 2266, the conferee plugs the dongle 1922 into a large common screen that the conferee intends to invite to the session causing presentation of the screen address via the display at block 2268. At block 2270, the conferee enters the screen address into an address field (see 2246 in FIG. 93) causing the server 1512 to link to the screen associated with the entered address at 2272. At 2274, the server transmits the session files to the newly linked screen and at block 2276 the session continues, now with shared content on each of the conferee's personal device and on the newly linked large display screen.

It should be clear that in at least some embodiments of the present disclosure, any conferee that is invited to a session or that is linked to an ongoing session has the ability to invite large common screens to the session without having to interrupt the ongoing session and without requiring any authorization from other session conferees. In effect, a conferee can independently change her device viewing configuration without disrupting any other conferees. Similarly, any conferee that is invited to a session or that is linked to an ongoing session has the ability to invite other conferees to the session without seeking authorization from other conferees.

In at least some cases, where server 1512 can track locations of conferee devices used in a session, server 1512 may be programmed to delink from a screen when no conferees are proximate the display only screen. For instance, if conferees leave a conference room and are still participating in a conference session via their portable devices, server 1512 may delink from large display only screens in the conference room so that potentially sensitive documents are not presented in the conference room while conferees are absent.

Figure 95:
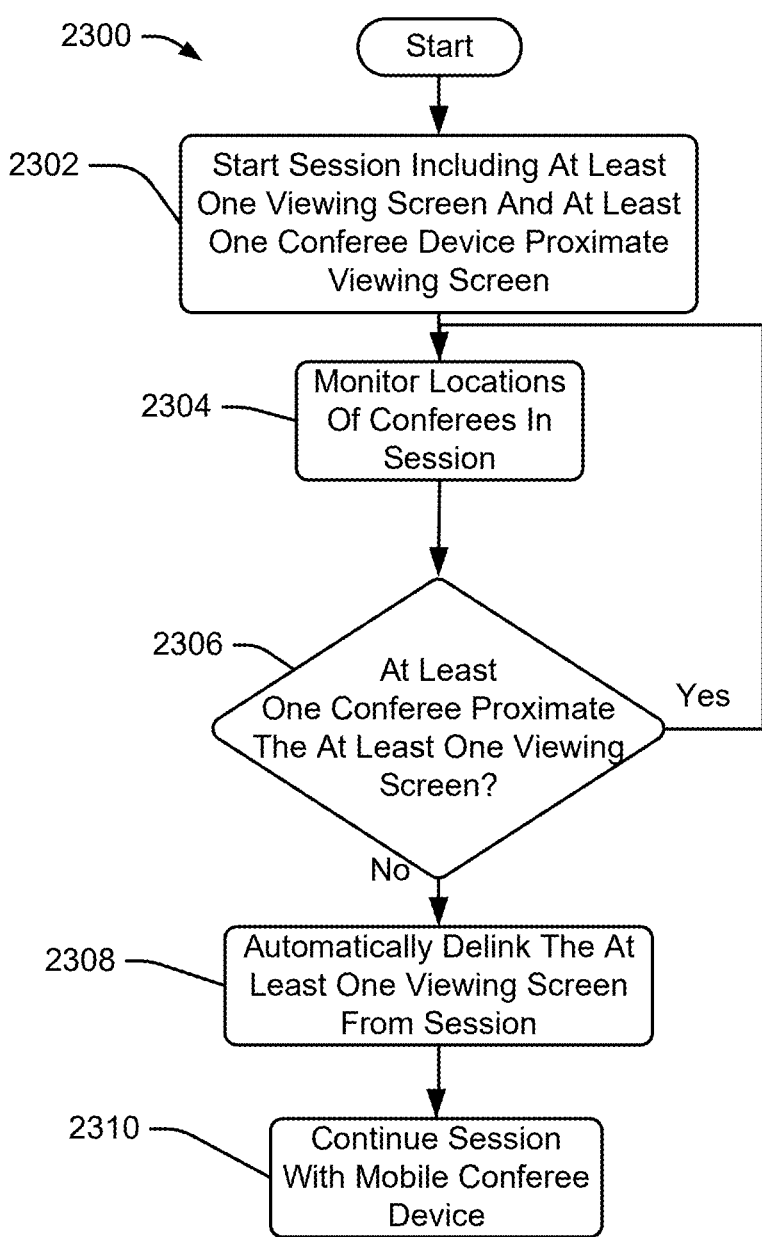
FIG. 95 is a flow chart illustrating a process whereby, if no conferee devices are located proximate a large display screen that is linked to an ongoing session, the large screen is dis-associated with the session.

Referring to FIG. 95, a process 2300 for delinking a session from common screens when conferees move away from the common screens is illustrated. At block 2302, a session is started including at least one common viewing screen and at least one conferee device that is proximate the viewing screen. At block 2304, server 1512 monitors the locations of conferees in the session by monitoring the locations of the conferee devices. At block 2306, server 1512 determines if at least one conferee is proximate the at least one common viewing screen. Where at least one conferee remains proximate a common viewing screen, the session remains linked to the common screen as control loops back up to block 2304. If at least one conferee is not proximate the common viewing screen, control passes to block 2308 where server 1512 delinks the session from the common viewing screen. At block 2310 the session continues with other devices linked to the session including the mobile or portable conferee devices.

In some cases when a last conferee leaves a space in which a common screen is presenting a session, server 1512 will present a query in a pop up window (not illustrated) asking the conferee if the session should be delinked from the common screen. In this case, the conferee could allow the session to continue on the common screen for some reason. For instance, if the conferee is only leaving the conference space for 5 minutes the conferee may want to continue to present the session on the common screen to avoid the need to re-link to the session. As another instance, there may be conferees in the space viewing the session on the common screen that do not have personal devices linked to the session and the conferee leaving the session may not want to cut off the other unlinked conferees from the session.

In some cases when a last conferee leaves a session, the session may remain linked to the common screen but the common screen may be blanked out or otherwise may show a different scene than the session view until one of the conferees with a device linked to the session again enters the conference space. When a conferee reenters a space, the server may automatically re-present the session in its current state. In the alternative, the server may offer the conferee the choice to represent the session on the common screen in its current state.

In many cases one conferee may have access to two or more screens and may prefer to present some session content on a second personal screen during a session. For instance, many people today use both a laptop and a tablet type computing device (e.g., an Ipad, an Android pad, etc.), where each of the laptop and the tablet device includes a separate display screen. In at least some embodiments it is contemplated that a conferee may be able to invite two personal display devices to a session where the second display device can be used as a private second screen for viewing an additional document view.

Referring again to FIG. 91, in addition to the features described above, the exemplary invite window 2226 includes a "My Second Screen" icon 2231. When icon 2231 is selected, either a pre-input address of the conferee's second device (e.g., a phone number or other identifier) is used to invite the second device to the session or the conferee is queried for the address of the second device which the conferee can manually enter. Once server 1512 has the address of the second device, server 1512 links to that device and transmits the session documents thereto to be cached in a memory associated with the second device. In addition, server 1512 stores a flag indicating that the second device is a second personal device for the conferee so that the second device can be driven in a different fashion than a primary display device.

Figure 96:
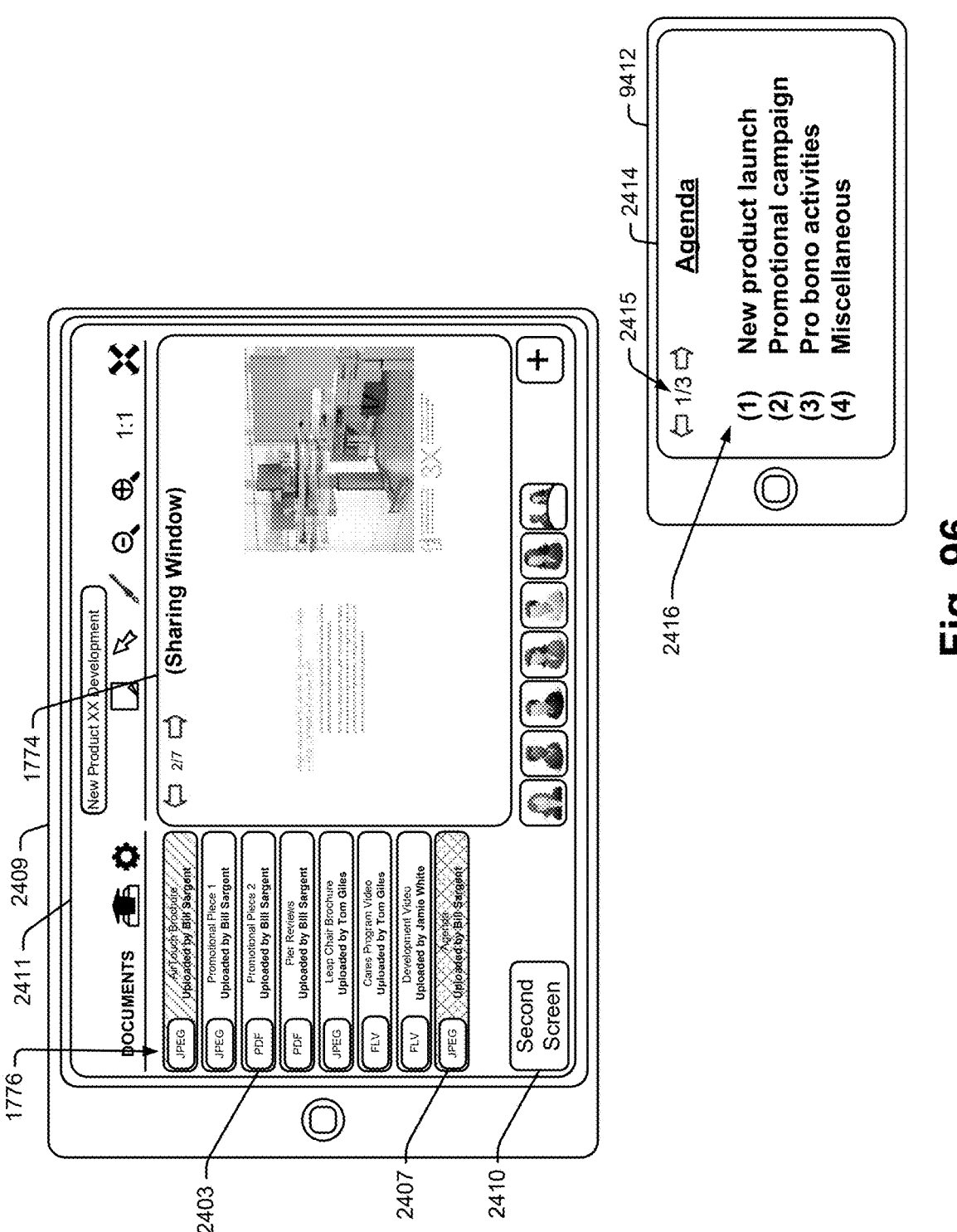
FIG. 96 shows a tablet type computing device and a smart phone type computing device that are used by a single conferee where different session content is presented on each of the devices.

Referring to FIG. 96, a first or primary device 2409 and a second or secondary device 2412 are shown that include a tablet type device 2409 and a smart phone type device 2412. The primary device screen 2411 looks similar to the screens described above with two exceptions. First, screen 2411 includes an icon 2410 associated with the second device 2412. Second, screen 2411 includes an icon 2407 that is shown double cross hatched to indicate that the document associated therewith is currently being presented on the second device display which is labeled 2414. The second device display 2414 presents the second document that is associated with highlighted icon 2407 at 2416 which, in the present example, is an agenda for the session. Here, the second screen 2414 presents only a viewing image with a stripped down interface that includes a progression tool 2415 for changing the page of the document presented on screen 2414. The presented second screen 2414 does not include any other interface tools, a document queue, a conferee queue, etc., each of which is presented via display screen 2411. Instead, the instance of a document presented via screen 2414 is enlarged to the maximum size so that the document can be viewed relatively easily.

In the FIG. 96 example, a conferee can use the queues and other tools presented via device 2409 in the same manner that is described above. In addition, the conferee can change the content on the second screen 2414 via actions on the first screen 2411. For instance, the conferee can change the document presented on the second screen 2414 by simply dragging a different document from the queue 1776 to the second screen icon 2410. If a different document is dragged to icon 2410, the icon associated with the dragged document in the queue would be highlighted with double cross hatching to indicate that the document associated there with is presented on the second screen 2414 and document icon 2407 highlighting would be removed.

In the FIG. 96 case, the content on the second screen 2414 may only be for use by the conferee that invited the second screen and may not be mirrored on other session screens. In this case, the second screen operates like a private window. In the alternative, where at least two conferees use a second screen, in at least some cases, all second screens may be mirror images of the other second screens linked to the system. Thus, for instance, where each of two conferees use two devices as in FIG. 96 to access more information during a session, the server 1512 may automatically associate the second display screens with each other so that any document or page presented on one of the screens is automatically and essentially in real time, presented on the other of the second display screens. For example, in FIG. 96, assume that each of first and second conferees are viewing the same first and second screens 2411 and 2414 on their own devices at two disparate locations. Here, if the first conferee drags document icon 2403 into the second screen field 2407, the document associated with icon 2403 would be presented on screens 2414 on each of the first and second conferee's second devices. Thus, remote conferencing using multiple screens that can be associated with each other on the fly is contemplated.

Figure 97:
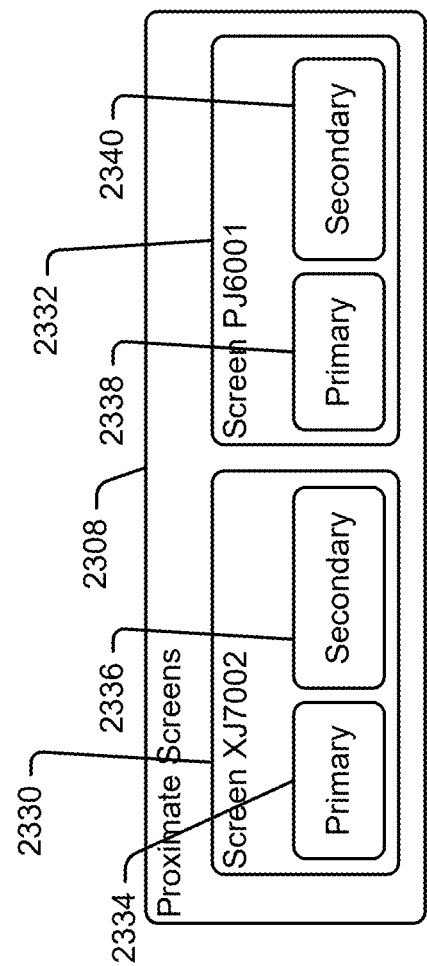
FIG. 97 shows a window that may be presented via a conferee's device display screen for designating screens as primary or secondary when a screen is invited to a session.

In addition to being able to invite two personal devices to a session, in at least some embodiments it is contemplated that several proximate common screens may be invited to a session so that two or more document may be viewed on the proximate screens at the same time. In this regard, see FIG. 97 where a sub-window 2331 that may replace sub-window 2230 in FIG. 91 is illustrated for specifying if a common screen is to be used as a primary display device or a secondary display device. In FIG. 91, when a conferee selects icon 1782 to open the invite window 2226 including sub-window 2308, different controls 2330 and 2332 for two proximate screens (see again 2220 and 2222 in FIG. 91) are presented. Control 2330 allows a conferee to specify if screen XJ7002 is to be used as a primary screen 2334 or as a secondary screen 2336 while control 2332 allows the conferee to specify if screen PJ6001 is to be used as a primary screen 2338 or a secondary screen 2339.

Figure 98:
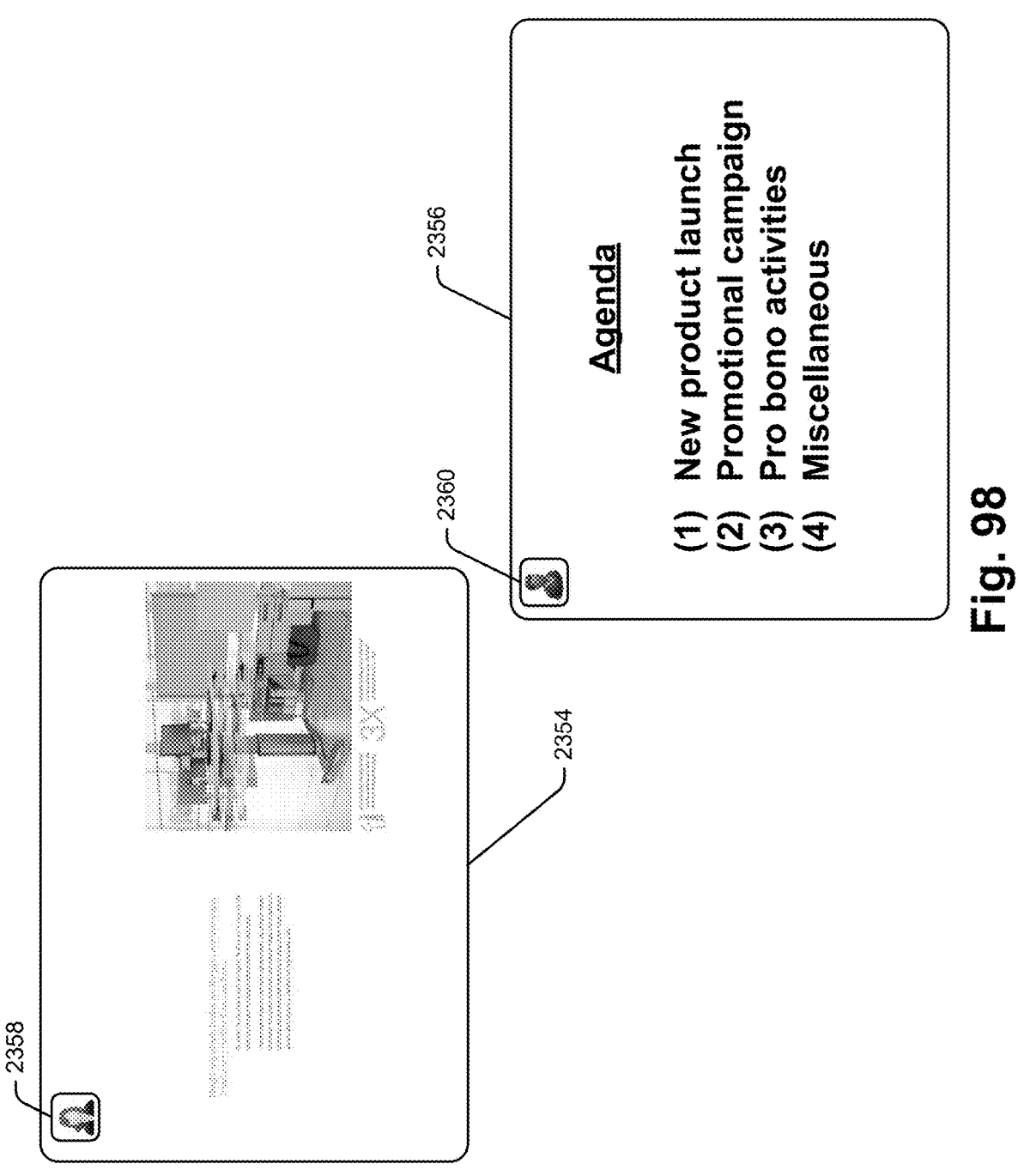
FIG. 98 shows two screen shots correspond to two large display screens that may be used during a conferencing session.

In at least some cases a secondary common screen will only be available in systems where the server mirrors content on all secondary screens so that conferees with two screen access always see the same content on each of the first and second screens. For instance, see FIGS. 96 and 98 where two different documents in widow 1774 and on screen 2414 are mirrored on two large common display screens 2354 and 2356. Icons 2358 and 2360 indicting via an image or video of conferees which conferee moved each document to the sharing spaces are shown. In other cases where at least one of the common screens is also an input device (e.g., a touch sensitive screen), the input capable screen may present the complete control interface as shown at 2411 in FIG. 96 and the second screen may be controlled in a semi-private fashion without mirroring the second screen on other session device displays.

In other embodiments it is contemplated that two sharing windows may be presented on each or at least a subset of conferee device displays or perhaps on all conferee device displays so that first and second documents can be viewed at one time by the subset or all of the conferees. To this end, see FIG. 99 which shows a screen shot that includes a second sharing window 2352 that is smaller than primary sharing window 1774. Here, any conferee can move any document into sharing window 2352 by dragging an associated document icon from the queue 1776 into space 2352. When a conferee changes the document viewed in window 2352 on the conferee's screen, the document in other secondary spaces on other conferee devices is similarly changed. Here, clearly the image in the larger sharing space 1774 is easier to view than the image in the second space 2352. To switch the documents among the two spaced 1774 and 2352, any conferee can drag a document from space 2352 to space 1774 or vice versa. Here, in at least some embodiments an icon including the image or video of the conferee that moved the most recent document into each of spaces 1774 and 2352 may be spatially associated with the space as shown at 2355 and 2357.

Figure 99:
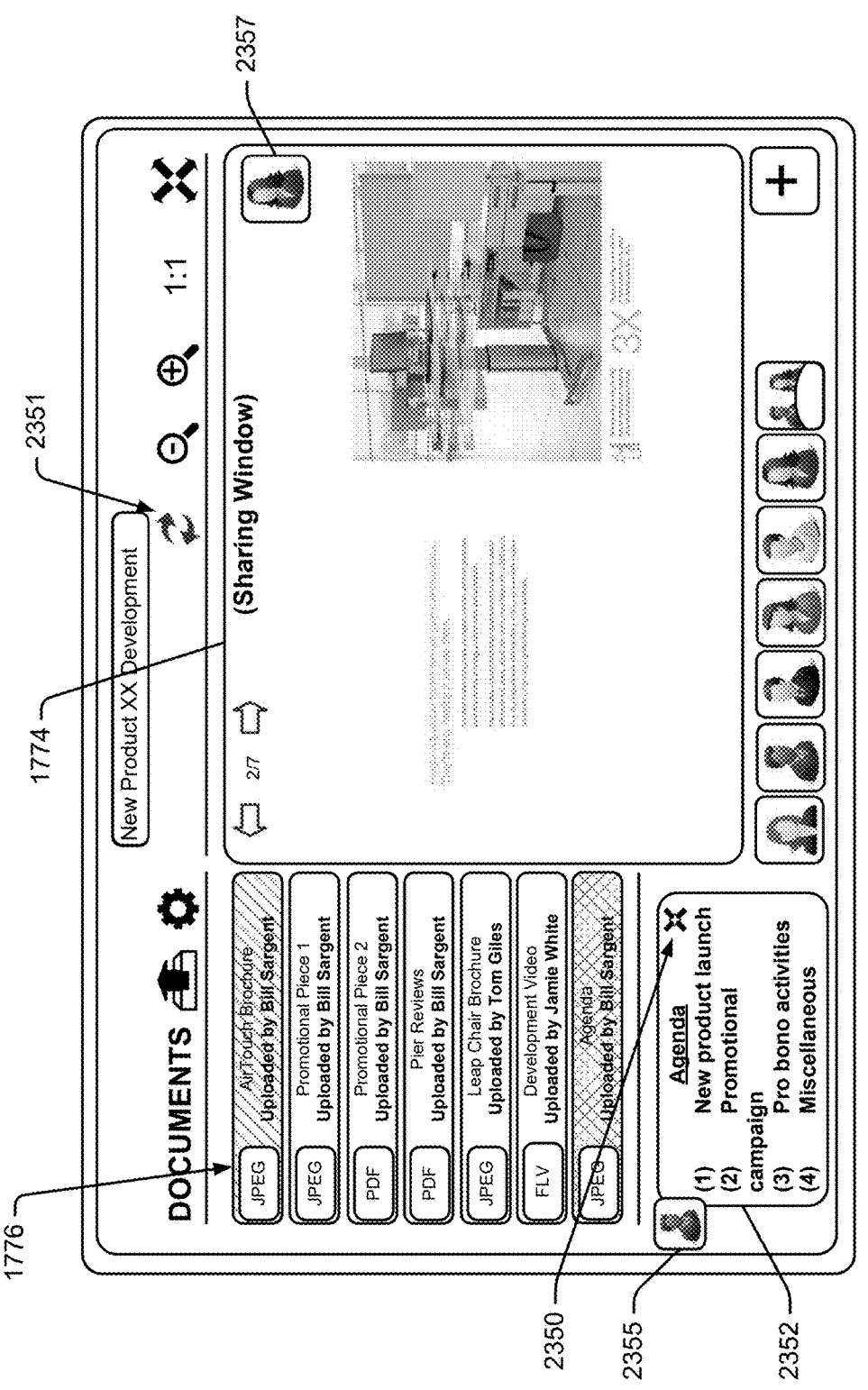
FIG. 99 is a screen shot illustrating a conferee device display screen that includes first and second sharing windows where document icons are highlighted to indicate which document is in which window.

In at least some cases where two large common and proximate displays are linked to a session and a conferee only has access to a single display (e.g., a portable laptop display), the single conferee display may present the screen shot in FIG. 99 showing both the first and second sharing windows 1774 and 2352 while the large common displays 2354 and 2356 mirror the first and second sharing windows 1774 and 2352, respectively. In this case, any change to either of the documents in either of the first or second sharing windows 1774 or 2352 would be mirrored on screens 2354 and 2356, respectively. To set this arrangement up, the conferee would simply invite the two large screens to the session and would specify each as primary or secondary.

In a case where a system server identifies space and associated affordances for use by one or more conferees during a scheduled session, the server may be programmed to automatically identify one or more large common display screens within an identified space and associate the identified screen(s) with the session prior to commencement of the session. Here, instead of requiring a conferee to identify a screen to be linked to the session, the server itself would automatically perform the linking function and initiate the session content download prior to the session commencing. Thus, for instance, where there are two large common displays in a scheduled session space, a first of the displays may be assigned as a primary display for the session and the second display may be assigned as a secondary display for the session in the space. All session content would be cached in a memory associated with the scheduled space and the single cache would be used to drive each of the primary and secondary display screens as described above. Here, as above, one or more conferees could invite one or more additional screens to the session at any time or could disassociate one or more of the screens from the session.

In at least some cases it is contemplated that one or more conference spaces will include many more screens or emissive surface fields than required to present session content. For instance, one space may include four large common display screens arranged about the walls of the space. As another instance, another space may include one large emissive surface that substantially covers a wall where smaller fields or windows can be presented on the emissive surface to simulate primary and secondary session screens. In this case, a server may be programmed to always select a default set of optimized screens or fields for presenting primary and secondary session content. Where a first, second, third and fourth common screens are located on a left wall, the left of a center wall, the right of a center wall and a right wall, respectively, the server may be programmed to select the left and right center screens (e.g., the second and third screens) as primary and secondary session screens automatically.

Each potential conferee may have a preferred screen specification that indicates screen preferences for that specific conferee. For instance, a first conferee may always want a personal laptop device to operate as a primary screen and a smaller personal tablet device to operate as a primary display screen. Here, when the first conferee is using her laptop and tablet devices during a session, the session server may present primary and secondary content on the laptop and tablet screens, respectively, automatically. As a default, if the first conferee in only using one of her table and her laptop during a session, the server may control the one device screen as a primary screen and forego the secondary screen interface tools which are, in that case, not needed.

In at least some embodiments where server 1512 supports audio and video conferencing as well as data conferencing, server 1512 may be programmed to present video of a most audibly active conferee in a session. For instance, where a first conferee speaks for two minutes followed by a second conferee for 18 seconds, the system may present video and audio of the first conferee to all linked devices for the first two minutes followed by audio and video of the second conferee for the next 18 seconds.

Referring again to FIG. 59, to obtain audio from conferees, microphones 1517 may be provided for each conferee device to feed the audio to server 1512. Here, server 1512 is programmed to compare audio from the different microphones and identify the loudest audio signal received. Video from a camera associated with the microphone that generates the loudest audio signal is then transmitted to each of the session linked devices to be displayed. In at least some cases the server 1512 would be programmed with some hysteresis so that inadvertent loud sounds do not switch the presented video from one conferee to another too quickly. Where there is a silent period, in some cases, the server would maintain the video of the conferee that most recently spoke or may switch out to a general conference room image of conferees in a space associated with the session.

Figure 100:
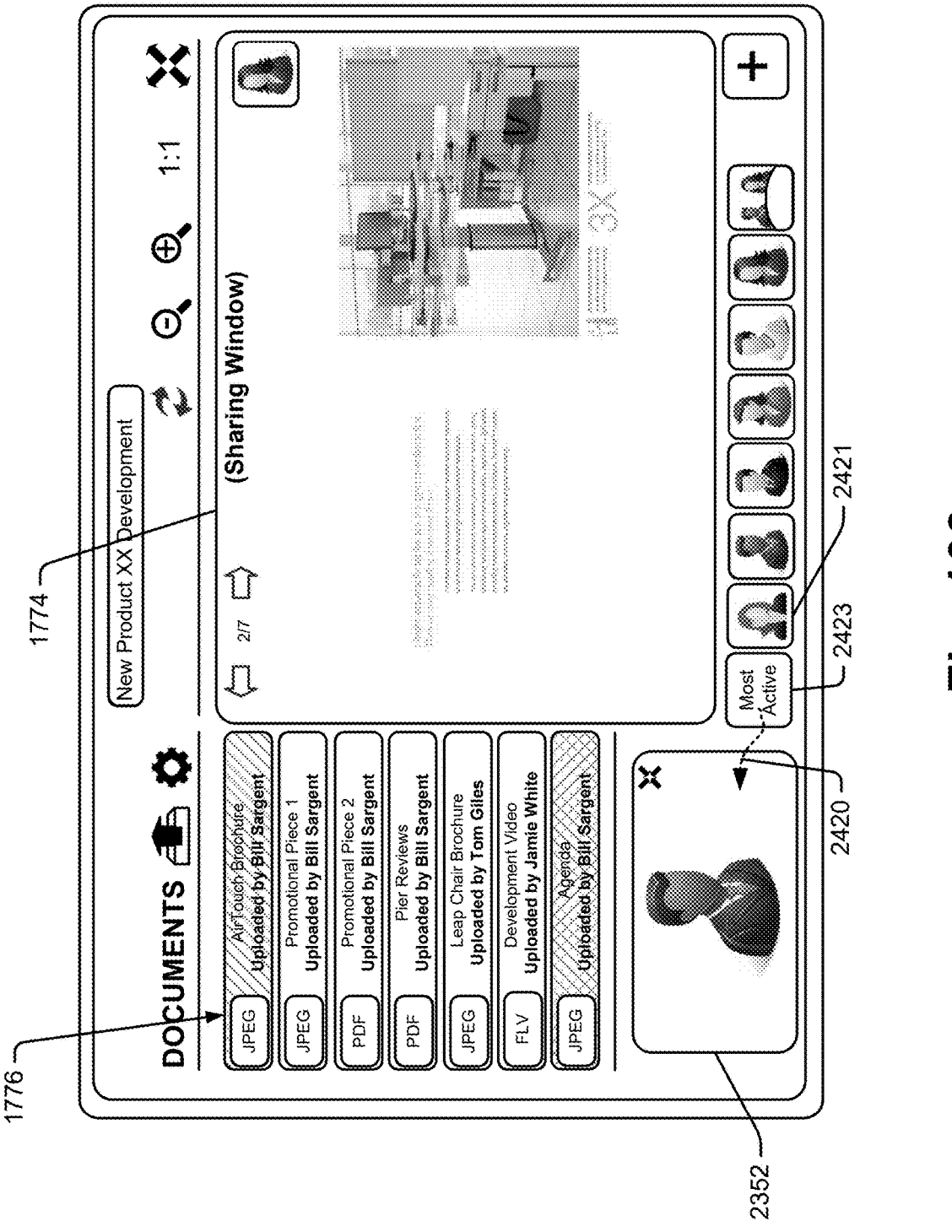
FIG. 100 is a screen shot illustrating a conferee device display that includes a sharing window and a smaller window for showing a real time video of a conferee.

Referring again to FIG. 100, in at least some cases the video of the most audibly active conferee may be presented via either the primary screen 1774 or the secondary screen 2352, at the direction of any one of the conferees linked to the session. For instance, in FIG. 100 a "Most Active" icon 2423 is presented in the conferee queue where icon 2423 can be dragged to either of the primary or secondary windows to show the video of the most active conferee. Arrow 2420 represents a dragging action which results in the video of the most active conferee in space 2352 as shown. Other conferee icons (e.g., 2421) may also be dragged into either of the primary or secondary sharing windows 1774 or 2352, respectively, to show a persistent video of one of the conferees.

In at least some cases, any conferee may be able to replace any conferee video in either of the primary or secondary sharing windows by dragging a document icon from document queue 1776 to one of the primary or secondary windows or by dragging another conferee icon to one of the windows.

Figure 101:
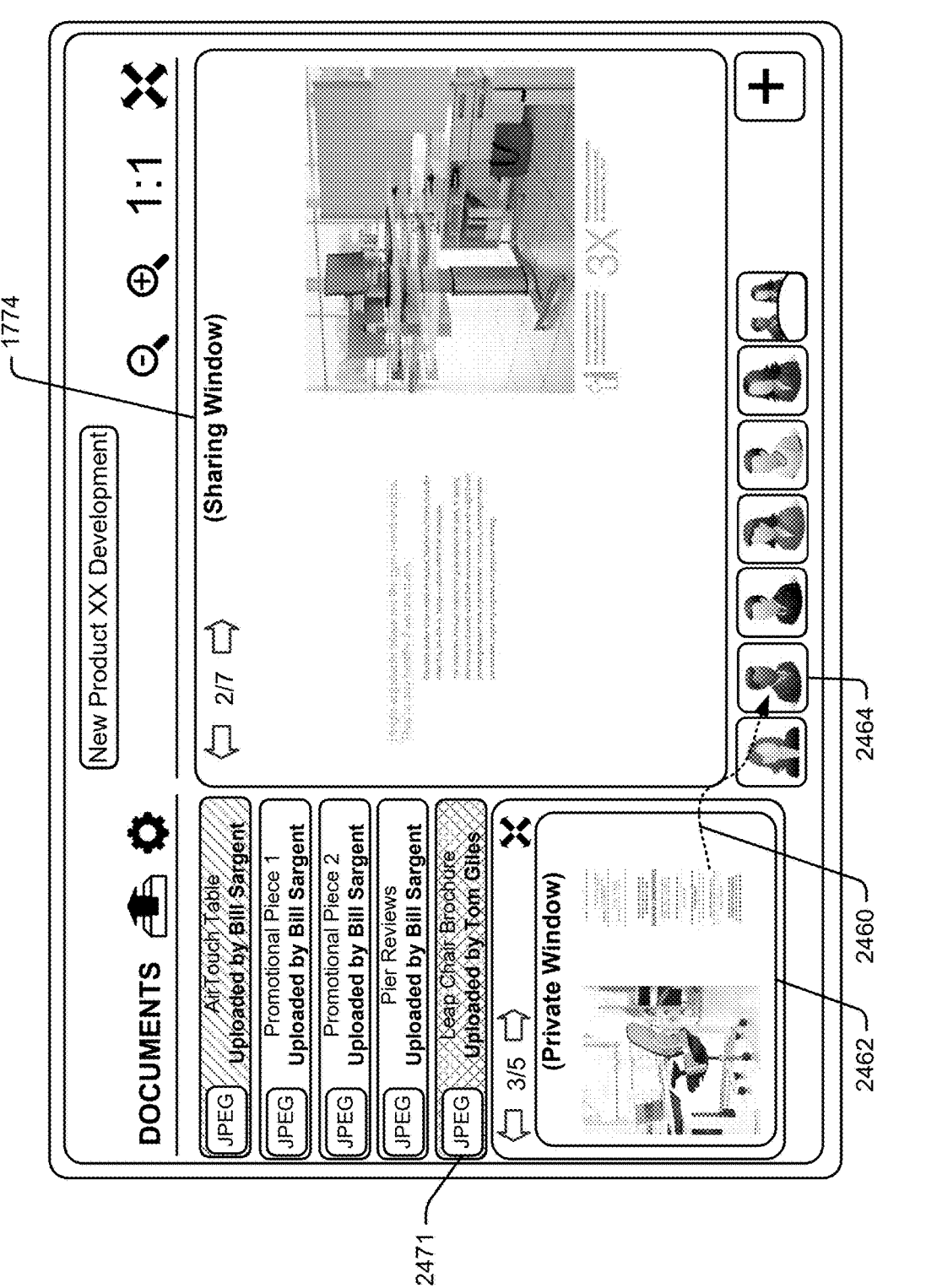
FIG. 101 is a screen shot showing how a document in a private window may be shared in a side bar fashion with another conferee linked to a session.
Figure 102:
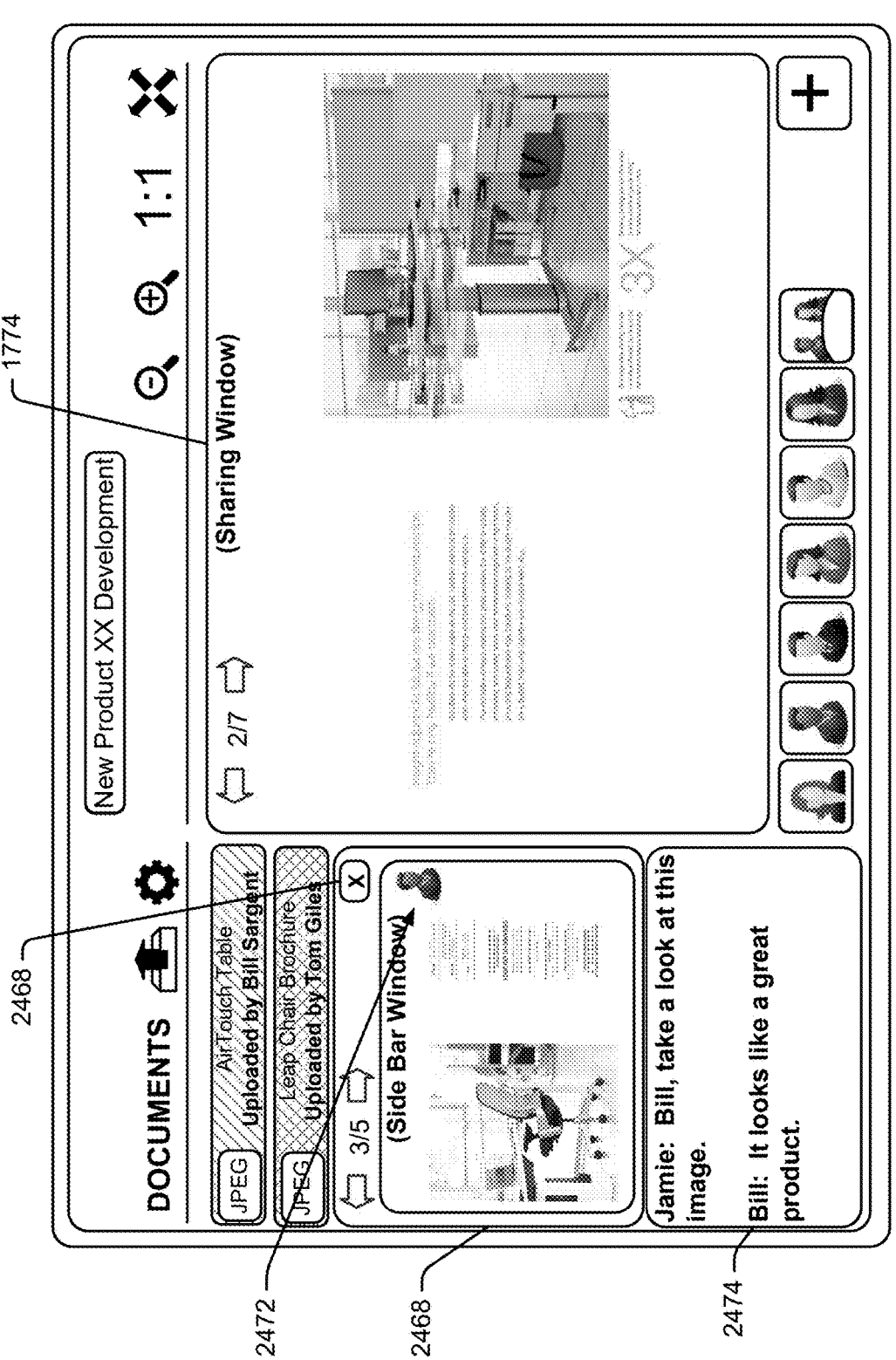
FIG. 102 is a screen shot showing a side bar view of a session.

It has also been contemplated that there will be times when a subset of conferees linked to a session may want to share a session document amongst themselves without sharing with the larger group for some reason. For instance, referring to FIG. 101, a first conferee associated with the device presenting the screen shot shown in FIG. 101 may want to share a document presented in the first conferee's private window 2462 with a second conferee associated with conferee icon 2464. In at least some cases it is contemplated that, to share the document in private window 2462, the first conferee can simply drag from window 2462 to the conferee icon 2464 to effectively "drop" the document from window 2462 into a side bar window as shown in FIG. 102 at 2468. Here, the side bar window 2468 would be presented on the first conferee's device display as shown in FIG. 102 and would also be opened up on the second conferee's device display in a similar fashion. In some cases a dialog window 2474 would also be opened to enable the conferees to text via an instant messenger application or the like back and forth without communicating with other conferees in the session. A conferee indicator 2472 is presented on the side bar window or is at least spatially associated there with to indicate the identity of the other conferee linked to the side bar. To add another conferee to the side bar, an icon associated with the other conferee may be selected and dragged into the side bar window causing the server to present the side bar window on the other conferee's device display and causing each of the first and second conferee's devices to present another indicator akin to 2472 to indicate the identity of the other conferee added to the side bar.

In some embodiments where a side bar is formed between two or more conferees, server 1512 will automatically delink audio between the two or more conferees that are part of the side bar from the larger session so that the side bar conferees can have a semi-private conference independent of the other conferees. In some cases, while the side bar audio is cut out of the larger session, the larger session audio may continue to be presented to the side bar conferees either at normal volume level or at some reduced volume level so that the side bar conferees can still follow the larger session while conducting their side bar. In this case the text window 2474 may not be needed. At any time during a side bar, close icon 2468 may be selected to close the side bar session. When a side bar is closed, in addition to removing the side bar window from conferee screens, full conferee audio would again commence.

It has further been recognized that, in addition to sharing documents like PDFs, JPEGS, Flash videos, etc., conferees in some cases will want to show content within the context of operating applications such as a word processor, a spread sheet application, various drawing programs, etc. One way to enable conferees to share content in operating applications is to allow a conferee to run an application on the conferee's computing device and share the conferee's device "desktop" with other conferees in a sharing window during a session.

In order to maintain a simple and intuitive interface where all features work in a similar fashion, as in the case of "fixed" documents that have a generally persistent form (e.g., PDFs, videos, etc.) and that are added to a session queue prior to sharing, prior to sharing a desktop during a session, an icon for controlling desktop sharing has to be provided in a queue on the session interface. To this end, see again FIG. 78 where the list of sources 2034 includes a "My Desktop" option 2031 that can be selected to add an icon for a conferee's desktop to a queue. Unlike static documents (e.g., a PDF, a JPEG, etc.) that do not change and therefore can be uploaded and cached in queues by devices linked to a session once for subsequent use, a desktop is dynamic (e.g., changes as a conferee interacts therewith) and therefore caching a desktop is not generally an option. Instead, when a desktop is added to a queue, only a desktop icon is added to the queue where the icon can be used to start a desktop streaming process when selected for sharing.

Figure 103:
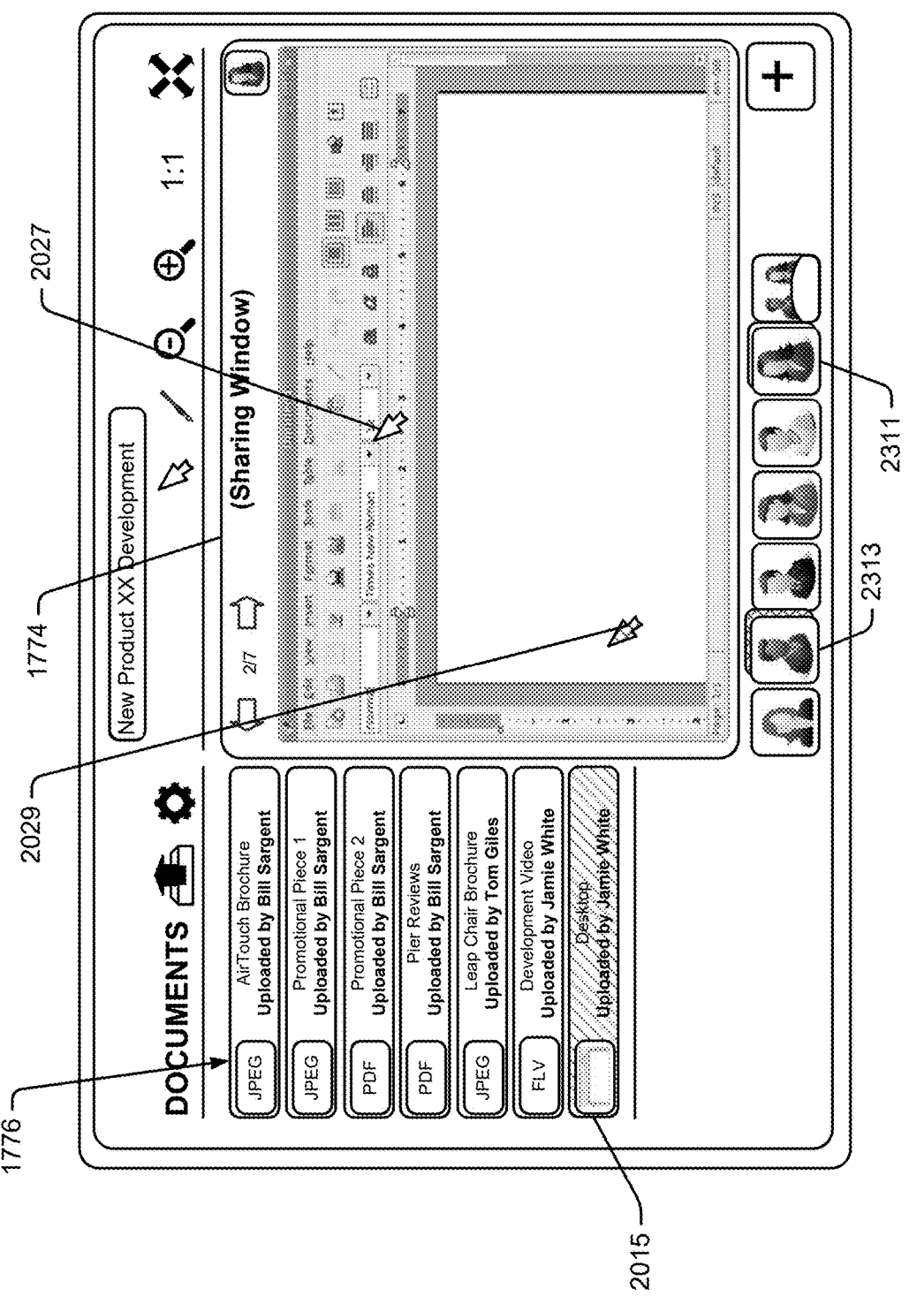
FIG. 103 is a screen shot that shows a conferee's desktop being shared in a sharing window.

Referring to FIG. 103, in at least some cases a desktop icon 2015 may be added to a general document queue for a session to be moved into a sharing window 1774 by any conferee at any time. Here, it is contemplated that when a conferee other than the conferee associated with a desktop icon uses the desktop icon to share another conferee's desktop, an intermediate step may occur where the conferee associated with the desktop to be shared has to authorize the sharing process. For instance, upon a conferee attempting to share another conferee's desktop, a pop up window may appear on the display screen of the device used by the conferee associated with the desktop to be shared querying whether the conferee authorizes sharing or not. In this case desktop sharing would only commence upon an affirmative response.

In other cases desktop sharing in a session may be substantially restricted so that only a conferee that adds a desktop icon to a session queue can share the desktop in a sharing window. To this end, desktops are dynamic and therefore, as a conferee uses her desktop, the information presented on the desktop often is not intended for sharing in a session and instead, the desktop has to be prepared for sharing prior to the act of sharing. In this case, if any conferee could select the desktop of another conferee represented in the queue for session sharing at any time, a shared desktop could include information unintended for sharing when the act of sharing occurs. Restricting desktop icon selection to conferees that add a desktop to a session should avoid unintended desktop sharing.

Even though a desktop icon may only be selectable for sharing by a conferee that adds a desktop icon to a session queue, it is useful to include a desktop icon in queues on all session linked interface devices so that all conferees are aware that other conferees are contemplating sharing their desktops. Thus, in at least some cases, desktop icons may be presented in all session queues even though only one conferee (e.g., the conferee associated with a desktop) may be able to select each of the desktop icons for sharing. In at least some cases, while all desktop icons added to the session by any conferee may appear in each document queue, desktop icons that a specific conferee cannot select for sharing (e.g., desktop icons associated with other conferees) may be visually distinguished to indicate inability for the conferee to select. For instance, desktop icons that are not selectable by a conferee may be rendered semi-transparent to indicate that the icons cannot be selected.

In still other cases desktop icons may be added to private queues for each conferee so that only the conferee associated with the desktop sees the icon and can select the desktop icon for sharing. To this end, see again FIG. 86 that shows a conferee's desktop icon 2013 in a private queue. By placing the desktop icon a private queue, a conferee has a sense that the desktop is private and will not be shared unless the conferee takes affirmative steps to share. In addition, where desktop icons are only presented in private queues, conferees are not confused by their appearance in the session document queue.

To move a desktop into the sharing window, a conferee simply drags (or double clicks) the desktop icon 2015 (or 2013 in FIG. 86 in the case where the desktop icon is in a private queue) into the sharing window 1774 causing the document shared in the window 1774 to be replaced by the desktop image. When the desktop icon is dropped in window 1774, the device associated with the desktop icon starts to stream the dynamic desktop image to the session server 1512 which in turn distributes the dynamic desktop image to all devices linked to the session. Each device receiving the streaming desktop uses the streaming desktop to drive the sharing window 1774 on the interface in the session browser (see streamed image in window 1774 in FIG. 103).

Because the device associated with a shared desktop icon is linked to the session and therefore typically has a session interface akin to the interface shown in FIG. 103 open when the desktop is shared, initially the streamed desktop image will often include the interface view in its current state. Where a conferee's device is windows based and the session interface browser is open in a first window, the conferee may maximize a second window and run an application in the second window that would become the streamed desktop image.

To end desktop sharing, the conferee that is sharing the desktop can re-access the session interface in the first window and move any content object including a static document, a conferee video, etc., into the sharing window. Similarly, any other conferee can end desktop sharing by moving a content object into the sharing window. When a conferee other than the conferee that is sharing a desktop image moves another content object into the sharing window 1774, if the conferee that was sharing the desktop image is not viewing the session interface browser in a window, the window including the interface browser is automatically rendered viewable so that the conferee knows that the desktop sharing has ceased.

Where a conferee's device is screen based (e.g., different applications are opened on different screens that can be accessed one at a time as on many smart phones, tablet devices, etc.) and the session interface browser is open in a first screen, upon sharing the desktop image, the conferee may open a second screen and run an application on the second screen that would become the streamed desktop image. To end desktop sharing, the conferee that is sharing the desktop can re-access the session interface on the first screen and move any content object including a static document, a conferee video, etc., into the sharing window. Similarly, any other conferee can end desktop sharing by moving a content object into the sharing window. When a conferee other than the conferee that is sharing a desktop image moves another content object into the sharing window 1774, if the conferee that was sharing the desktop image is not viewing the session interface browser on a screen, the screen including the interface browser is rendered viewable so that the conferee knows that the desktop sharing has ceased and to give the conferee a view of the session that is consistent with the view seen by other linked conferees.

Although not shown, in at least some cases, there may be a way for one or any conferee linked to a session to end desktop sharing by, in effect, blanking content in the sharing window so that no content is shared in that window. In this manner desktop sharing could be ended without requiring sharing of other content in the sharing window to avoid possible confusion if there is no other content that a conferee would like to share at the specific time.

In other cases, when a conferee shares a desktop by dragging the desktop icon into the sharing window on an interface browser, the conferee's device may automatically minimize the interface browser so that whatever is "below" the browser on the conferee's device is immediately viewable on the conferee's device display and therefore is immediately streamed to server 1512 and on to the other session linked devices for sharing. This process eliminates the intermediate step of streaming the session interface to all conferees that has to be minimized prior to sharing the intended desktop content. Thus, here, a conferee intending to share a desktop application would open the desktop application in a second window or on a second screen and prepare the application. For instance, where a drawing program is to be shared, the drawing program would be opened in the second window or on the second screen and then the session interface browser in the first window (e.g., a window in addition to the window in which the session browser is operating) or on the first screen would be used to drag the desktop icon to the sharing window 1774. Upon sharing the desktop, the first window or screen would be minimized and the second window or screen showing the session browser including the prepared drawing application would be shared.

In still other embodiments an intermediate step prior to sharing would occur to enable a conferee to confirm that a desktop is ready to share or to prepare the desktop prior to sharing. For instance, the intermediate step may include presenting the current state of a conferee's desktop in a private view so that the conferee can confirm that the desktop is in condition for sharing. To this end, in FIG. 86, when the desktop icon 2015 is dragged to sharing window 1774, the conferee's desktop may be shown as part of an intermediate step as in FIG. 104 with the session interface removed from the conferee's display and the current state of the desktop shown as at 2237. Here, the conferee can manipulate the desktop in real time to control a maximized application, open new windows to run other applications, search web pages to be shared, overlap several windows with several different applications opened and operating at the same time, etc.

Figure 104:
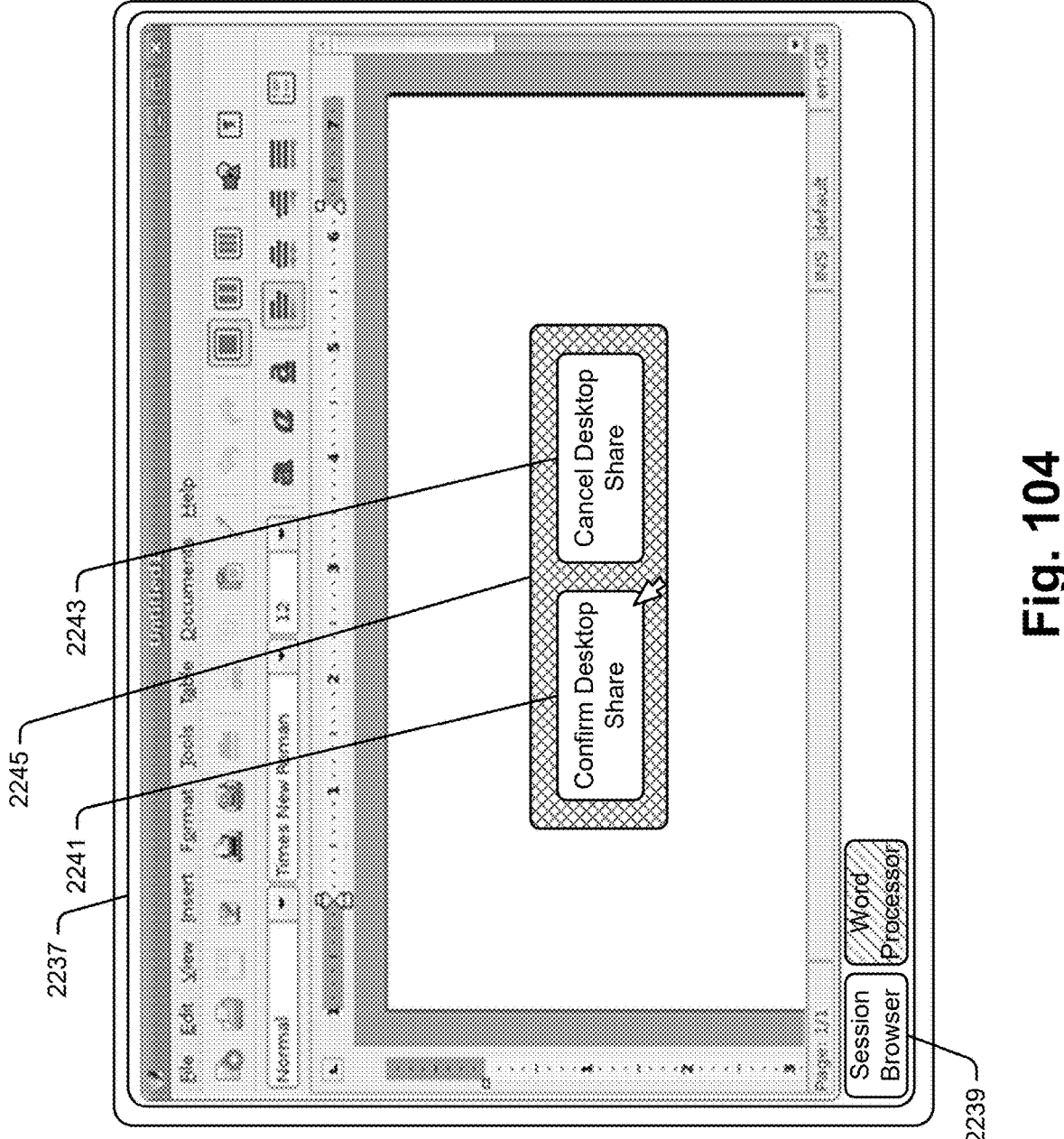
FIG. 104 is a screen shot showing an intermediate step that occurs when a conferee starts the process of sharing the conferee's desktop to ensure that a desktop is not inadvertently shared.

In addition to showing the current state of the conferee's desktop, the FIG. 104 view adds a session browser icon 2239 to the open applications toolbar at the bottom of the view that can be selected to re-access the session interface browser. In addition, the device presenting the FIG. 104 view also presents a simple sharing control overlay 2245 to the conferee that is considering sharing the desktop. The sharing control overlay includes a "Confirm Desktop Share" icon 2241 and an "End Desktop Share" icon 2243. Once the conferee has prepared the desktop for sharing via the FIG. 104 interface, the conferee commences sharing by selecting icon 2241. Prior to selection of icon 2241 the desktop has not been shared in the session and thereafter, the device presenting the desktop streams the desktop image to server 1512 and on to the other session linked devices to be presented in the sharing spaces 1774. If the conferee decides not to share the desktop, the conferee selects icon 2243 which re-maximizes the session interface browser (see again FIG. 103) without sharing the desktop.

If the desktop is shared, during the sharing process, in at least some embodiments the device sharing the desktop presents a persistent sharing control overlay for ending the desktop sharing activity. To this end see the exemplary screenshot 2255 in FIG. 105 where a control overlay includes a "Cancel Desktop Share" icon 2243 that can be selected at any time to end the desktop sharing activity and return to the session interface browser view. In at least some cases the control overlay is only presented on the desktop that is being shared and is not streamed as part of the desktop image to the server 1512 or other session linked devices.

While the system described above requires a conferee to affirmatively add a desktop icon to a queue prior to sharing a desktop from the conferee's device, in other cases a desktop icon may automatically be added to the session document queue or to the private queue for each conferee interface device linked to a session. Thus, for instance, in a case where desktop icons are located in private queues, each of ten conferees linked to a session would have a unique desktop icon in his or her private queue (see again FIG. 86) at all times and manual addition of the icon to a queue would not be required. By providing desktop icons automatically in a queue, possible confusion related to whether or not a desktop can be shared and how to upload a desktop icon can be avoided. Here, because desktop images are not cached and instead are streamed only when shared, adding desktop icons automatically to session interfaces does not require caching and does not require streaming until a conferee actually shares a desktop with other conferees.

In some embodiments only a conferee sharing a desktop can control the applications run on the conferee's desktop. For instance, where a conferee shares a word processor document via a session interface, the conferee can manipulate the document by adding text, changing fonts and font size, highlighting text, adding a table, etc., but other conferees viewing the desktop shared in a sharing window 1774 of a session interface can only watch the application being manipulated.

Figure 105:
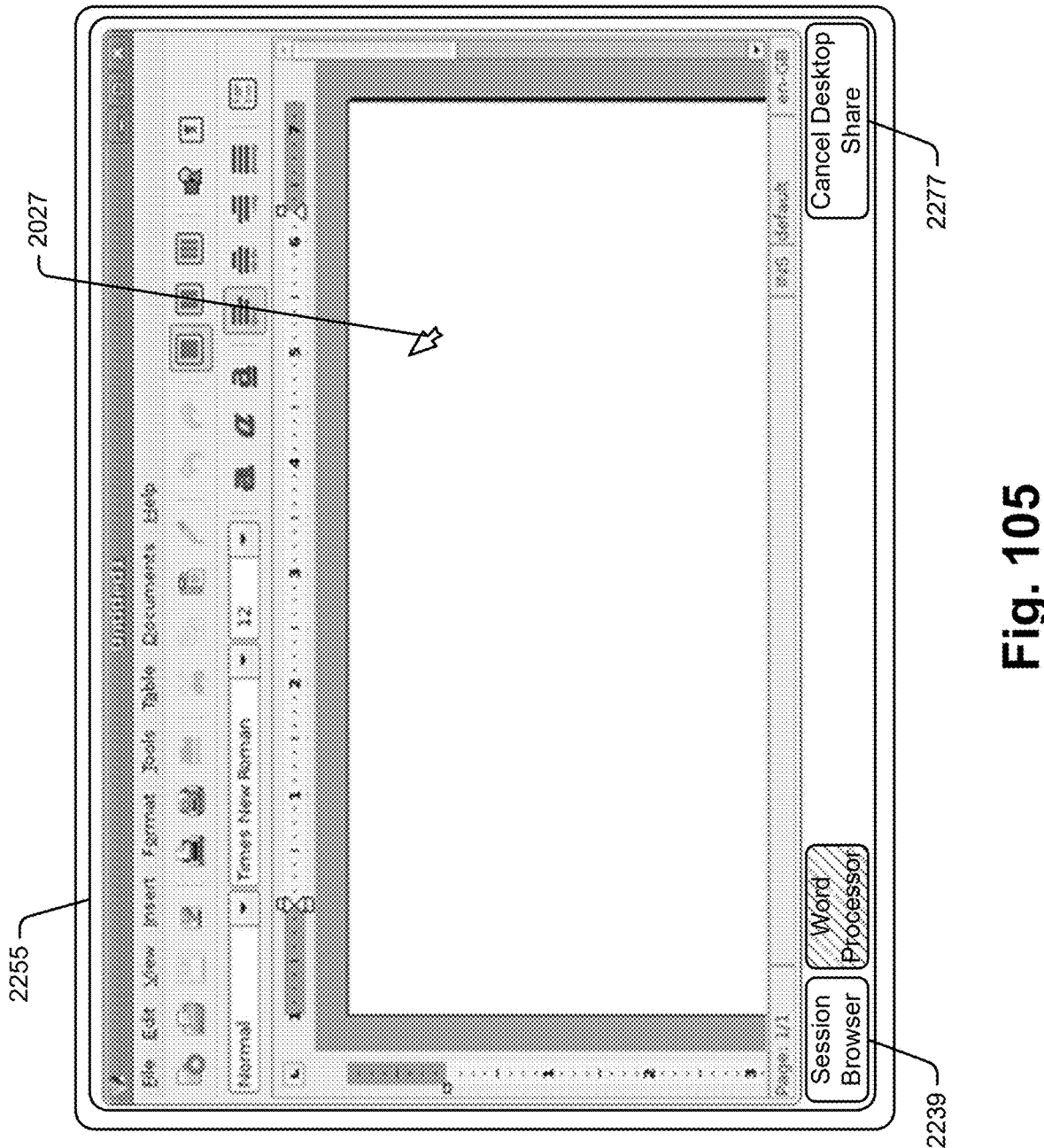
FIG. 105 is a screen shot showing a view that a conferee may have when the conferee's desktop is being shared in a session.

In other cases it is contemplated that any conferee may be able to interact with any application that is shared by another conferee via a shared desktop. To this end see again FIGS. 103 and 105. Here it is assumed that the conferee associated with icon 2311 in FIG. 103 is sharing a desktop as shown in FIG. 105 and that other conferees see the shared desktop as shown in the sharing window 1774 in FIG. 103. Pointing icon 2027 is controlled by the conferee sharing the desktop while pointing icon 2029 is controlled by the conferee associated with icon 2313. The conferee icons 2311 and 2313 are highlighted or otherwise visually distinguished in a fashion similar to the pointing icons 2027 and 2029, respectively, so that conferees can discern which conferee is controlling which pointing icon. For instance, the shadow boxes about icons 2311 and 2313 may be red and blue respectively and the pointing icons 2027 and 2029 may also be red and blue, respectively.

As pointing icon 2027 is moved about on the desktop shown in FIG. 105 and as the desktop is used to modify the word processor document, movement of the icon 2027 and document modifications are simply reproduced on all session linked devices as part of the dynamic streaming desktop image.

To enable the conferee associated with icon 2313 to control the streaming desktop shared by the conferee associated with icon 2311, the precise locations of any activity on the image of the shared desktop in space 1774 are identified and commands related to the activities are correlated with the locations and the locations and commands are transmitted to the conferee device that generates the desktop. For instance, referring again to FIG. 103, as icon 2029 is moved about on the desktop image in window 1774, the location of the icon and a command to create the pointing icon are transmitted to the device generating the desktop. As another instance, if a conferee clicks on a point in the word processor document, the click location and a command indicating that a click occurred are transmitted to the device generating the desktop. As one other instance, after a click at a location, if a conferee types a word, the locations of each letter and each letter generated are transmitted to the device generating the desktop.

Upon receiving locations and associated commands, those locations and commands are used by the operating system and applications on the device generating the desktop to drive the operating system and the applications. For instance, the command to generate a pointing icon is used to create a pointing icon on the desktop image at the associated location on the desktop image, the command to click at a point in a word processor document is used to generate a cursor at the associated location, and the commands indicating locations and associated letters that comprise a word are used to drive the word processor program to add the letters at the associated locations in the document. As the commands and associated locations are converted into changes to the desktop image, the resulting new desktop images are streamed to the server 1512 and on to the session linked devices to be shared among the session conferees. In these cases, the session browsers are equipped to obtain commands for controlling the operating system and applications run by a device linked to a session and can transmit those commands to the operating system and applications to be performed to control the operating system and applications to change a desktop image essentially in real time.

In other embodiments where a software application is ubiquitous so that every device or at least a sub-set of devices linked to a session have the application loaded or can obtain free access to the application (e.g., internet based word processors, spread sheets, etc.), when an application is shared, each device may open its own instance of the application and load up a document from the shared application for viewing and interaction. Here, any conferee input from any conferee may be streamed to each session linked device and may be used to update the device specific instance of the application and shared document. This type of system where a shared application is run by each linked device and an instance of a shared document on the application is stored on each linked device, like the cached documents, can expedite the process of sharing the application, the related document and any edits, annotations, etc. made to the document.

Figure 114:
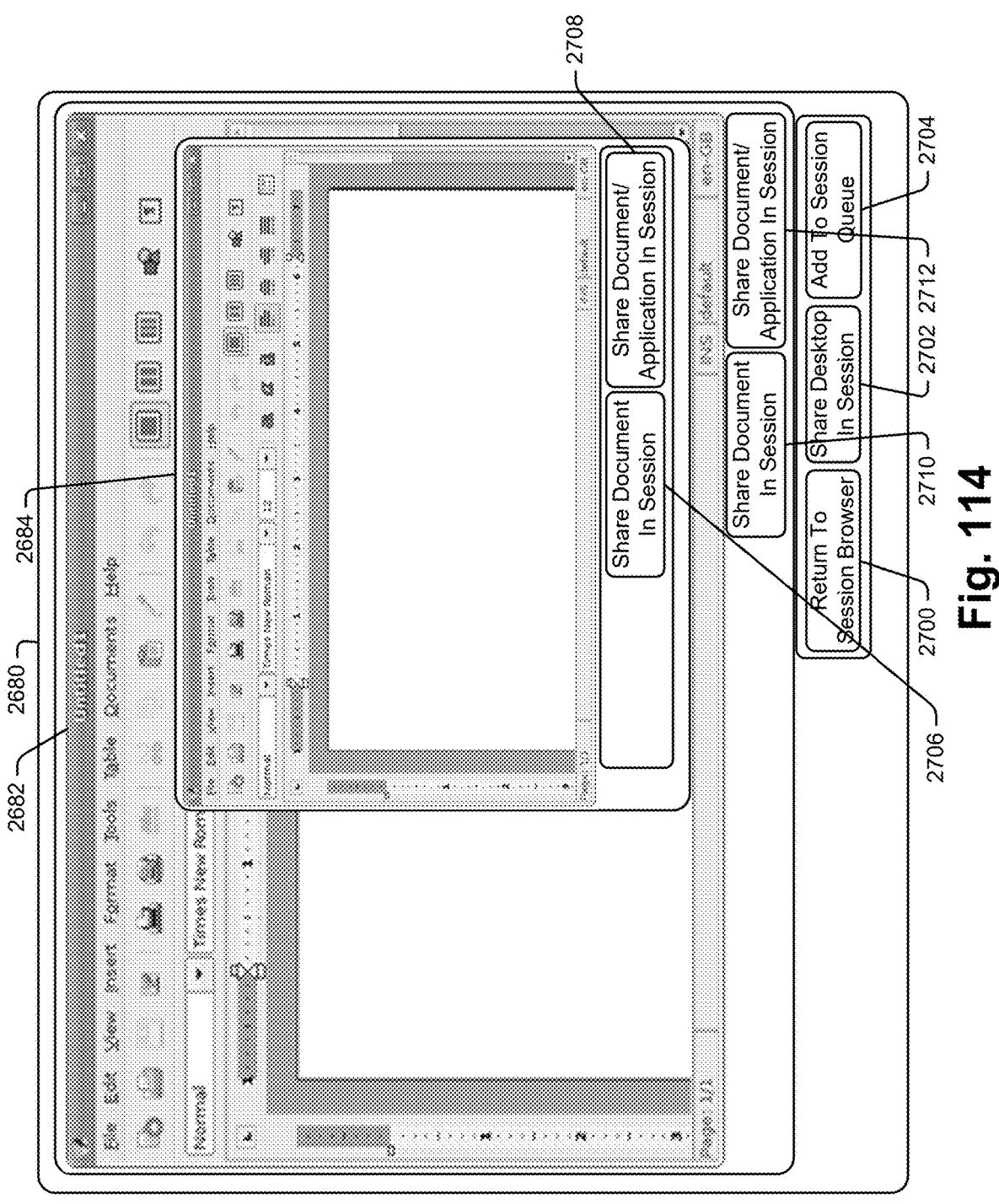
FIG. 114 is a screen shot showing output of a conferee's device display that enables a conferee to share output of applications run on the conferee's device with other conferees linked to a session.

In at least some embodiments, it is contemplated that any time a conferee has the session application open in a browser window or on a browser screen, the system may present a session overlay or border for sharing the conferee's desktop image or adding the desktop to the session queue whenever the conferee is viewing a window or screen other than the session window or screen. Thus, for instance, referring again to FIG. 100, assume that the conferee associated with icon 2421 wants to share an application running on a different screen on her device. The conferee may use a standard interface feature on her device to switch to the other screen causing her device to present the other application as shown in FIG. 114. Upon switching to the other screen, the device may present the application open on the other screen as shown with a sharing overlay that includes a "Return To Session Browser" icon 2700 and a "Share Desktop In Session" icon 2702. To return to the session open on the session browser screen, the conferee can select icon 2700.

Here, the conferee may switch to another application open on yet a different screen and the overlay including icons 2700 and 2702 would be persistently presented. Once the conferee opens an application that the conferee would like to share, the conferee can simply select icon 2702 to start streaming the conferee's current desktop image to the session server and on to the session linked devices for sharing in the sharing window. Once sharing commences, desktop sharing can be halted in any of the ways described above (e.g., selection of a cancel icon 2277 as in FIG. 105, etc.). Instead of immediately sharing the desktop and opened application, the conferee may select the "Add To Session Queue" icon 2704 to add a desktop icon to the session queue in cases where a desktop icon is not already automatically included in the queue.

Here, while an application in a screen is being shared, the sharing conferee can control the application to change content and the changes would be presented to other linked conferees. In addition, the sharing conferee could switch to a different screen in which a different application is open and that application would be shared with session linked conferees. When the conferee switches to a different application to share, the overlay shown in FIG. 105 would persist so that the conferee could cancel desktop sharing or return to the session browser at any time.

It has been recognized that, instead of sharing content via dynamic applications (e.g., a spreadsheet, a word processor application, a drawing application, etc.) via desktop sharing, in at least some cases a conferee will want to share only an application without sharing an entire desktop. For instance, while a conferee is using a smart phone, a tablet type device, a laptop or the like, oftentimes information will appear on the device screen that is out of the control of the conferee. For example, an instant message window may pop up to present a message from a friend at any time or a meeting or appointment reminder window may pop up at any time. As another instance, a conferee may prefer sharing on an application by application basis as opposed to a dynamic desktop so that the conferee does not inadvertently and unintentionally share an application or content in the application.

In addition, it has been recognized that in many cases conferees will want the ability to privately peruse content or a document associated with a dynamic application that another conferee places in a session queue in a manner akin to that described above with respect to static documents at any time prior to, during or after a session period. Thus, for instance, it would be useful in many cases for a first conferee to add a first word processor document that exists in a dynamic application to a session queue for access via the application during a session and for any conferee invited to the session to be able to view the first word processor document even if the conferee cannot access or control the application on the first conferee's device.

In at least some embodiments it is contemplated that the system will enable any conferee to add a document or file to a queue where, at the time the document or file is added to the queue, the document or file only exists as content in a dynamic application. Here, upon adding a document to the queue, in at least some cases, the document is added in a format that captures the content of the document in a persistent fashion which is independently accessible by any conferee at any time unless the document is affirmatively removed from the session queue. For instance, in at least some cases a PDF or JPEG of the document may be generated and added to the queue to be accessed by any conferee. In this case, the PDF or other format document in the queue may represent the document itself or, in other cases, may represent screen shots of the output of the dynamic application including the content (e.g., a specific document) to be shared presented within the application itself. Documents generated for the queue in this fashion are cached for quick access by any of the session linked devices.

Once an application and associated content is added to the session queue as a document, in addition to any conferee being able to open the document in a private window, any conferee may also move the document into the sharing window via double clicking the document, dragging an icon associated with the document from the queue to the sharing window, etc. When the document is opened in a private window, in at least some embodiments, the document is opened in a static form as opposed to within the application associated with the document so that, when in private view, none of the conferees can use the associated application to alter the content of the document.

In at least some cases, whenever any conferee opens a document associated with a dynamic application in the sharing window, the application associated therewith is automatically run and the document is opened within the application in the sharing window so that any conferee may edit the document using the application in the sharing window. Here, when a document is edited in a sharing window, in at least some cases, the edits to the document are stored on the device of the conferee that added the original document to the queue and a new persistent (e.g., a PDF) version of the document is generated and stored in the queue as part of the session record for subsequent access.

In other embodiments, when a document or file associated with a dynamic application is added by a first conferee to a session queue, only the first conferee may be able to edit the document despite the capability of other conferees to access the shared persistent version of the document. For instance, when a word processor application and associated word process document is shared by a first conferee by placing the application/document in a session queue and the document is represented as a PDF (e.g., in a persistent form), conferees other than the first conferee may only be able to access the PDF version of the document. Here, when a second conferee shares the document in the sharing window, only the PDF version of the document may be presented.

If, however, the first conferee shares the document from the queue by dragging the document to the sharing window, the system may automatically cause the first conferee's device to run the application associated with the shared document, load the shared document and start to stream the shared document to the session server to be passed on to the other session linked devices. Here, once the document is opened in the associated application and the application and document are being streamed to the other linked devices, the first conferee can used the conferee's device to manipulate or edit the document within the application and those manipulations are shared with the other conferees via their devices essentially in real time.

In this case, because only the application as opposed to the first conferee's complete desktop is shared, any pop up windows will only appear on the first conferee's device and not within the shared session window or space. Similarly, if the first conferee opens a second screen or window to access a second application while the document and first application open in a first screen or window are being shared, the contents in the second screen or window are not shared.

In at least some embodiments it is contemplated that any conferee may be able to add two or more applications and related content (e.g., a document) to a session queue. For instance, a first conferee may add each of a first word processor document in a word processor application and a first spreadsheet in a spreadsheet application to a session queue. Thereafter, the first conferee may be able to access any of the applications in the queue at any time to open the application and related document for private viewing, sharing, etc.

Referring again to FIG. 114, the exemplary screen shot shows a desktop image 2680 where two different applications are opened in first and second windows 2682 and 2684 and where the second window 2684 overlaps the first window 2682. Here, each application window includes an overlay or border section that includes session related icons for sharing applications presented within the separate windows. To this end, window 2684 includes a "Share Document In Session" icon 2706 and a "Share Document/Application In Session" icon 2708 as part of the overlay or border to be presented via a conferee's device when the conferee is linked to a session and the conferee accesses an application in a window or on a different screen from the window or screen in which the session interface is presented. Icon 2706 can be selected to open a persistent version (e.g., a PDF) of the document in the sharing window of the session interface. In this regard, when icon 2706 is selected, the system generates (e.g., automatically prints a PDF version) a persistent version of the document presented via the application in window 2684, adds the document to the session queue if it is not already in the queue, cashes the document for access via each of the session linked or at least session associated (e.g., some devices by be associated with a session but not currently liked) conferee devices and causes each of the session linked devices to open the shared document in a sharing window.

Referring still to FIG. 114, icon 2708 can be selected to duplicate the output of application running in window 2684 in the shared window of the session interface including the document currently presented in window 2684. In this regard, when icon 2708 is selected, the system streams the output of the application running in window 2684 to the session server which passes the streamed video to all other session linked devices for substantially real time sharing. At this point, instead of seeing the entire desktop image as shown in FIG. 114, session conferees will see the application output from window 2684 in the sharing windows of the session interfaces. Once the application is shared, any edits to the document presented by the application are presented simultaneously via all of the shared windows.

Referring yet again to FIG. 114, a separate set of session control icons are presented as part of an overlay or border for window 2682 including a document sharing icon 2710 and an application sharing icon 2712. Icons 2710 and 2712 operate in a fashion similar to that described above with respect to icons 2706 and 2708. Thus, for instance, if a first conferee is sharing the application currently running in window 2684 in a session sharing window of the session interface and the first conferee selects icon 2712, the system would change to duplicate or replicate the application and content from window 2682 in the sharing windows of the session interfaces.

In at least some cases it may be that a window overlay or border including session control icons would only be provided for a top window when windows are layered on top of each other to avoid confusion or so that space on a display screen is not taken up by too many session control icons. Thus, for instance, in FIG. 114, because window 2684 is on top of window 2682, the overlay including icons 2706 and 2708 may be presented while the overlay for window 2682 including icons 2710 and 2712 may not be presented. If window 2682 were moved to the top spot, the overlay would be removed from window 2684 and presented for window 2682 in this case.

In at least some cases, after a conferee shares an application and content associated therewith, the conferee can navigate to other windows or screens including the session interface or some other application program to perform other tasks while the shared application and content are continually presented via the shared windows. Thus, for example, in FIG. 114, if the application in window 2684 is shared, the conferee that shared window 2684 may select window 2682 to bring the application run therein to the top of the desktop and may edit the document presented in window 2682 while still sharing the application in window 2684. This feature enables great flexibility for an application sharing conferee to continue to perform various tasks while still sharing an application.

Figure 106:
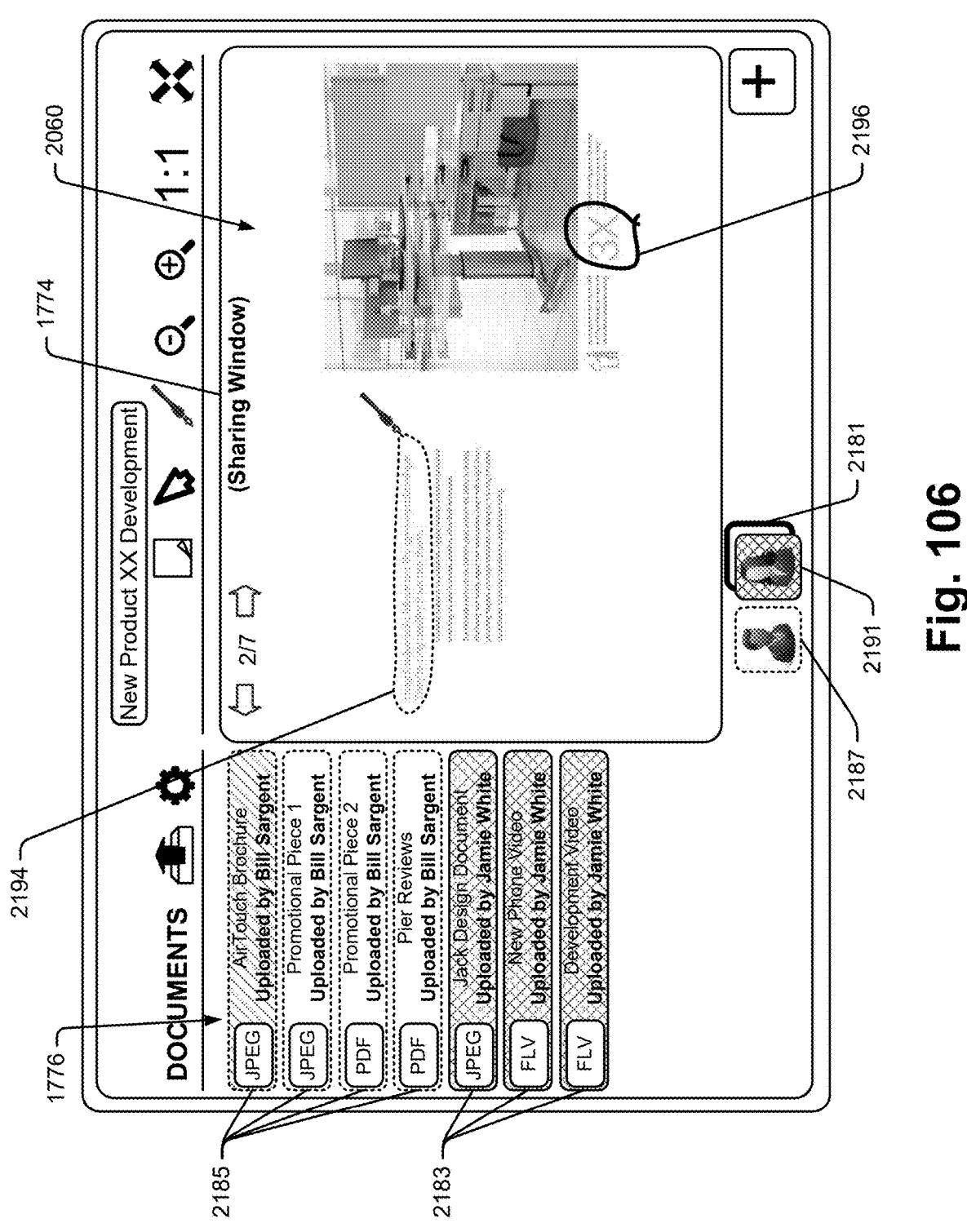
FIG. 106 is a screen shot showing differently visually distinguished features on a conferee device display linked to a session where the different appearances indicate ownership of actions, documents, etc., associated with the features.

Referring to FIG. 106, an exemplary session interface screen shot is illustrated that shows various highlighting and other visual effects meant to convey ownership of different activities on the screen. In this regard, the exemplary inter-face includes a shared document 2060 in sharing window 1774 where cross hatching of a first document icon 2061 in the document queue 1776 indicates that the document in the sharing window 1774 is associated with icon 2061. The shadow box 2181 on conferee icon 2191 indicates that the conferee associated with icon 2191 opened the document in sharing window 1774. Each document icon in queue 1776 is highlighted with a distinguishing border that indicates which conferee added the document to the session queue. For instance, each of icons 2185 is highlighted via a dashed border to indicate that each of those documents was added to the queue by the conferee that is associated with the conferee icon that has a similar dashed border (e.g., icon 2187) in the conferee queue. Similarly, each icon in the set labelled 2183 has been double cross-hatched to indicate that each of those documents was added to the queue by the conferee that is associated with the conferee icon that has a similar double crosshatching (e.g., icon 2191) in the con-feree queue.

Referring still to FIG. 106, annotations of a document page in window 1774 also have appearances that are keyed to the different conferees. For instance, annotations by the conferee associated with icon 2191 that has a solid border may include solid lines as at 2196 while annotations by the conferee associated with icon 2187 that has a dashed border may include dashed lines as at 2194. While shown as solid and dashed lines and borders, in particularly advantageous embodiments all of the borders and lines use colors to visually distinguish. Thus, in FIG. 106 for instance, all dashed lines and borders may be red while all solid lines and borders associated with document icons, conferee icons and annotations may be blue to help conferees quickly discern who is doing what regarding the session interface.

Figure 107:
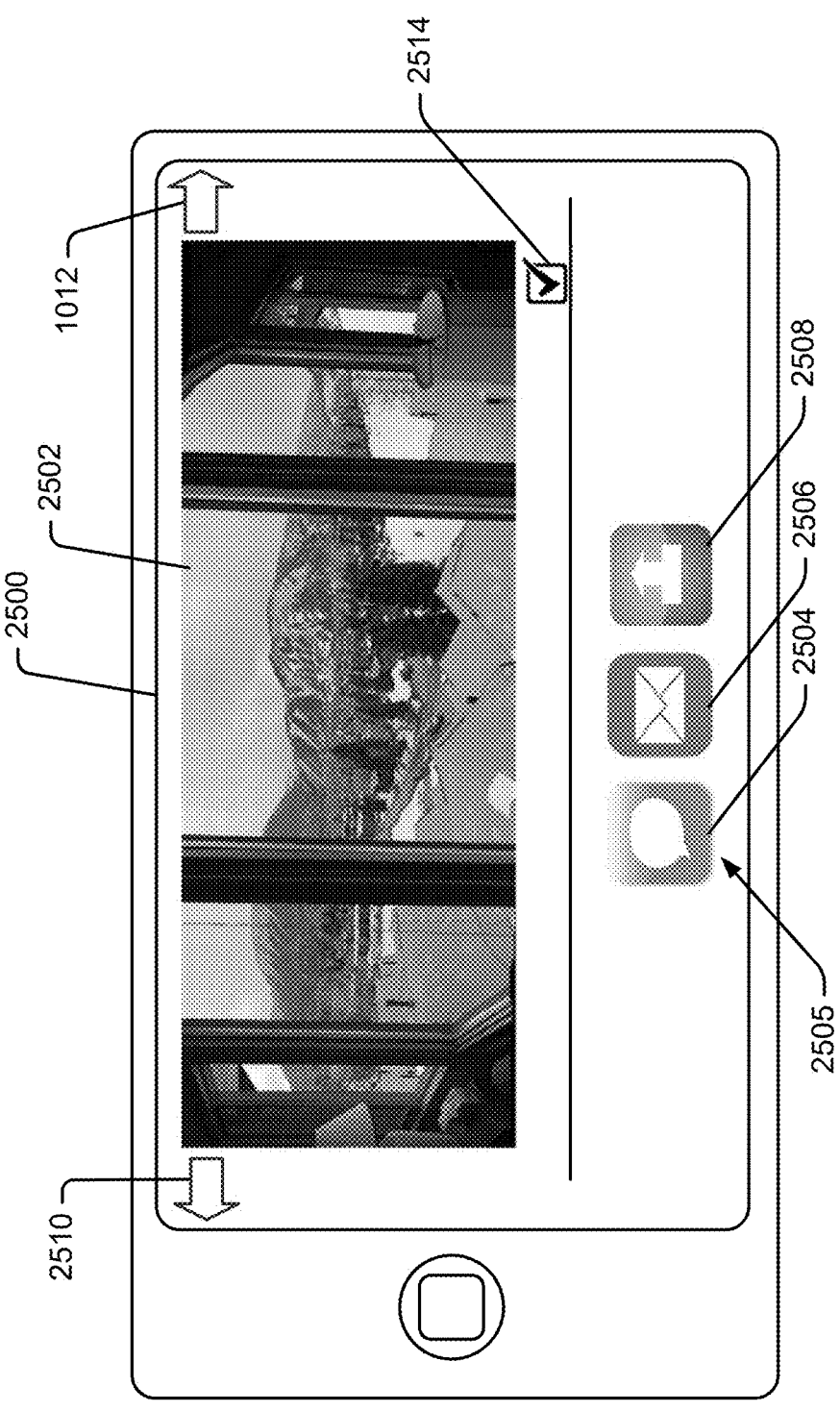
FIG. 107 shows a smart phone type device including an interface for adding an image to a session queue with minimal friction.

It has been recognized that a smart phone or tablet type device or even a camera that is capable of wireless com-munication represent particularly advantageous devices for generating content to be shared in a session. To this end, a session application may be loaded on to a smart phone that enables a conferee to quickly and easily upload images obtained via the phone camera to a session queue. Referring to FIG. 107, in at least some cases a conferee can use a phone camera, digital camera or other device including a digital camera to take one or more pictures/images or video to be added to a queue. Then, when the conferee accesses a conventional image sharing menu 2505 that enables the conferee to share images via a chat application (see chat icon 2504 in FIG. 107), an e-mail application (see e-mail icon 2506) or other sharing applications, a session icon 2508 may be presented along with the other sharing application icons that can be selected to add an image to a session queue.

Figure 108:
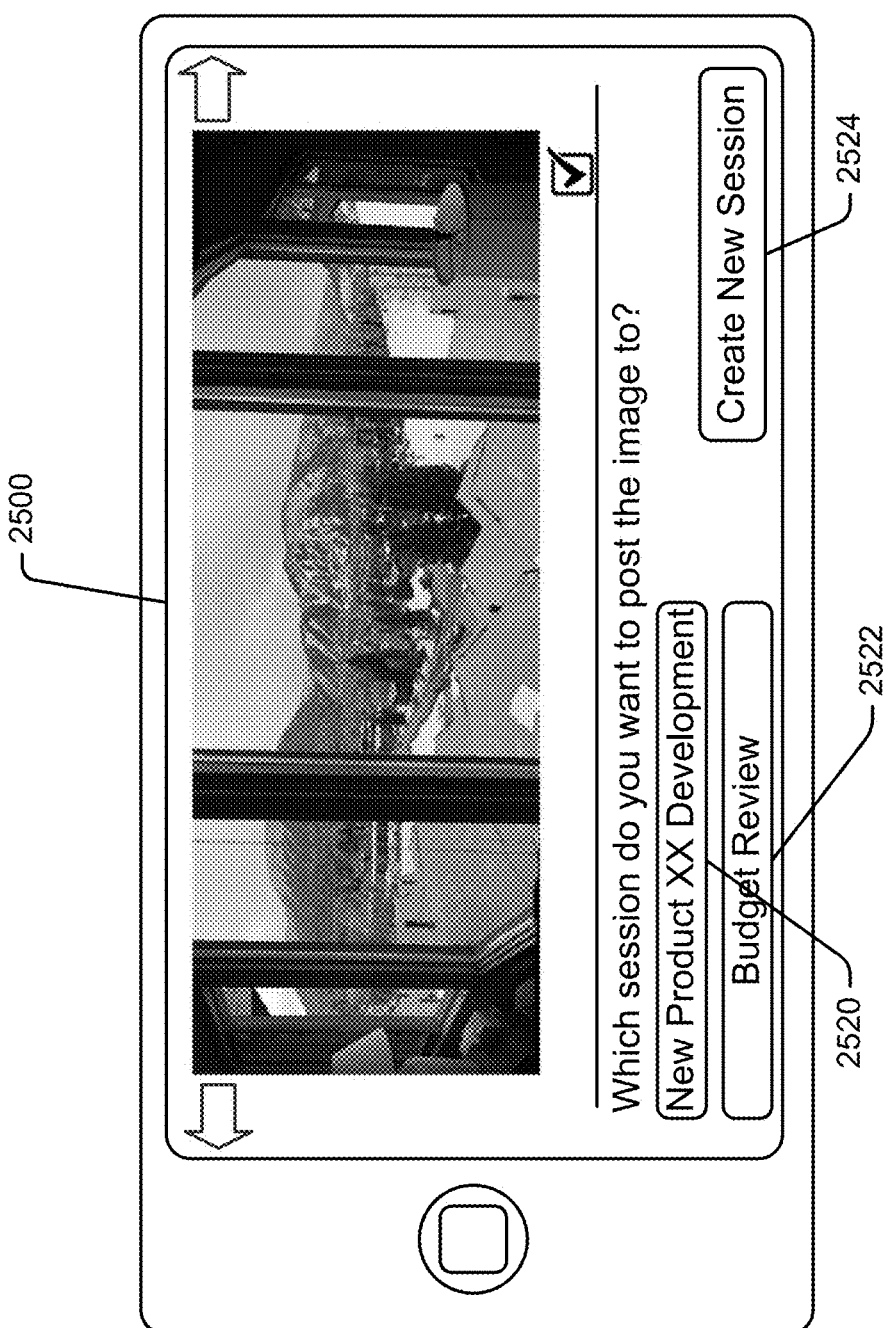
FIG. 108 is similar to FIG. 107, albeit showing the device in an intermediate state where a conferee selects one of several sessions to which to add an image.

To add one or more images to a queue, first the conferee uses screen arrows 2510 and 2512 or some other on screen navigation tool like a swiping action to locate the images to be added to the queue. Images to be added can be tagged via selection of an on screen check box 2514. Once images to add to the queue have been selected, the conferee selects session upload icon 2508. In at least some embodiments, when icon 2508 is selected, an interface for selecting one of several existing session queues or to start a new session queue is provided as shown in FIG. 108. FIG. 108 includes a separately selectable icon 2520 and 2522 for each session that the specific conferee is currently associated with. Thus, each conferee that uses the system may have a different set of session options presented. FIG. 108 also includes a "Create New Session" icon 2524 that can be selected to instantiate a new session with a new session queue to which one or more images can be added.

It has also been recognized that it would be helpful if the conferencing system were able to distinguish new files in a queue from old files. Here, the terms "new" and "old" may mean different things in different systems. For instance, a new document to a specific conferee may mean a document added to the queue since the last time the conferee accessed the session queue. As another instance, a new document to a specific conferee may mean a document that has never been opened while the conferee was logged into a session regardless of whether or not the document was in the queue the previous time the conferee logged into the session. As still one other instance, even if a document has been viewed by a conferee, if the document has been changed via annotation, addition of a note, etc., the document may be considered "new" to a conferee.

In at least some embodiments documents that are new to a conferee may be highlighted or otherwise visually distin-guished in some fashion. For instance, in FIG. 109, docu-ments 2550 that have been added to the session queue 1776 since the last time Jamie White accessed the queue are shown highlighted in cross hatch. In the alternative, the cross hatched document icons 2550 may indicate documents that have never been opened while Jamie White was logged into a session or documents that have at least been changed since Jamie White was last linked to a session. In some cases documents newly added to the queue may be visually distinguished (e.g., shown in different color) in a fashion different than documents that have been changed and/or documents that have been in the queue for some time but that have never been opened while a particular conferee was logged onto a session. For instance, for a first conferee, newly added documents may be highlighted red, changed documents may be highlighted blue and old documents never opened while the first conferee was logged on to a session may be highlighted green.

Where several conferees are logged into a session at the same time, the highlighting to indicate "new" documents may be different for each conferee. For instance, a first conferee may have been logged in for each of five confer-ences related to a session while a second conferee only logged in for two of the five. In this case it is highly likely that the first conferee has viewed more queue documents than the second conferee and therefore the second conferee would have more document icons highlighted as "new" than the first conferee.

Instead of highlighting new documents in the session queue, the system may present two queues, one including new documents and the other including old documents. In this case the interface including both queues may look a lot like the interface in FIG. 86 except that the queues 2172 and 2174 would be labeled "old" and "new" instead of "session" and "private." In still other embodiments it is contemplated that a third category of documents may be distinguished by the system including, for instance, documents in the queue but never opened while a specific conferee was logged onto the system, but that were reviewed by other conferees in a prior sharing session. This third category may be visually distinguished (e.g., highlighted using a third color) or presented in a third suitably labeled queue. A fourth category may include documents viewed by a sharing sub-set of session conferees since the last time a specific conferee participated in a conference associated with the session. This would help a conferee understand what was missed during a recent conference.

In some embodiments a conferee may be able to cause the system to highlight documents added to a queue by that conferee or any one conferee or sub-set of conferees so that those documents can be easily distinguished. For instance, see FIG. 109 where each document icon 2552 added to the queue by Jamie White is shown with a shadow box. Highlighting icons for a conferee may be automated where icons added by each conferee are automatically highlighted in some fashion on the device used by the specific conferee. In other cases a conferee may be able to select (e.g., double click) a conferee icon (see 2555 in FIG. 109) in the conferee queue 1778 to cause the system to highlight all documents added to the session queue by that conferee. For instance a conferee could select icon 2555 to highlight icons in queue 1776 associated with documents added to the queue by the conferee associated with icon 2555.

It has further been recognized that it would be advantageous for at least some conferees to be able to look back at session conferences/meetings and see the sequence of various aspects of document manipulation. For instance, a conferee may want to see the sequence by which documents have been added to a session queue, the sequence in which documents have been accessed in session conferences, who posted and who accessed the documents, etc. To this end, in at least some embodiments a "History" icon 2548 as shown in FIG. 109 may be included on a session screen that can be selected to access a history function of the system.

Figure 109:
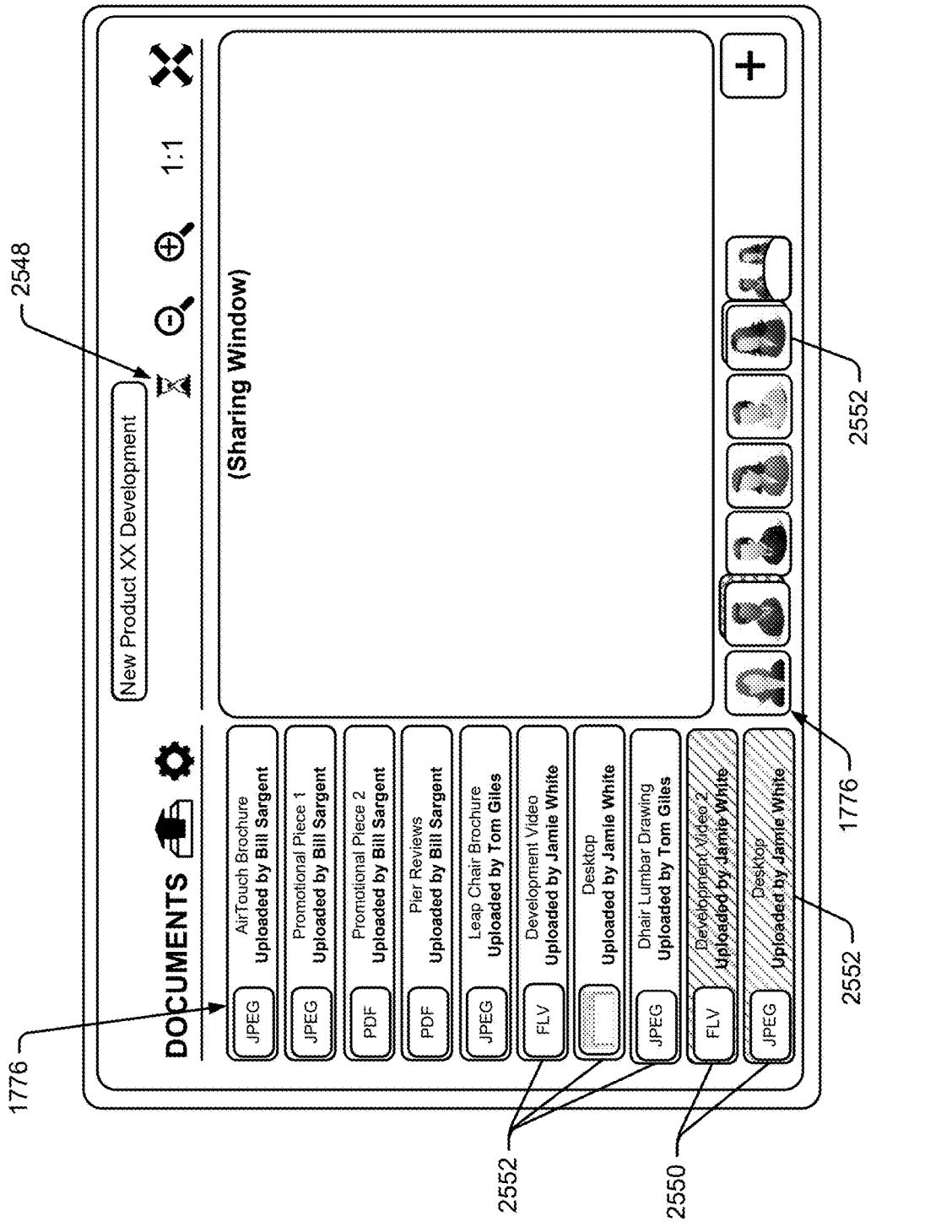
FIG. 109 is a screen shot showing highlighting of a specific conferee's documents in a queue as well as highlighting of documents that are "new" to the conferee associated with the device used to present the screen shot.
Figure 110:
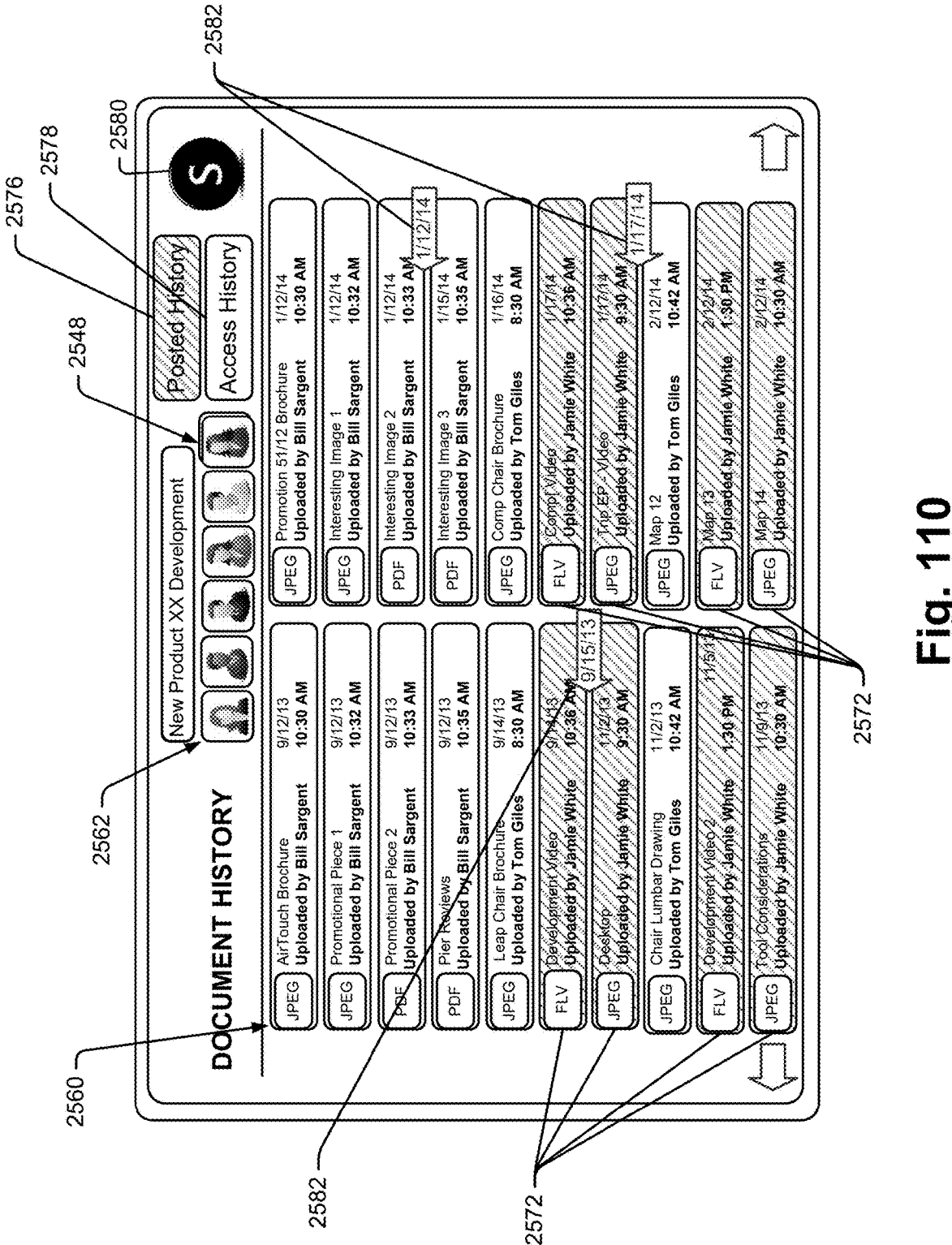
FIG. 110 is a screen shot showing a history view of a session.

When icon 2548 is selected, referring also to FIG. 110, the system may present a document history screen for viewing different aspects related to document sequencing. As shown, the view includes a document list 2560 showing the date and time documents where added to the queue. The view also includes a conferee queue 2562 showing images or video of each conferee currently linked to a session. In the alternative, the queue 2562 may show all conferees that ever participated in a session regardless of whether or not the conferee is currently linked to the session. Here, as in FIG. 109, a conferee may be able to highlight all documents in queue 2560 added to the queue by a specific conferee by selecting the conferee's icon in queue 2562. In FIG. 110, the conferee icon 2570 associated with Jamie White has been selected and is highlighted with a shadow box and document icons 2572 in queue 2560 that were added by Jamie White are shown highlighted with cross hatching to distinguish those documents from others in the queue.

Meeting icons 2582 are also provided on the view that indicate specific points in time at which session conferences occurred. Here, a session conference may include any session during which two or more conferees were logged on to a conference at the same time, during which more than half of the conferees associated with a session logged on, during which one or more documents have been shared among at least two or more conferees, or any other criteria that indicates a threshold level of activity. Each icon 2582 may operate as a hyperlink to other information about a session conference including a list of conferees that attended, documents reviewed and applications run, times related to document sharing and a log of additional activities.

Referring still to FIG. 110, the view includes a "session" icon 2580 for switching back to a session view as shown in FIG. 109. A "Posted History" icon 2576 is included for selecting the posted queue 2560 shown in FIG. 110. An "Access History" icon 2578 is provided for accessing another view of the document history that shows which documents were accessed and when. To this end see the view in FIG. 111 where document icons are arranged in an access queue 2600 that sequentially shows when (date and time) documents were accessed and by whom.

Figure 112:
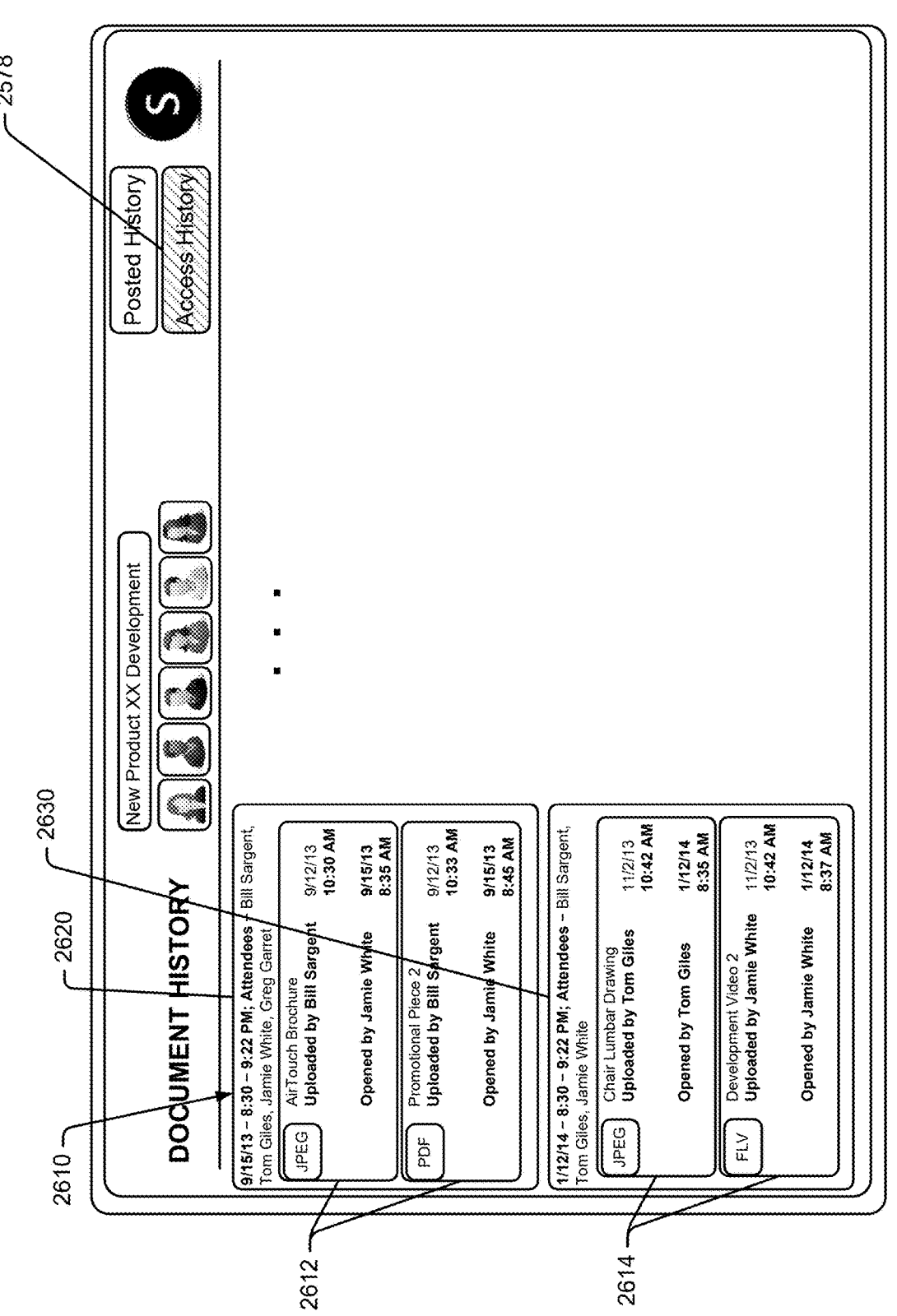
FIG. 112 is a screen shot showing a different session history view.

Referring to FIG. 112, another access view includes a document queue 2610 that arranges document icons by session conference. For instance, queue 2610 includes a first meeting entry 2620 and a second meeting entry 2630 where icons 2612 associated with documents accessed during the first meeting and icons 2614 associated with documents accessed during the second meeting are presented in the first and second meeting entries 2620 and 2630, respectively.

Figure 111:
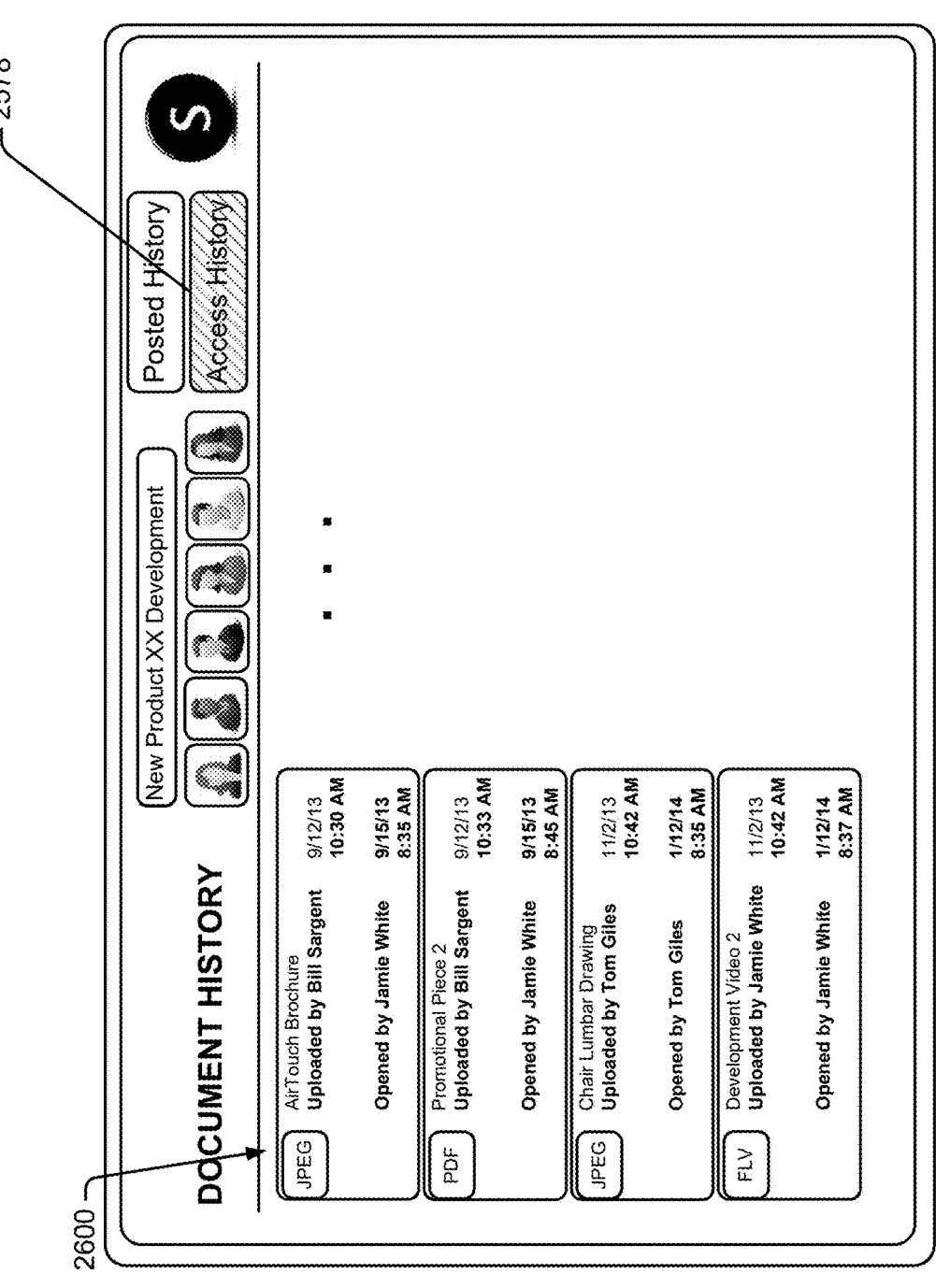
FIG. 111 is a screen shot showing a different session history view.
Figure 113:
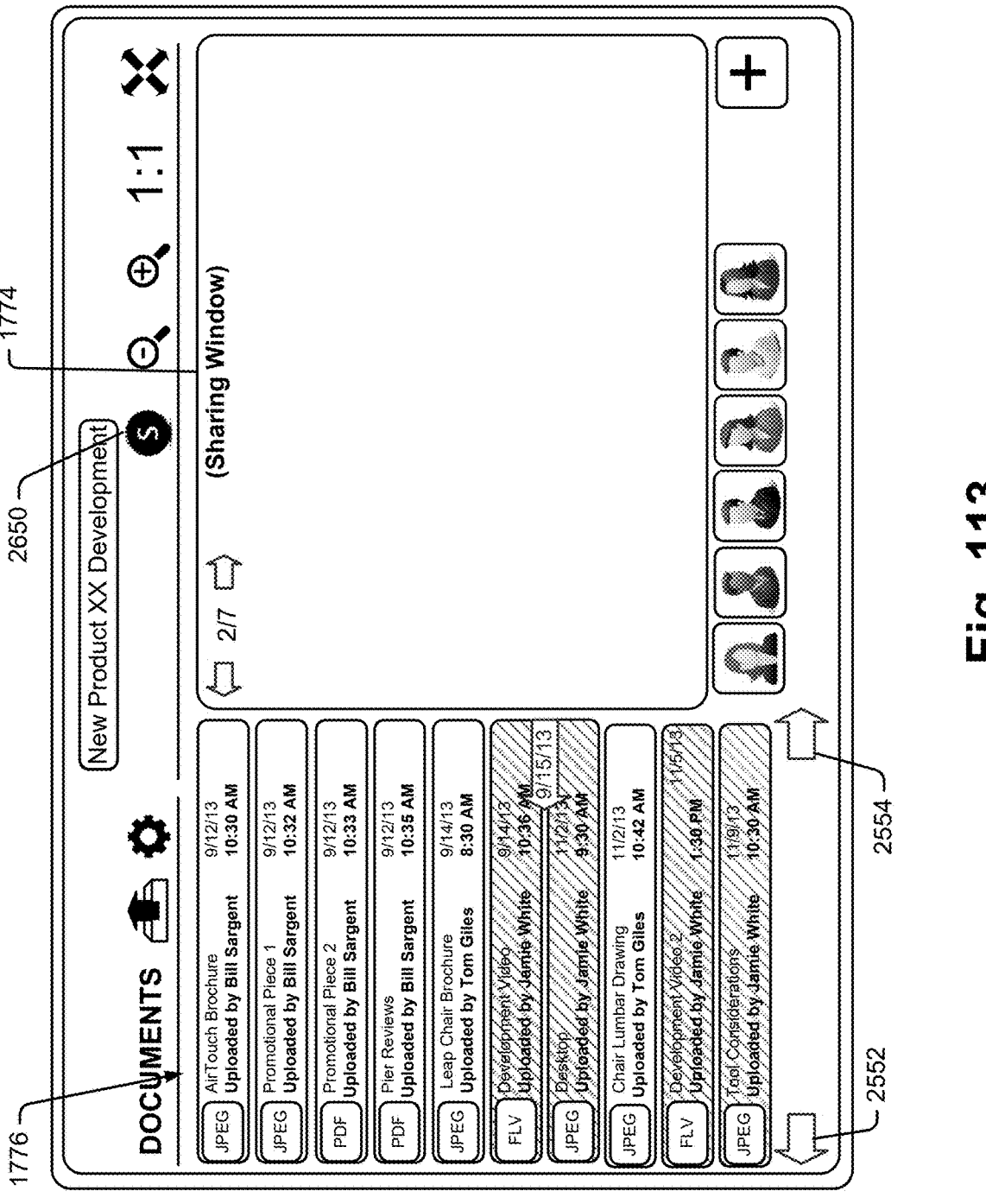
FIG. 113 is a screen shot showing a different session history view.

In any of the historical views shown in FIGS. 110 through 112, it is contemplated that any of the document icons may be selected to open the document associated there with in a private window for viewing privately by a conferee. FIG. 113 shows yet another historical queue view where documents are listed in the order in which they were added to the queue and include date and time information as well as information indicating the conferee that added each document to the queue. Here, the historical queue is located at the location of the session queue and therefore the look and feel of the session view including the sharing window 1774 remains similar to when the session queue is presented. A conferee can switch between the FIG. 113 view and the FIG. 109 view by selecting icons 2650 and 2548. The system described above offers may advantages over known conferencing systems. First, the disclosed system enables a conferee to schedule or start a current session with a plurality of other conferees easily and intuitively using email or some other simple interface system.

Second, the system enables conferees to add content including documents and files to a session queue at any time including prior to a session conference, during a session conference or after a conference has ended. The queue can persist indefinitely and operate as a repository for any content that may be of interest to conferees that participate in a session. The queue can be added to or trimmed down to only maintain what is important to conferees at any time.

Third, in at least some cases the system enables any conferee to add new conferees to a session without requiring consent from any other conferees and without disturbing other conferees associated with a session. For instance, where five people are participating in a session conference, a first of the five can invite a sixth conferee independent of the other four conferees. As another instance, the first conferee could initiate a separate session conference with the sixth conferee without the other four conferees attending so that the first conferee could get the sixth conferee up to speed on session activities independent of the other conferees.

Fourth, in at least some embodiments, any conferee can add additional display screens or devices to a session independent of other conferees and without disturbing other conferees. For instance, a first conferee using a hand held device like a smart phone, a tablet, etc., may, during a session conference, move to a location where the first conferee has access to a large flat panel display screen. Recognizing the advantage of viewing a session via a large display screen, the first conferee can invite the screen via an address or identifier associated with the screen to the session conference. Thereafter, shared documents and files are also presented on the large screen that was added to the session.

Fifth, the system may help a conferee find an available large display screen that can be invited to a session. To this end, the locations of many personal devices can be tracked as a user moves about in a building, on a campus, etc. when a conferee logs on to a session or prior to when a conferee is scheduled to attend a session, the system may identify the location of the conferee's device as well as the locations of available large display screens and may offer to schedule or commence use of one or more screens by the conferee during the session.

Sixth, at least some embodiments of the disclosed system enable each conferee to separately view queued session documents in private windows while still having the ability to view a currently shared document in a sharing window. This enables each conferee to view and examine one document when the conferee independently determines that the document may be of interest without disturbing other conferees.

Seventh, in some embodiments private queues are provided for each conferee to enable conferees to gather possible documents for a session without worrying about others viewing the documents and either being confused or passing judgment. Private queue documents can be shared subsequently in session in a sharing window and may be moved to the session queue for access by all.

Eighth, in some systems all queued documents are cached by all conferee devices that link to a session to expedite sharing, moving between documents, etc. When a session is over, the cached documents are removed from the conferee device memories and instances of the queued documents are only persistently stored by the session server.

Ninth, in at least some embodiments, conferees can share their device desktops (e.g., the current screen shot on their device display) with other conferees in a sharing window. Here, as in the case of sharing documents, any conferee can assume control of the sharing window from other conferee simply by opening the conferee's desktop in the sharing window.

It has further been recognized that once a server or set of system servers have access to space/affordance specifications, space and employee or conferee schedules, session schedules and session content, other useful services and products can be provided for helping people manage their time efficiently and effectively. For instance, one additional service may be a day planner service that helps a user plan her daily activities based on her schedule, tasks to perform, available space and affordances, locations of other people, etc. In this regard, assume that, in addition to scheduled activities like conference session, telepresence meetings, appointments, etc., a first employee has a weekly list of aspirational tasks that the first employee would like to accomplish during the week during unscheduled time periods. Here, the phrase "aspirational tasks" is used to refer to tasks that the first employee wants to accomplish but that have not formally been associated with a time slot during which to complete the tasks. Here, if a task is not accomplished, the task simply remains on the list until affirmatively removed by the first employee. The first employee's task list may be updated at any time and a system server may automatically schedule a recurring time for the first employee to update the task list by adding tasks, deleting tasks, reprioritizing tasks, etc. For example, the recurring time may always be at 9 AM on Saturday morning. In other cases, a system server may recognize when the first employee has some unscheduled time in her schedule and may present the task list for consideration and updating during an unscheduled period. In some cases where the first employee wants to see her task list once a week, the server may wait until the next unscheduled period after 7 days has passed since the last time the first conferee considered her task list and may present the list or a link (e.g., a hyperlink via an e-mail notice) to the task list for consideration at that time.

For the purposes of this example, assume that for Lisa Dempsy, the first employee, a task list includes (1) Individually review session 00001 content; (2) Review session 00003 content with John Sargent prior to the end of the week; (3) Teleconference with Tom Giles; (4) Confer with Jamie White-Session 00004; and (5) Make travel arrangements for June trip to Shanghai; and (6) Call ABC corporation purchasing agent about new agreement. Also assume that a server is programmed to review the first employee's schedule every morning at 8 AM and to suggest activities for unscheduled periods. Also assume that the first employee's schedule indicates that, on Tuesday, May 6, the first employee has several scheduled activities but that there are first and second one hour periods open in the first employees schedule between 9 AM and 10 AM and between 3 PM and 4 PM, respectively In at least some embodiments of the present disclosure, the system server that manages the day planner service may be programmed to identify the first and second open periods and identify the tasks in the first employee's task list and may suggest one or more of the task list tasks to fill one or more of the first and second open periods. In addition, the server may be programmed to use the first conferee's schedule to identify the first employee's locations during the first and second open periods and may also access a facility space schedule and identify open spaces proximate the scheduled locations for the first employee during the first and second open periods. The server may also identify resources or affordances associated with the open spaces. The server may also examine the tasks on the task list and determine if any particular resources are required or may be optimal for facilitating any of the tasks. For instance, in the case of the second exemplary task above (e.g., Review session 00003 content with John Sargent prior to the end of the week), a space including at least one large common display screen may be optimal, in the case of the third exemplary task above (e.g., Teleconference with Tom Giles), a space including a telepresence system including a camera, speakers, special lighting and a large display screen may be optimal.

In this example, the server may send an e-mail to the first conferee at 8 AM each day as scheduled indicating open schedule times during the day for the first employee as well as the first employee's task list supplemented by additional information such as a suggested space or spaces for at least a subset of the tasks on the list that are optimized and located near where the first employee is scheduled to be during an associated unscheduled time slot. Where a task requires one or more employees or other persons in addition to the first employee, the system may also automatically check schedules for each of the other employees and select a time slot for the task based at least in part on the schedules of multiple employees. Thus, in the example described above, a system server may, for each open slot or period in the first employee's schedule for a specific day, present a list of task options that may be slotted for the open time where the resources required or needed to optimize use of the time for the specific tasks are all available.

Figure 115:
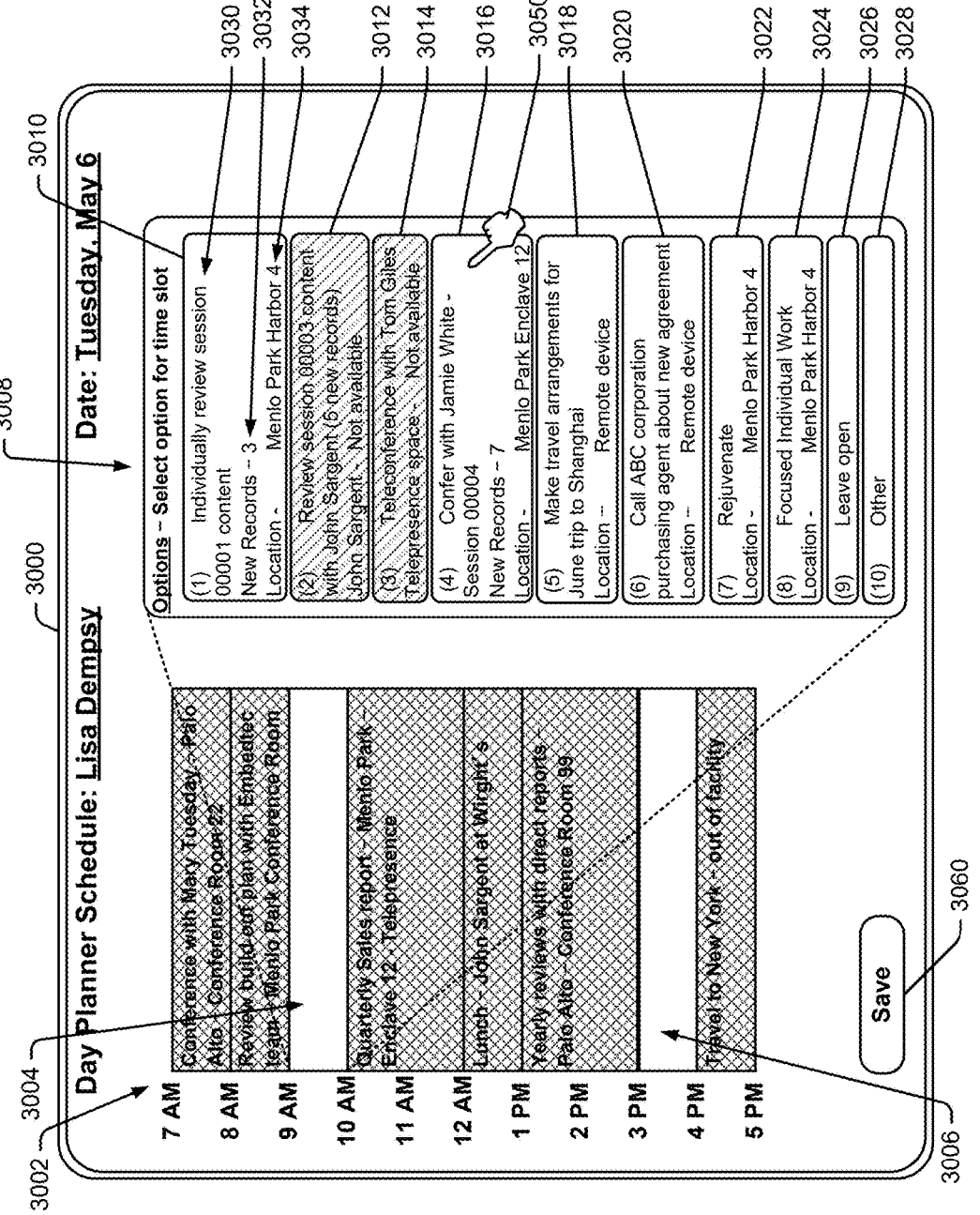
FIG. 115 is a screen shot that shows a day planner screen shot that is consistent with at least some embodiments of the present disclosure.

Referring to FIG. 115, one exemplary day planner service may generate an e-mail that includes a hyperlink to a scheduling browser window or screen shot as shown at 3000. The browser window 3000 indicates the first employee's day schedule at 3002 with existing appointments shown as double cross hatched and the two one hour open slots or periods at 3004 and 3006 as clear to indicate "free time" or unscheduled periods. As shown, the screen shot also includes a list 3008 of tasks and other options for the first open schedule time slot 3004 for the Lisa Dempsy, the first employee, where the list 3008 is spatially or graphically associated with the schedule time slot 3004. Consistent with the above example, list 3008 includes first through sixth tasks labeled 3010, 3012, 3014, 3016, 3018 and 3020. Each task is shown as a separate selectable virtual icon or button which can be selected via a mouse or otherwise controlled virtual pointer 3050. The first task 3010 on the list includes a task description 3030, a content descriptor 3032 and a suggested location 3034 for facilitating the task.

In FIG. 115, the descriptor 3030 indicates "Individually review session 00001 content" which means that Lisa Dempsy intends to review session 00001 content by herself. The content descriptor 3032 indicates that three new records have been added to the session 00001 content queue since the last time Lisa Dempsy accessed the session 00001 content. Although not shown, the content descriptor may include additional information such as the types (e.g, presentations, word processor documents, photos, videos, web site links, etc.) of the three new records, who posted the three new records, when each of the three new records was posted, etc. Other content descriptor information may indicate number of records altered and/or deleted by other session participants, a next meeting scheduled that is associated with session 00001, etc.

Location descriptor 3034 indicates a suggested location or space that can be reserved for Lisa Dempsy to facilitate an associated task 3030. Here, the system server will identify a likely optimal location for the task based on, among other things, Lisa Dempsy's scheduled locations just prior to and just after the open time slot 3004 as well as resources needed to complete the task 3030. Here, resources to complete the task may include affordances within a space as well as other employees needed to complete the task. For instance, where a task requires a telepresence system, an identified space would optimally include a telepresence system. In FIG. 115, a space for task 3030 is indicates as "Menlo Park Harbor 4" which is in the same facility as Lisa Dempsy's location prior to and after slot 3004. As another instance, where a task includes Jamie White, a second employee (see task 3016 in FIG. 115), an identified space would for a face to face conference would have to be selected that would be convenient (e.g., proximate) Jamie White during the open time slot. In FIG. 115, a space for task 3018 is indicates as "Menlo Park Enclave 12" which is again in the same facility as Lisa Dempsy prior to and after slot 3004.

In FIG. 115, the second and third tasks on list 3008 are shown cross hatched to indicate that some resource required for each of those tasks is not available during time slot 3004. For instance, task 3012 requires John Sargent who is not available during slot 3004. As another instance, task 3014 requires a space including a telepresence system proximate Lisa Dempsy's location during slot 3004 which is not available. Unavailability of John Sargent and a proximate telepresence system are indicated under the descriptions of each of tasks 3012 and 3014 to indicate why each of those tasks is cross hatched and therefore un-selectable.

For at least some tasks, an employee's personal portable device may work well to complete the task and in those cases, the task may always be presented as a selectable option on list 3008. Thus, for instance, tasks 3018 and 3020 in FIG. 115 are shown as selectable and the location is indicated as "Remote device" meaning that Lisa Dempsy can use her laptop, tablet, smart phone, etc., to facilitate the task.

In addition to the tasks from an employee's task list, other options for an open schedule slot may also be presented. For instance in FIG. 115, additional options include a "Rejuvenate" option 3022, a "Focused individual work" option 3024, a "Leave open" option 3026 and an "Other" option 3028. The "Rejuvenate" option 3022 can be selected to indicate that Lisa Dempsy intends to rest during the open slot 3004. Option 3022 indicates a location or space that can be used to rejuvenate (e.g., "Menlo Park Harbor 4"). The "Focused individual work" option 3024 can be selected to indicate that Lisa Dempsy intends to perform some type of individual work activity. Option 3024 indicates a location that can be used to facilitate focused work, again, Menlo Park Harbor 4.

Leave open option 3026 can be selected to simply leave unscheduled time slot 3004 open. Other option 3028 can be selected to specify some other activity during slot 3004.

Figure 116:
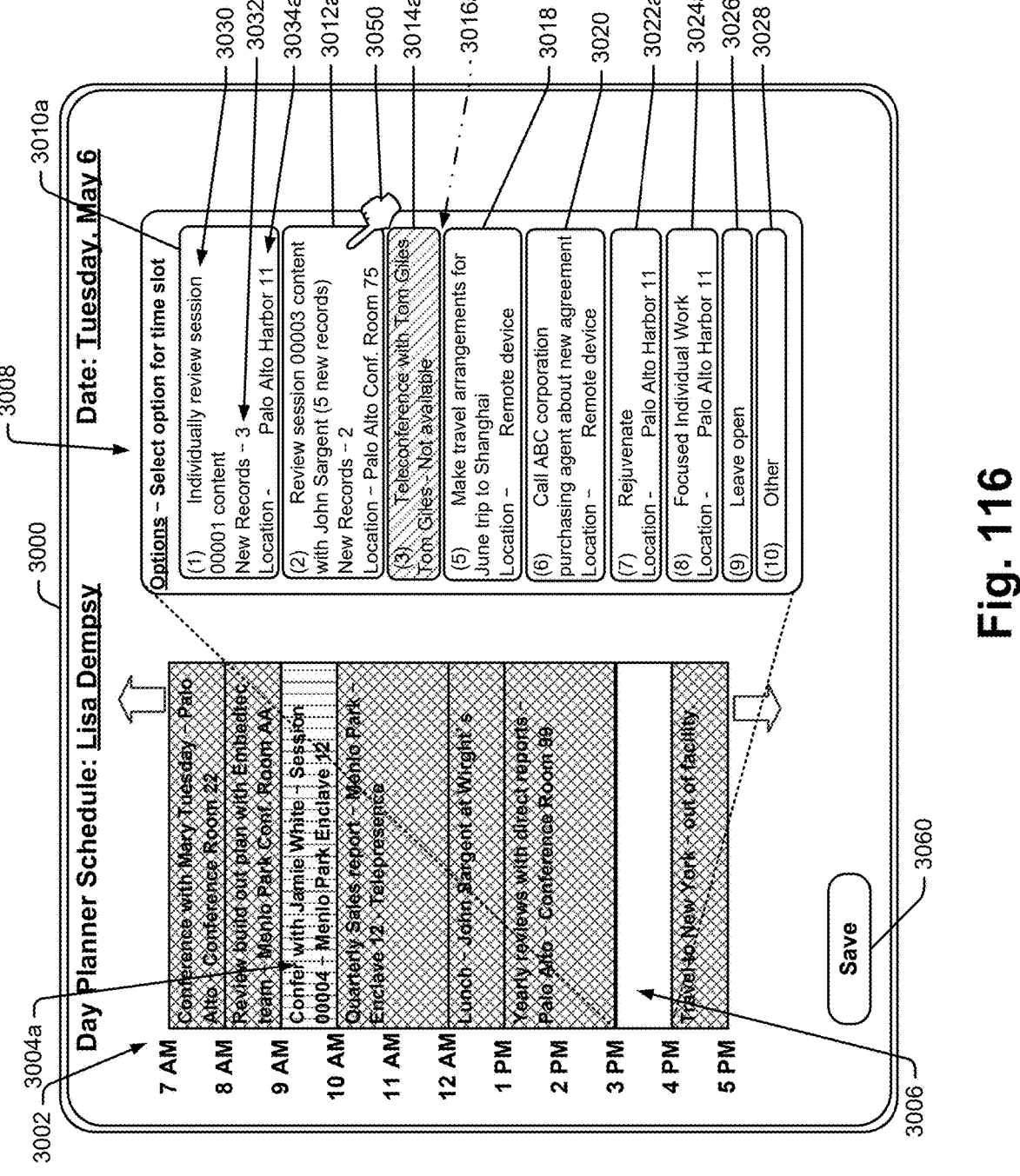
FIG. 116 is similar to FIG. 115, albeit showing the screen shot at a different time during a day planning process.

Once an option from list 3008 is selected for slot 3004, the option is entered into the slot 3004 and the appearance of the slot is altered to indicate a different status. To this end, where the conference with Jamie White option 3016 in FIG. 115 is selected, the browser window is updated to have the appearance shown in FIG. 116 where the Jamie White conference has been entered into the schedule and removed from the option list 3008. In FIG. 116, window features that are different than the FIG. 115 features are labeled with the same number as in FIG. 115 followed by an "a" qualifier (e.g., 3004a as opposed to 3004). In FIG. 116, slot 3004a is shown as vertically cross hatched to indicate a tentatively scheduled conference. Here, the conference with Jamie White is only tentatively scheduled as it requires acceptance of a request for the conference from Jamie White. In this regard, when option 3016 is selected in FIG. 115, in addition to placing that option 3016 in the slot 3004a, a system server sends a request for the conference to Jamie White. Once the request is accepted, the appearance of slot 3004a is altered to indicate a fully scheduled task.

Referring still to FIG. 116, after a task or other option has been selected for slot 3004a, the browser window is updated by removing the selected task from the task list 3008 (see that the task no longer appears at 3016a. In addition, the system server alters window 3000 to guide Lisa Dempsy to consider the next iopen slot 3006. As shown, the window presents all options available for slot 3006 in list 3008. Comparing FIGS. 115 and 116, it can be seen that list information has changed appreciably. In this regard, see that at the time associated with slot 3006, Lisa Dempsy is no longer located at the Menlo Park facility and instead is at the Palo Alto facility. Thus, the location information associated with each of the tasks and options in FIG. 116 indicates a space at the Palo Alto facility as opposed to the Menlo Park facility. To this end, compare versions of the first task at 3010 and 3010a where the location information associated with the first task changes as a function of the first employee's location at different times during the day.

Referring still to FIG. 116, comparing versions 3012 and 3012a of the second task in the list in FIGS. 115 and 116, respectively, it can be seen that while John Sargent was unavailable during the first unscheduled slot 3004 in FIG. 115, John Sargent is available during the second slot 3006 shown in FIG. 116 (e.g., the second task 3012a is not cross hatched in FIG. 116). In addition, a location for the review with John Sargent is presented as part of the task specified at 3012*a*.

Referring yet again to FIGS. 115, comparing versions 3014 and 3014*a* of the third task in the list, it can be seen that while the conference with Tom Giles does not work out during either of the first or second unscheduled time slots, the reason why the conference does not work out in each of those cases is different. In version 3014, the conference did not work out because no teleconference space was available during slot 3004 while in version 3014*a* the conference does not work out because Tom Giles is not available. In FIG. 116 the locations associated with options 3022*a* and 304*a* are modified to reflect the different location of Lisa Dempsy just before and after slot 3006.

Once Lisa Dempsy is finished selecting tasks and options for slots in her Daily schedule, "save" icon 3060 can be selected to store the selections. After selections are stored, in the case of tasks that involve session content review, just prior to the scheduled time slot, session content may be cached within a memory associated with the space so that when Lisa Dempsy enters the space at the scheduled time, the session content can be quickly accessed and reviewed.

While not shown, it is contemplated that tasks on an employee's task list may be prioritized in some fashion so that when tasks are presented to the employee each morning at 8 AM, high priority tasks are placed at the top of the list. Similarly, a due date/time may be assigned to some or each of the tasks on a task list in some embodiments where the date/time specify at least a target time at which the task should be completed. Here, the date/time may be used by a system server to prioritize tasks within a list or even to reduce a task list down to a smaller number of high priority tasks based on when they need to be accomplished.

While described as a day planner service, it should be appreciated that the task presentation process may be performed at other times such as, for instance, weekly, monthly, etc. In addition, while the task list is described above as being presented at a specific time each day, in other embodiments the time at which the list is presented may depend upon some sensed or perceived parameter. For instance, where a service user is scheduled to be in a meeting at the time the task list is to be presented, a system server may delay presenting the task list until the user has some unscheduled time to consider the list. As another instance, where the service user is scheduled at the time the task list is to be presented, the server may identify an earlier time temporally proximate the time at which the list is to be presented and may present the list at the earlier time. In still other cases, real time sensed activities of the service user may be sensed via cameras or other sensor devices within space and the list may be presented at a time at which a server discerns that the user is free to consider the list and her schedule. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Thus, the invention is to cover all modifications, equivalents, and alternatives falling within the spirit and scope of the invention as defined by the following appended claims. To apprise the public of the scope of this invention, the following claims are made:

What is claimed is:

1. A method of facilitating a collaboration session among a plurality of conferees, each conferee using an interface device that includes a display screen, the method comprising the steps of:

presenting a session interface on each interface device that is linked to a content sharing session wherein each session interface includes a content sharing window and a public file queue, each public file queue including content representations, each content representation in the public file queue associated with a file that is available for viewing during the conference session;

upon selection of a content representation from the public file queue for sharing via any one of the interface devices, presenting the file associated with the selected content representation via each of the content sharing windows;

upon selection of a content representation from the public file queue for private viewing via any one of the interface devices, presenting the file associated with the selected content representation via a private window on the interface device display screen of the one of the interface devices; and wherein, any interface device may select and share any file associated with any content representation in the public file queue and any interface device may select and privately access any file associated with any content representation in the public file queue.

2. The method of claim 1 wherein at least a subset of the files in the public file queue include multiple pages of content and wherein, upon presenting one of the files that includes multiple pages of content in the content sharing windows, each interface device enables an employee to change which page of the multiple content file is presented in the content sharing window in an egalitarian fashion.

3. The method of claim 1 wherein at least first and second interface devices can simultaneously open separate first and second instances, respectively, of any of the files associated with content representations in the public file queue for private viewing by first and second conferees, respectively.

4. The method of claim 3 wherein at least a subset of the files in the public file queue include multiple content pages and wherein different pages of a first multiple page content file may be simultaneously viewed via the first and second interfaces.

5. The method of claim 1 wherein conferees post files to the public file queue for access during a session and wherein the method further includes providing a conferee identifier for each of the files in the public file queue indicating which conferee posted the file to the public file queue.

6. The method of claim 1 wherein at least a subset of the files in the public file queue include multiple pages of content and wherein, upon presenting one of the files that includes multiple pages of content in the content sharing windows, each interface device enables an employee to change which page of the multiple content file is presented in the content sharing window in an egalitarian fashion.

7. The method of claim 1 wherein at least a subset of the interface devices enable a conferee to annotate content presented in the content sharing window on the interface device used by the conferee, any annotations made to content in the sharing window on the interface device used by the conferee replicated in the other content sharing windows on the other interface devices.

8. The method of claim 7 wherein annotations to content are stored as annotations to the files that include the content.

9. The method of claim 7 wherein first and second of the interface devices can be used to simultaneously make annotations to content in the content sharing windows.

10. The method of claim 7 wherein a different color is associated with each of the conferees and wherein annotations by a specific conferee show up in the color associated with the conferee on all of the content sharing windows.

11. The method of claim 1 wherein at least a subset of the interface devices enable a conferee to annotate content presented in the private window.

12. The method of claim 11 wherein a conferee is capable of moving content from a private window to the content sharing windows.

13. The method of claim 12 wherein annotations added to content in a private window are moved along with content to the content sharing windows when content from the private window is moved to the content sharing windows.

14. The method of claim 1 wherein a separate conferee is associated with each of the interface devices and wherein each interface presents an indication of each of the conferees that is associated with one of the interface devices that is linked to the session.

15. The method of claim 14 wherein each interface device is associated with a camera for obtaining video of an associated conferee during the session and wherein each indication of a conferee includes a live video representation of the conferee.

16. The method of claim 14 further including visually distinguishing the indication of the conferee that is associated with the conferee that most recently modified the content in the content sharing spaces.

17. The method of claim 1 wherein the at least a first common display screen also presents the file queue for viewing within the conference space.

18. The method of claim 1 wherein a separate conferee is associated with each of the interface devices and wherein the at least a first common display screen also presents an indication of each of the conferees that is associated with one of the interface devices that is linked to the session.

19. A method of facilitating a collaboration session among a plurality of conferees, each conferee using an interface device that includes a display screen, the method comprising the steps of:

presenting a session interface on each interface device that is linked to a content sharing session wherein each session interface includes a content sharing window and a private file queue that is unique to the interface device, each private file queue including content representations, each content representation in the private file queue associated with a file that is available for viewing during the conference session;

upon selection of a content representation from the private file queue for sharing via any one of the interface devices, presenting the file associated with the selected content representation via each of the content sharing windows;

upon selection of a content representation from the private file queue for private viewing via any one of the interface devices, presenting the file associated with the selected content representation via a private window on the display screen of the interface device used to select the content representation without presenting the file in the content sharing windows; and wherein, any interface device may be used to select and share any file associated with any content representation in the private file queue presented by the interface device and any interface device may be used to select and privately access any file associated with any content representation in the private file queue presented by the interface device.

20. A method of facilitating a collaboration session among a plurality of conferees, each conferee using an interface device that includes a display screen, the method comprising the steps of:

presenting a session interface on each interface device that is linked to a content sharing session wherein each session interface includes a content sharing window and a private file queue that is unique to an associated interface device, each private file queue including content representations wherein each content representation in the private file queue is associated with a file that is available for viewing during the conference session, each interface further including a common public file queue, each public file queue including content representations wherein each content representation in the public file queue is associated with a file that is available for viewing during the conference session;

upon selection of a content representation from either one of the private file queue or the public file queue for sharing via any one of the interface devices, presenting the file associated with the selected content representation via each of the content sharing windows;

upon selection of a content representation from either one of the private file queue or the public file queue for private viewing via any one of the interface devices, presenting the file associated with the selected content representation via a private window on the display screen of the interface device used to select the content representation without presenting the file in the content sharing windows; and wherein, any interface device may be used to select and share any file associated with any content representation in either the private file queue or the public file queue presented by the interface device and any interface device may be used to select and privately access any file associated with any content representation in either the private file queue or the public file queue presented by the interface device.

* * * * *